United States Patent

[11] 3,582,071

[72] Inventors Herbert D. Grosvenor;
Robert Torresen, both of Muskegon, Mich.;
Jerome F. Walker, Kirtland, Ohio

[21] Appl. No. 612,568
[22] Filed Jan. 30, 1967
[45] Patented June 1, 1971
[73] Assignee Brunswick Corporation

[54] BOWLING SCORING SYSTEM
13 Claims, 45 Drawing Figs.

[52] U.S. Cl. .......... 273/54, 235/92
[51] Int. Cl. .......... A63d 5/00
[50] Field of Search .......... 273/43, 43 A, 54 C, 54 D; 235/92 26

[56] References Cited

UNITED STATES PATENTS

| | | | |
|---|---|---|---|
| 3,484,107 | 12/1969 | Hoffman et al. .............. | 273/54 C |
| 3,189,349 | 6/1965 | Mentzer .............. | 273/54 C |
| 3,219,345 | 11/1965 | Rogers .............. | 273/54 D |
| 3,435,120 | 3/1969 | Cornell et al. .............. | 273/54 C |

*Primary Examiner*—Anton O. Oechsle
*Attorney*—Hofgren, Wegner, Allen, Stellman and McCord

ABSTRACT: An automatic bowling scoring system for multiple lane use including a single computer and associated peripheral systems including provisions for handling such situations as (1) out of range pins; (2) illegal balls; (3) the spotting of a new setup of pins without computer cycling; (4) error correction and handicap entry through a single system; (5) erroneous attempts to change bowler identification before the bowler completes a frame; (6) the lack of bowler identification; (7) peculiar 10th frame situations; and (8) erroneous bowler identification; and which further includes time saving features as printer positioning extrinsically of computer operation and the permitting of a bowler to bowl the second ball in a frame even if the computer has not utilized the first ball information.

Inventors:
Herbert D. Grosvenor,
Robert Torreson
Jerome F. Walker
By Hofgren, Wegner,
Allen, Stellman & McCord Att'ys

BOWLING SCORING SYSTEM

BACKGROUND OF THE INVENTION

There have been a number of proposals of bowling scoring apparatus in the past. However, none are yet known to be commercialized due to their lack of reliability, economic impracticality, inflexibility or their inability to perform functions required in a practical sense over and above the mere keeping of a bowling score. Accordingly, there is a need for a reliable, economically feasible, flexible bowling scoring system that can perform virtually any function desired by a bowler.

SUMMARY OF THE INVENTION

One object of the invention is the provision of a computing device for computing bowling scores bowled on a plurality of lanes wherein manually operable means are utilized for identifying a bowler to the computer, together with means for locking the manually operable means in a bowler identifying position after they have been utilized to identify a bowler and means for disabling the locking means only after the bowler has completed a frame such that bowler identification to the computer cannot be changed between the rolling of the first ball in a frame and the end of the computation of the bowler's score following the last ball in the frame.

Another object of the invention is the provision of a computer for computing bowling scores including manually operable means that may be manipulated by a bowler for identifying himself to the computer, an automatic pinsetter having a rake and means for stopping the automatic pinsetter with the rake down after the last ball in a frame has been bowled such that a subsequent bowler will be reminded to identify himself to the computer.

Yet another object is the provision of such a pinsetting and computer combination and including means for preventing the pinsetter from stopping with its rake down after the first ball in a frame when a bowler has identified himself to the computer and another ball must be rolled to complete the frame.

A still further object of the invention is the provision of such a pinsetter and computer combination wherein the preventing means includes means operative in the tenth frame for precluding such pinsetter stopping irrespective of pinfall values achieved by any ball other than the last ball in the tenth frame.

Another object of the invention is the provision of such a computer including such manually operable means for bowler identification wherein failure to operate the manually operable means will not provide the computer with any bowler identification whatsoever such that pinfall achieved when a bowler has not identified himself to the computer will not be credited to the previous bowler and means for causing the pinsetter to be stopped with its rake down to remind the bowler that identification is required, whereby operation of the manually operably means by the bowler in response to the reminder will cause the pinfall achieved when no identification was present to be credited to the bowler identifying himself to the computer.

Another object of the invention is the provision of a computer for computing bowling scores, a printer positionable in a plurality of positions relative to a score sheet for printing bowling scores computed by the computer, and manually operable bowler identification means for identifying a bowler to the computer and for positioning the printer at a preselected position relative to the score sheet.

Another object is the provision of a computing device for computing bowling scores and including a foul system having a foul detecting device, manually operable foul decision means, for verifying the occurrence or nonoccurrence of a foul, and means for enabling the foul decision means only when the foul detecting means has detected a foul.

Another object of the invention is the provision of such a system including a computer and a foul system wherein the computer is associated with an automatic pinsetter and the foul system includes means for automatically cycling of the pinsetter upon the occurrence of a first ball foul.

Still another object is the provision of such a computer and automatic pinsetter combination including means for causing the pinsetter rake to be lowered while precluding initiation of a computing operation until the foul decision means have been manipulated.

Another object of the invention is the provision of a bowling score computer in combination with an automatic pinsetter, and including pin detecting means on the automatic pinsetter for providing the computer with pinfall information, and means for precluding operation of the pin detecting means after the second ball in a frame has been bowled if the computer has not yet utilized the pinfall information relative to the first ball in the frame.

Another object is the provision of a bowling score computer in combination with an automatic pinsetter wherein pinfall information is provided to the computer each time the automatic pinsetter is cycled, and means for cycling the pinsetter without providing pinfall information to the computer such that a new set of pins may be spotted or the pinsetter and the computer synchronized without initiating a computing operation.

Another object of the invention is the provision of a bowling score computer including a single manually operable system for alternatively entering handicap values into the computer or for correcting scoring errors.

Another object is the provision of a computing device for computing bowling scores wherein the logic is particularly well suited for use in conjunction with an automatic pinsetter whereby the computer exercises certain control over the pinsetter in the tenth frame situations that may require cycling of the pinsetter such that the bowling lane with which it is associated will automatically be placed in readiness for a new bowler or a new game following the third ball in a tenth frame with a single cycling of the pinsetter.

Another object of the invention is the provision of a bowling score computer in combination with an automatic pinsetter including means for detecting pinfall and for providing pinfall information to the computer for computation of a bowler's score, means for determining when pinfall information is available and for causing a computation cycle in response thereto, and means for determining when a standing pin is out of range of the detecting means and, in response to such condition, for disabling the determining means whereby computation of a bowler's score on the erroneous basis of only detecting standing pins cannot proceed.

Yet another object of the invention is the provision of such a pinsetter and computer combination further including manually operable means for providing pinfall information to the computer to cause computation when an out-of-range pin precludes the computation of bowler scores.

Still another object of the invention is the provision of a computing device for computing the bowling scores of a plurality of bowlers bowling on a plurality of lanes including manually operable means that may be manipulated by a bowler for identifying his pinfall information to the computer, means responsive to manipulation of the manually operable means by the bowler for precluding further manipulation thereof by a bowler, means for disabling the precluding means for preventing effective operation of the precluding means during the period beginning with the availability of pinfall information to the computer and terminating when the computer has completed computation for a last ball of a frame whereby the computer may score the first ball of a bowler, score a different bowler on another lane, and return to score the second ball of the bowler without the possibility of the bowler identification being changed by improper manipulation of the manually operable means.

Other objects and advantages of the invention will be apparent from the following description taken in connection with the accompanying drawings.

DESCRIPTION OF THE DRAWINGS

FIG. 9 is a logic diagram of the BCD (binary coded decimal) up counter of the arithmetic register which is used for adding pinfall for frame score purposes and team totals and comprises FIGS. 9A, 9B and 9C. FIG. 9B is to be placed adjacent the right edge of FIG. 9A while

FIG. 23 is a logic diagram of a scanning cycle control for scanning the various information inputs and controlling computation in response to conditions at such inputs and is comprised of FIGS. 23A, 23B and 23C. FIG. 23B is to be placed adjacent the right-hand edge of FIG. 23A, while

FIG. 27 is a schematic of a handicap entry system and a portion of an error correction system and is comprised of FIGS. 27A and 27B.

DETAILED DESCRIPTION

Figure 1:
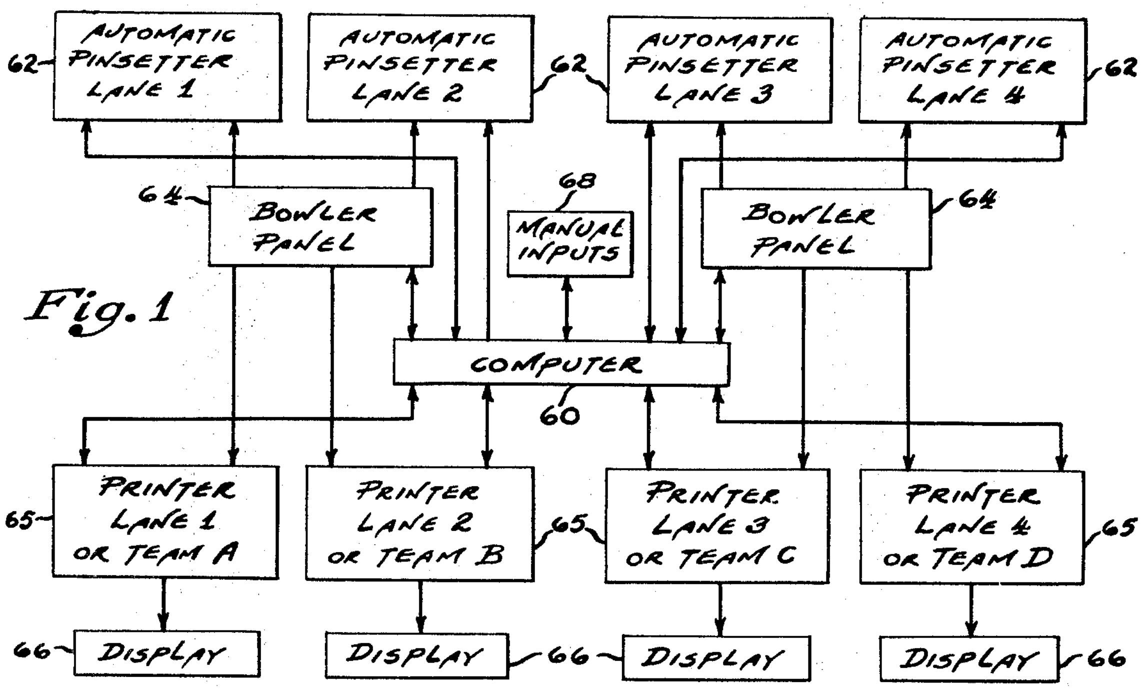
FIG. 1 is a block diagram of a bowling scoring system embodying the invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

For convenience, the following is an outline of the description following, indicating the pages on which each subject begins:

BOWLING SCORE SYSTEM

| | Page No. |
|---|---|
| I. Basic description of the system: | |
| A. Overall system | 14 |
| B. Printed record | 18 |
| C. Basis of computation and output functions | 21 |
| D. Computer | 25 |
| E. Printer | 43 |
| F. Conventions used in the specification and drawings | 43 |
| II. Specific description of the system: | |
| A. Pin detection | 47 |
| B. Pinfall buffers | 48 |
| C. Light drivers and steering gates | 51 |
| D. Pinfall register | 53 |
| E. Pinfall register control | 56 |
| F. Arithmetic register | 61 |
| 1. BCD up counter | 61 |
| 2. Pinfall counter | 67 |
| 3. Recirculating shift register connections | 69 |
| G. Bowler state control | 71 |
| 1. Bowler state register | 72 |
| 2. Bowler state decoder | 75 |
| 3. Bowler state updating matrix | 76 |
| 4. OR matrix | 85 |
| H. Bowler score cycle control | 87 |
| I. Frame counter | 92 |
| J. Printer frame control | 94 |
| K. Frame selection matrix | 99 |
| L. Character selection matrix | 100 |
| M. Printer cycle control | 102 |
| N. Computer cycle control | 115 |
| 1. Computer cycle ripple counter | 118 |
| 2. Computer sequence counter | 123 |
| 3. Computer cycle gating | 127 |
| O. Scanning cycle control | 146 |
| P. Memory and related gating | 156 |
| Q. Memory word selection logic | 161 |
| R. League bowling | 165 |

BOWLING SCORE SYSTEM

| | Page No. |
|---|---|
| 1. Team totals | 165 |
| a. Frame buffer | 167 |
| b. Frame comparator | 168 |
| c. BCD down counter | 170 |
| 2. Handicap entry | 175 |
| 3. Individual lane reset logic | 180 |
| S. Error correction | 187 |
| T. Bowler identification | 195 |
| U. Split detection | 205 |
| V. Pinsetter mechanical modifications and related circuitry | 208 |
| 1. Pin detection during a second ball cycle | 209 |
| 2. Miscellaneous switches | 211 |
| 3. Pinfall ready circuit | 212 |
| 4. Out-of-range pins | 212 |
| 5. Indication of lack of bowler identification | 214 |
| 6. New pins solenoid | 220 |
| 7. Manual cycling of pinsetter | 220 |
| 8. Third ball-tenth frame pinsetter cycling | 223 |
| 9. Resetting of the pinfall buffers prior to a subsequent bowler | 226 |
| W. Foul detection and verification system | 227 |
| X. Relation of the foul system to the pinsetter | 231 |
| III. Summary of functions | 234 |

I. BASIC DESCRIPTION OF THE SYSTEM

A. Overall System

The overall system in which the scoring apparatus of the instant invention is used is shown in block form in FIG. 1. The system comprises a computer 60, described in greater detail hereinafter, which provides the basic function of computing a bowler's score including the cumulative score through each frame and the first ball pinfall and both ball pinfall in each frame. In the exemplary embodiment of the invention, the computer 60 is adapted to compute scores bowled on four bowling lanes, that is, on two adjacent lane pairs, although it will be apparent hereinafter that by increasing the speed of the printer and increasing the size of the memory, it could be used to score a significantly greater number of lanes.

As will be seen, the computer 60 may be conditioned for open bowling on both lane pairs, league bowling on both lane pairs or league bowling on one lane pair and open bowling on the other lane pair. In league bowling, players bowl one frame on one lane and the next frame on an adjacent lane while in open bowling, one or more players bowl on a single lane. It will thus be apparent to those skilled in the art that the computer is arranged with respect to lane pairs as opposed to individual lanes in order to accommodate league bowling which is customarily played on a lane pair.

The computer 60 also controls a number of peripheral functions such as the automatic cycling of automatic pinsetters 62, one of each lane, to prepare the lane for the next bowler or game in such tenth frame situations that may require it. Additionally, in the event a bowler commits a foul on the first ball rolled in any frame, the computer 60 is arranged to cause the automatic pinsetter 62 for the lane on which the foul was committed to set a new set of pins and to be cycled such that upon the rolling of the next ball, the pinsetter will go through a second ball cycle, again, to prepare the lane for the next bowler.

The overall system additionally includes a pair of bowler panels 64, one for each lane pair. As will be seen, each bowler panel 64 includes 24 switching devices, twelve for each lane. The switching devices in each bowler panel 64 are arranged with respect to the computer 60 so as to cause the latter to effect computation of the score of a bowler in accordance with the condition of one of the 12 switches assigned to each lane. That is to say, the switching devices associated with each bowler panel 64 serve to identify the bowler who is about to bowl to the computer 60 such that pinfall achieved on that lane should be credited to that particular bowler. As will appear, each of the 24 switching devices in each bowler panel 64 are manually operated by a bowler. Furthermore, in the open bowling mode, no more than twelve of the 24 switching devices for each lane pair, six for each lane are used, while in the league bowling mode, all 24 may be used. In the latter mode, the necessary lane sequencing of bowlers and teams due to the custom in league bowling of a team bowling first on one lane and than on the other, is achieved by manual operation of the 24 switching devices.

The manual bowler and lane sequencing provided by the bowler panel switching devices permits a bowler who has arrived after the start of the game to "catch up" with the other bowlers by bowling a plurality of frames in a chain of succession that need not be broken by the bowling of a frame by another player. It further permits, in the league bowling mode, two different members of the same team to bowl simultaneously on the two lanes of the lane pair. This latter feature provides a distinct advantage insofar as in league bowling one team will bowl often faster than the other team. In prior art devices, having automatic bowler sequencing and/or automatic lane sequencing, it is necessary that each team complete its bowling on a lane before a given member thereof may switch to the next lane. As a result, members of the slower bowling team must often stand around idly waiting for the last member of their team to complete his bowling on a given lane before they may initiate bowling on the second lane even though the faster team has completed bowling on that lane. As a result, the delay caused by the slower bowling team is perpetuated, a situation which is avoided by the instant invention.

The computer 60 additionally provides a peripheral function for use in conjunction with each bowler panel 64. Since the bowlers are sequenced manually by manipulation of the switching devices in each bowler panel 64, it is necessary to provide means for preventing the changing of bowler identification before the computer has digested the pinfall information from that lane and during the period between the first ball in a frame rolled by a bowler and the rolling of a second ball in that frame by that bowler. By means to be described hereinafter, the computer 60 locks the bowler identification switching devices in each bowler panel 64 to prevent such occurrences. Additionally, in the case where the computer has not digested the pinfall information from a particular lane, it is arranged to control the cycling of the automatic pinsetter 62 for that lane such that the latter will stop with its rake down to indicate to the subsequent bowler that the computer is not ready for the rolling of another ball. The automatic pinsetter 62 will maintain the rake down in the alley blocking position until the computer has indicated to it that the pinfall information has been digested. Similar action of the pinsetter rake is effected by failure of a bowler to close his bowler identification switch. Finally, the computer 60 is arranged with respect to each pinsetter such that a bowler may bowl both balls in a frame whether or not the pinsetter has utilized the first ball pinfall information.

Each lane additionally includes a printer 65 and projection system 66. Each printer 65 is arranged with respect to the computer 60 so as to receive information relative to a bowler's game therefrom and to print a permanent record thereof such that the projection system 66 will project an image thereof to a viewing screen to be visible to the bowler. In other words, each printer 65 and projection system 66 provides a readout for that lane or team for the computer 60.

Each printer 65 is arranged to receive control signals from both the computer 60 and from each bowler panel 64. As will appear, the printer 65 is arranged to print in a plurality of frame columns and at a plurality of bowler lines. Furthermore, each such printing device is arranged to print one or more of 13 different characters indicative of the scoring of a bowler's game. Each printing device 65 receives frame information and character information from the computer 60 while receiving bowler line information from the bowler panel 64 with which it is associated. As will be apparent, the computer 60, an occasion, will insure information relative to a bowler line so as to position the printing device 65 in anticipation of a subsequent printing cycle.

The computer 60 includes an input from the pin detecting system of each automatic pinsetter 62 on which information relative to a bowler's pinfall is received such that it may be utilized in computing the bowler's score. The computer 60 has an additional input from a manual input system 68. The manual input system 68 is utilized for correcting errors in the computed score of a bowler in the event of a miscalculation by the computer 60 or in the event of erroneous pinfall detection by an automatic pinsetter 62. Additionally, in the league bowling mode, the manual input system 68 is utilized for entering a team handicap value into the computer such that the team handicap value will be included in a team total which, as will appear, is printed out at the end of each frame and each game.

B. Printed Record

The invention contemplates, in a broad sense, the automatic scoring and indication of the various occurrences in a bowling game. In particular, a permanent printed record of a bowler's game is provided as the main product of operation of the apparatus.

Figure 2:
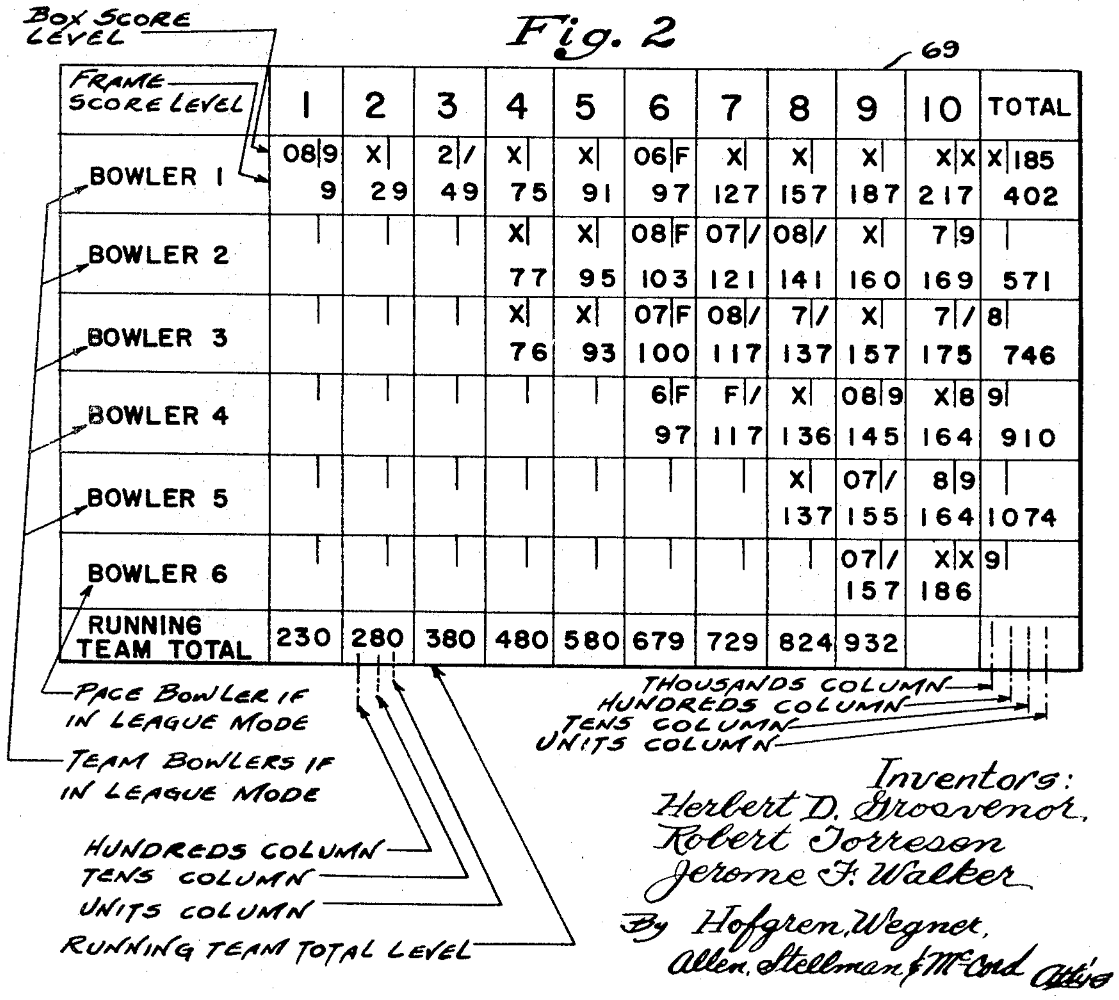
FIG. 2 is an illustration of a bowling score sheet in the form of a printed record produced by the system.

A typical printed record 69 of the games of a plurality of bowlers bowling in the league mode is shown in FIG. 2. The printed record is in a generally conventional format and comprises a sheet of paper, such as that disclosed in the copending application of W. D. Cornell et al., Ser. No. 243,634, filed Dec. 10, 1962, and assigned to the same assignee as the instant application, the disclosure of which is hereby incorporated by reference. If desired, the scoresheet 67 may be ruled off a s indicated in FIG. 2 to include a vertical column for the names of the bowlers, 10 vertical columns for the scores in each of frames 1—10 and an 11th vertical column for the total score or so-called "11th frame." The score sheet may also be ruled off in the horizontal direction to provide frame headings and six bowler lines, each of the latter having an upper, box score level and a lower, frame score level. An additional horizontal column may be provided for the recording of a running team total.

From the scoresheet 67, it will be apparent that in frames 1 to 10, inclusive, a character may be printed in anyone of six different positions for a specific bowler in a specific frame. The leftmost column within each frame column is designated the hundreds column, and, at the frame score level, the hundreds digit of the bowler's cumulative score will be printed. At the box score level, only a 0, the common designation for a split, will be printed and then, only if the bowler has left a split after the first ball in the frame has been rolled. The middle column within each of the frame columns 1—10 inclusive, is the tens column and, at the frame score level, the character representing the tens digit of a bowler's cumulative score will be printed. At the box score level, an indication of the bowler's first ball pinfall will be printed in the tens column. The character printed may be from 0 to 9 if the pinfall achieved by the bowler on the first ball in the frame was less than 10 or an X if the bowler achieved a strike. In the event that the bowler committed a foul on the first ball, an F will be printed in this position. The rightmost column within each of the frame columns 1—10 is the units column and, at the frame score level, will have the units digit of the bowler's cumulative score printed therein, while at the box score level, a character from 0 to 9 will be printed depending upon the bowler's total pinfall for both balls of that particular frame if less than 10, or a / may be printed if the bowler has achieved a spare. In the event the bowler commits a foul on the second ball of the frame, an F will be printed at this level.

With reference to the total or eleventh frame column, an additional column therewithin is added on the left. This column is the thousands column and, at the frame score level, will have printed therein the thousands digit of the team total if the team total exceeds 999. At the box score level, the results of any third ball in the 10th frame are printed. The remaining columns in the 11th frame, may have characters printed therein only at the frame score level with the exception of the box score level for bowler number one. The box score level relative to bowler number one in the 11th frame may have a team handicap value printed therein in the hundreds, ten and units columns.

Referring now to the running team total level, the running team total has its digits printed in the corresponding columns of frames 1—9 and includes all pins definitely earned by the team through the frame in which it is printed. Thus, when a mark is achieved in a frame, the value of 10 is included in the team total for that frame for each such mark. It will also include the team handicap value, if any, in all frames occurring after the entry of the team handicap value. Since the end of game team total is printed in the 11th frame, it is not necessary to provide for printing in the 10th frame at the running team total level.

In league bowling, it is sometimes desirable to permit a so-called "pace bowler" to bowl with a given team. For example, the use of a pace bowler is common when one of the members of the team is unable to bowl. However, in current practice, a pace bowler's score is not added to the team total. Thus, as will appear, the score of the pace bowler who bowls in the sixth position is never added to the team total, but rather, the computer scores the pace bowler as though he were playing in the open bowling mode.

When the computer is used to score open bowling, it will accommodate up to six bowlers per lane. Obviously, in such a case it is not necessary to print running team totals or to shown a handicap entry on a grand team total in the 11th frame. The manner in which such printing is controlled will be seen hereinafter.

C. Basis of Computation and Output Functions

Figure 3:
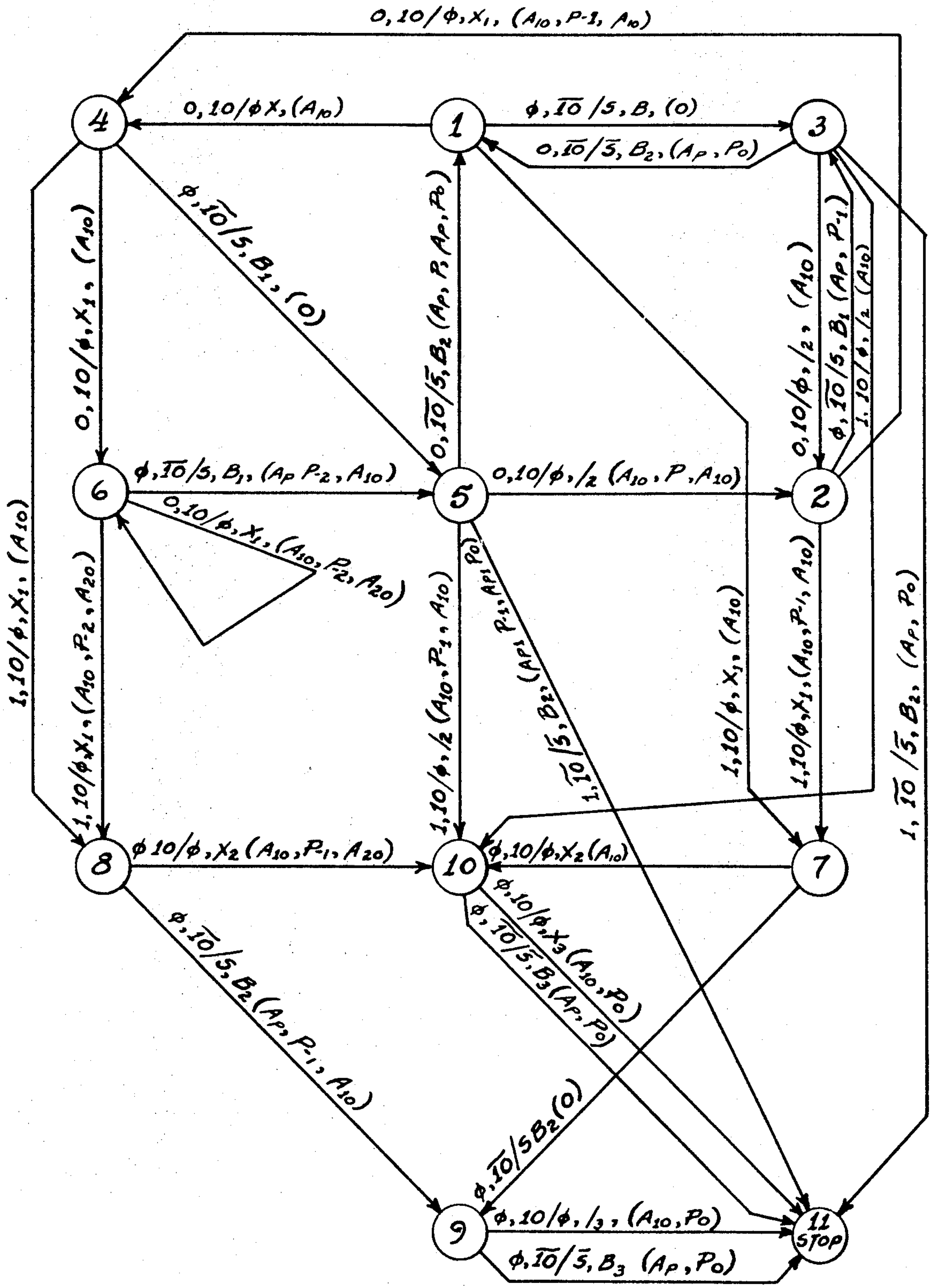
FIG. 3 is a flow chart illustrating certain input and output functions of the system relative to the scoring of a bowler.

The manner in which bowling scores are computed and the resultant output functions generated relative to providing the printed record is shown functionally in FIG. 3. Specifically, computation is directed by the existence of a particular condition or state of a bowler's game. As will be seen, information relative to the state of a bowler's game is stored in a predetermined segment of a bowler's memory and the information is periodically read out to direct the computation of the bowler's score, updated in view of the pinfall achieved by each and every ball rolled by the bowler and ultimately written back into the particular segment of the bowler's memory where it will be retained until further computation is necessary. The condition of a bowler's game always dictates that a particular state must exist and, accordingly, computation cannot proceed in any case unless a particular state of a bowler's game exists to direct such computation. This arrangement, which is quite different from many prior art systems wherein computation will proceed in a predetermined manner unless particular events such as a strike or a spare occur, provides a significantly greater degree of sophistication in terms of readout functions and various peripheral functions for controlling 10th frame operation of a pinsetter.

The instant invention contemplates that each bowler's game may be in anyone of 11 possible states which are determined on the basis of pinfall achieved by the bowler and the frame in which the bowler is bowling. As will be evident to those skilled in the art, a greater or lesser number of states could be used depending upon the degree of system sophistication desired. The 11 states are as follows:

TABLE 1

| State | State definition |
|---|---|
| 1 | Start or first ball following an open frame. |
| 2 | First ball following a spare. |
| 3 | Second ball following an open frame or a spare. |
| 4 | First ball following a single strike. |
| 5 | Second ball following a strike. |
| 6 | First ball following two strikes. |
| 7 | Second ball in the tenth frame following a strike in the tenth frame. |
| 8 | Second ball in the tenth frame following two consecutive strikes. |
| 9 | Third ball in the tenth frame following one strike on the first ball in the tenth frame. |
| 10 | Third ball in the tenth frame following two strikes in the tenth frame or a spare in the tenth frame. |
| 11 | End of bowler's game. |

By reference to FIG. 3, the sequence of computer functions can be determined with respect to any given change from one bowler's state to another. Each of the 11 possible states is indicated as a circle containing the number of the state. The various arrows indicate every possible change from one state to another. The notations adjacent each arrow indicate the various game conditions required to go from one state to the other and the computer functions generated by the change and have the following meanings.

TABLE 2

| Notation | Notation definition |
|---|---|
| 0 | Any frame but the tenth frame. |
| Ø | Frame is immaterial. |
| 1 | Tenth frame. |
| $\underline{10}$ | Pinfall=ten. |
| $\overline{10}$ | Pinfall is less than ten. |
| S | Print split symbol if a split exists. |
| $\overline{S}$ | Do not print split symbol. |
| $B_1$ | Print in first box score position (tens column). |
| $B_2$ | Print in second box score position (units column). |
| $B_3$ | Tenth frame, print in third box score position (thousands column—eleventh frame). |
| $X_1$ | Print strike symbol in first box score position—any frame. |
| $X_2$ | Print strike symbol in second box score position—tenth frame. |
| $X_3$ | Print strike symbol in third box score position—tenth frame. |
| $/_2$ | Print spare symbol in second box score position. |
| $/_3$ | Print spare symbol in third box score position—tenth frame. |
| (O) | Do not print cumulative score—do not add to score. |
| (A) | Add pinfall, 10 or 20 to score as indicated by subscript. |
| (P) | Print cumulative scores in frame location indicated by subscript; minus 1-back, one frame, minus 2-back two frames, zero-in current frame. |

At the beginning of the game, each player's state will be state one. If the bowler does not achieve a strike on the first ball of the game, his game will then change to state three. As the notations indicate, the change from state one to state three requires that it be any frame but the 10th and a pinfall less than 10. Furthermore, if a split exists, a split symbol will be printed and the pinfall achieved by the first ball will be printed in the first box score location. Finally, the change precludes any addition of pinfall to the bowler's cumulative score or the printing thereof.

If, on the second ball, the bowler knocks down the remaining pins, the bowler's state will shift to state two. This change will occur when the input functions indicate that it is any frame but the tenth frame and the total pinfall for that frame is equal to 10. As a result, the output functions require that a spare be printed in the second box score position in the appropriate frame and that the score value of 10 immediately entered into the bowler's cumulative score memory.

In the event the bowler on his next ball, which is the first ball in the second frame, rolls a strike, the input functions showing that it is any frame but the 10th and that a pinfall of 10 has been achieved cause the bowler's state to be changed to state four. As a result of this change, an output function calling for the printing of strike symbol in the first box score position will be emitted. Additionally, 10 points will be added to the bowler's cumulative score, subsequent to which a cumulative score will be printed back one frame position or in the first frame position. When this printing operation is accomplished, the pinfall achieved by the making of the strike, namely, 10 pins, will be immediately added to the cumulative score of the bowler.

From the foregoing example, it will be apparent how the state flow diagram depicts the operation of the computer to generate output functions in response to given input functions. The means to accomplish such operations are described hereinafter.

D. Computer

Figure 4:
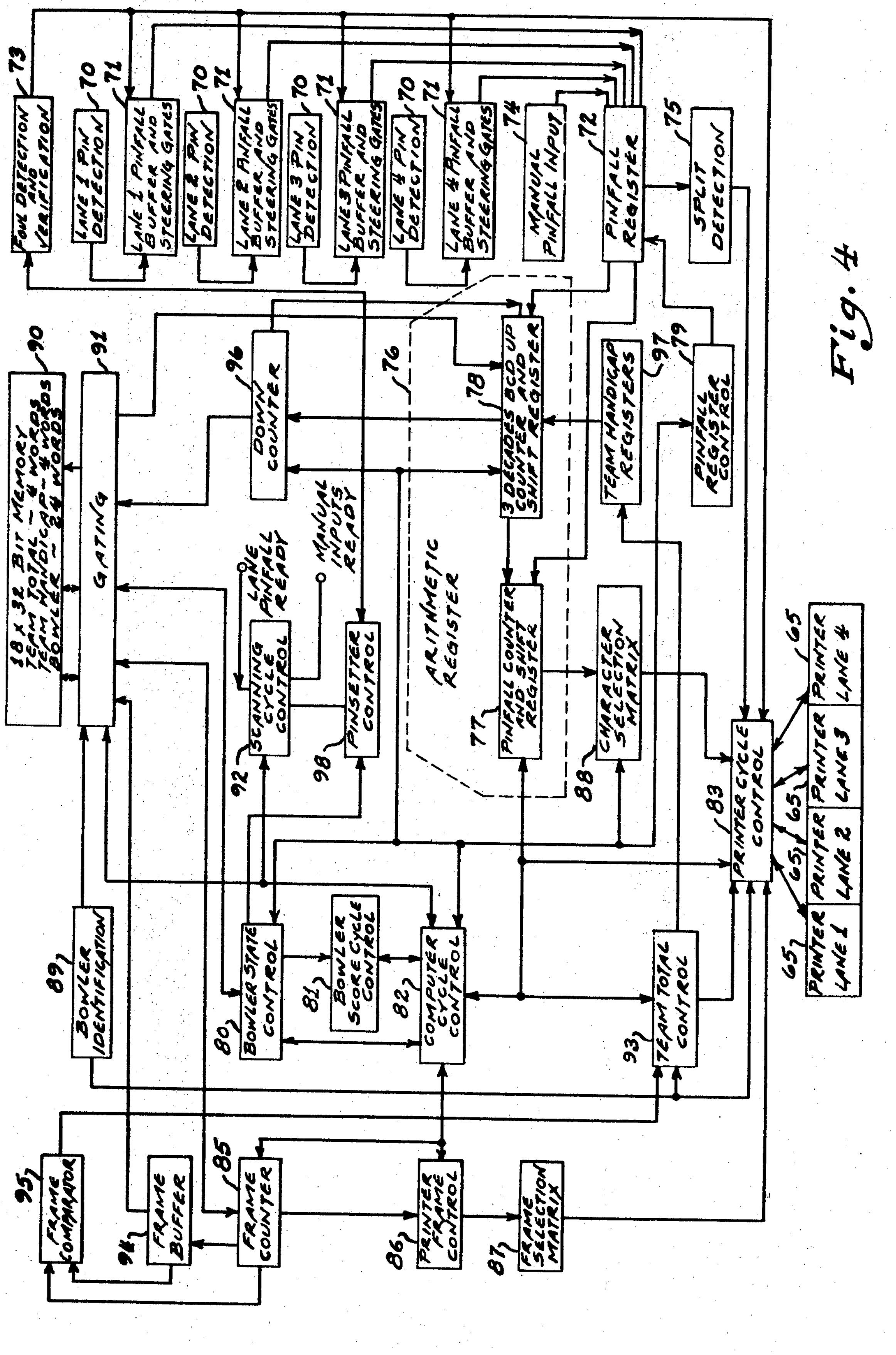
FIG. 4 is a block diagram of the computer used in the system.

It will be recalled that the computer 60 is arranged to compute the bowling scores achieved by the plurality of bowlers on a plurality of lanes. Thus, each lane is provided with pin detecting means 70 shown schematically in FIG. 4. Operative in conjunction with each pin detecting means 70 is a pinfall buffer and steering gate arrangement 71. The pinfall buffers 71 receive information from the pin detecting means 70 relative to the position of standing pins. This information is gated through the steering gates 71 to a pinfall register 72 in a manner such that the pinfall register 72 receives the information from only one lane at a time. The purpose of the pinfall buffers is to preserve pinfall information for short periods of time in the event that an automatic pinsetter having the pin detecting means thereon or independent pin detecting means used in conjunction with the pinsetter is reset during cycling of the pinsetter and before the information may be channeled to the pinfall register 72. Additionally, the pinfall buffers 71 serve to preserve pinfall achieved by the first ball in a frame such that it may be utilized for computing the bowler's score in the event the bowler commits a foul on the second ball in the frame.

Foul detection and verification means 73 are provided for each lane and are arranged to preclude the pinfall buffer 71 from reading pinfall information in the event of a first ball foul and for precluding the resetting of the pinfall buffers in the event of a second ball foul. Additionally, the foul detection and verification means 73 provide a signal which is utilized to cause the printing of a foul symbol in the appropriate position on the score sheet.

There is also provided a manual pinfall input means 74 which may be used to correct errors in a bowler's score caused by either erroneous computation by the computer, erroneous pin detection by the pin detecting means 70 or erroneous foul detection and verification caused by improper manipulation of the foul detection and verification means 73. Additionally, if a bowler improperly identifies himself to the computer such that the latter causes pinfall to be credited to the wrong bowler, this may be corrected by use of the manual pinfall input means 74.

The pinfall information received from the pinfall buffers and steering gates 71 and the manual pinfall input means 74 are utilized as inputs by the pinfall register 72 such that the condition of the latter will indicate the particular position of each pin that is either standing or down. The information relative to each pin is read simultaneously into the pinfall register by control of the steering gates 71 as mentioned above.

The arrangement of standing and fallen pins as it appears in the information contained within the pinfall register 72 is sensed by split detecting means 75. If the arrangement of the pins is such as to be a split within the definition thereof set forth by the American Bowling Congress, the split detecting means 75 will sense that a split exists and if only the first ball in a frame has been rolled, the sensing of the split condition will cause the printing of a split symbol on the score sheet.

In order to determine the number of fallen pins for box score purposes and for addition to the bowler's cumulative score, an arithmetic register 76 is provided. The arithmetic register consists of a pinfall counter 77 and a binary coded decimal up counter 78. The pinfall counter 77 counts the pinfall achieved by the first ball in each frame and the total pinfall achieved in each frame by the two balls thereof. This information is printed in the box score positions described above. The binary coded decimal up counter adds the pinfall achieved by both balls in a frame to the bowler's cumulative score such that the cumulative score may be printed at the frame score level as set forth above. A pinfall register control 79 causes the pinfall information present in the pinfall register 72 to be placed in the pinfall counter 77 after each ball of a frame and into the BCD up counter after either a strike in a frame or the second ball in a frame.

A bowler state control 80 includes a bowler state register which contains the state of a bowler's game. The bowler state control 80 is also provided with a bowler state decoding matrix which decodes the information contained in the bowler's state register. Finally, the bowler state control 80 includes a bowler state updating matrix which redetermines and updates the bowler's state information contained in the bowler's state register after each ball in a frame is rolled. The bowler's state information contained in the bowler state control is utilized to control the computation and printing of bowler's scores. In this connection, a bowler score cycle control 81 receives bowler state information from the bowler state control and in conjunction with a computer cycle control 82 causes such functions as may be necessary to compute a bowler's score and enable the reading out of a bowler's score such that a printed record thereof will be formed.

When it is necessary to score a bowler, the bowler score cycle control 81 and the computer cycle control 82 issue appropriate signals to a printer cycle control 83 which controls the printers 65 associated with each of the four lanes. The printer cycle control 83 in conjunction with the computer cycle control directs one of the printers 65 associated with the lane from which pinfall information has been received to print in the thousands, hundreds, tens or units column within a frame column and to print at the box score level or at the frame score level. The particular frame column in which the pinfall information is to be printed is determined by a frame counter 85, a printer frame control 86 and a frame selection matrix 87 together with the computer cycle control 82.

Frame information relative to the bowler to be scored is contained in the frame counter 85. The frame information therein corresponds to the frame in which the bowler is bowling as opposed to the frame in which he is to be scored. It will be apparent that this is a necessary distinction as when a bowler is working on a spare, a strike or two successive strikes, the cumulative score for the frames in which the mark or marks were made will not be complete until the bowler has rolled one or more balls in one or more succeeding frames.

The printer frame control 86 receives information from the frame counter 85 relative to the bowler's current frame. The computer cycle control 82 in conjunction with bowler state control 80 causes the printer frame control 86 to assume a condition indicative of the frame in which a printed cumulative score is to be placed. The resulting condition of the printer frame control 86 is sensed by the frame selection matrix 87 which thereby issues a signal to a printer 65 for directing the printer 65 to print the cumulative score in a particular frame column while the computer cycle control 82 enables a particular one of the printers 65 to print.

A character selection matrix 88 is arranged to sense the condition of the pinfall counter 77. In the case of box scores, the condition of the pinfall counter 77 is decoded by the character selection matrix 88 which, in turn, causes the printer cycle control 83 to direct a particular printer 65 to print a particular character. In the case of printing cumulative scores, each digit of the cumulative score is decoded individually and printed in a serial manner. As will be seen, the printing of such digits occurs in the following order: the thousands digit, if necessary, is printed first; the hundreds digit is printed second; the tens digit printed third and the units digit printed last. In order to achieve the serial decoding of the digits of the cumulative score in required order, the printer cycle control 83 causes the cumulative score information contained in the BCD up counter 78 to be shifted, one digit at a time, into the pinfall counter 77 where it is decoded by the character selection matrix 88 and ultimately printed by a selected printer 65. In the printing of cumulative scores, the printer cycle control has an additional function of suppressing leading or nonsignificant zeros.

In order to direct a selected printer 65 to print in a selected bowler line, bowler identification means 89 are provided. The bowler identification means 89 serve to direct a corresponding printer 65 to print at a particular box score level for a particular bowler. When it is necessary to print at the frame score level for that bowler, the bowler identification means 89 together with the computer cycle control serve to indicate that printing should be accomplished at the frame score level.

The bowler identification means 89 provide yet another function. A memory 90 includes a word therein for each of the 24 bowlers that may be accommodated by the system. The bowler identification means 89 serve to connect the appropriate bowler word with the computer when that bowler is to be scored.

Each bowler word therein includes information relative to that bowler's cumulative score, the frame in which he is bowling and the state of his game. Through appropriate gating 91, the particular bowler word is selected and the frame information in each word is directed to the frame counter 85. The state information in the bowler word is directed to the bowler state control 80 while the bowler's score information is directed to the BCD up counter 78. Such information is used in each location to control the computation and read out of a bowler's score in the manner previously described, is updated and is subsequently written back into the bowler memory 90.

Since there may be as many as four different bowler identifications at any given instant (one on each of the four lanes), and the computer is arranged to handle the scoring of only one bowler at a time, means are provided in the form of a scanning cycle control 92 for permitting association of the computer 60 with but a single bowler word in the memory 90 at a time. The scanning cycle control 92 scans the pin detection system 70 on each of the four lanes together with the manual pinfall input system 74 and a handicap input system to be described hereinafter and senses when one of the aforementioned information sources is ready to provide information for computation. When such a situation is detected, the scanning cycle control 92 locks on that particular information source and enables the gating 91 to select only the bowler word for the bowler associated with that particular source.

When the scanning cycle control 92 has locked on a particular information source, it, together with the computer cycle control 82 will cause the bowler information contained in the memory 90 for the selected bowler to be directed to the frame counter 85, the bowler state control 80 and the arithmetic register 76. Additionally, the computer cycle control 82 will cause the bowler score cycle control 81 to score the bowler which will cause the printer cycle control 83 to cause such printing as may be necessary. In the latter respect, the scanning cycle control 92 causes the computer cycle control to select the printer 65 for the lane for which the pinfall information is being made available or for the teams with which the bowler is associated. Upon completion of the scoring of a bowler, the computer cycle control 82 causes such updating of bowler information as may be necessary and the writing of such information back into the memory 90.

Means are also provided for computing and printing running team totals when the computer is used in league bowling. To serve this end, a team total control 93 is provided. Since the running team totals are printed at the completion of a team frame, it is necessary that a bowler's score be added to the team total only if he is bowling in the same frame as the team. Accordingly, a frame buffer 94 and a frame comparator 95 are provided. The frame buffer receives frame information relative to the frame in which a bowler is bowling from the frame counter 85 upon direction by the computer cycle control and at a subsequent time in the scoring of the bowler, team frame information is placed in the frame counter and the bowler frame information contained in the frame buffer 94 is compared with the team frame information by the frame comparator 95. If the two are equal, the frame comparator 95 causes the team total control 93 to proceed with the team totaling cycle. In this cycle, the bowler's cumulative score is read from the binary coded decimal up counter 78 into a down counter 96. The cumulative score for the team, which consists at any given instant of the total of the cumulative scores of those members of the team that have been computed for the frame in which the team total is to be computed and the team handicap if entered, is read into the BCD up counter from a selected team total word in the memory 90. The down counter 96 is then counted to zero which will cause the bowler's cumulative score contained therein to be added to the team total cumulative score contained in the BCD up counter 78. The resulting score is then written from the BCD up counter 78 back into the corresponding team total word in the memory for further addition of bowler cumulative scores, or, if the score just added corresponded to that of the bowler bowling in the last position on the team such that the bowler completed a team frame, the information will be shifted into the pinfall counter 77 to be decoded by the character selection matrix 88 and ultimately printed under the direction of the printer cycle control 83 operating in a manner similar to that described above in conjunction with the printing of a bowler's cumulative score.

As mentioned above, the running team total score is comprised of the cumulative scores of each of the bowlers on the team in the frame for which the team total score is to be computed. This is in contradistinction to an arrangement wherein the pinfall achieved by each bowler in each frame is added to the team total to provide the cumulative team total. The arrangement utilized by the invention is such that the team total is computed anew from each cumulative bowler score at the end of each frame. As a result, when an individual bowler's score is corrected by means of an error correction procedure utilizing the manual pinfall input 74, subsequent running team totals will be correct due to the inclusion of the corrected bowler's score therein.

The invention also provides team handicap registers 97 under the control of the team total control 93. Team handicap values may be set up manually on the team handicap registers 97 and, if permitted by the team total control 93, the handicap values will be entered into the BCD up counter to be included in the team total which is printed out at the end of each frame or game. Such team handicap values may be entered into the apparatus at any time during the game and a word in the memory 90 is provided for each team's handicap entry.

The computer additionally includes a pinsetter control 98. The pinsetter control receives information from the foul detection verification means 73 together with information from the bowler state control 80 and the scanning cycle control 92. Upon the occurrence of a first ball foul, the pinsetter control 98 under the direction of the scanning cycle control 92 will cause the pinsetter on the lane on which the foul occurred to spot a new set of pins and prepare itself to undergo a second ball cycle when the next ball is rolled. Thus, when the second ball in the frame is rolled, if pins are left standing, the pinsetter will undergo a normal second ball cycle and spot a new set of pins in readiness for the next bowler. Similarily in certain tenth frame situations wherein bonus balls are rolled, the pinsetter control 98 under direction of the bowler's state control 80 will cause the pinsetter to undergo a second ball cycle after the third ball in the tenth frame is rolled such that a new set of pins will be spotted by the pinsetter in readiness for the following bowler or the initiation of a new game. This arrangement automatically anticipates recycling of the pinsetters in such situations and thereby speeds up the bowling game.

E. Printer

As the instant invention contemplates the making of a permanent record of the score achieved in a bowling game, it is necessary that some means for performing this function be provided. Specifically, the invention contemplates the use of four printers, one for each of the four lanes to be scored, of the type disclosed in copending applications of W. A. Crimmins, Ser. No. 563,742, filed July 8, 1966 and G. B. Pratt, Ser. No. 563,754, filed July 8, 1966 and assigned to the same assignee as the instant application, the disclosures of which are hereby incorporated by reference.

Figure 5:
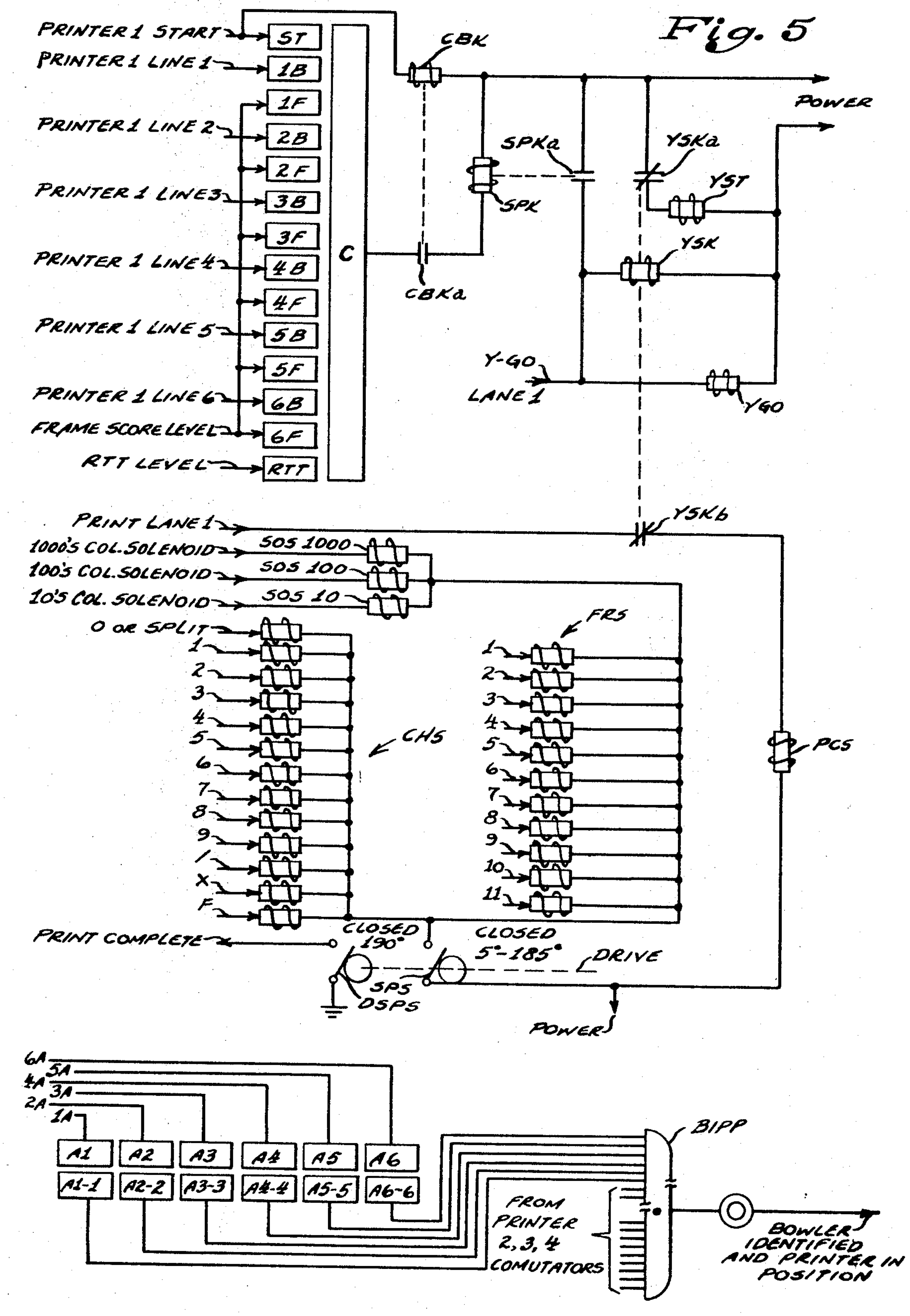
FIG. 5 is a schematic illustration of the control circuitry of a printer used in conjunction with the system.

For the purpose of clarity, a brief description of the operation of a printer made in accordance with the aforementioned copending applications is as follows. Reference may be made to FIG. 5 which schematically illustrates the arrangement of a printer to the computer of the instant invention. Each printer includes 11 print wheels, each print wheel bearing the characters 0—9, X, / and F for a total of 13 characters in all. The first nine print wheels are arranged to print units, tens and hundreds digits in each of the first nine frame columns on a scoresheet, respectively. The 10th print wheel serves to print units, tens and hundreds digits in the 10th frame column and the thousands digit in the total or 11th frame column. The 11th print wheel prints units, tens and hundreds digits in the total or 11th frame column. In order to control the printing in a selected frame column, 11 frame selection solenoids FRS (designated FRS in said applications) are provided, each of the 11 solenoids being responsible for unlatching a corresponding print wheel for printing in the desired frame column. Additionally, 13 character selection solenoids CHS (designated CHS in said applications) are provided, one such solenoid being responsible for selecting a desired one of the 13 printer characters.

There are also provided three column selection solenoids SOS–10, SOS–100 and SOS–1000 (designated COS–10, COS–100 and COS–1000 in said applications) for positioning the print wheel in the tens digit column, the hundreds digit column or the thousands digit column within a given frame column. However, as will be seen hereinafter, the control of the printer by the computer is such as to permit printing in the thousands column only in the 11th frame. It should also be noted that when no one of the character selection solenoids are actuated, the design of the printer is such that it will print in the units column in the selected frame.

Each printer additionally includes a print-cycle solenoid PCS (designated PCS in said applications) which, when energized, will initiate a printing cycle. Each printer is arranged such that when the print-cycle solenoid is energized to start a printing operation, a solenoid power switch SPS (COPS and CFPS in said applications) is closed to connect one side of the frame selection solenoids, the character selection solenoids and the column selection solenoids to a source of power. As will be seen hereinafter, the other side of these solenoids is connected to solenoid drivers within the computer which, when energized by the computing apparatus, will complete the circuit for a selected solenoid in each of the three groups thereof. In this respect, as will appear, the outputs of the computer for frame selection, character selection and column selection are connected to the corresponding solenoids in those groups on each of the four printers utilized. However, the computing apparatus is arranged to energize only a single print cycle solenoid at any given instant such that by way of the foregoing arrangement, a frame selection solenoid, a character selection solenoid and a column selection solenoid, if needed, will be energized only in the particular printer that has its print cycle solenoid energized by the computer.

Each printer additionally includes a switch DSPS (designated DPS in said applications) which is closed at a predetermined point in a printing cycle and is arranged to provide the computing apparatus with a PRINT COMPLETE signal to indicate that the printer has responded to the inputs thereto generated by the computer and has completed the handling thereof. As will be apparent from said applications, such a signal is generated after the printing of each character (as opposed to the printing of a plurality of characters in a predetermined sequence). When it is necessary to print more than one character, such a signal will cause the computer to go on and read out the next character to the printer. In the event it is not necessary to print further characters relative to a bowler's score at the time such a signal is present, such a signal will cause the computer to go on to perform such other sequences as may be necessary.

The printer also provides means for moving within a frame column to any one of 13 distinct positions. The first 12 positions correspond to a box score position and a frame score position for each of six bowlers while the 13th position provides for the printing of a running team total when the computer is scoring league play. This movement takes place in the Y direction and, accordingly, a Y-dirve cam (designated 50 in said applications) is provided for each printer. As disclosed in said applications the Y-drive mechanism includes a Y-GO solenoid YGO that controls the movement of the printer between the box score levels and frame score levels of each of the bowlers. In certain situations in a bowling game, it is necessary to record box score information, frame score information and, after the next ball is rolled, additional box score information and additional frame score information. Such a situation typically occurs when a bowler does not achieve a strike or a spare in the frame following a spare or the frame preceded by two strikes. Other situations wherein the printer must go from one level to the next and return to the first will be apparent and the Y-GO solenoid YGO is utilized to control such printer movement. Furthermore, occasionally the printer will not start out in the proper position to score a bowler. As will be seen hereinafter, the computer includes means for sensing such a condition and will energize the Y-GO solenoid YGO to thereby cause the printer to assume the proper position. The Y-drive mechanism of each printer may also be activated to position the printer at the running team total level. A signal from the computer is arranged to control such positioning as will be seen.

Referring again to FIG. 5, each printer includes 14 contacts ST, 1B, 1F, 2B, 2F, 3B, 3F, 4B, 4F, 5B, 5F, 6B, 6F and RTT. Each of the 14 contacts ST–RTT are arranged in close proximity to a contact C. The Y-drive cam (designated 50 in said applications) includes a brush that is adapted to bridge any one of the 14 contacts ST–RTT and the contact C. The specific one of the 14 contacts ST–RTT connected with the contact C will depend upon the position of the printer relative to the score sheet. For example, if the printer position is such as to cause printing at the box score level of bowler number one, the brush on the Y-drive cam will bridge the contact 1B and the contact C. Similarly, if the printer is in a position to print at the running team total level, the brush on the Y-drive cam will bridge the contact RTT and the contact C. The contact C is connected through the normally open contacts CBK*a* of a relay CBK and a step printer relay SPK to a source of power. The relay CBK is connected to the contact ST for receiving a PRINTER ONE START signal and to the source of power. The relay SPK includes normally open contacts SPK*a* in series with the parallel combination of the Y-GO solenoid YGO and a relay YSK across the source of power. The relay YSK when energized may open contacts YSK*a* and YSK*b* to deenergize a Y-stop solenoid YST and disable the printer cycle solenoid PCS respectively. The Y-stop solenoid is, of course, placed in series with the contacts YSK*a* across the source of power.

When a PRINTER ONE START signal is generated, the relay CPK will be energized and close the contacts CPK*a* such that the relay SPK may be energized if the brush on the Y-drive cam is bridging the contact C and an energized one of the 14 contacts ST–RTT to close contacts SPK*a* to energize the Y-GO solenoid YGO. Simultaneously, the Y-drive stop relay YSK will be energized to deenergize the Y-drive stop solenoid YST and disable the printer cycle solenoid PCS. As disclosed in said application, the energization of the Y-GO solenoid YGO will cause the printer to continually change position with respect to the various lines on the score sheet until the Y-GO solenoid YGO is deenergized. Such stopping will occur when the brush on the Y-drive cam of the printer contacts a deenergized one of the contacts ST–RTT and the relay SPK will be deenergized to energize the Y-stop solenoid YST and enable the printer cycle solenoid PCS.

As will be seen hereinafter, manually operated bowler identification buttons are used for deenergizing the selected one of the contacts 1B, 2B, 3B, 4B, 5B and 6B while energizing the nonselected contacts 1B, 2B, 3B, 4B, 5B and 6B and the contact ST. Thus, when a bowler identification pushbutton has been depressed, the printer will be energized until the brush on the Y-drive cam finds the deenergized contact corresponding to the bowler identification switch that has been depressed. This will cause the printer to be positioned at the box score level of the scoresheet for the bowler line corresponding to the depressed bowler identification button.

As will also be seen hereinafter, the contact ST, which corresponds to a home position of the printer, is energized by a PRINTER ONE START signal from either the bowler identification system or the error correction system such that if the printer is in the home position, it will begin its search for a deenergized contact. The RTT contact is normally energized such that the printer will not stop at the running team total level. However, when the computer requires that a running team total score be printed, the computer cycle control gating will issue an R.T.T. LEVEL signal which deenergized the RTT contact such that the printer may stop at the running team total level.

In order to position the printer at the frame score level, as will be seen, the computer control gating issues a FRAME SCORE LEVEL signal which is used to deenergize each of the contacts 1F, 2F, 3F, 4F, 5F and 6F. However, such a signal is issued only after printer has positioned itself at the proper box score level such that when printer movement is subsequently started, the printer will move only one position, namely that from the box score level to the frame score level for the same bowler.

In order to cause such movement from the box score level to the frame score level for a single bowler, or the reverse, or if the printer has for some reason erroneously stopped at an improper position, the computer cycle control gating as will be seen may issue a Y-GO LANE ONE signal. Such a signal is applied to the common junction of the contacts SPK*a*, the Y-stop relay YSK and the Y-GO solenoid YGO and will cause energization of the Y-GO solenoid YGO independently of the contacts SPK*a*. However, such a Y-GO LANE ONE signal appears only as a momentary pulse and is merely sufficient to cause the printer to move from one level on the scoresheet to the next lower level. Thus, if the printer is at the box score level and a FRAME SCORE LEVEL signal is present, a Y-GO LANE ONE signal will merely cause the printer to move one position, namely to the frame score level for the same bowler. However, if the printer is at frame score level and the Y-GO solenoid YGO is pulsed, the one level movement of the printer will cause the brush on the Y-drive cam to bridge the box score contact and the contact C for the next bowler which will be energized since that bowler will not have identified himself and the printer will continue to step through all box score and frame score levels together with the running team total level and the home position until it is returned to the box score level of the bowler who has identified himself by depressing his ID button. Similarly, if the Y-GO LANE ONE signal is issued because the printer is in an improper position, the printer will continue to move until the brush on the Y-drive cam bridges a deenergized one of the contacts ST–RTT and the contact C which will be the proper position as it will have been deenergized by manipulation of the bowler identification pushbuttons.

Each printer additionally includes fixed contacts A1, A2, A3, A4, A5 and A6, one for each of the six bowlers whose scores may be printed by the printer, which are adapted to receive 1A—6A signals from the bowler identification system as will appear. Only one of such signals may be present at any given instant and indicates that one of bowlers 1—6 of team A has identified himself. The presence of such a signal will energize one of the contacts A1—A6. The Y-drive cam includes a brush that is adapted to close a circuit between the contacts A1—A6 and a corresponding one of adjacent contacts A1–1, A2–2, A3–3, A4–4, A5–5 and A6–6. The contacts A1–1 through A6–6 are connected as inputs to an AND gate BIPP which may issue a BOWLER IDENTIFIED AND PRINTER IN POSITION signal. The AND gate BIPP includes inputs from corresponding contacts on the printers associated with each of lanes two, three and four.

As will be seen, the computer will not begin computation of the score for any given bowler until that bowler has established his identification and the printer is properly positioned at the corresponding bowler line. This is necessary as the computer must be capable of digesting information almost simultaneously from several input sources. Accordingly, means are provided to prevent the computer from standing idle while a printer is being moved to a proper position. As will be seen, the BOWLER IDENTIFIED AND PRINTER IN POSITION signal must be present before the computer will stop and digest information from any of the input sources. For example, if it be assumed that the first bowler on team A has depressed his pushbutton, a 1A signal will be present. When the printer for team A has moved to the bowler one position, a brush on the Y-drive cam will complete the circuit between the contact A1 and the A1–1. Thus, the 1A signal will be fed into the AND gate BIPP as an input. This signal will disable the AND gate BIPP and cause the latter to issue the BOWLER IDENTIFIED AND PRINTER IN POSITION signal. As will be seen hereinafter, when a BOWLER IDENTIFIED AND PRINTER IN POSITION signal is not present, the computer will cause the pulsing of the Y-GO solenoid YGO to initiate movement of the printer such that it may search to find the proper position.

From the foregoing, it will be apparent that the bowler identification system is primarily responsible for the positioning of the printer at the proper level on a scoresheet. However, it will also be apparent that when the printer is not in the proper position or, as will appear, the computer anticipates that the next printing operation will occur at a level different from that at which the printer is currently located, the computer will cause movement of the printer to the proper position.

F. Conventions Used in the Specification and Drawings

The instant invention comprises an almost wholly electronic device comprised of standard, semiconductor building blocks such as flip-flops (bistable multivibrators), AND gates, OR gates, NAND gates, NOR gates, delay multivibrators (monostable multivibrators), clocks (astable multivibrators), electronic switches and inverters. The logic, which is generally a so-called "negative logic" approach and is asynchronous, utilizes various combinations of these elements which are wholly comprised of capacitors, resistors, diodes and transistors. Where mechanical or electromechanical devices are used, they will be called by their conventional name.

In the drawings, a flip-flop is indicated as a pair of touching or intersecting circles having a "1" within one of the circles and an "0" within the other circle. Since, as is well known, a flip-flop may be either in a "set" condition or a "reset" condition, the "1" section of each flip-flop will be referred to hereinafter as the "set" section while the "0" section will be referred to as the "reset" section.

Conventional Boolean notations are used throughout and, accordingly, AND gates are indicated as closed semicircles having a dot (Boolean "and" convention) therein while OR gates are indicated as closed semicircles having a plus (Boolean "or" convention) therein. NAND gates are designated by a doubly closed semicircle having a dot therein, while NOR gates are shown as doubly closed semicircles having a plus therein. Delay multivibrators are shown as a pair of intersecting circles with a pulse symbol within one of the circles while clocks or free running multivibrators are shown as a pair of intersecting circles. Electronic switches are indicated by a pair of concentric circles while inverters are indicated as a triangle having an inner line parallel to one side thereof and intersecting the other two sides.

With respect to the various notations used throughout the drawings and description, all physical elements are referred to either wholly by number or letter, or by one or more letters followed by one or more numbers. In the case of the latter, the letters preceding the numbers are abbreviations for the particular portions of the computer in which the element exists. For example, certain elements in the pinfall counter are preceded by the letter designation PC. The numbers following a letter or combination thereof, except with reference to the memory bits and the pinfall buffers, represent the binary coded number that may be present in that bit or the binary coded decimal number that may be present in that bit. For example, the reference character PC4 refers to the third bit of the pinfall counter, which bit, when set, will contain the binary coded number four therein. Similarly, the reference character BCD800 refers to the 12th bit of the binary coded decimal up counter which, when set, will contain the binary coded decimal number 800 therein. In the case of the memory bits, the number refers to the numerical position of the bit as opposed to the number contained therein. With respect to the pin detecting switches and pinfall buffers, the number designates the pin position on the bowling lane to which the pinfall buffer corresponds.

Throughout the specification and drawings, various input and output signals are given reference designations. In many instances, such signals will be referred to be concise descriptive phrases or abbreviations that are self-explanatory. In other instances, they will be referred to by designations made up of a combination of one or more numbers followed by one or more letters. In such cases, the order of the letters and numbers has been reversed from that used describing the physical element from which the signal is issued. Thus, a signal designated 1PC or $\overline{1PC}$ are outputs from the first bit of the pinfall counter, the 1PC signal being an output from the set section of the flip-flop PC1 while the $\overline{1PC}$ signal is an output from the reset section of the flip-flop PC1. From the foregoing, it will be apparent that a signal designation is characterized merely by the inversion of the order of the letters and numbers of the physical element that generates the signal.

Finally, in the specification, various gates will be referred to as being of the "pulse-forming" type. Such gates are designated in the drawings in the manner set forth above but further including a conventional symbol for a capacitor on one or more of their input leads. Whenever such a designation occurs, it will be understood that the gate shown or referred to is a conventional pulse forming gate of the type denoted by the particular symbol used.

II. SPECIFIC DESCRIPTION OF THE SYSTEM

A. Pin Detection

Means are provided for detecting pinfall on a bowling lane and for issuing signals in response to such detection, which signals comprise a source of pinfall information which is eventually fed to the scoring apparatus such that scores may be computed therefrom in a manner to be described hereinafter. The pinfall detecting devices may be conventional in nature and may be associated with an automatic pinsetter or independent thereof. In the disclosed exemplary embodiment of the invention, the pin detecting mechanisms may take on the form of the pin detecting means disclosed in the Torresen et al. application Ser. No. 50,542, and are arranged on the pin deck of an automatic pinsetter in the manner disclosed in that application.

Figure 6:
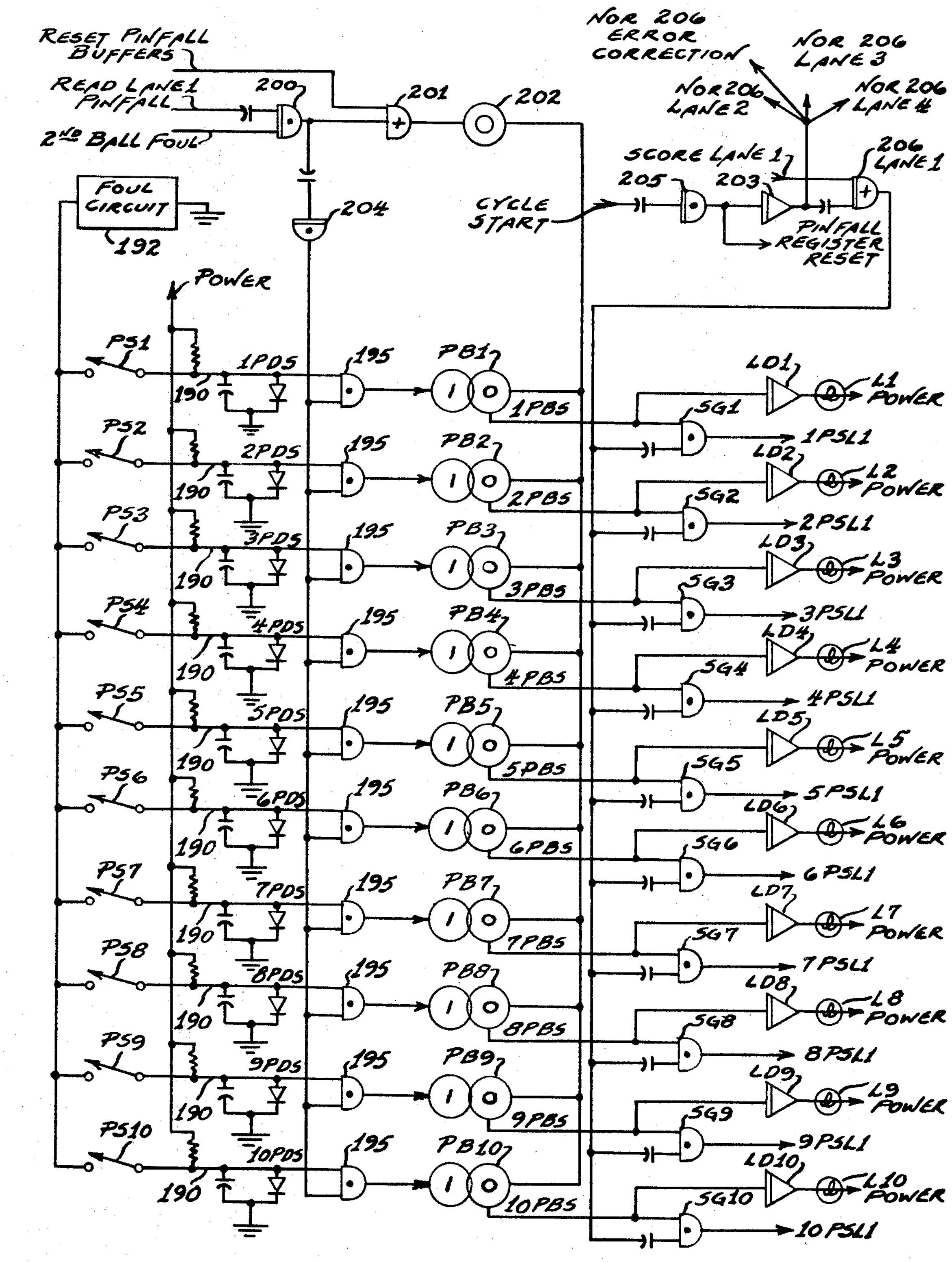
FIG. 6 is a schematic of the means used for pin detection, pinfall buffering and the steering of pinfall information to the computer for one lane.

The pin detecting means of the Torresen et al. application comprises switches and are schematically shown as switches PS1—PS10 in FIG. 6. The switch PS1 is arranged to be opened by a standing one pin. The switches PS2—PS10 are similarly arranged to be opened by standing two–10 pins, respectively. One side of each of the switches PS1—PS10 have a common lead through a foul circuit 192 to ground. The other sides of each of the switches PS1—PS10 are each connected through a network, generally designated 190, comprised of a resistor, a capacitor and a diode to ground and to a source of power. The networks 190 are arranged such that when any given switch PS1—PS10 is closed, there will be no signal on the network side of such a switch, assuming that the foul circuit 192 is in a condition to ground the side of the switches PS1—PS10 to which it is connected. However, when any given switch PS1—PS10 is opened, or when both of the switches 102 and 194 are opened in a manner to be described hereinafter, a signal will appear on the network side of the corresponding switch. Since, as noted above, each of the switches PS1—PS10 is opened to correspond to a standing pin, an output signal on the network side of any one or more of the switches PS1—PS10 corresponds to a standing pin in the designated position. Such PIN DETECTED STANDING signals from the switches PS1—PS10 are indicated as signals 1PDS—10PDS, respectively, and are fed to a pinfall buffering system for such purposes as will be described below.

B. Pinfall Buffers

A pinfall buffering system, shown in FIG. 6, is provided for each of the four lanes with which the scoring apparatus is to be used. Each of the four pinfall buffers consists of 10 flip-flops PB1—PB10 which serve as storage devices for storing pinfall information relative to pins one—10 respectively.

The set lead of the flip-flop PB1 is connected through an AND gate 195 to the network side of the switch PS1 in the pin detection system to receive a signal 1PDS therefrom. The remaining flip-flops PB2—PB10 are similarly connected to the network side of the corresponding switches PS2—PS10 in the pin detection system. Thus, a 1PDS signal serves as an input to the AND gate 195 interposed between the switch PS1 and the flip-flop PB1 while a 2PDS signal serves as an input to the AND gate 195 interposed between the switch PS2 and the flip-flop PB2, etc.

Each of the AND gates 195 additionally has a common input on which a READ LANE ONE PINFALL signal is received. The READ LANE ONE PINFALL signal is issued by the scanning cycle control in a manner to be described hereinafter and is first fed to a pulse-forming NAND gate 200. The output of the NAND gate 200 is then fed to an electronic switch 202, which, when energized, causes the flip-flops PB1—PB10 to be reset. The output from the NAND gate 200 is also fed to another pulse-forming NAND gate 204, the output of the latter being slightly delayed and fed to the common input of each of the AND gates 195, to enable the latter after resetting of the flip-flops PB1—PB10 to permit setting of selected ones of the flip-flops PB1—PB10 in accordance with the condition of the pin detecting switches PS1—PS10.

The NAND gate 200 has a second input which may receive a SECOND BALL FOUL signal as will appear and which will disable the NAND gate 200 to prevent the resetting of the flip-flop PB1—PB10 in the event of a second ball foul. Such an arrangement is required as when a second ball foul occurs, the pinfall achieved by the first ball should be counted while that achieved by the second ball disregarded. Thus, in order to preserve the first ball pinfall information contained in the flip-flops PB1—PB10, it is necessary to prevent the resetting thereof.

It should be noted that an OR gate 201 is interposed between the NAND gate 200 and the electronic switch 202 such that it will pass the output of the NAND gate 200 to the electronic switch 202 to reset the pinfall buffers PB1—PB10 when a READ LANE ONE PINFALL signal is issued and a foul has not been detected or verified. The OR gate 201 includes a second input for receiving a RESET PINFALL BUFFERS signal which may be generated in an automatic pinsetter near the end of a typical second ball cycle thereof. Since, as will be seen, the pinfall buffers PB1—PB10 are additionally used to control lamps for indicating standing pins, and it is desirable to turn off such lamps prior to the bowling of a subsequent bowler, the RESET PINFALL BUFFERS signal is issued to reset pinfall buffers PB1—PB10 and to turn off the lamps in a manner to be seen when a bowler has substantially completed his frame as indicated by the nearing of completion of the second ball cycle of the automatic pinsetter.

The operation of the pinfall buffer is as follows. If it be assumed that a ball has been rolled and a foul has not been detected or verified, non, certain ones, or all of the switches PS1—PS10 will be closed corresponding to the downing of a pin in the position to which they correspond. When the READ LANE ONE PINFALL signal is issued, the AND gates 195 associated with open ones of the switches PS1—PS10 will be enabled to set their associated flip-flops PB1—PB10.

When a subsequent ball is rolled, the READ LANE ONE PINFALL signal will first cause the flip-flops PB1—PB10 to be reset whereupon the subsequent enabling of the AND gates 195 by the READ LANE ONE PINFALL signal will permit certain ones of the flip-flop PB1—PB10 to be set if the corresponding switches PS1—PS10 are opened by standing pins. Thus, it will be apparent that when a foul does not occur, the operation of the pinfall buffers PB1—PB10 and the switches PS1—PS10 will proceed in an identical manner when the READ LANE ONE PINFALL signal is issued.

When a first ball foul is detected and verified, the foul circuit 192, in a manner to be seen, will cause the common connection between each of the switches PS1—PS10 to go to the potential of the power source such that all pins will be read as standing when the AND gates 195 are enabled by the READ LANE ONE PINFALL signal. In other words, the potential at the network side of the switches PS1—PS10 will be made equal to that of the power source whether or not the switches PS1—PS10 are opened or closed.

In the case of a second ball foul, certain ones of the pinfall buffers PB1—PB10 will have been set corresponding to the standing pins remaining after the first ball and will not be reset due to the disabling of the NAND gate 200 by the presence of the SECOND BALL FOUL signal placed thereon. Furthermore, since the NAND gate 200 is disabled in the manner just mentioned, the AND gates 195 will not be enabled by the READ LANE ONE PINFALL signal and thus the switches PS1—PS10 cannot be read and the condition of the flip-flops PB1—PB10 will remain unchanged from that present after the sensing of the first ball pinfall.

C. Light Drivers and Steering Gates

Means are provided for each of the four lanes scored by the computing device for visually indicating the position of standing pins to a bowler after his first ball as shown in FIG. 6. Lamps L1—L10, when lit, correspond to standing one—10 pins respectively. The lamps L1—L10 may be arranged in a triangular array corresponding to the conventional array in which the bowling pins are disposed. In order to cause any one or all of the lamps L1—L10 to be illuminated due to a corresponding standing pin, lamp drivers LD1—LD10 are placed in series with the respective lamps L1—L10 and a source of power. Each of the lamp drivers LD1—LD10 are comprised of electronic switches of a conventional nature and have their inputs connected to an output of the corresponding flip-flop PB1—PB10. The flip-flops PB1—PB10, when set, provide an output signal indicating their set condition, 1PBS—10PBS, which is applied to the appropriate lamp driver LD1—LD10. Accordingly, when any one of the flip-flops PB1—PB10 are set, the corresponding lamp driver LD1—LD10 is energized to cause its respective lamp L1—L10 to be illuminated and indicate to a bowler that a corresponding pin is standing.

Since a single computer is utilized to compute bowling scores achieved on four bowling lanes, it is necessary to provide means for selectively associating the computer with the pinfall information systems on each lane such that the computer receives pinfall information from but one lane at a time. This function is achieved through the use of four sets of steering gates SG1—SG10 associated with each of the four lanes, each of which is comprised of a two input AND gate. Each of the steering gates SG1—SG10 has an input connected to an output of the corresponding flip-flop PB1—PB10 of the pinfall buffer. The second input of each of the steering gates SG1—SG10 have a common connection of a NOR gate 206. The NOR gate 206 has a pair of inputs the first of which receives a SCORE LANE ONE (or TWO or THREE or FOUR or ERROR CORRECTION depending upon the information source) signal, while the second receives a CYCLE START signal through an inverter 203 from a pulse-forming NAND gate 205. Both signals are generated by the scanning cycle control. From the foregoing, it will be apparent that when a steering gate SG1—SG10 receives an appropriate signal 1PBS—10PBS corresponding to a set flip-flop PB1—PB10 and an input from the output of the NOR gate 206, each of the steering gates SG1—SG10 will issue an output if the pin to which it corresponds is standing. Such output signals, assuming that the gates SG1—SG10 are associated with lane one to provide the computer with pinfall information therefrom, are labeled 1PSL1—10PSL1, the first number standing for the position of the standing pin, and the second number standing for the lane number, here lane one. Thus, a 5PSL4 signal indicates that a bowler had left a five pin standing on lane four.

Of course, it will be appreciated that signals such as the 1PSL1 output from the AND gate SG1 will occur only when the latter receives a signal from the pinfall buffer corresponding to standing one pin and an input signal which is the output signal from the NOR gate 206. Accordingly, the output of the NOR gate 206 is controlled by appropriate inputs to be described hereinafter to control the issuing of signals 1PSL1—10PSL1 to the computer. Further, as noted above, there is a separate and similar light driver and steering gate circuit associated with each of the pinfall buffers on each of the four lanes from which the computer derives its input information. Thus, by suitable control of the NOR gates 206–1, 206–2, 206–3, 206–4 and 206–ERROR CORRECTION for lanes one—four and the error correction system, respectively, pinfall information from but a single selected source will be received by the computer at any given instant.

The output of the NAND gate 205 is also used to issue a PINFALL REGISTER RESET signal which is used as will appear.

D. Pinfall Register

Means are provided in the computing apparatus for receiving pinfall information from each of the lanes one—four. As noted above, such pinfall information is fed to the computer as signals 1PSL1—10PSL4, it being understood that the number of such signals cannot exceed 10 as they correspond to the number of pins standing on any given lane and are derived from but a single lane at any time by virtue of the operation of the NOR gates 206–1 through 206–4 and the steering gates SG1–10 for each lane.

Figure 7:
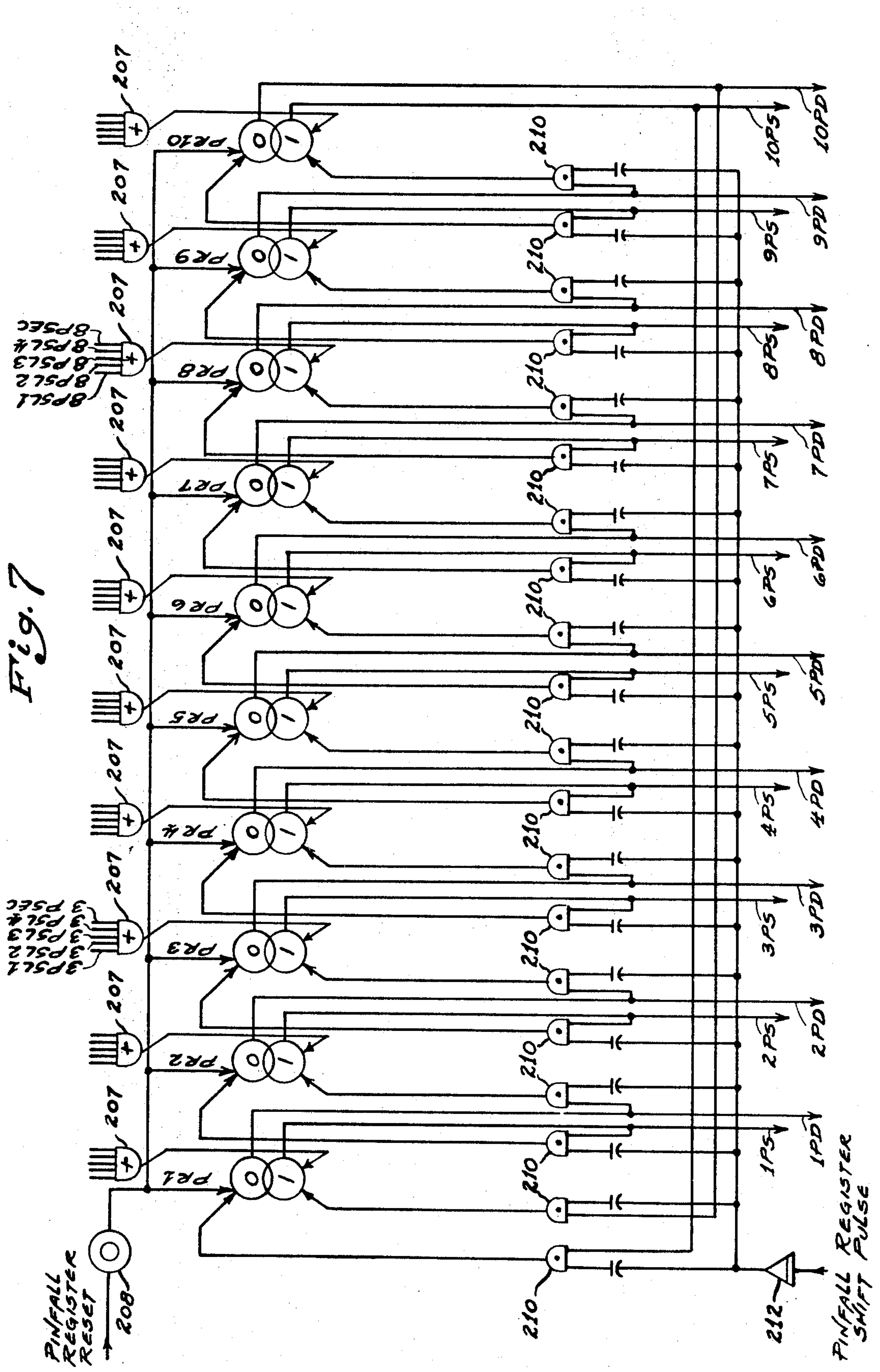
FIG. 7 is a logic diagram of a pinfall register which accepts pinfall information and converts it to a form usable by the computer.

More specifically, the pinfall information from an appropriately selected lane is received in the computing apparatus by a 10-bit recirculating shift register shown in FIG. 7. The 10-bit recirculating shift register is comprised of a series of 10 flip-flops PR1—PR10, each of which is arranged to be set when a corresponding pin is standing on the preselected lane. This function is achieved by connecting the set input of the flip-flop PR1 to the output of each of the steering gates SG1 on lanes one—four through an OR gate 207. The set inputs of each of the flip-flops PR2—PR10 are similarly connected to the outputs of each of the steering gates SG2—SG10 on lanes one—four through OR gates 207. The OR gates 207 additionally have fifth inputs on which 1PSEC—10PSEC signals may be received from the error correction system as will appear.

Each of the flip-flops PR1—PR10 have a common reset connection to an electronic switch 208 which is energized to cause the flip-flops PR1—PR10 to be reset by a PINFALL REGISTER RESET signal generated by the NOR gate 205 (FIG. 6) associated with the steering gates as described previously.

Each of the flip-flops PR1—PR9 have an output 1PD—9PD from their reset section leading through a two input AND gate 210 to the set section of the next higher flip-flop. The flip-flop PR10 has a similar connection to the flip-flop PR1. Additionally, an output 1PS—9PS from the set section of each of the flip-flops PR1—PR9 is fed through a two input AND gate 210 to the reset section of the next higher flip-flop. Again, the flip-flop PR10 has a similar connection to the flip-flop PR1. From the foregoing, it will be apparent that 20 AND gates 210 are arranged to gate output signals from one flip-flop to the next higher flip-flop (with the exception of the gating of outputs of the flip-flop PR10 to the flip-flop PR1).

Each of the AND gates 210 has a common second input connected to the output of an inverter 212 which receives PINFALL REGISTER SHIFT PULSE signal from the pinfall register control as described hereinafter. Each pulse output of the inverter 212 will cause the flip-flop PR2 to assume the condition of the flip-flop PR1, the flip-flop PR3 to assume the condition of the flip-flop PR2, ... and the flip-flop PR1 to assume the condition of the flip-flop PR10. Ten such pulses are generated by the pinfall register control such that the condition of each of the flip-flops PR1—PR10 is shifted 10 times. As a result of this arrangement the condition of the flip-flop PR1, for example, is at least momentarily placed on each of the flip-flops PR2—PR10 and finally is replaced on the flip-flop PR1.

It should be noted that the output of the reset sections of the flip-flops PR1—PR10, which outputs are numbered 1PD—10PD respectively, do not have a signal thereon when their corresponding pin is down. Similarly, the outputs 1PS—10PS of the set side of the flip-flops PR1—PR10 do not have a signal thereon when the respective flip-flops are set corresponding to a standing pin. When any given flip-flop PR1—PR10 is reset corresponding to a downed pin, its set section output 1PS—10PS may issue an output signal while when a flip-flop PR1—PR10 is set corresponding to a standing pin, its reset output 1PD—10PD will have a signal thereon.

From the foregoing, it will be apparent that during the shift cycle the set section output 10PS of the flip-flop PR10 will have placed thereon a number of output signals or pulses corresponding to the number of downed pins as determined by the number of reset flip-flops. This information is used for score computation in a manner to be described hereinafter.

The signals appearing on the various outputs 1PS—10PS and 1PD—10PD are also utilized in a split detection system to be described hereinafter.

E. Pinfall Register Control

As noted above in the description of the pinfall register, the pinfall achieved by a ball is converted to a string of pulses therein, which string of pulses is read from the output 10PS of the set side of the flip-flop PR10 of the pinfall register during the shift cycle. In order to provide the necessary pulses to the inverter 212 of the pinfall register to cause initiation of a shift cycle, a pinfall register control is provided.

Figure 8:
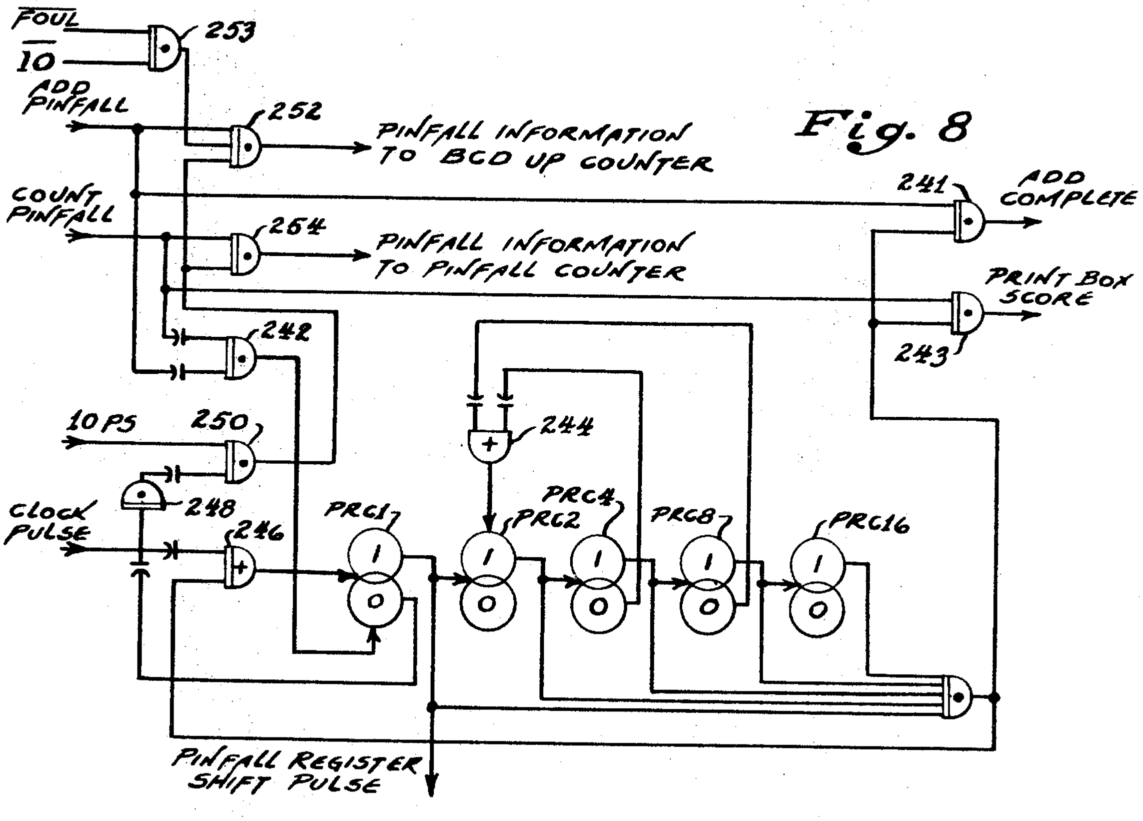
FIG. 8 is a logic diagram of a control for the pinfall register.

The pinfall register control consists of a twenty feedback counter comprised of five flip-flops PRC1, PRC2, PRC4, PRC8 and PRC16 as shown in FIG. 8. The outputs of the set section of the first four flip-flops PRC1, PRC2, PRC4 and PRC8 are connected to the trigger input of the next higher flip-flop to sense one to zero changes of the lower flip-flop. Additionally, the outputs of the set section of each of the five flip-flops are connected as inputs to a NAND gate 240. Finally, the set section output of the flip-flop PRC1, on which PINFALL REGISTER SHIFT PULSES are issued, is connected to the input of the inverter 212 shown in FIG. 7. A reset input on the flip-flop PRC1 is connected to the output of a NAND gate 242 which is arranged to cause the flip-flop PRC1 to be reset whenever an ADD PINFALL or a COUNT PINFALL signal is issued by the computer cycle control gating. The outputs of the reset section of the flip-flops PRC4 and PRC8 are connected as inputs to an OR gate 244 which has its output connected to the set lead of the flip-flop PRC2.

Timing pulses for the pinfall register control are issued by a clock such as a free running multivibrator, at two times the required rate of shifting of the pinfall register shown in FIG. 7 and are utilized as an input to a NOR gate 246. The NOR gate 246 has as a second input, the output of the NAND gate 240, which normally disables the NOR gate 246. The output of the NOR gate 246 is connected to the input of the flip-flop PRC1.

The output from the reset section of the flip-flop PRC1 is fed through a one input NAND gate 248 to NAND gate 250 as an input thereto. The NAND gate 250 has a second input which is connected to the output of the set section of the flip-flop PR10 of the pinfall register. The output of the NAND gate 250 serves as a common input to two NAND gates 252 and 254, each of which has a second input on which an ADD PINFALL or a COUNT PINFALL signal is received, respectively. The outputs from the NAND gates 252 and 254 are fed to the BCD up counter for calculation of a bowler's cumulative score and to a pinfall counter for computation of a bowler's box score respectively.

The NAND gate 252 has a third input from a NAND gate 253 which normally receives FOUL and STATE 10 signals. Whenever both signals are not present, corresponding to a foul by a bowler when his state is STATE 10, the output of the NAND gate 253 disables the NAND gate 252 to preclude the adding of pinfall to the bowler's score.

By virtue of the feedback from the reset section of the flip-flops PRC4 and PRC8 through the OR gate 244 to the set lead of the flip-flop PRC2, it will be apparent that the pinfall register control counts in the following sequence.

TABLE 3

| PRC16 | PRC8 | PRC4 | PRC2 | PRC1 | Actual decimal number in control | Number of input pulses |
|---|---|---|---|---|---|---|
| | | | | Start | | |
| 0 | 0 | 0 | 0 | 0 Shift | 0 | 1 |
| 0 | 0 | 0 | 0 | 1 | 1 | 2 |
| 0 | 0 | 0 | 1 | 0 Shift | 2 | 3 |
| 0 | 0 | 0 | 1 | 1 | 3 | 4 |
| 0 | 0 | 1 | 1 | 0 Shift | 6 | 5 |
| 0 | 0 | 1 | 1 | 1 | 7 | 6 |
| 0 | 1 | 0 | 1 | 0 Shift | 10 | 7 |
| 0 | 1 | 0 | 1 | 1 | 11 | 8 |
| 0 | 1 | 1 | 1 | 0 Shift | 14 | 9 |
| 0 | 1 | 1 | 1 | 1 | 15 | 10 |
| 1 | 0 | 0 | 0 | 0 Shift | 16 | 11 |
| 1 | 0 | 0 | 0 | 1 | 17 | 12 |
| 1 | 0 | 0 | 1 | 0 Shift | 18 | 13 |
| 1 | 0 | 0 | 1 | 1 | 19 | 14 |
| 1 | 0 | 1 | 1 | 0 Shift | 22 | 15 |
| 1 | 0 | 1 | 1 | 1 | 23 | 16 |
| 1 | 1 | 0 | 1 | 0 Shift | 26 | 17 |
| 1 | 1 | 0 | 1 | 1 | 27 | 18 |
| 1 | 1 | 1 | 1 | 0 Shift | 30 | 19 |
| 1 | 1 | 1 | 1 | 1 Stop | 31 | 20 |

The operation of the pinfall register control is as follows. When either an ADD PINFALL or a COUNT PINFALL signal is received by the NAND gate 242, the latter causes the flip-flop PRC1 to be reset. As a result of the resetting of the flip-flop PRC1, the flip-flop PRC2 will be reset as will be flip-flops PRC4, PRC8 and PRC16. As a result of the changes of the conditions of the flip-flops, the NAND gate 240 no longer causes the NOR gate 246 to block the input from the clock to the flip-flop PRC1 and timing pulses from the clock are applied to the input of the flip-flop PRC1 causing it to alternately be placed in a set and reset condition.

When the output of the NAND gate 242 caused the flip-flop PRC1 to be reset, a PINFALL REGISTER SHIFT PULSE signal was issued to the pinfall register. Since the input to the flip-flop PRC1 is no longer blocked by action of the NOR gate 246, a pulse from the clock causes the flip-flop PRC1 to be set. This causes no change in condition of the flip-flop PRC2. Upon reception of the next clock pulse by the flip-flop PRC1, it returns to a reset condition and issues a second shift pulse. This resetting of the flip-flop PRC1 causes the flip-flop PRC2 to be set. The next timing pulse received by the flip-flop PRC1 again causes it to be set while the condition of the remaining flip-flops is unchanged. Upon receiving the next pulse from the clock, the flip-flop PRC1 is again reset to thereby issue a third shift pulse to the pinfall register while simultaneously causing the flip-flop PRC2 to be reset, which action causes the flip-flop PRC4 to be set. When the flip-flop PRC4 becomes set, the feedback from its reset section is passed through the OR gate 244 to set the flip-flop PRC2. Thus, as a result of the feedback, the flip-flops have been caused to jump from 00011 to 00110 by a single clock pulse, skipping the numbers 00100 and 00101. As indicated in Table 3, the feedback from the flip-flops PRC4 and PRC8 through the OR gate 244 to the flip-flop PRC2 cause several such jumps during the counting sequence such that the counter goes from an "all bits reset" to an "all bits set" condition upon the reception of but twenty input pulses, the first of which is applied as a result of the change of the NAND gate 242 in response to an input thereto and nineteen are received from the clock.

When the control has reached an "all bits set" condition, the inputs from each of the five flip-flops to the NAND gate 240 cause the latter to issue a signal to the NOR gate 246 to block further inputs to the flip-flop PRC1 to thereby stop the counting sequence.

As noted above, a NAND gate 248 is interposed between an input of a NAND gate 240 and the output of the reset side of the flip-flop PRC1. The reset section output of the flip-flop PRC1 issues a train of pulses which are related in time to the train of output pulses present on the set output 10PS of the flip-flop PR10 of the pinfall register. As the above noted output from the pinfall register is connected as an input to the NAND gate 250, the pulses from the reset section of the flip-flop PRC1 serve as enabling pulses to permit signals indicative of the number of down pins to be passed as inputs in both of the NAND gates 252 and 254. Depending on whether the counting sequence and resultant shift cycle were initiated by an ADD PINFALL or a COUNT PINFALL signal, one of the NAND gates 252 or 254 will be enabled to have an output of pinfall information in the form of a string of pulses which will be fed to either a BCD up counter for the purpose of totalizing the bowler's score or to the pinfall counter to enable a bowler's box score to be computed. The BCD up counter and pinfall counters comprise the arithmetic register and utilize such input signals in a manner to be described hereinafter.

A pair of NAND gates 241 and 243 receive ADD PINFALL and COUNT PINFALL signals respectively and have common second inputs from the NAND gate 240. As a result of this logic arrangement, when each flip-flop of the pinfall register control is set corresponding to the end of a counting or adding sequence, one of the NAND gates 241 and 243, depending on whether it is a counting or an adding sequence, will be enabled. In the case of an adding sequence, the NAND gate 241 will issue an ADD COMPLETE signal. If it is a counting sequence, the NAND gate 243 will issue a PRINT BOX SCORE signal. The use of the signals will appear hereinafter.

F. Arithmetic Register

Figure 9A:
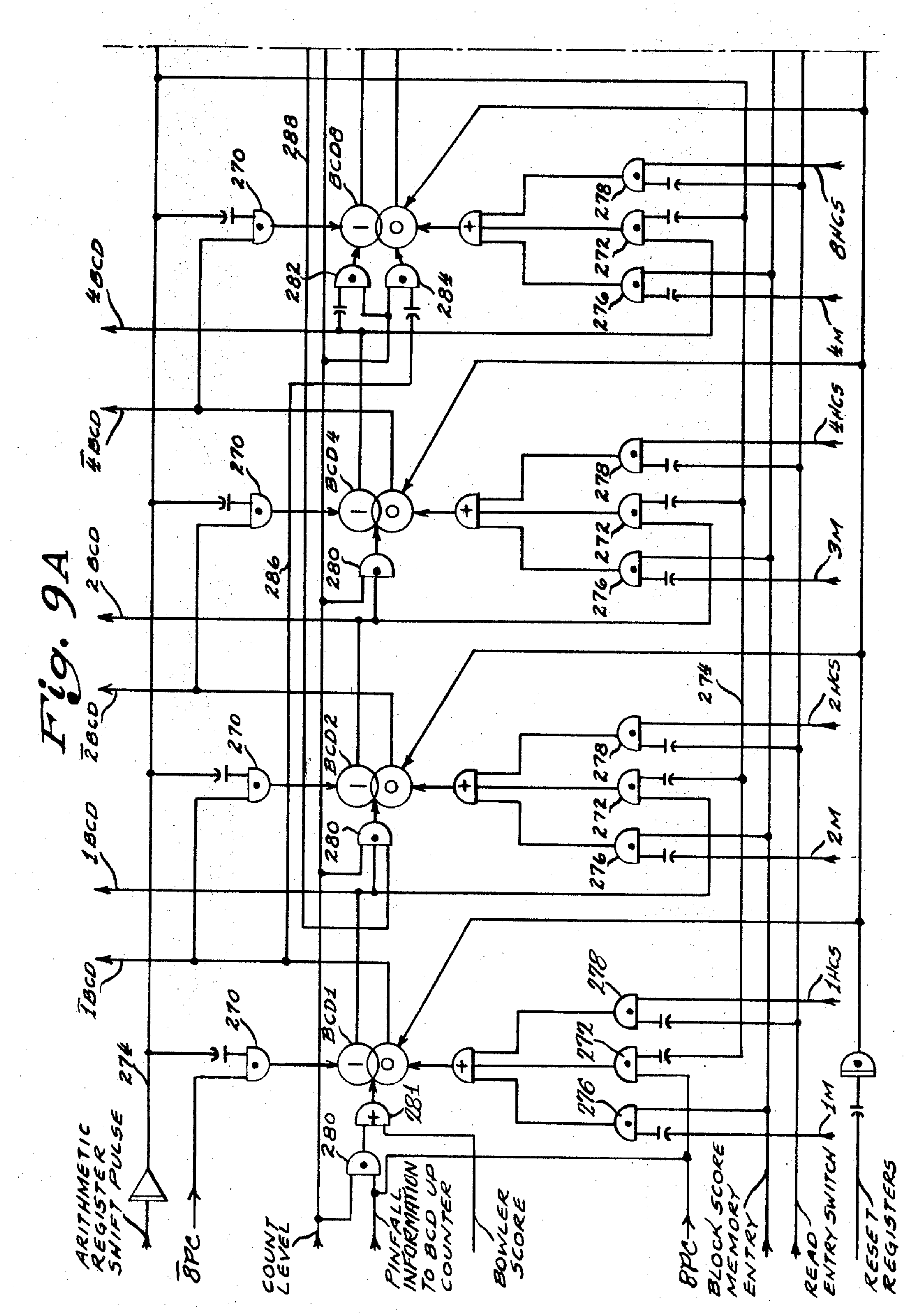
Figure 9B:
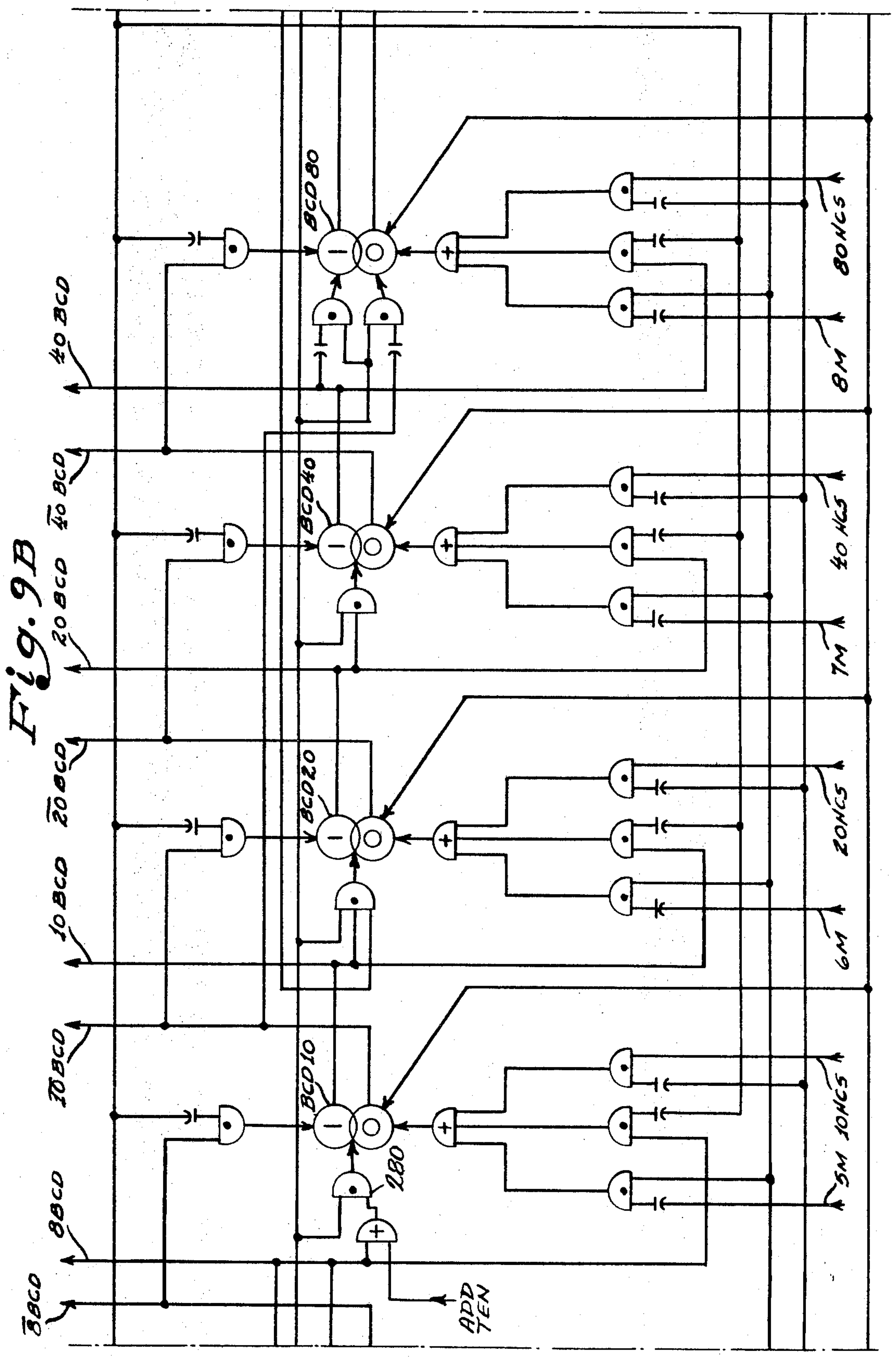
Figure 9C:
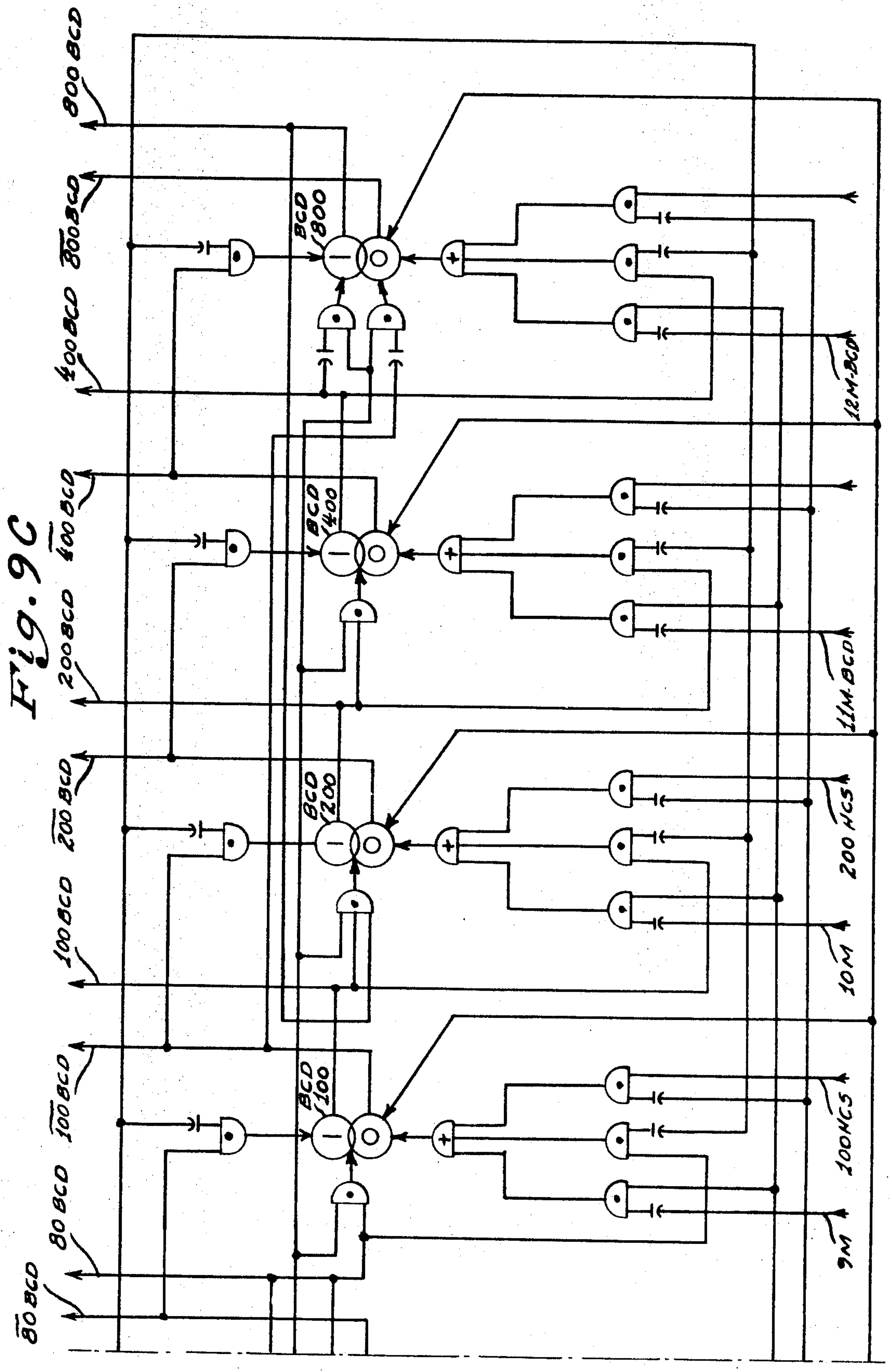
FIG. 9C is positioned similarly with respect to FIG. 9B.

Actual computation of bowler's scores for frame score purposes and the counting of pinfall for box score purposes are accomplished in the arithmetic register. The arithmetic register is comprised of a three decade binary coded decimal up counter and shift register shown in FIGS. 9*a*, 9*b* and 9*c* and a pinfall counter and shift register illustrated in FIG. 10, and both counters are connected together to form a recirculating shift register.

1. Binary Coded Decimal Up Counter And Shift Register

The BCD up counter and shift register (FIGS. 9*a*, 9*b* and 9*c*) is comprised of 12 flip-flops BCD1, BCD2, BCD4, BCD8, BCD10, BCD20, BCD40, BCD80, BCD100, BCD200, BCD400 and BCD800, the number following the BCD serving to indicate the decimal number held in each of the flip-flops when it is set. Each of the flip-flops BCD1—BCD800 are interconnected in a conventional manner to form an up counter and shift register. More specifically, the output of the reset section of a flip-flop serves as an input to AND gates 270 having outputs connected to the set section of the next higher flip-flop while the outputs of the set sections of each flip-flop are connected through AND gates 272 as inputs to the reset section of the next higher flip-flop. Each of the AND gates 270 and 272 have a common connection to a lead 274 on which an ARITHMETIC REGISTER SHIFT PULSE is issued by the printer cycle control as will appear to cause the condition of any given flip-flop to be placed upon the next higher flip-flop.

The flip-flop BCD1 receives pinfall information through an OR gate 281 and an AND gate 280 which has an input connected to the output of the NAND gate 252 of the pinfall register control. Each of the flip-flops BCD1—BCD800 have inputs to their reset sections from the outputs of AND gates 276 which, in turn, have their inputs connected to the respective bits in the memory in a manner to be described hereinafter. Each of the AND gates 276 has a second input on which a BLOCK SCORE MEMORY ENTRY signal may be issued to cause the AND gates 276 to block the passage of information from the memories to the flip-flops BCD1—BCD800. Additionally, each flip-flop BCD1—BCD800 has an input for receiving a RESET REGISTERS signal to reset the flip-flops. Finally, each of the flip-flops BCD1—BCD200 have a third input to their reset sections from the output of AND gates 278 which have inputs connected to the error correction and handicap system for correcting scoring errors and for introducing handicap values in a manner to be described hereinafter. Additionally, each of the AND gates 278 has a second input on which "READ ENTRY SWITCH" pulse may be issued to cause and the AND gates 278 to pass to the flip-flops BCD1—BCD200 the information set up on the manually operated error correction and handicap entry system.

The counting sequence of each of the three decades is similar and thus only one need be described. For example, the least significant decade, comprised of the flip-flops BCD1—BCD8, count as follows:

TABLE 4

| BCD8 | BCD4 | BCD2 | BCD1 | Decimal count |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 0 | 0 | 0 | 0 | [1] 10 |

[1] 1 on BCD10.

To achieve the above counting sequence, the inputs to the three least significant bits or flip-flops of each decade are gated through AND gates 280. In the case of the flip-flop BCD1, the input is the pinfall information received from the pinfall register through the NAND gate 252 of the pinfall register control as noted above or in the form of BOWLER SCORE pulses from the down counter during a team totaling cycle. In the case of the remaining flip-flops comprising the three bits of most significance of each decade, the input to the respective AND gates 280 is received from the set section output of the next lower flip-flop. Additionally, each of the AND gates 280 receives an enabling COUNT LEVEL signal from an electronic switch 297 associated with the pinfall counter (FIG. 10) to permit the signal appearing on its input to be passed as an input to its corresponding flip-flop. As will appear, this signal is issued only during a counter or adding sequence and not during a shifting sequence.

The logic further includes AND gates 282 connected as inputs to the set section of the flip-flops comprising the most significant bit of each decade and AND gates 284 connected as inputs to the reset sections of such flip-flops. The flip-flops BCD8, BCD80 and BCD800 receive their usual pulse input from the set section of the next lowest flip-flop of their respective decades through the AND gates 282. A line 286 connected to the output of the reset section of the least significant flip-flop in each decade serves as an input to the AND gates 284 and thus to the reset section of the least significant flip-flop in each decade serves as an input to the AND gates 284 and thus to the reset section of the most significant flip-flop in each decade. Thus it will be apparent, for example, that whenever the flip-flop BCD1 goes from binary one to binary zero, the flip-flop BCD8, if previously set, will be reset corresponding to a binary zero unless a COUNT LEVEL signal is not present to enable the AND gates 280, 282 and 284.

A feedback line 288 from the set section of the most significant flip-flop of each decade is utilized as an input to the AND gates 280 connected to the flip-flops of second least significance in each respective decade (BCD2, BCD20, BCD200) and serves to disable the respective AND gates 280 whenever the most significant flip-flop of that decade is in a set condition corresponding to binary one. For example, when a tenth input pulse is received on the AND gate 280 of the flip-flop BCD1, that flip-flop will be reset and issue a signal to the flip-flop BCD2 which would normally cause the flip-flop BCD2 to be set. However, since at this point the flip-flop BCD8 is in a set condition, the input to the flip-flop BCD2 is disabled and the latter remains reset. Simultaneously therewith, the resetting of the flip-flop BCD1 causes the issuing of a signal on the line 286 to the AND gate 284 to reset the flip-flop BCD8. Accordingly, upon receipt of the tenth pulse input by the flip-flop BCD1, each of the flip-flops BCD1—BCD8 are reset (if not already reset) corresponding to binary zero and the resetting of the flip-flop BCD8 due to the signal on the line 286 causes the flip-flop BCD10 in the next higher decade to become set. As a result, a binary coded decimal number is in the BCD up counter and shift register which corresponds to decimal 10. The operation of the flip-flops in each decade is similar to that just described.

As is well known, in the scoring of bowling it is often necessary to add a value of 10 or 20 to the score in the event of the occurrence of a spare, a strike or a pair of successive strikes. To facilitate such an addition, the flip-flop BCD10 includes an additional ADD TEN input which, when energized in a manner to be seen hereinafter, causes the flip-flop to be set and/or reset such that the actual decimal number in the BCD up counter and shift register is increased by the value of 10 or 20.

As will be noted in FIGS. *9a*, *9b* and *9c*, each of the flip-flops BCD1—BCD800 includes leads from their respective outputs which are adapted to be associated with the various memory bit and a binary coded decimal down counter and shift register in a manner to be seen hereinafter.

From the foregoing, it will be apparent that the three decade binary coded decimal up counter and shift register is capable, in and of itself, of handling the computation of cumulative score values in the decimal range from zero to 999. While an individual bowler score can never exceed decimal 300, and thus is easily handled by the BCD up counter, quite often a team total score in league bowling will exceed decimal 999 and a team total score of decimal 1500 is possible. Furthermore, in a handicap league the maximum value of decimal 1500 for a team is increased by an amount equal to five times the maximum handicap permitted per bowler which increases the maximum possible team total to a figure in the neighborhood of decimal 2000. Accordingly, it is necessary to provide means in the arithmetic register over and above the BCD up counter to enable the computation of score values in the neighborhood of decimal 2000, in the event such a contingency occurs.

Figure 10:
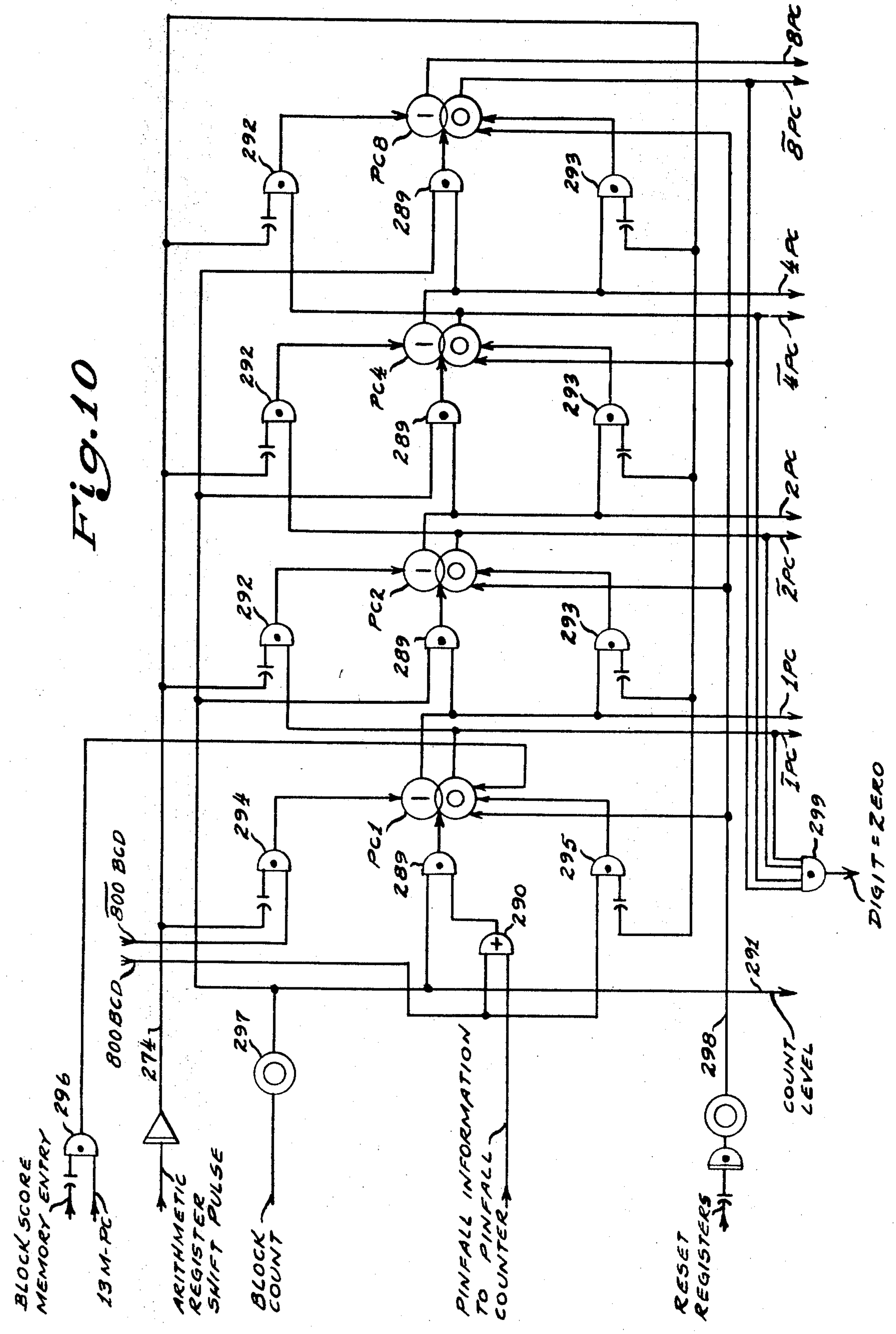
FIG. 10 is a logic diagram of the pinfall counter of the arithmetic register which is used to count pinfall for box score purposes.

To serve this end, the outputs from the flip-flop BCD800 are connected as inputs through appropriate gating to inputs of the flip-flop PC1 of the pinfall counter (FIG. 10). Thus, if it be assumed that the condition of the flip-flops BCD1—BCD800 in the BCD counter is 100110011001 corresponding to the presence of the decimal 999 therein, and a pulse is placed on the input to the flip-flop BCD of the arithmetic register to cause its condition to change to correspond to the decimal 1000, each of the flip-flops BCD1—BCD800 will be reset to binary zero in the manner generally described above. When the flip-flop BCD800 is reset, it will issue an output signal which serves as an input to the flip-flop PC1 of the pinfall counter to cause the latter to be set, which in the team total sequence, corresponds to decimal 1000. Additional input pulses may be fed to the BCD counter to cause it to reach a condition corresponding to decimal 999 which condition, when taken with the condition of the flip-flop PC1 of the binary counter, corresponds to decimal 1999. Such additional pulses have no effect on the condition of the flip-flop PC1 of the pinfall counter as the latter's condition is changed only when the flip-flop PCD800 goes from set to reset.

By virtue of the foregoing construction, it will be appreciated that the pinfall counter serves as a fourth quarter-decade of the BCD counter under certain conditions, namely when the computing apparatus is working with a number in excess of decimal 999. While the above description of the secondary function of the pinfall counter has been described with relation to input pulses to the BCD up counter, it will also be appreciated that the team total words in the memory for any given team may contain a number in excess of decimal 999. Since during a team total computing sequence it is necessary to read the memory into the BCD up counter such that additional pinfall achieved by the team may be computed therein, it is also necessary to provide the flip-flop PC1 of the pinfall counter with an input from the team total memory such that numbers in excess of decimal 999 may be read into the BCD up counter and that portion of the pinfall counter which is temporarily serving with the BCD counter. Accordingly, the flip-flop PC1 of the pinfall counter is provided with a gated input which is connectable to the bit of the various team total words in the memory corresponding to the number 1000 in a manner to be described hereinafter.

2. Pinfall Counter And Shift Register

In order to provide a complete record of a bowler's score, it is not only necessary to provide a cumulative or frame score, but, additionally, a so-called "box score" is required. A box score typically signifies the pinfall achieved on the first ball of a frame, the cumulative pinfall achieved on both balls in a frame, a split, a first or second ball foul, a strike or a spare. Means are provided in the instant invention for providing box score indications of each of the foregoing occurrences. In order to provide indications of the pinfall achieved by the first ball in a frame and the total pinfall achieved by both balls in a frame, the invention contemplates the use of a pinfall counter.

The pinfall counter is shown in FIG. 10 and is comprised of a binary up counter and shift register having four flip-flops PC1, PC2, PC4, and PC8. Each of the flip-flops PC1—PC8 receives its input during the counting sequence from respective AND gates 289. The input to an AND gate 289 associated with the flip-flop PC1 from which the latter derives its input is connected to the output of an OR gate 290 which receives a first input from the NAND gate 254 in the pinfall register control. It will be recalled that the NAND gate 254 is arranged to pass pinfall information from the pinfall register upon the receipt of a COUNT PINFALL signal to the pinfall counter. Also, the OR gate 290 has a second input which is connected to the set section of the flip-flop BCD800 of the BCD up counter.

Each of the AND gates 289 associated with the flip-flops PC2—PC8 have an input that is connected to the output of the set section of the next lower flip-flop. All of the AND gates 289 have a common input from a counter level lead 291 such that they are enabled only when a COUNT LEVEL signal is present thereon.

To enable the pinfall counter to act as a shift register, the reset section of each flip-flop PC1—PC4 is connected through AND gates 292 to the set section of the next higher flip-flop. Similar connections are made from the set sections of each of the flip-flops PC1—PC4 through AND gates 293 to the reset sections of the next higher flip-flop. Each of the AND gates 292 and 293 has a common input to the shift pulse lead 274 on which the printer cycle control issues shift pulses as will appear.

Each of the flip-flops PC1—PC8 is provided with a common connection to a reset line 298, which, when it receives a RESET REGISTERS signal, is operative to reset the flip-flops PC1—PC8 such that the condition of the pinfall counter will correspond to decimal 0.

To permit the information in the pinfall register to be utilized, the set sections of each of the flip-flops PC1—PC8 include outputs 1PC—8PC. Similarly, the reset sections of each of the flip-flops PC1—PC8 include outputs $\overline{\text{1PC}}$—$\overline{\text{8PC}}$. These outputs are connected to a binary to decimal printer character selection decoding matrix by means of which the condition of the pinfall counter, which is reflective of the pinfall achieved on a given lane for a given ball, is decoded and fed to the printer for that lane to select the appropriate printer character.

Finally, the outputs $\overline{\text{1PC}}$—$\overline{\text{8PC}}$ are used as inputs to an AND gate 299 which will issue a DIGIT EQUAL ZERO signal when all of the flip-flops PC1—PC8 are reset. This signal is used for zero suppression in the printer operation as will appear.

3. Recirculating Shift Register Connections

As mentioned previously, the BCD up counter and the pinfall counter are connected together to form a recirculating shift register. As will be seen hereinafter, when it is desired to print a bowler's score or a team total score, the contents of the BCD up counter are read out digit by digit into the pinfall counter from which they are decoded and then printed. This step occurs before the updated bowler's score is written into the appropriate memory word and accordingly, it is necessary that the updated score by replaced in the BCD up counter to be subsequently written in the memory. Additionally, in certain instances in a bowling game, it is necessary to update the score, print, update the score a second time and again print, all in rapid succession and the BCD up counter must be reloaded after the first printing in order that the second updating of the score may be performed. An example of such an instance is when an open frame follows a frame in which a strike was achieved.

To provide for the reading out of the BCD up counter into the pinfall counter, the flip-flop PC1 is provided with an AND gate 294 associated with its set section and the shift pulse lead 274 and which has an input connected to the output $\overline{\text{800}}$BCD of the reset section of the flip-flop BCD800 of the BCD up counter. The flip-flop PC1 additionally has an input to its reset section through an AND gate 295 similarly associated with the shift pulse lead 274 and which has a second input connected to the output 800BCD of the set section of the flip-flop BCD800 of the BCD up counter. These connections permit the contents of the BCD up counter to be shifted into the pinfall counter. The inputs to the flip-flop PC1 of the pinfall counter from the flip-flop BCD800 of the BCD up counter permit the former to serve as a fourth quasi-decade of the BCD up counter during the team total function should the team total score be of such a value as to exceed the capacity of the BCD up counter alone. Accordingly, the flip-flop PC1 may be set by an input from an AND gate 296 that is connected to the appropriate bit in the team total word in the memory and enabled under such circumstances as will appear.

A block count switch 297 is also used in conjunction with the pinfall counter. The output of the electronic switch 297 is connected to the count level lead 291 to issue a COUNT LEVEL signal to enable the AND gates 280, 282, 284 and 289 for adding sequences and to disable the AND gates upon the receipt of a BLOCK COUNT signal from the printer cycle control for a shifting sequence.

In order to provide for recirculation of the contents of the arithmetic register, the 8PC output of the flip-flop PC8 of the pinfall counter is connected as an input to the AND gate 272 associated with the flip-flop BCD1 of the BCD up counter. Additionally, the $\overline{8}$PC output of the flip-flop PC8 is connected as an input to the AND gate 270 associated with the flip-flop BCD1.

The resulting construction provides for recirculation of information within the arithmetic register in much the same manner as information contained within the pinfall register, discussed previously, is recirculated.

G. Bowler State Control

In order to properly score a bowling game, it is necessary to know at least a portion of the history of the bowler's game prior to the frame to be scored. Broadly, the history should provide information as to whether the bowler is currently working on a spare, a strike, a pair of successive strikes or an open frame. Additionally, in order to accommodate certain tenth frame situations in a bowling game when a bowler score computer is used in conjunction with an automatic pinsetter, it is also desirable that the bowler history indicate when the bowler is bowling in the tenth frame. In the instant invention, the pertinent history of a bowler's game necessary to direct proper computation and control of the 10th frame pinsetter control functions is coded as any one of the 11 possible states of the bowler's game set forth in Table 1. That is, each one of the 11 bowler states represents a distinct condition of the past history of a bowler's game. The presence of a particular bowler state during the computation of a bowler's score controls the computation thereof such that it is accomplished in accordance with the past history denoted by that particular state. Bowler state information is read out of a bowler's memory during a score cycle to direct the computation thereof, is updated if necessary in accordance with the scoring done by the bowler in that particular frame and is then written back into the bowler's memory for use in the next computation cycle for that bowler. Obviously, in order to provide these functions, it is necessary to provide a bowler state control. As will appear, the bowler state control is comprised of a bowler state register, a bowler state decoder, a bowler state updating matrix and an OR matrix.

1. Bowler State Register

Figure 11:
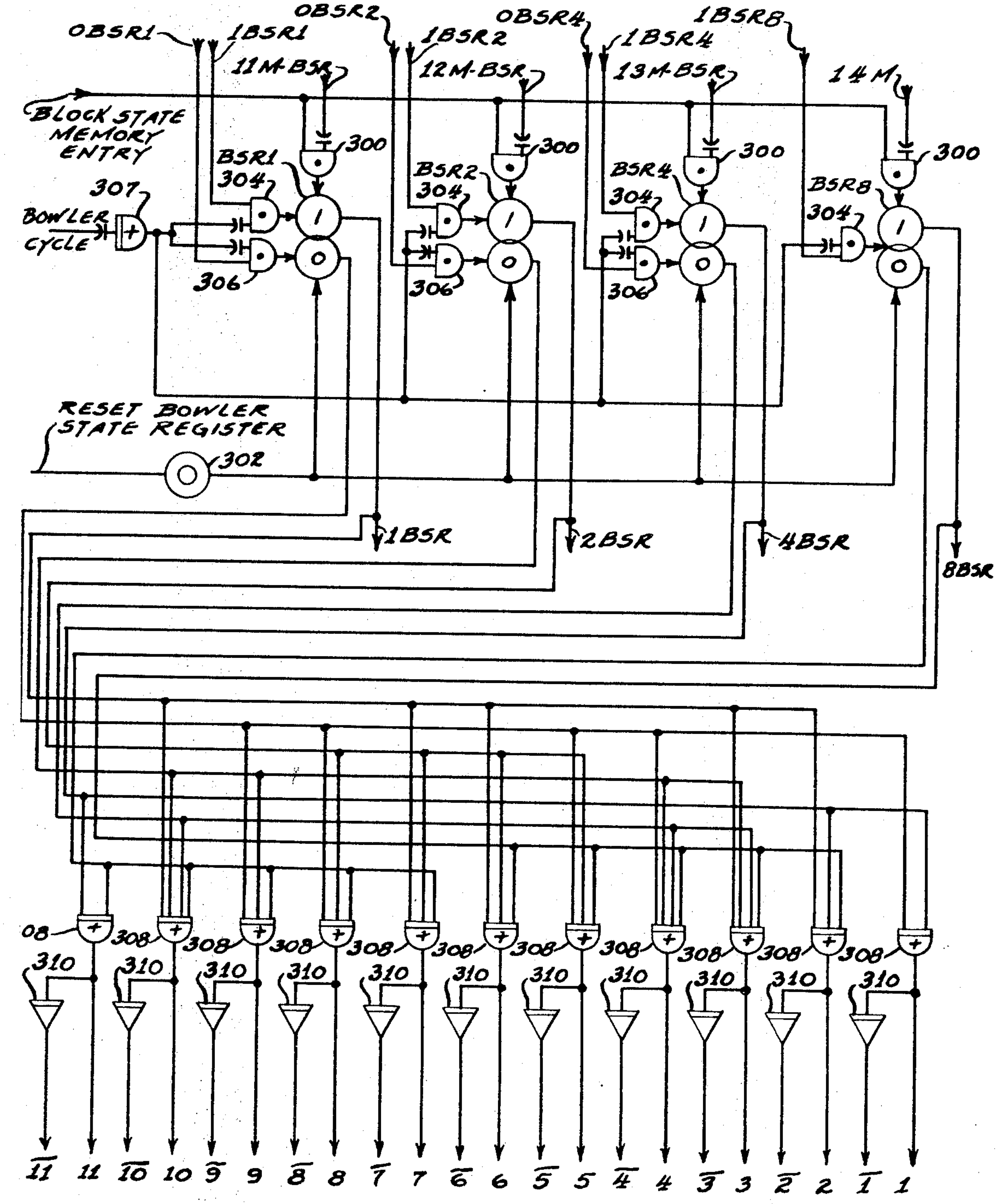
FIG. 11 is a logic diagram of a bowler state register and a bowler state decoding matrix which are used to control computation of a bowler's score in relation to past pinfall.

The bowler state register is shown in FIG. 11 and is comprised of four flip-flops BSR1, BSR2, BSR4, and BSR8. Each of the flip-flops BSR1—BSR8 has an input to its set section from a pulse forming AND gate 300. Each of the AND gates 300 has an input which may be associated with the appropriate bits in a bowler's memory and a second input on which a disabling BLOCK STATE MEMORY ENTRY signal may be received. As a result, when the BLOCK STATE MEMORY ENTRY signal is not present at the AND gates 300, and when a given bowler memory is selected, the flip-flops BSR1—BSR8 will be set in accordance with the condition of the corresponding bits in the bowler memory.

Each of the flip-flops BSR1—BSR8 includes a common connection to their reset sections from the output of an electronic switch 302 for receiving a RESET BOWLER STATE REGISTER signal at such times will hereinafter appear.

Each of the flip-flops BSR1—BSR8 are additionally provided with an input to their set sections from an AND gate 304 and an input to their reset sections from an AND gate 306. Each of the AND gates 304 and 306 are of the pulse forming type and include a common first input on which a BOWLER CYCLE signal may be received from a pulse forming NOR gate 307 to enable the AND gates 304 and 306 at the termination of the cycle of the bowler score cycle control. The AND gates 304 associated with the respective flip-flops BSR1—BSR8 are arranged to receive the indicated signals from the bowler state updating matrix to cause their respective flip-flops to be set upon the absence of a BOWLER CYCLE signal at the completion of a bowler scoring cycle. The AND gates 306 associated with the reset sections of the flip-flops BSR1—BSR4 are similarly adapted to receive the indicated input signals from the bowler state updating matrix to cause their respective flip-flops to be reset upon completion of a bowler scoring cycle.

The outputs of the set and reset sections of the flip-flops BSR1—BSR8 are utilized as inputs to the bowler state decoder and as inputs to the appropriate bits in a bowler's memory for writing updated bowler's state information into the bowler's memory.

It will be apparent to those skilled in the art that the flip-flops BSR1—BSR8 operate independently of each other to the extent that any given change in the condition of one of the flip-flops will not necessarily produce a change in another of the flip-flops. Tat is to say, none of the flip-flops BSR1—BSR8 derive information from another of the flip-flops but rather, change condition in accordance with appropriate inputs from the bowler's memory, the bowler state updating matrix or a RESET BOWLER STATE REGISTER signal.

The correspondence between a bowler's state and the combinations of the conditions of the flip-flops BSR1—BSR8 are set forth in the following table. The correspondence between a given bowler's state and the bowler's past history which it represents have been set forth previously in Table 1.

TABLE 5

| | BSR8 | BSR4 | BSR2 | BSR1 |
|---|---|---|---|---|
| Bowler state: | | | | |
| 1 | 0 | 0 | 0 | 0 |
| 2 | 0 | 0 | 0 | 1 |
| 3 | 0 | 1 | 0 | 1 |
| 4 | 0 | 1 | 0 | 0 |
| 5 | 0 | 1 | 1 | 0 |
| 6 | 0 | 1 | 1 | 1 |
| 7 | 1 | 1 | 1 | 1 |
| 8 | 1 | 1 | 1 | 0 |
| 9 | 1 | 1 | 0 | 0 |
| 10 | 1 | 1 | 0 | 1 |
| 11 | 1 | 0 | 0 | 1 |

From the foregoing it will be apparent that the combinations of the conditions of the flip-flops BSR1—BSR8 each correspond to a given bowler state. The combinations of the conditions are decoded in a manner to be seen hereinafter.

2. Bowler State Decoder

The bowler state decoder consists of a matrix comprised of eleven NOR gates 308 and 11 inverters 310. The NOR gates 308 have their respective inputs connected as indicated in FIG. 11 to the outputs of the set and reset sections of various ones of the flip-flops BSR1—BSR8 so as to sense the conditions thereof and issue an output signal if the condition corresponds to the state with which each NOR gate 308 is associated. For the sake of brevity, it is not believed necessary to describe in detail each specific input to each of the NOR gates 308.

The output of each of the NOR gates 308 is associated with the respective inverter 310. As a result of this construction, it will be apparent that when a NOR gate 308 issues a signal corresponding to the existence of the particular state with which it is associated, the associated inverter 310 will not issue a signal. However, when a NOR gate 308 does not have an output corresponding to the existence of the state with which it is associated, its associated inverter 310 will have an output signal. Accordingly, the outputs from the inverters 310 correspond to the absence of the particular state with which they are associated, although in some instances, the absence of a signal at an inverter output is used in detecting the presence of a state. Thus it will be apparent that the bowler state decoder will issue 11 output signals at all times. One of the output signals will correspond to the existence of a state while the other 10 outputs will correspond to the absence of the other 10 states. Certain ones of the 11 output signals of the bowler state decoder are utilized in controlling the computation of a bowler's score and for updating the bowler's state. In the latter connection, certain of the signals from the bowler state decoder are utilized as inputs by the bowler state updating matrix as will appear.

3. Bowler State Updating Matrix

Figure 12:
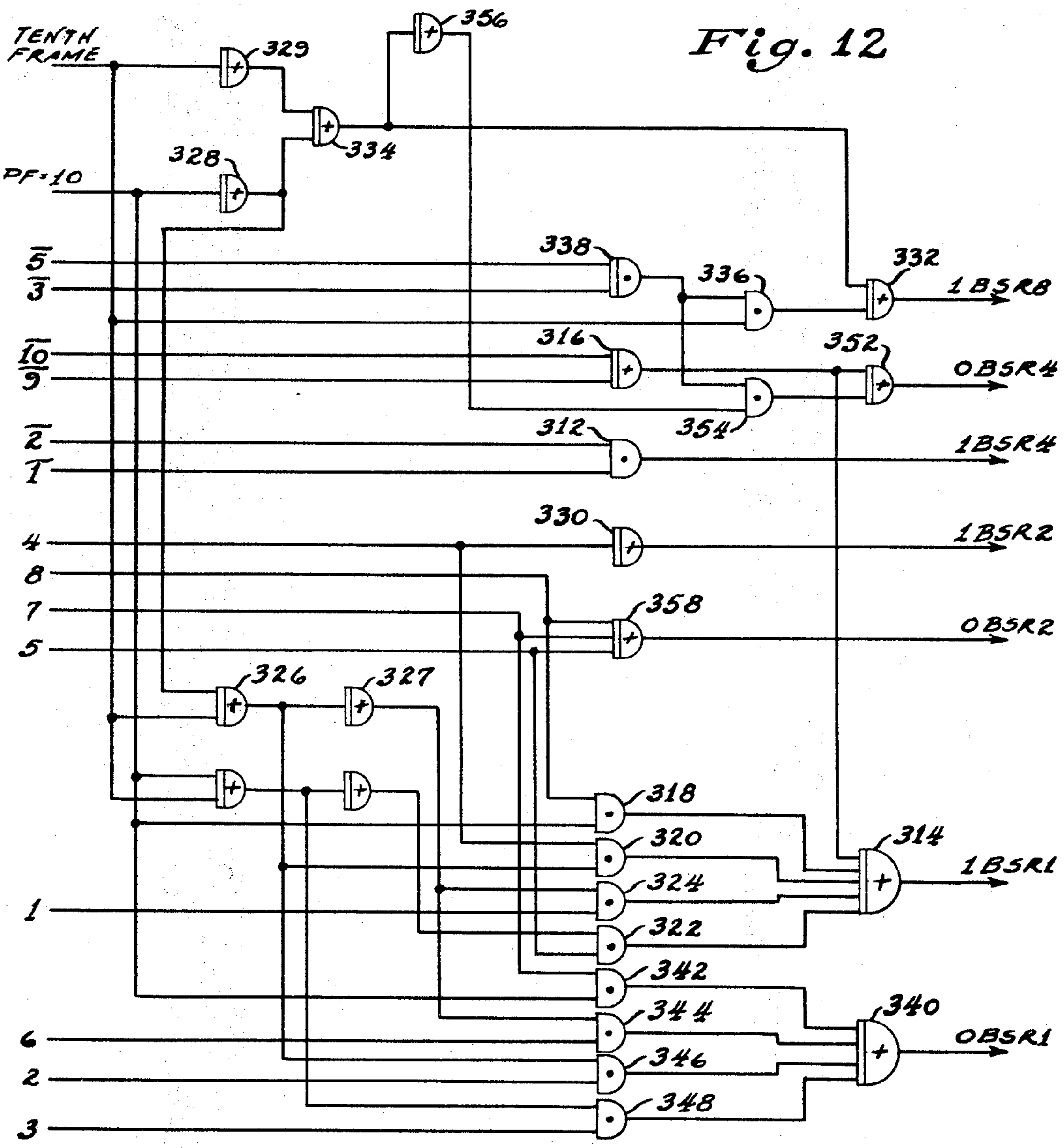
FIG. 12 is a logic diagram of a bowler state updating matrix for updating a bowler's state for future computation control.

The bowler state updating matrix is shown in FIG. 12 and essentially comprises seven logical circuits for controlling the setting of the flip-flops BSR1—BSR8 and the resetting of the flip-flops BSR1—BSR4 of the bowler state register. The matrix includes inputs on which STATE 1—8 and STATE $\overline{1}$, $\overline{2}$, $\overline{3}$, $\overline{5}$, $\overline{9}$ and $\overline{10}$ signals may be received and a pair of inputs on which 10 FRAME and PF=10 signals may be received. A 10 FRAME signal is generated any time a bowler is bowling in the 10th frame by the frame counter as will appear. The PF=10 signal is generated whenever a strike or a spare is obtained on the first or first and second balls, respectively, in any frame. Thus it will be apparent that both signals can only be present simultaneously in the 10th frame. When neither signal is present the situation corresponds to a pinfall of less than 10 achieved in any frame but the 10th frame.

The bowler state updating matrix, as noted above, includes seven outputs, four of which are utilized to selectively set the flip-flops BSR1—BSR8 and three of which are used to reset the flip-flops BSR1—BSR4. The outputs used for setting the flip-flops are designated 1BSR1—1BSR8, respectively, while the outputs for resetting the flip-flops are designated 0BSR1—0BSR4, respectively.

Table 6, below, indicates each of the possible changes from one state to another as well as the game conditions required to cause each change.

TABLE 6

| | $PF\neq10$, 10 frame | $PF=10$, 10 frame | $PF=10$, 10 frame | $PF\neq10$, 10 frame |
|---|---|---|---|---|
| Bowler state: | | | | |
| 1 | 3 | 4 | 7 | |
| 2 | 3 | 4 | 7 | |
| 3 | 1 | 2 | 10 | 11 |
| 4 | 5 | 6 | 8 | |
| 5 | 1 | 2 | 10 | 11 |
| 6 | 5 | 6 | 8 | |
| 7 | | | 10 | 9 |
| 8 | | | 10 | 9 |
| 9 | | | | 11 |
| 10 | | | | 11 |
| 11 | | | | |

Table 7, below, illustrates for each possible change of state, the output signal (s) that must be emitted by the bowler state updating matrix to the bowler state register to cause the flip-flops thereof to conform the condition corresponding to the newly updated state.

TABLE 7

| State from— | Change to— | Signals required |
|---|---|---|
| 1 | 3 | 1BSR1·1BSR4 |
| 1 | 4 | 1BSR4 |
| 1 | 7 | 1BSR1·1BSR2·1BSR4·1BSR8 |
| 2 | 3 | 1BSR4 |
| 2 | 4 | 1BSR4·0BSR1 |
| 2 | 7 | 1BSR2·1BSR4·1BSR8 |
| 3 | 1 | 0BSR1·0BSR4 |
| 3 | 2 | 0BSR4 |
| 3 | 10 | 1BSR8 |
| 3 | 11 | 1BSR8·0BSR4 |
| 4 | 5 | 1BSR2 |
| 4 | 6 | 1BSR1·1BSR2 |
| 4 | 8 | 1BSR2·1BSR8 |
| 5 | 1 | 0BSR2·0BSR4 |
| 5 | 2 | 1BSR1·0BSR2·0BSR4 |
| 5 | 10 | 1BSR1·1BSR8·0BSR2 |
| 5 | 11 | 1BSR1·1BSR8·0BSR2·0BSR4 |
| 6 | 5 | 0BSR1 |
| 6 | 6 | |
| 6 | 8 | 1BSR8·0BSR1 |
| 7 | 9 | 0BSR1·0BSR2 |
| 7 | 10 | 0BSR2 |
| 8 | 9 | 0BSR2 |
| 8 | 10 | 1BSR1·0BSR2 |
| 9 | 11 | 1BSR1·0BSR4 |
| 10 | 11 | 0BSR4 |

From the foregoing it will be apparent that the change from one bowler state to another always requires at least one output signal from the bowler's state updating matrix. It will also be apparent that where the possibility exists that a change from one state to any one of several states may occur, the specific state to which the change is made is dictated by the particular output or outputs from the bowler state updating matrix. Since many of the possible changes from a state each require at least one common signal for any of the possible changes, it is necessary in order to insure that the change is made to the proper state, that only the required signal (s) is emitted and that the signals that could cause a change to another state are blocked.

An analysis of the logical arrangement of the various AND, NAND and NOR gates which comprise the bowler state updating matrix will show that it performs the above functions. Thus, for the sake of brevity it is not believed necessary to describe the particular arrangement of the various gates. Rather, the following examples will be utilized to illustrate the operation for certain state changes.

EXAMPLE 1:

Let us assume that a bowler is about to roll the first ball in a game or the first ball following an open frame and that it is not the tenth frame. Under such circumstances, each of the flip-flops BSR1—BSR8 are reset and their condition is decoded as state one. The bowler rolls the ball and achieves a strike. Thus, the next ball that the bowler will roll will be the first ball following a strike, a situation that corresponds to state four. In order to change the condition of the bowler state register from state one to state four, it is only necessary to set the flip-flop BSR4. Accordingly, it is necessary that the bowler state updating matrix emit the signal 1BSR4 from an AND gate 312. The AND gate 312 includes a pair of inputs for receiving STATE $\overline{2}$ and STATE $\overline{1}$ inputs from the bowler state decoder. Since initially the bowler started in state one, it is clear that the STATE $\overline{2}$ input to the AND gate will be true. However, since the initial state was state one, it is equally clear that the STATE $\overline{1}$ input to the AND gate 312 will be false and the AND gate 312 will be disabled. The output of the AND gate 312 is arranged with respect to the AND gate 304 associated with the flip-flop BSR4 such that the disabling of the AND gate 312 will enable the AND gate 304 to set the flip-flop BSR4 at the end of a bowler cycle. Accordingly, the bowler state register will assume a condition corresponding to the existence of state four.

The flip-flop BSR1 will not be set for the following reason. The corresponding output signal 1BSR1 is issued from a NOR gate 314. The NOR gate 314 includes an input connected to the output of a NOR gate 316 which receives STATE $\overline{10}$ and STATE $\overline{9}$ inputs. Since both inputs will be present in a state one situation, it is clear that the NOR gate 316 does not issue an output signal to the NOR gate 314. The NOR gate 314 has three additional inputs from AND gates 318, 320 and 322 which receive input signals indicative of the presence of state eight, state four and state five respectively. Since none of these inputs are present in a state one situation, it is clear that the AND gates 318, 320 and 322 will be disabled and will not issue an input signal to the NOR gate 314. A fourth AND gate 324 may also issue an input to the NOR gate 314. One of the inputs to the AND gate 324 is receptive of a state one signal. Thus, the AND gate 324 will issue a signal to the NOR gate 314 unless its other input is not receiving a signal. The other input to the AND gate 324 is received from the output of a NOR gate 326 having a first input on which a TENTH FRAME signal may be received. The second input to the NOR gate 326 is received from the output of a NOR gate 328 having an input on which a PF=10 signal is received. Since PF=10 signal is present due to the strike bowled by the bowler, and an output from the NOR gate 328 is not present, due to the absence of a TENTH FRAME signal because it is not a 10th frame situation, there will be an output from the NOR gate 326 to a NOR gate 327. The latter will not enable the AND gate 324, and, accordingly, the AND gate 324 will not provide the NOR gate 314 with an input. As a result, the NOR gate 314 receives no inputs and accordingly will have an output.

However, it will be recalled that in order to set or reset a flip-flop, the signal issuing gate, here the NOR gate 314, must be disabled. Accordingly, the flip-flop BSR1 will not be set.

The flip-flop BSR2 will not be set as a required condition will not be present at a NOR gate 330. The NOR gate 330 has an input on which a STATE 4 signal is received. Since it is not a state four situation, the NOR gate 330 will have an output thereon which, as noted above, will not cause the flip-flop BSR2 to be set.

The flip-flop BSR8 will not be set by the condition of the output of a NOR gate 332 for the following reasons. A NOR gate 334 will not have an output due to the presence of an output from a NOR gate 329 which has an output when a TENTH FRAME signal is not present. Similarly, the NOR gate 332 will not receive an input from an AND gate 336 as the latter is disabled both by the output condition of a NAND gate 338 and the lack of a TENTH FRAME signal. The NAND gate 338 has a pair of inputs on which STATE $\overline{5}$ and STATE $\overline{3}$ signals are applied. Since it is a state one situation, both of these signals will be present and the NAND gate 338 will not have an output to apply as an input to the AND gate 336. Accordingly, the AND gate 336 is disabled and will not provide the NOR gate 332 with an input signal. As a result, the NOR gate 332 lacks any input and, accordingly, will have an output signal that will disable the AND gate 304 associated with the flip-flop BSR8.

EXAMPLE 2:

If it be assumed that the bowler has previously bowled a spare and he is about to roll the first ball following the spare in any frame but the 10th frame, and he downs less than 10 pins, it will be apparent that the required state change necessitates that the bowler go from his original state, here state two, to the new state of state three. From Table 7 it will be apparent that such a state change requires only the setting of the flip-flop BSCR4. The flip-flop BSR4 will be set due to the disabling of the AND gate 312 by reason of the lack of a STATE $\overline{2}$ input. This operation occurs similarly to that described above in Example 1. The flip-flop BSR2 will not be set as the output from the NOR gate 330 will not enable its associated AND gate 304 due to the lack of a STATE 4 input. This action occurs exactly as described in the previous example.

The flip-flop BSR8 will not be set as the NOR gate 332 will not receive an input from the NOR gate 334 as neither TENTH FRAME nor PF=10 signals are present. This action is similar to that described above in Example 1 in conjunction with the effect of the absence of the TENTH FRAME signal. Nor will the NOR gate 332 receive an input from the AND gate 336. This is due to the lack of an enabling input to the AND gate 336 in the absence of a TENTH FRAME signal. Accordingly, the NOR gate 332 will not receive any input and will issue an output disabling the AND gate 304 associated with the flip-flop BSR8.

The flip-flop BSR1 will not be reset as the enabling input to its AND gate 306 must come from the output of a NOR gate 340. The NOR gate 340 has four inputs from AND gates 342, 344, 346 and 348. Since the AND gates 342, 344 and 348 have inputs on which signals indicative of the presence of state seven, state six or state three, respectively, are received, and such states are not present in a state two situation, it is clear that the AND gates 342, 344 and 348 will not be enabled to provide the NOR gate 340 with input signals. The AND gate 346 has a first input which receives the output of the NOR gate 326 which, when a PF=10 signal is not present, will receive an input from the output of the NOR gate 328. Accordingly, the NOR gate 326 will not have an output signal to enable the AND gate 346 in spite of the presence of a STATE 2 input to the latter and will not provide the NOR gate 340 with an input. Thus, the NOR gate 340 locks all inputs and will have an output which will disable the AND gate 306 associated with the flip-flop BSR1 and preclude the resetting thereof.

EXAMPLE 3:

Assume that the bowler has bowled a strike in the eighth and ninth frames. Accordingly, the state of that bowler's game will be state six. Assume that on the first ball in the 10th frame the bowler rolls another strike, such a pinfall requires a change from state six to state eight. Accordingly, it is necessary to set the flip-flop BSR8 and reset the flip-flop BSR1. Since in such a situation, both the TENTH FRAME and PF=10 signals are present, the NOR gate 334 will provide the NOR gate 332 with one input. This will cause the latter to have an output condition that will enable the AND gate 304 associated with the flip-flop BSR8.

The NOR gate 340 will also have an output condition that will cause the flip-flop BSR1 to be reset. This condition will be due to the input provided to the NOR gate 340 by the AND gate 344 which is enabled by a STATE 6 input and an input connected to the output of the NOR gate 327, which, it will be recalled, has its input connected to the output of the NOR gate 326. The NOR gate 326 will not have an output when a TENTH FRAME signal is issued. Accordingly, the NOR gate 327 will have an output which will enable the AND gate 344 to issue an input to the NOR gate 340 to cause the latter to ultimately reset the flip-flop BSR1.

The flip-flop BSR4 will not be reset as the output from a NOR gate 352 disables the AND gate 306 associated with that flip-flop. This is in part due to the connection of one input of the NOR gate 352 to the output of the NOR gate 316 which, it will be recalled, receives signals indicative of the absence of states nine or ten. Since such is the case, the NOR gate 316 will not provide the NOR gate 352 with an input. An AND gate 354 will not provide the NOR gate 352 with an input as it will be disabled both by the output of a NOR gate 356 having an input connected to the output of the NOR gate 334 as well as by the output of the NAND gate 338. Accordingly, the NOR gate 352 will not have an input and will issue an output disabling the AND gate 306 associated with the flip-flop BSR4.

The flip-flop BSR2 will not be reset as the output from a NOR gate 358 will disable the AND gate 306 associated with the flip-flop BSR2. This is due to the lack of any input to the NOR gate 358. For the NOR gate 358 to have an input, the bowler's initial state would have to be either state five, state seven, or state eight. Since the bowler's state is state six, it is clear that such inputs do not exist.

From the foregoing, the mode of operation of the bowler state updating matrix is believed apparent. In summary, it should be said that the outputs from the bowler's state updating matrix serve primarily as enabling inputs to the AND gates 304 and 306 associated with the various flip-flops of the bowler's state register such that upon the detection by those AND gates of the absence of a BOWLER CYCLE signal, the bowler's state will be updated in accordance with the pinfall and frame situation in which he is bowling. Of course, such updating will occur only after the previous state has been utilized to control the computation of the bowler's pinfall during the bowler cycle, if such computation is necessary. Finally, in a manner to be seen hereinafter, the updated bowler's state is written back into the bowler memory.

4. Or Matrix

As will be apparent from the various state definitions, certain of the states have a proportion of a bowler's game history in common. For example, a bowler states 1, 2, 4 and 6 can only exist when a bowler is about to bowl the first ball in a frame. Accordingly, these states may be termed first ball states. Similarly, states 3 and 5 are second ball states while states 3, 5, 9 and 10 are each indicative of the fact that the ball about to be rolled will be the last ball rolled in that frame. States 7 and 8 are indicative of the fact that the bowler is in the 10th frame and will be permitted to roll an additional two balls to fill in existing marks. States 9 and 10 indicate that a bowler is in the tenth frame and will be permitted to bowl one additional ball before the frame is terminated. Other similarities exist between various ones of the several bowler's states.

Since, as will appear, the various sequences and functions performed by the computer in a large part are dictated by the existence of a condition in a bowler'game, which condition may be indicated by the existence of one or more bowler states, it is desirable to provide a single signal indicative of the existence of that condition. A number of such signals, generated by the existence of a single state within a group of states each representing a similar condition in a bowler's game, are provided by the OR matrix generally designated 360 and shown in FIG. 13. The OR matrix 360 is comprised of a plurality of OR gates having various inputs connected to the outputs of the bowler's state decoding matrix as indicated or to the outputs of other OR gates within the OR matrix 360 itself. The indicated output signals are indicative of the existence of any one of the states shown and are utilized elsewhere in the computer as will appear.

H. Bowler Score Cycle Control

In order to correctly compute and direct the printing of bowler score information, it is necessary to provide means for controlling the bowler score cycle. More specifically, one or more of the following functions must be performed sequentially:

TABLE 8

$f_1$–If a split exits, print a split symbol.
$f_2$–Print the bowler's box score.
$f_3$–Add the bowler's pinfall to his previous total.
$f_4$–Print the bowler's frame score.
$f_5$–Add the bowler's score a second time. If his present pinfall is a strike and his present state is state 6 or state 8, add an additional ten to his score.
$f_6$–Print the bowler's updated frame score.

The above mentioned functions are performed as a function as of the bowler's state, the bowler's present pinfall, and the bowler's present frame by the bowler score cycle control.

Figure 14:
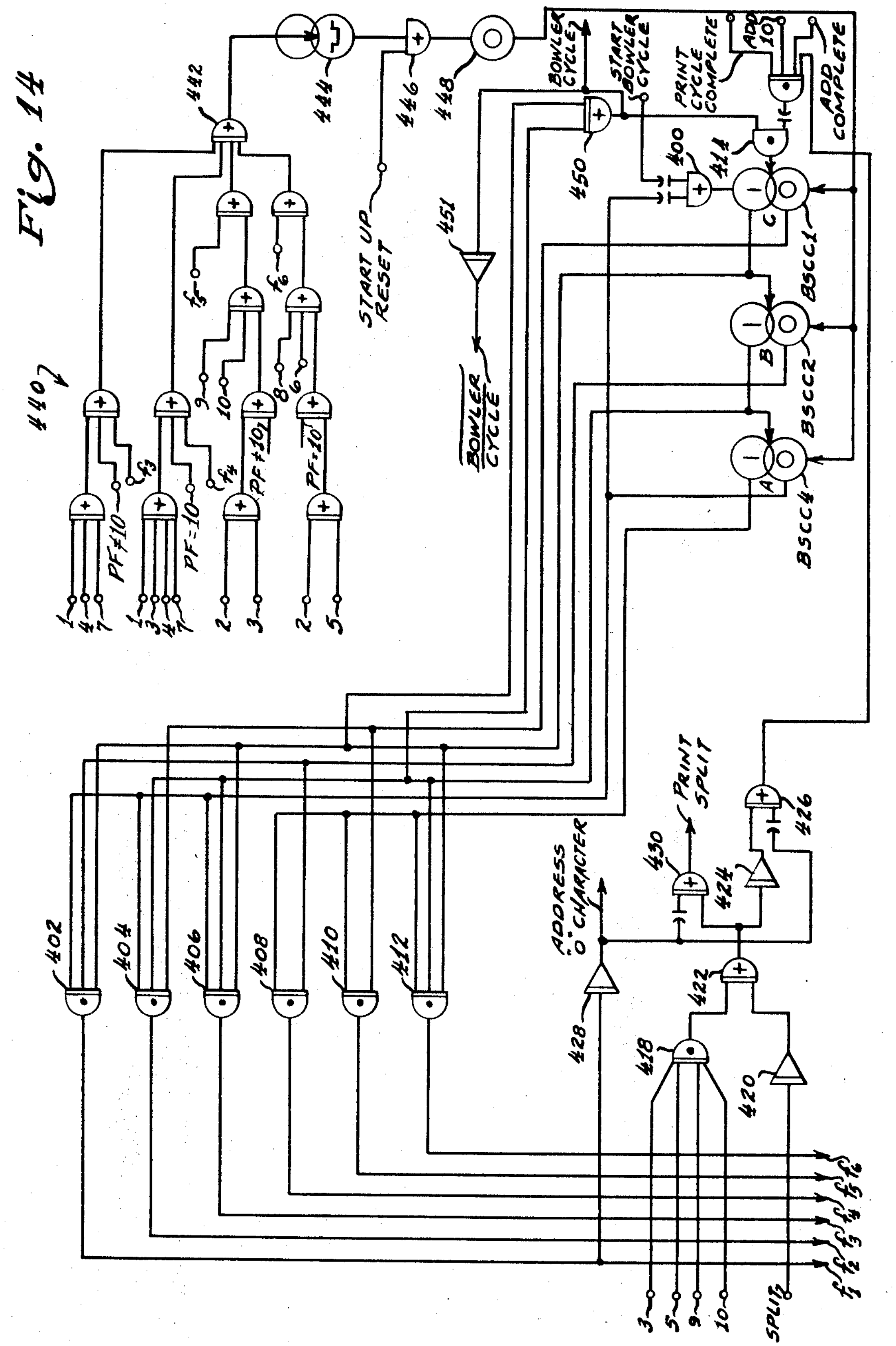
FIG. 14 is a logic diagram of a bowler score cycle control which generates functions relative to the scoring of a bowler.

The bowler score cycle control is shown in FIG. 14 and comprises a 3-bit feedback counter which counts on a scale of seven. Each bit comprises a flip-flop connected to form a counter and, accordingly, three flip-flops BSCC1, BSCC2 and BSCC4 are provided. In order to provide the feedback, the output from the reset section of the flip-flop BSCC4 is connected as an input through an OR gate 400 to the set section of the flip-flop BSCC1. The following table illustrates the counting sequence of the flip-flops BSCC1—BSCC4 and the combination of set and reset conditions of each of the flip-flops BSCC1—BSCC4 during the counting sequence corresponding to the six functions $f_1$—$f_6$ set forth above.

TABLE 9

| BSCC4 | BSCC2 | BSCC1 | Functions |
|---|---|---|---|
| 0 | 0 | 0 | Stop |
| 0 | 0 | 1 | $f_1$ |
| 0 | 1 | 0 | $f_2$ |
| 0 | 1 | 0 | $f_2$ |
| 0 | 1 | 1 | $f_3$ |
| 1 | 0 | 1 | $f_4$ |
| 1 | 1 | 0 | $f_5$ |
| 1 | 1 | 1 | $f_6$ |
| 0 | 0 | 0 | Stop |

The conditions of the flip-flops BSCC1—BSCC4 are decoded by NAND gates 402, 404, 406, 408, 410 and 412. The NAND gate 402 has its inputs connected to the reset sections of the flip-flops BSCC4 and BSCC2 and the set section of the flip-flop BSCC1. Accordingly, it will detect a binary 001 condition to emit an $f_1$ signal. The NAND gates 404—412 are appropriately connected as indicated to the set and reset sections of the various flip-flops so as to detect the binary conditions thereof noted in the above table and emit signals corresponding to the functions $f_2$—$f_6$ respectively.

The counter comprised of the flip-flops BSCC1—BSCC4 is controlled in the following manner. Initially, a START BOWLER CYCLE signal from the computer cycle control sets the flip-flop BSCC1 through the OR gate 400. Other inputs to cause counting are issued to the flip-flop BSCC1 through an AND gate 414 which is arranged to step the counter whenever it is disabled. Disabling inputs to the AND gate 414 are received from a NAND gate 416 having four inputs. A first input to the NAND gate 416 causes the counter to be stepped one count upon the reception of a PRINT CYCLE COMPLETE signal from the printer cycle control. A second input causes the stepping of the counter upon the reception of an ADD TEN signal from the computer cycle control, while a third input causes the stepping of the counter upon the reception of an ADD COMPLETE signal from the pinfall register control. A fourth input to the NAND gate 416 causes the stepping of the counter when it is determined that a split does not exist.

It will be apparent that a split can only exist when a bowler's game is in states 1, 2, 4, 6, 7 or 8. To reduce the logical complexity, it is simpler to detect the nonsplit states which are states 3, 5, 9 or 10. Accordingly, a NAND gate 418 has four inputs on which signals representative of the existence of states 3, 5, 9 or 10 may be applied. A SPLIT signal from the split detection logic is applied through an inverter 420 to an input of a NOR gate 422 as will appear. The NOR gate 422 includes a second input from the output of the NAND gate 418. The arrangement of NAND gate 418, the inverter 420 and the NOR gate 422 is such that when a SPLIT signal is not received by the inverter 420 or when a signal representative of the presence of one of the states 3, 5, 9 and 10 is received by the NAND gate 418, the NOR gate 422 will issue an input to a NOR gate 426 through an inverter 424. The NOR gate 426 has a second input from the NAND gate 402 through an inverter 428 which issues an ADDRESS 0 CHARACTER signal to the four printers such that if a split is detected, a zero or split symbol will be printed. Thus, when the flip-flops BSCC1—BSCC4 are in a binary 001 condition and a split is not detected or the bowler state is nonsplit state, the NOR gate 426 will issue an input signal to the NAND gate 416 to step up the counter one count.

A NOR gate 430 has a first input connected to the output of the NOR gate 422 and a second input connected to the output of the inverter 428. When the condition of the counter corresponds to $f_1$, and a SPLIT signal is received by the inverter 420 while the NAND gate 416 does not receive signals indicative of bowler states 3, 5, 9, or 10, the NOR gate 430 will issue a PRINT SPLIT signal to cause the printing of a split symbol.

Since it is not always necessary that each of the functions $f_1$—$f_6$ be performed during every bowler cycle, it is necessary to provide means for resetting the counter comprised of the flip-flops BSCC1—BSCC4 when conditions that do not require the sequential utilization of all six functions exist. Consideration of the various bowler's states, the various output functions and certain of the functions $f_1$—$f_6$ will show that resetting of the counter should be done in accordance with the following logical expression.

$$\text{Reset}=\{(1+4+7)\cdot \text{P.F}\neq 10\}f_3+\{(1+3+4+7)\cdot \text{P.F. } 10\}f_4 +\{9+10+[(2+3)\cdot \text{P.F}\neq 10]\}f_5 +\{8+6+[(2+5)\ \text{P.F.}=10]\}f_6$$

where:

1—10 represent a bowler state, $f$ represents the bowler cycle function designated by the subscript, and P.F. represents a pinfall designated by the following number.

This relation is implemented by means of NOR GATES, generally designated 440, arranged to follow the expression. When the expression is true, a NOR gate 442 will issue an output signal to an 8 microsecond delay multivibrator 444. The output from the delay multivibrator 444 is passed through an OR gate 446 and an electronic switch to the reset sections of the flip-flops BSCC1—BSCC4 and to an input of the OR gate 438. Additionally, the OR gate 446 includes a second input on which a STARTUP RESET signal may be received. Thus, it will be apparent that whenever the above logical relation is true, after an 8 microsecond delay, the flip-flops BSCC1, BSCC2 and BSCC4 will be reset such that when the bowler score cycle control is to be used for a subsequent scoring sequence, it will again be sequentially placed in the conditions corresponding to $f_1$—$f_6$. The bowler score cycle control will be similarly reset in readiness for a scoring sequence when a STARTUP RESET signal is issued thereto.

In the event the bowler score cycle control performs each of the functions $f_1$—$f_6$ in a single sequence, it will be reset from $f_6$ to $f_0$ by the PRINT CYCLE COMPLETE signal when the printing required by $f_6$ is completed.

A NOR gate 450 has a pair of inputs connected to the set section of the flip-flops BSCC1 and BSCC2 respectively and an output used to generate a BOWLER CYCLE signal and is applied through an inverter 451 to generate a $\overline{\text{BOWLER CYCLE}}$ signal. As will appear, the BOWLER CYCLE and $\overline{\text{BOWLER CYCLE}}$ signals are used elsewhere in the computer. The output of the NOR gate 450 is additionally used to disable the AND gate 414 whenever one of the flip-flops BSCC1 or BSCC2 are not set such that the counter cannot be stepped at times when a bowler cycle is not required. However, once the flip-flop BSCC1 is set in response to a START BOWLER CYCLE signal, the inputs to the NOR gate 450 will cause the latter to enable the AND gate 414 during the sequences $f_1$—$f_6$ such that the counter may be stepped as required.

I. Frame Counter

In order to accomplish proper scoring in the 10th frame and to print the various scores in the proper frame, means are provided for counting the number of frames played by a bowler. The frame counter together with the printer frame control, the latter to be described hereinafter, provide these functions.

Figure 15:
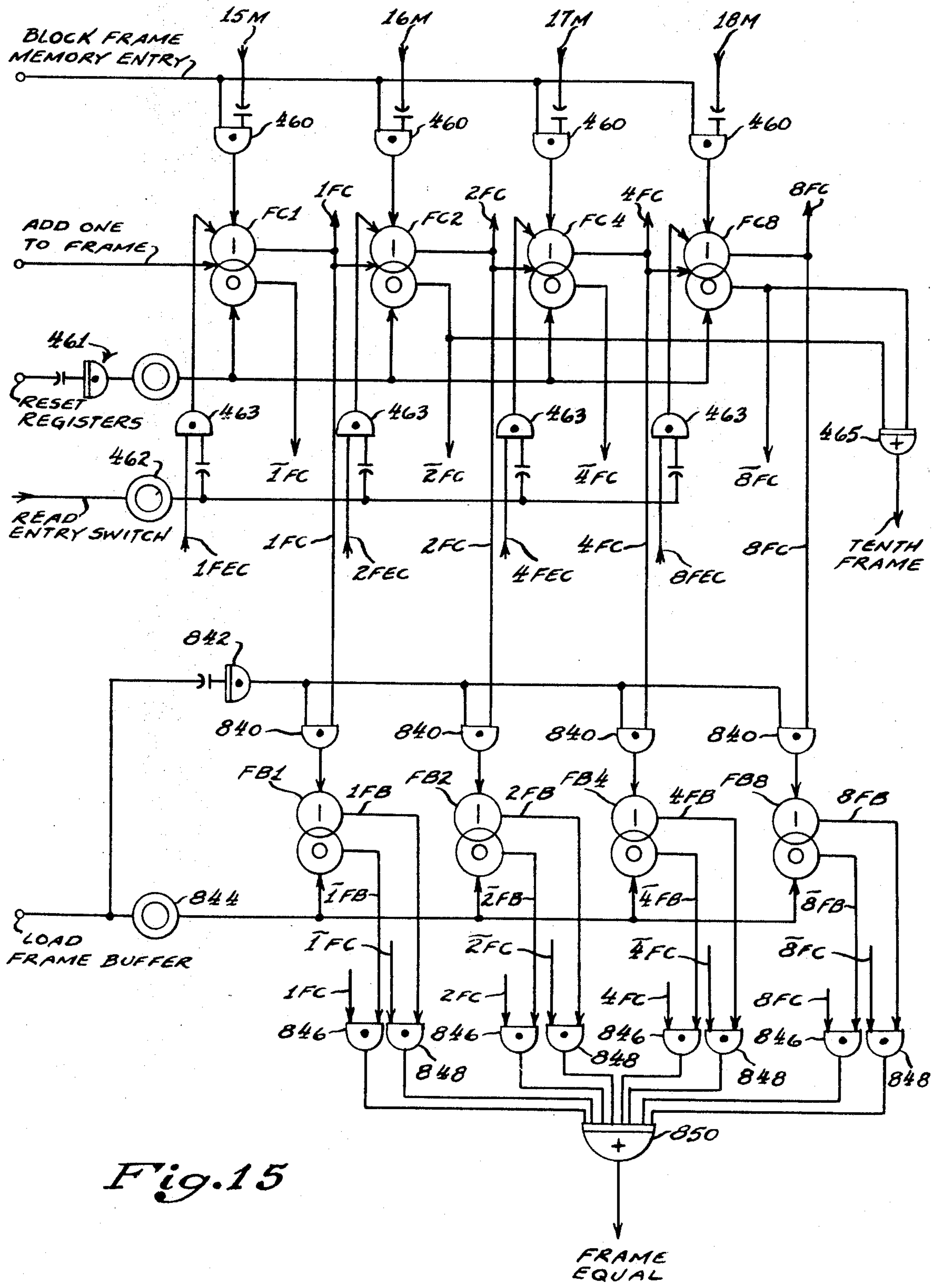
FIG. 15 is a logic diagram of a frame counter together with a frame buffer and a frame comparator which provide information relative to a bowler's frame and which control the initiation of a team totaling cycle.

The frame counter is shown in FIG. 15 and comprises a conventional four bit binary counter. Each of the four bits comprises a flip-flop FC1, FC2, FC4 and FC8. In order to provide the counting function, an output from the set section of each of the flip-flops FC1—FC4 is connected to the trigger input of the next higher flip-flop. The flip-flop FC1 includes an input on which an ADD ONE TO FRAME signal is received in a manner to be described hereinafter to cause it to change its condition to increase the number contained in the frame counter by one.

As the frame counter is arranged in conventional manner, it will be appreciated that each change in a flip-flop FC1—FC4 from binary one to binary zero causes the next higher flip-flop to change its condition.

The outputs 1FC—8FC of the set sections of the flip-flops FC1—FC8, respectively, are gated into corresponding flip-flops in the printer frame control and frame buffer in a manner to be described hereinafter such that they will, under appropriate conditions, assume the condition of the frame counter. Additionally, the outputs 1FC—8FC are also utilized as inputs to the memory as will appear.

The flip-flops FC1—FC8 of the frame counter include inputs 15M, 16M, 17M and 18M to their set sections from a corresponding sense amplifier of the memory through AND gates 460. Each AND gate 460 additionally has a disabling input on which a BLOCK FRAME MEMORY ENTRY signal may be received. Thus, if the AND gates 460 are not disabled by a BLOCK FRAME MEMORY ENTRY signal, each of the flip-flops FC1—FC8 will be set to correspond to the condition of the frame information contained at a selected bowler memory.

Each of the flip-flops FC1—FC8 additionally include a common reset input from a pulse forming NAND gate and electronic switch arrangement 461. By means to be described hereinafter, at some time prior to each computing sequence in which frame information is required, the frame counter is reset by resetting each of the flip-flops FC1—FC8. The selected bowler frame memory bits are then read to set appropriate flip-flops FC1—FC8 of the frame counter to correspond to the frame information contained in the bowler frame memory bits. This information may then be passed along to the corresponding flip-flops in the printer frame control to load the latter with frame information. Additionally, frame information is also read from the frame counter into a frame buffer.

The frame counter is also provided with switch inputs for use in an error correction procedure. An electronic switch 402 is energized by a READ ENTRY SWITCH signal from the computer cycle control. The output of the electronic switch 402 is utilized as an enabling input by each of four pulse forming AND gates 403. The output of each respective AND gate 403 is utilized as an input to the set section of each of the flip-flops FC1—FC8 such that when the corresponding AND gate 403 is enabled, the flip-flops FC1—FC8 with which it is associated will be set. Each of the AND gates 403 has a second input on which signals 1FEC, 2FEC, 4FEC and 8FEC may be received from the error correction system as will appear. Thus, when any AND gate 403 receives a corresponding input from the error correction system together with a READ ENTRY SWITCH signal from the computer cycle control, that AND gate 403 will be enabled to cause the flip-flop with which it is associated to be set.

In order to issue a TENTH FRAME signal to the bowler state updating matrix, which it will be recalled is necessary to generate a bowler state unique to the tenth frame, a NOR gate 465 is arranged to detect when the flip-flops FC2 and FC8 are set and issue the TENTH FRAME signal when such is the case. It will be apparent that when the flip-flops FC2 and FC8 are set, a decimal number equal to ten or more will be present in the frame counter. Since the bowling game is terminated upon completion of the tenth frame, it is only necessary to detect the conditions of the flip-flops FC2 and FC8.

J. Printer Frame Control

As noted above with respect to the frame counter, it is necessary that frame information for each bowler be processed to control the location of printing operations. Because of the nature of the scoring of a bowling game, it is often necessary to delay the printing of a cumulative score until a subsequent ball or balls have been rolled. In each such instance, it is necessary to print such a cumulative score in a frame preceding or two frames preceding the frame in which the frame score completing ball is rolled.

Figure 16:
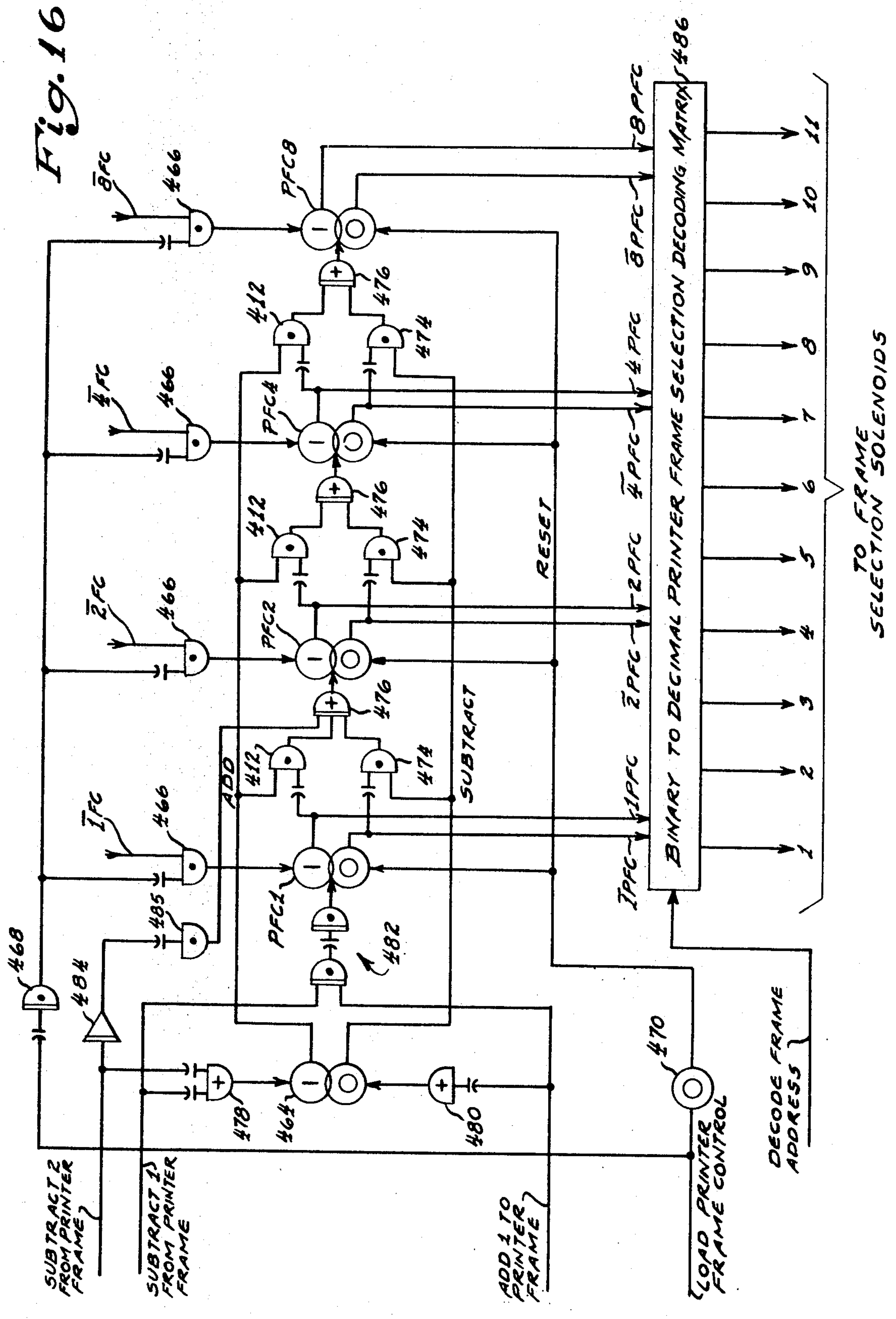
FIG. 16 is a logic diagram of a printer frame control and a frame selection matrix for informing the printer to print in a specific frame.

In order to "back up" the printer one or two frames, a printer frame control is provided as shown in FIG. 16. The printer frame control consists of a four bit binary bidirectional counter having four flip-flops PFC1—PFC8. Additionally, a fifth control flip-flop 464 is used to control the direction in which the printer frame control counts.

In order to load the printer frame control with frame information, the conditions $\overline{1}$FC—$\overline{8}$FC of the flip-flops FC1—FC8 of the frame counter are applied as an input to the set sections of the flip-flops PFC1—PFC8, respectively, through AND gates 466. The operation of the AND gates 466 to pass the conditions 1FC—8FC of the flip-flops FC1—FC8 of the frame counter is controlled by a LOAD PRINTER FRAME CONTROL signal from the computer cycle control which is passed to the AND gates 466 via a pulse-forming NAND gate 468. Additionally, each LOAD PRINTER FRAME CONTROL signal is directed through an electronic switch 470 to each of the reset sections of the flip-flops PFC1—PFC8. As a result of this arrangement, wherever a LOAD PRINTER FRAME CONTROL signal is received, each of the flip-flops PFC1—PFC8 will be immediately reset. The pulse-type NAND gate 468 generates its output on the trailing edge of the LOAD PRINTER FRAME CONTROL signal and, as a result, the electronic switch 470 causes resetting of the flip-flops PFC1—PFC8 before the AND gates 466 have been enabled by the output of the NAND gate 468. When the AND gates 466 have been enabled, the flip-flops PFC1—PFC8 are free to change to a set condition depending upon the condition of the corresponding flip-flop FC1—FC8 in the frame counter. It is in this manner that the printer frame control is loaded with frame information by the frame counter.

In order to provide a counting function, the set section output of each of the flip-flops PFC1—PFC4 is connected through an AND gate 472 and a NOR gate 476 to the trigger input of the next higher flip-flops. Similarly, the outputs of the reset sections of the flip-flops PFC1—PFC4 are connected through AND gates 474 and the NOR gates 476 to the trigger input of the next higher flip-flop. Each of the AND gates 472 includes a second disabling input connected to the output of the set section of the control flip-flops 464. The AND gates 474 have their second inputs connected to the output of the reset section of the control flip-flops 464. Thus, depending upon the condition of the control flip-flop 464, either the AND gates 472 or the AND gates 474 will be disabled for such purposes as will hereinafter appear.

A pair of inputs on which SUBTRACT ONE FROM PRINTER FRAME and SUBTRACT TWO FROM PRINTER FRAME signals may be received from the computer cycle control are connected through an OR gate 478 to the input of the set section of the control flip-flop 464. A similar input for the reception of an ADD ONE TO PRINTER FRAME signal is connected through an OR gate 480 to the reset section of the flip-flop 464. As a result of this construction, whenever an ADD ONE TO PRINTER FRAME signal is received, the control flip-flop 464 will be reset to remove the disabling signal from the AND gates 472. Similarly, whenever a SUBTRACT ONE FROM PRINTER FRAME or a SUBTRACT TWO FROM PRINTER FRAME signal is received, the control flip-flop 464 will be set to remove the disabling signal from the AND gates 474.

Both of the leads on which a SUBTRACT ONE FROM PRINTER FRAME or an ADD ONE TO PRINTER FRAME signal are received are connected through a pair of NAND gates, generally designated 482 to the trigger input of the flip-flop PFC1. The lead on which the SUBTRACT TWO signal is received is connected through an inverter 484, a pulse-forming NAND gate 486 and a NOR gate 476 to the trigger input of the flip-flop PFC2.

The operation of the printer frame control is as follows: If it is desired to add one to the number contained in the bidirectional counter comprising the printer frame control, an ADD ONE TO PRINTER FRAME signal is issued. This causes the control flip-flop 464 to be reset to thereby enable the AND gates 472 and disable the AND gates 474. The same ADD ONE TO PRINTER FRAME signal is applied as the trigger input to the flip-flop PFC1. If the flip-flop PFC1 is reset, the input pulse will cause it to become set. If the flip-flop PFC1 is set, it will become reset and the change in its condition will be passed through the enabled AND gate 472 to the trigger input of the flip-flop PFC2 to thereby cause the latter to change its condition. Binary one to binary zero changes in the flip-flops PFC2 and PFC4 are similarly passed to their next highest flip-flop through the enabled AND gates 472.

An illustration of the operation in response to a SUBTRACT ONE FROM PRINTER FRAME signal or a SUBTRACT TWO FROM PRINTER FRAME signal is as follows. When either a SUBTRACT ONE FROM PRINTER FRAME or a SUBTRACT TWO FROM PRINTER FRAME signal is received, the control flip-flop 464 is set to thereby disable the AND gates 472 and enable the AND gates 474. If the flip-flop PFC1 is set corresponding to the presence of a binary one therein and the signal received is a SUBTRACT ONE FROM PRINTER FRAME signal, the application of the signal through the NAND gate 482 to the trigger input of the flip-flop PFC1 will cause it to be reset. Normally, this change from binary one to binary zero would cause the flip-flop PFC2 to change its condition. However, since the AND gates 472 are disabled, no condition changing signal will be received by the flip-flop PFC2. Accordingly, the changing of the condition of the flip-flop PFC1 from set to reset corresponds to the subtracting of the number one from the number contained in the printer frame control. In the event that flip-flop PFC1 is reset and the flip-flop PFC2 is set when a SUBTRACT ONE FROM PRINTER FRAME signal is received, such a signal will cause the flip-flop PFC1 to become set corresponding to an increase by one of the number contained in the printer frame control. However, the change in condition of the flip-flop PFC1 from binary zero to binary one will be passed by the enabled AND gate 474 as an input to the flip-flop PFC2 to cause the latter to become reset. Such resetting of the flip-flop PFC2 corresponds to a decrease by two of the number contained in the printer frame control. Thus, the change in conditions of the flip-flops PFC1 and PFC2 considered jointly result in a net decrease of one in the number contained by the printer frame control. It should be noted that the just mentioned resetting of the flip-flop PFC2, which would normally cause a change in condition of the flip-flop PFC4 is precluded from doing such by reason of the disabled AND gates 472.

In the case of a SUBTRACT TWO FROM PRINTER FRAME input, no signal is applied to the flip-flop PFC1. However, the signal is applied as an input to the flip-flop PFC2 which, if set corresponding to at least the number two in the printer frame control, will be reset to decrease by two the number contained in the printer frame control. In the event the flip-flop PFC2 is reset and the flip-flop PFC4 is set when the SUBTRACT TWO signal is received, the input to the flip-flop PFC2 will cause it to become set corresponding in addition of the number of two. As noted above with respect to the SUBTRACT ONE FROM PRINTER FRAME sequence, the similar change in the flip-flop PFC2 from zero to one will be passed along as a signal through the enabled AND gate 474 as an input to the flip-flop PFC4 to cause the latter to be reset which corresponds to a subtraction of four from the number contained in the printer frame control. Accordingly, the net decrease in the number contained in the printer frame control upon the receipt of a SUBTRACT TWO FROM PRINTER FRAME signal will be two.

The information contained in the printer frame control after a subtract or add sequence is utilized to control the frame location in which the printer is to print. This information is passed out of the printer frame control on outputs 1PFC—8PFC from the set sections of the flip-flops PFC1—PFC8, respectively, to the frame selection matrix. Similar output signals $\overline{1}$PFC—$\overline{8}$PFC are emitted by the outputs of the reset sections of the flip-flops PFC1—PFC8, respectively.

K. Binary to Decimal Printer Frame Selection Decoding Matrix

In order to use the frame information contained in binary code in the printer frame control, to control the location in which the printer will print, it is necessary to provide means for converting such information to a decimal form where it may be fed to appropriate printer frame selection solenoids.

Specifically, the means provided to decode the information contained in the printer frame control comprise a conventional binary to decimal decoding matrix 486 shown schematically in FIG. 16. The binary to decimal printer frame selection decoding matrix is comprised of a plurality of electronic gates (not shown) connected to receive the output signals 1PFC—8PFC and $\overline{1}$PFC—$\overline{8}$PFC from the flip-flops PFC1—PFC8 of the printer frame control. The gates are also arranged to be enabled by a DECODE FRAME ADDRESS signal from the computer cycle control as will appear. Depending upon the conditions of the flip-flops PFC1—PFC8, the gating in the decoding matrix will energize one of eleven outputs, each of which is connected to a corresponding frame selection solenoid on each of the printers. Preferably, drivers for the printer frame selection solenoids are contained within the decoding matrix.

L. Binary to Decimal Printer Character Selection Decoding Matrix

Figures 17, 23C:
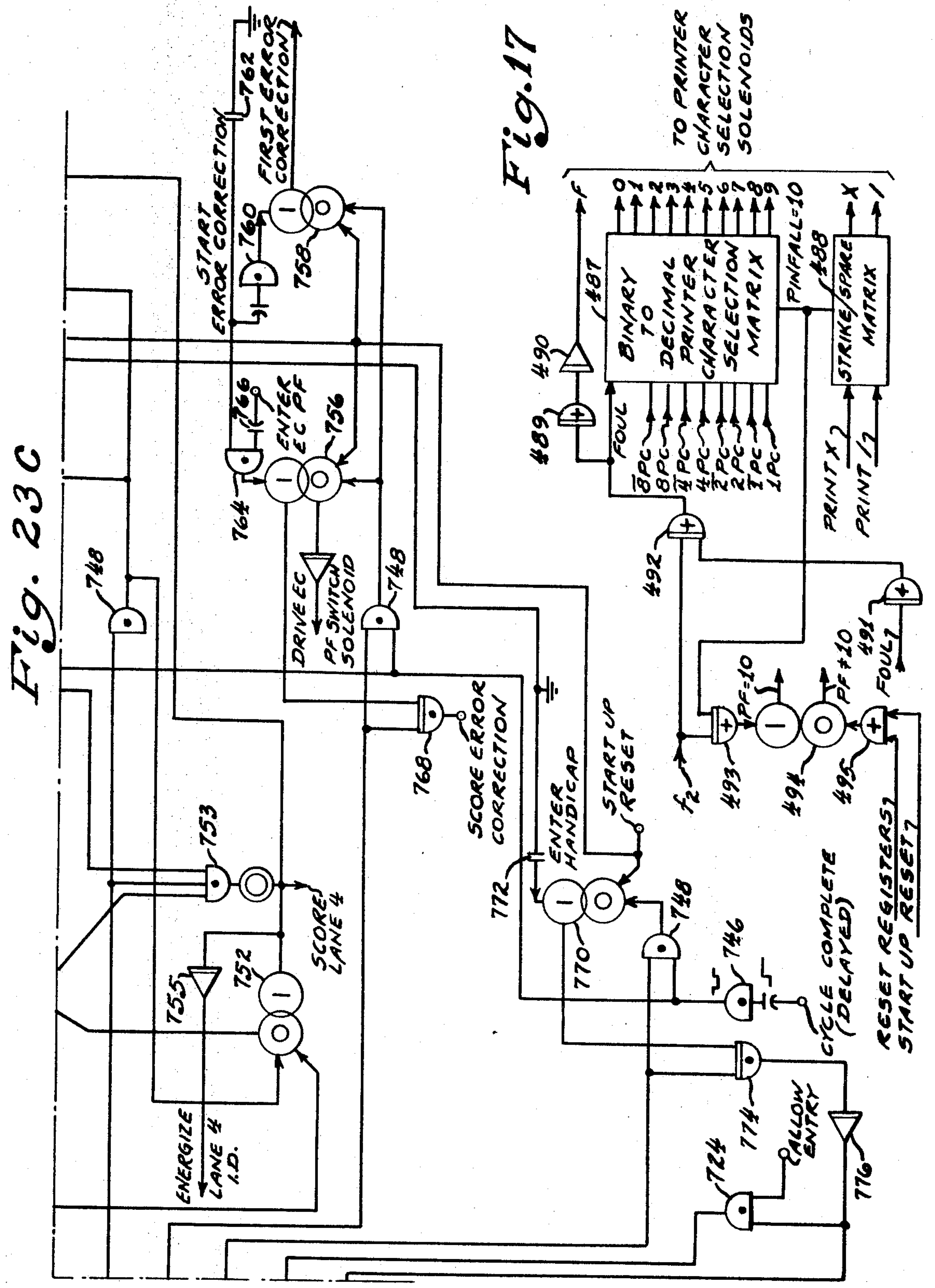
FIG. 17 is a logic diagram of a character selection matrix for causing the printer to select a given character for printing.
FIG. 23C is to be placed adjacent the lower edge of FIG. 23B.

The printer character selection matrix is shown in FIG. 17 and comprises a conventional binary to decimal decoding matrix 487 made up of a plurality of electronic gates (not shown). The matrix is adapted to receive eight inputs 1PC—8PC and $\overline{1}$PC—$\overline{8}$PC from the pinfall counter (FIG. 10) described previously. A ninth input to the matrix serves to disable the matrix in the event a foul is detected and verified in response to a FOUL signal from the scanning cycle control.

The printer character selection matrix has 10 outputs corresponding to the printer characters 0—9. An eleventh output from the matrix 487 issues a signal when the matrix decodes a condition of the pinfall counter corresponding to a pinfall equal to 10. The PINFALL EQUALS TEN signal is fed to a strike/spare matrix 488, comprised of a pair of electronic gates (not shown) as an input thereto. Additionally, the strike/spare matrix includes a pair of inputs on which PRINT X and PRINT / input signals are received from the computer cycle control. When the strike/spare matrix receives PINFALL EQUALS TEN and PRINT X input signals, the strike/spare matrix indicates to the printer that a character for a strike should be selected. Similarly, when the strike/spare matrix receives a PINFALL EQUALS TEN and a PRINT / signal, it indicates that a spare character should be selected.

Both of the matrices 487 and 488 preferably include solenoid drivers associated with their outputs.

In parallel with the ninth input to the matrix 487 on which the disabling FOUL signal corresponding to the occurrence of a detected and verified foul is received, is connected a one input NOR gate 489 and solenoid driver 490. The FOUL signal is received from the scanning cycle control through a one input NOR gate 491 and a two input NOR gate 492. The latter NOR gate is also receptive of an $f_2$ input signal. Accordingly, upon the reception of a FOUL signal and $f_2$ signal, the NOR gate 492 will be enabled to ultimately cause the driver 490 to signal the printer to select the foul indicating character. Such an occurrence will simultaneously disable the matrix 487 which, because it is disabled, cannot enable the strike/spare matrix 488.

The first 10 outputs from the matrix 487, the two outputs from the matrix 488 and the output from the driver 490 are connected to the corresponding character selection solenoids in the printers for each of the four lanes. As will be seen hereinafter, only the solenoid on the printer associated with the lane to be scored is energized to select the appropriate character.

The 11th output from the matrix 487 on which the PINFALL EQUALS TEN signal may be issued is also utilized as an input to a NOR gate 493. The NOR gate 493 has a second input on which an $f_2$ signal may be received. The output from the NOR gate 493 is utilized as an input to the set section of a flip-flop 494 and is arranged to cause the latter to be set upon the reception by the NOR gate 493 of both an $f_2$ and a PINFALL EQUALS TEN signal. The flip-flop 494 includes inputs to its reset section through a NOR gate 495 which may receive either a RESET REGISTERS signal or a STARTUP-RESET signal to cause the flip-flop 494 to be reset.

The output from the set section of the flip-flop 494 is utilized to issue a PF=TEN signal to the bowler state updating matrix to when the pinfall on a first ball is equal to 10 or when the cumulative pinfall on two balls is equal to 10. Thus, the flip-flop 494 serves to issue information necessary to the updating of a bowler's state. Additionally, the flip-flop 494 has an output from its reset section on which a PF≠TEN signal is issued. Both the PF=TEN and the PF≠TEN signals are additionally used as inputs to the reset gating arrangement 440 associated with the bowler's score cycle control. Thus, in addition to supplying the bowler's state updating matrix with necessary pinfall information, the flip-flop 494 additionally supplies the bowler score cycle control with information necessary to determine whether the counter associated therewith should be reset prior to the performance of all the functions which it is capable of inducing.

M. Printer Cycle Control

As previously noted in connection with the description of the pinfall counter and the binary coded decimal up counter of the arithmetic register, cumulative score information contained in the binary coded decimal up counter is read, four bits at a time, into the pinfall counter where it is decoded by the printer character selection matrix to energize a selected printer character selection solenoid in a printer. Since the score information in the BCD counter is contained in 12 bits of information (a 13th bit in the case of team totals may be present in the flip-flop PC1 of the pinfall counter), and the printer character selection matrix is only capable of decoding four bits of information at any given time, it is necessary to provide means for reading out information in the BCD counter four bits at a time. Additionally, it is necessary to provide means to cause the printer to print the selected character after each four bit group of cumulative score information has been received by the pinfall counter and decoded by the printer character selection matrix. The means for accomplishing these functions are provided by the printer cycle control.

Figure 18A:
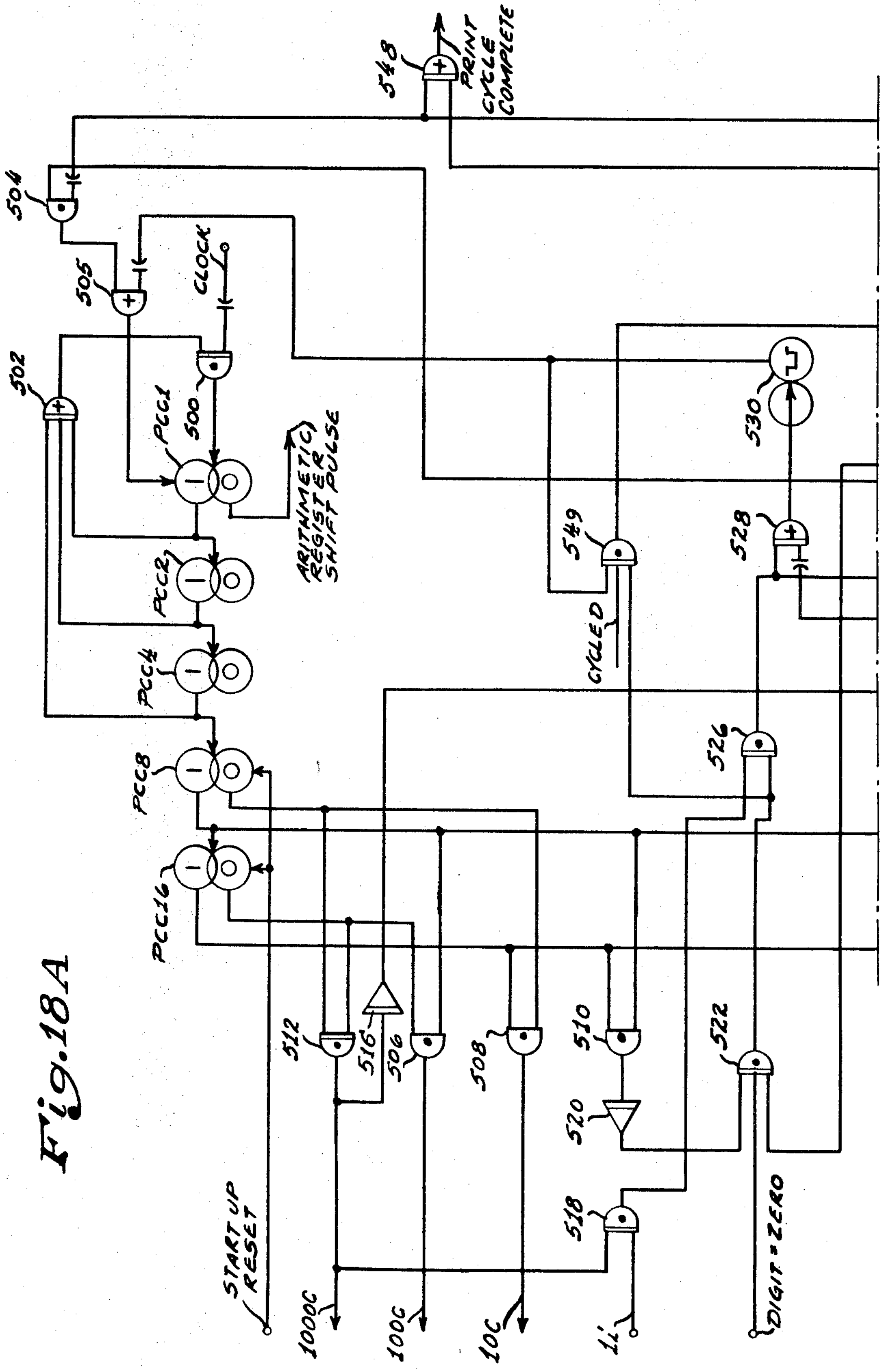
FIG. 18 is a logic diagram of a printer cycle control which controls the printing operation and is comprised of FIGS. 18A and 18B.
FIG. 18B is to be placed adjacent the lower edge of FIG. 18A.
Figure 18B:
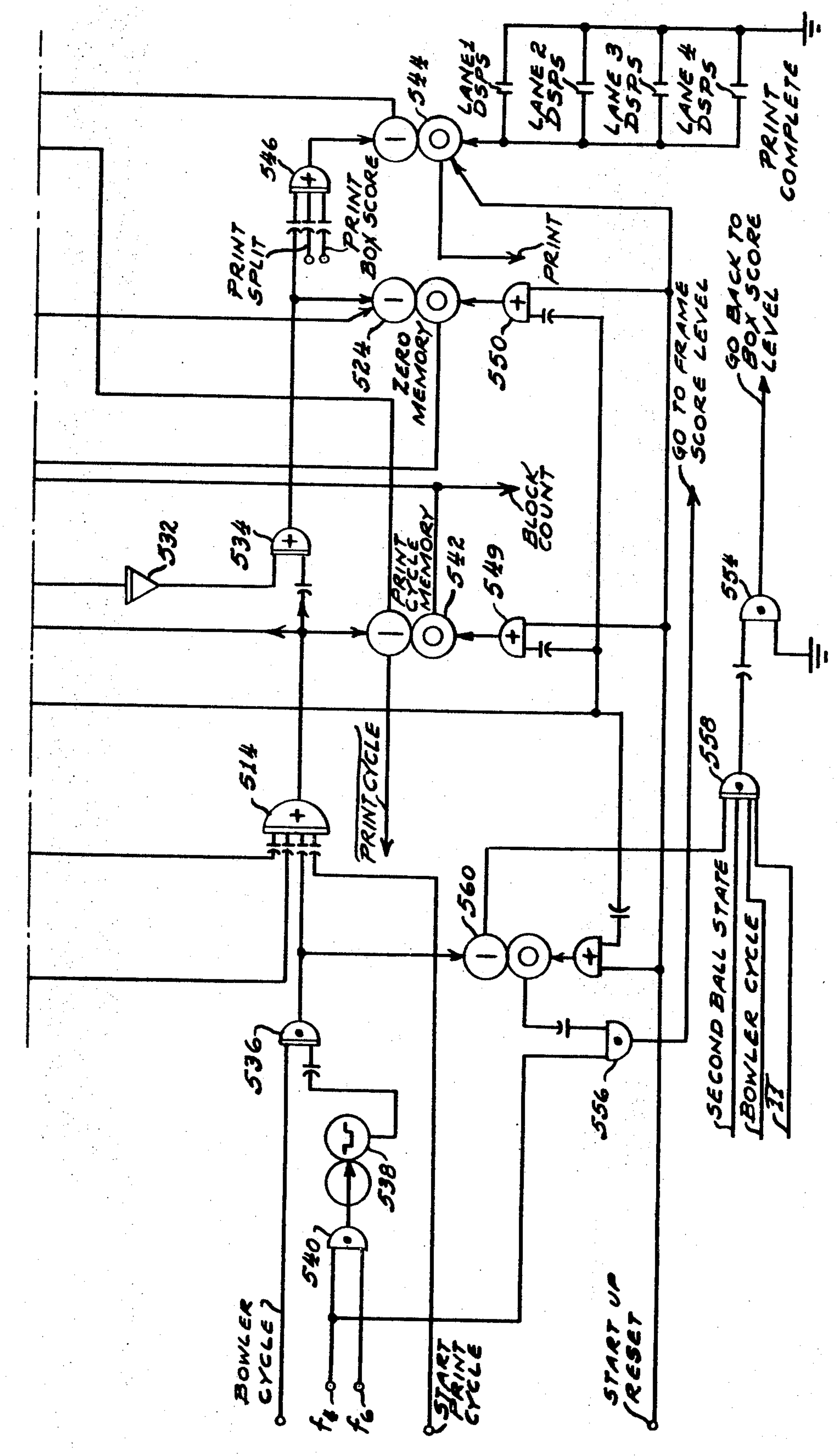

The printer cycle control is shown in FIGS. 18A and 18B and comprises five flip-flops PCC1, PCC2, PCC4, PCC8 and PCC16. Each of the flip-flops PCC1—PCC8 includes an output from its set section which is connected to the trigger input of the next higher flip-flop to form a convention binary up counter. The flip-flop PCC1 has a trigger input connected to the output of a NAND gate 500. The NAND gate 500 includes a first input on which clock pulses are received at two times the required rate of shifting required of the BCD counter and pinfall counter. The second input to the NAND gate 500 is a disabling input connected to the output of a NOR gate 502 to stop the counting sequence at such times as hereinafter appear.

The flip-flop PCC1 includes an input to its set section from an AND gate 504 and an OR gate 505 which, under certain circumstances, issue a signal to the flip-flop PCC1 to cause the latter to be set and start a counting sequence. The outputs from the set sections of the flip-flops PCC1—PCC4 are connected as inputs to the NOR gate 502. This arrangement is such that when each of the flip-flops PCC1—PCC4 are in a reset condition, the NOR gate 502 issues a disabling signal to the NAND gate 500 to stop further transmission of clock pulses to the flip-flop PCC1 thus stopping the counting sequence.

The flip-flops PCC8 and PCC16 have a common input to the reset sections on which a STARTUP or RESET signal may be received to cause the flip-flops PCC8 and PCC16 to be reset as the sequences may require.

The flip-flops PCC8 and PCC16 further include outputs from their set and reset sections which are connected as inputs to AND gates 506, 508 and 510; a NAND gate 512 and a NOR gate 514. The AND gate 506 is arranged to detect a zero-one condition of the flip-flops PCC16 and PCC8, respectively; the AND gate 508 is arranged to detect a one-zero condition; and AND gate 510 is arranged to detect a one-one condition; and the NAND gate 512 is arranged to detect a zero-zero condition. The NOR gate 514 is of the pulse forming type and is arranged to detect any zero to one change in the flip-flop PCC8 or the flip-flop PCC16.

The output from the reset section of the flip-flop PCC1 is connected to the lines 274 of the pinfall counter and a BCD up counter (FIGS. 9 and 10) to provide the arithmetic register with the necessary shift pulses so as to cause the information contained in the BCD up counter to be shifted into the pinfall counter for decoding and printing purposes.

In operation, the printer cycle control causes information to be shifted into the pinfall counter in groups of four bits. This function is accomplished by the flip-flops PCC1—PCC4 which, when all are reset, act together through the NOR gate 502 to disable the input to the flip-flop PCC1 to preclude further counting and thus, the emission of additional shift pulses until such a time as the printer has digested the information and is ready for the new group of four bits of information. Upon this occurrence, the flip-flop PCC1 is set to remove the blocking input to the NAND gate 500.

The flip-flops PCC8 and PCC16 control the column in a frame in which the printer is to print. The NAND gate 512 issues 1000C signals to the printer column location matrix only in an 11th frame situation for printing in the thousands column while the AND gates 506 and 508 issue 100C and 10C signals to the printer column location matrix for printing in the hundreds column and the tens column respectively. In the absence of any of the 10C, 100C or 1000C signals, the printer will print in the units column, although an AND gate 510 is enabled when printing in the units column is required for purposes as will appear. The NOR gate 514, together with other means to be described hereinafter, directs the printer to print.

Accordingly, it will be apparent that the printer cycle control provides control of the shifting and column addressing functions. The control of the shifting and addressing is performed as a function of counting as follows.

TABLE 10

| | PCC16 | PCC8 | PCC4 | PCC2 | PCC1 | |
|---|---|---|---|---|---|---|
| | | | Start | | | |
| Address 1,000's column | 0 | 0 | 0 | 0 | 0 | Print 1,000's. |
| | 0 | 0 | 0 | 0 | 1 | Shift. |
| | 0 | 0 | 0 | 1 | 0 | |
| | 0 | 0 | 0 | 1 | 1 | Shift. |
| | 0 | 0 | 1 | 0 | 0 | |
| | 0 | 0 | 1 | 0 | 1 | Shift. |
| | 0 | 0 | 1 | 1 | 0 | |
| | 0 | 0 | 1 | 1 | 1 | Shift. |
| Address 100's column | 0 | 1 | 0 | 0 | 0 | Print 100's. |
| | 0 | 1 | 0 | 0 | 1 | Shift. |
| | 0 | 1 | 0 | 1 | 0 | |
| | 0 | 1 | 0 | 1 | 1 | Shift. |
| | 0 | 1 | 1 | 0 | 0 | |
| | 0 | 1 | 1 | 0 | 1 | Shift. |
| | 0 | 1 | 1 | 1 | 0 | |
| | 0 | 1 | 1 | 1 | 1 | Shift. |
| Address 10's column | 1 | 0 | 0 | 0 | 0 | Print 10's. |
| | 1 | 0 | 0 | 0 | 1 | Shift. |
| | 1 | 0 | 0 | 1 | 0 | |
| | 1 | 0 | 0 | 1 | 1 | Shift. |
| | 1 | 0 | 1 | 0 | 0 | |
| | 1 | 0 | 1 | 0 | 1 | Shift. |
| | 1 | 0 | 1 | 1 | 0 | |
| | 1 | 0 | 1 | 1 | 1 | Shift. |
| Address 1's Column | 1 | 1 | 0 | 0 | 0 | Print 1's. |
| | 1 | 1 | 0 | 0 | 1 | Shift. |
| | 1 | 1 | 0 | 1 | 0 | |
| | 1 | 1 | 0 | 1 | 1 | Shift. |
| | 1 | 1 | 1 | 0 | 0 | |
| | 1 | 1 | 1 | 0 | 1 | Shift. |
| | 1 | 1 | 1 | 1 | 0 | |
| | 1 | 1 | 1 | 1 | 1 | Shift. |
| | 0 | 0 | 0 | 0 | 0 | |
| | | | Stop | | | |

From the above, it will be seen that the required four shifts necessary to transfer the digit across each decade of the BCD up counter are provided in pulse form which pulses are generated by the one to zero changes in the flip-flop PCC1. The column address is determined by the conditions of the flip-flops PCC8 and PCC16, which conditions are decoded by the AND gates 506, 508, and 510 and the NAND gate 512. Once the four required shift pulses are emitted, the NOR gate 502 causes the NAND gate 500 to block further clock pulse inputs to the flip-flop PCC1 until it is set by a start pulse from the OR gate 505. As a result of the flip-flop PCC1 becoming set, the disabling input to the NAND gate 500 from the NOR gate 502 is removed. From the foregoing it is believed apparent how the printer's cycle control performs the two functions of directing the shifting of cumulative score information from the BCD counter into the pinfall counter and addressing the proper column in the printer during each frame.

The third and fourth functions of the printer cycle control include the suppression of all leading zeros in a score to be printed, together with the suppression of any printing in the thousands column unless the final team total is being printed in the eleventh frame. In order to accomplish the two suppressive functions just mentioned, the printing cycle control includes a plurality of electronic gates arranged to follow the logical relation:

$$\text{Print} = (\text{Digit Not Zero} + \text{Zero Memory Set} + \text{Print Units})\,\overline{(\text{Print Thousands} + \text{State } \mathbf{11})}$$

This function is implemented by NAND gates, and when true, a pulse is generated to set a print cycle memory. If not true, the negation gates a pulse to step the counter comprised of the flip-flops PCC1—PCC8 on to cause the shifting and reading of the next group of four bits of information from the BCD up counter.

The logic includes an inverter 516 having an input from the NAND gate 512 for purposes as will be seen. The output from the NAND gate 512 is also utilized as an input to a NAND gate 518 which has a second input connected to the bowler state decoding matrix for sensing the presence of bowler state 11. From the foregoing it will be apparent that the NAND gate 518 will have an output signal whenever the flip-flops PCC8 and PCC16 are not both in a reset condition or when the bowler's state is 11.

The output from the AND gate 510, which, it will be recalled, determines when printing should be accomplished in the units column, is fed through an inverter 520 as an input to a NAND gate 522. The NAND gate 522 includes a second input on which a DIGIT EQUALS ZERO signal may be received from the pinfall counter together with a third input from the reset section of a flip-flop 524 which serves as the zero memory. The levels of each of the three inputs are arranged to be of the same magnitude and to preclude the issuance of an output signal by the NAND gate 522 unless (a) the condition of the flip-flops PCC8 and PCC16 is such as to indicate that printing should be done in the units column, or (b) the DIGIT EQUALS ZERO signal is removed corresponding to a "digit not equal to zero" condition or (c) the zero memory flip-flop 524 is set.

The outputs from the NAND gates 518 and 522 are utilized as inputs by a NAND gate 526 and, when a signal is present on both inputs to the NAND gate 526, the corresponding lack of an output signal corresponds to a direction to print. However, when the NAND gate 526 does not receive signals on both of its inputs, the resulting output signal is directed as an input to a NOR gate 528 having its output associated with a 30 microsecond delay multivibrator 530. After a 30 microsecond delay, the delay multivibrator 530 issues a signal to the OR gate 505 associated with the set section of the flip-flop PCC1 to cause the latter to once again become set and renew the count.

The output from the NAND gate 526 is directed through an inverter 532 which will have an output signal when the NAND gate 526 detects that the above noted logical relationship is true. The output from the inverter 532 is utilized as an input by a NOR gate 534 which is arranged to cause the printing of the appropriate characters in a manner to be seen hereinafter.

The output of the NOR gate 514, which it will be recalled, detects zero to one changes of the flip-flops PCC8 and PCC16 to indicate that the shifting of each digit from the BCD up counter into the pinfall counter has taken place and that printing should take place, if required, provides an enabling input to each of the NOR gates 528 and 534 when such zero to one changes occur in the flip-flops PCC8 and PCC16. As a result, if the above noted logical relation is true, the NOR gate 534 will be enabled to cause a printing operation. However, if the logical relation is false, the NOR gate 528 will be enabled to trigger the delay multivibrator 530 and cause an input to the flip-flop PCC1 to cause the counter to go on to shift the next digit into the pinfall counter for subsequent decoding.

The NOR GATE 514 additionally includes an input from a NAND gate 536 having a first input on which a BOWLER CYCLE signal is received from the bowler score cycle control. The second input to the NAND gate 536 is connected to the output of a 10 microsecond delay multivibrator 538 which is triggered by an input from an AND gate 540 having inputs for receiving signals representative of the functions $f_4$ and $f_6$, the AND gate 540 being disabled to trigger the delay multivibrator 538 whenever an $f_4$ or an $f_6$ signal is present. Additionally, the NOR gate 514 includes a fourth input on which a START PRINT CYCLE signal is received. This logic is used for team total and handicap printing.

A print cycle memory flip-flop 542 has an input to its set section from the output of the NOR gate 514. Thus, the first enabling signal from the NOR gate 514 to the NOR gates 528 and 534 in a printing sequence will cause the print cycle memory flip-flop 542 to be set. An output from the reset section of the flip-flop 542 is utilized as an input by the NAND gate 504 so as to enable it during a printing sequence. A second flip-flop 544 is arranged to be set when printing is called for by the output from the NOR gate 534 via a NOR gate 546, a PRINT SPLIT signal input from the bowler score cycle control or a PRINT BOX SCORE signal from the pinfall register control to the NOR gate 546. The flip-flop 544 has an output from its reset section on which a PRINT signal is issued. Additionally, the flip-flop 544 includes parallel inputs to its reset section associated with the printers on each of the four lanes such that when any printer has completed the printer operation, the switch DSPS (see also FIG. 5) will be closed to issue a PRINT COMPLETE signal to cause the flip-flop 544 to be reset. When the flip-flop 544 is reset, the output from its set section is applied as an input to the AND gate 504 to ultimately cause the flip-flop PCC1 to become set and initiate a further shifting sequence, provided that the AND gate 504 is enabled by the flip-flop 542. A NOR gate 548 includes inputs connected from the set sections of both of the flip-flops 542 and 544 and for issuing a PRINT CYCLE COMPLETE signal when both of the flip-flops 542 and 544 are reset. Additionally, the set section of the flip-flop 542 issues a $\overline{\text{PRINT CYCLE}}$ signal which is utilized in the computer cycle control as will appear while a BLOCK COUNT signal is issued by the reset section of the flip-flop 542 to the electronic switch 297 of the pinfall counter (FIG. 10) to disable the gates of the arithmetic register used for counting purposes during a print cycle as previously noted.

In order to disable the input to the flip-flop PCC1 and preclude the initiation of a counting and shifting sequence, the AND gate 504 must be disabled. Such disabling occurs when the print cycle memory flip-flop 542 is reset due to the connection between the reset section of that flip-flop and the input to the AND gate 504. The print cycle memory flip-flop 542 may be reset in either of two ways. An OR gate 549 includes an output which will cause the flip-flop 542 to be reset when the OR gate 549 receives an input signal. One such input signal, a STARTUP RESET SIGNAL, may be placed on one input to the OR gate 549. A second input to the OR gate 549 is connected to the output of the inverter 516. It will be recalled that the NAND gate 512 senses when both of the flip-flops PCC8 and PCC16 are reset. It will also be apparent from the above table that when each digit contained in the BCD up counter has been read into the pinfall counter and decoded, each of the flip-flops PCC1—PCC16 will be reset. Accordingly, the NAND gate 512 detects this condition and issues a signal via the inverter 516 to the OR gate 549 to cause the print cycle memory flip-flops 542 to be reset thereby disabling the AND gate 504 and precluding further input pulses to the flip-flop PCC1.

The zero memory flip-flop 524 serves to remember whether a previous digit placed on the pinfall counter in a printing sequence was a nonzero digit by virtue of remembering if the NOR gate 534 had previously caused a character to be printed. Such a memory is required because in the case of a three-digit number having a second or tens digit equal to zero, neither the input from the AND gate 510 which detects a situation calling for the printing in the units column nor the input on which the absence of a DIGIT EQUALS ZERO signal would be detected would enable the NAND gate 522 to thereby enable the NAND gate 526 and permit the NOR gate 534 to indicate that a printing operation should take place. Accordingly, the output from the NOR gate 534 is connected as an input to the set section of the zero memory flip-flop 524 and will cause the latter to be set whenever a previous digit in a sequence has been printed. Since a previous digit will only be printed if it is a nonzero digit, the set condition of the zero memory flip-flop 524 is indicative of the fact that any subsequent digit that is equal to zero should be printed as it is significant.

From the foregoing, it will be apparent that a thousands digit in a team total will only be printed in the 11th frame. Occasionally, however, a running team total may exceed decimal 1000 in the ninth or prior frame. The printer is not designed to print the thousands digit in such a case and as is apparent from the logic described above, no attempt is made to print in the thousands column in any frame prior to the 11th. Thus, if a team total at the end of the ninth frame was equal to, for example, 1009, use of only the foregoing logic would result in only the printing of a 9 in the units column at the running team total level of the ninth frame. In order to indicate that the running team total in such a case is, in fact, 1009, it is desirable to print zeros in both the hundreds and tens columns. To provide this function, the zero memory flip-flop 524 is arranged to be set by the output of a NAND gate 549. The NAND gate 549 has a first input connected to the output of the NAND gate 522 and a second input connected to the output of the delay multivibrator 530. A third input to the NAND gate 549 is adapted to receive a CYCLE D signal which, as will be seen, corresponds to the computing and printing, if necessary, of the running team total. The arrangement is such that when the delay multivibrator 530 is tripped and the NAND gate 552 detects the absence of a DIGIT EQUALS ZERO signal during the occurrence of cycle D, the zero memory flip-flop 524 will be set such that all succeeding digits will be printed. In other words, in the exemplary situation, the presence of a decimal 1 in the pinfall counter corresponding to the thousands digit of a team total will be sensed by the NAND gate 522 but since it is not in a state 11 or end of game situation, printing will not take place. Since printing will not take place due to the failure of the NAND gate 526 and the inverter 532 and enable the NOR gate 534, the zero memory flip-flop 524 will not be set in the usual manner. However, it will be set in the manner just mentioned such that zeros will be printed in the hundreds and tens columns.

The zero memory flip-flop 524 includes an input from a NOR gate 550 for resetting purposes. The NOR gate 550 is arranged to receive a STARTUP RESET signal in a manner similar to the OR gate 548. Additionally, the output from the NAND gate 512 is fed via the inverter 516 as a second input to the OR gate 550 to cause resetting of the print cycle memory flip-flop 542 when the counting sequence performed by the flip-flops PCC1—PCC16 has been completed.

The printer cycle control is also utilized to generate a peripheral function, namely the generation of a signal to position the printer at a frame score level, and a second signal at the end of a bowler scoring cycle if the bowler requires two balls for a frame. The latter signal allows the printer to be repositioned at a box score level in anticipation of the printing of the second ball box score. The signals are derived from the outputs of two AND gates 554 and 556.

The AND gate 554 includes a grounded first input and a second input connected to the output of a NAND gate 558. The NAND gate 558 includes three inputs on which SECOND BALL STATE BOWLER CYCLE and STATE $\overline{11}$ signals may be received, respectively. The fourth input to the NAND gate 558 is connected to the output of the set section of a flip-flop 560 which is arranged to be set when the NAND gate 536 has an output and reset by the inverted output of the NAND gate 512 when the counting sequence is complete.

The AND gate 556 includes a first input connected to the reset section of the flip-flop 560 and a second input on which an $f_4$ signal may be received.

As a result of the above noted logic, a GO TO FRAME SCORE LEVEL signal will be issued by the AND gate 556 whenever an $f_4$ signal is present. It is to be noted that the $f_4$ signal also results in the setting of the flip-flop 560 such that a GO BACK TO BOX SCORE LEVEL signal will be issued by the AND gate 554 whenever the flip-flop 560 is set and the SECOND BALL STATE, BOWLER CYCLE and STATE ELEVEN signals are present at the NAND gate 558.

N. Computer Cycle Control

In order to centrally control the many elements of the computer described previously as well as those to be described hereinafter, it is necessary to provide a control means that provides overall control of the entire computer. In the instant invention, such overall control is provided by the computer cycle control which may be divided into three distinct portions. These portions are the computer cycle ripple counter, the computer sequence counter and the computer cycle gating.

The computer cycle control is arranged to direct the computer to undergo any one of four cycles. The cycles are as follows:

Table II

1. Cycle A—Handicap entry
2. Cycle B—Initial team total function
   Cycle $B_1$—Erasure of previous team total
   Cycle $B_2$—Reading of handicap into the team total and restoration of the handicap into the handicap memory
   Cycle $B_3$—The writing of the handicap into the team total memory
3. Cycle C—Scoring of a bowler
4. Cycle D—Addition of the bowler score to the team total, and printing of the team total if required.

Cycle A is initiated by an ALLOW HANDICAP ENTRY signal from the individual lane reset logic and a CYCLE START signal from the scanning cycle control, both of which will be described in detail hereinafter. Cycle B occurs only during league bowling and, where a pace bowler is used, disregards that bowler's score. It does not occur during an error correction procedure as will appear, nor in the open bowling mode. In order to permit restoration of the team handicap memory it is necessary to divide cycle B into the three parts set forth above. It is also necessary to perform Cycle B prior to the addition of a bowler's score to the team total as the arithmetic register does not provide for parallel addition.

Cycle C is initiated either by the end of Cycle B or by a CYCLE START signal from the scanning cycle control in the absence of the initiation of any of the other cycles. Cycle D is initiated by the completion of Cycle C, providing that the bowler just scored during Cycle C is in a first ball state, that bowler is not the pace bowler bowling in the number six position, the initiation of Cycle C was not caused by the scanning cycle control in response to an error correction procedure, and that the lane on which that bowler is bowling is not conditioned for open bowling. Additionally, although Cycle D may be initiated, as will appear, the ultimate goal of the cycle, namely, the addition of the bowler's score to the team total, will not take place unless the bowler's frame is identical to the frame for which the team total is to be computed.

Where one cycle follows another, a ripple counter is utilized for employing the termination of one cycle to initiate the beginning of the following cycle. The initiation of each cycle in turn is used by a sequence counter to generate a plurality of sequence commands which are generated in the same order to cause, through appropriate gating, the addressing of various computer subsystems if such addressing is required.

As will be apparent to those skilled in the art, cycles B—D will be employed at regular intervals while cycle A may occur at random depending upon when a handicap entry is manually made by a bowler and permitted by the computing device. Accordingly, cycle A may be termed an artificial cycle and, as will be seen, is independent of the ripple counter save for the fact that the performance of cycle A precludes the performances of cycles B—D until the former is terminated.

As noted above, cycle A is initiated by a CYCLE START signal and an ALLOW HANDICAP ENTRY signal, both of which are applied as inputs to a NOR gate 560 (see FIG. 19) in order to cause the NOR gate 560 to have an output. The output of the NOR gate 560 issues a CYCLE A signal and is applied as an input to a NOR gate 561 together with inputs representative of the occurrence of cycles $B_1$ and C as will appear. The output of the NOR gate 561 is connected as an input to the set section of a flip-flop 562 and is arranged with respect thereto such that when the NOR gate 560 has an output or when cycles A, $B_1$ or C are initiated, the flip-flop 562 will be set. An output from the reset section of the flip-flop 562 is utilized an an input to a NOR gate 563, together with inputs from the printer cycle control for receiving a PRINT CYCLE signal, the BCD down counter for receiving an ADD BOWLER SCORE TO TEAM TOTAL signal and the bowler score cycle control for receiving a BOWLER CYCLE signal. When the signals from the three just mentioned sources together with the signal from the reset section of the flip-flops 562 are present at the NOR gate 563, the latter will be disabled to thereby enable a NOR gate 564. The NOR gate 564 has a second input which is connected to the output of a clock (not shown) such that when the NOR gate 564 is enabled, the clock pulses will pass therethrough to step the sequence counter as will appear.

The flip-flop 562 has an input to its reset section from an AND gate 565 which is connected to a NOR gate 566. The NOR gate 566 is connected to the output of the NOR gate 560 and is arranged to be disabled whenever the latter has an output. When the NOR gate 566 is disabled, the AND gate 565, providing that it receives an appropriate enabling signal from the sequence counter as will appear, is enabled to reset the flip-flop 562.

From the foregoing it will be apparent that upon reception of a CYCLE START signal and an ALLOW HANDICAP ENTRY signal by the NOR gate 560, the flip-flop 562 will ultimately become set. If it is not a print cycle, a team total add score sequence or a bowler score cycle, the NOR gate 564 will be enabled to cause the sequence counter to step in accordance with the clock inputs applied thereto. When, as will appear, the sequence counter has stepped through an entire count, the AND gate 565 will receive an enabling signal therefrom and, due to the disabling of the NOR gate 566, the AND gate 565 will cause the flip-flop 562 to be reset to thereby enable the NOR gate 563 which, in turn, will disable the NOR gate 564 to preclude further counting by the sequence counter.

1. Computer Cycle Ripple Counter

Figure 19:
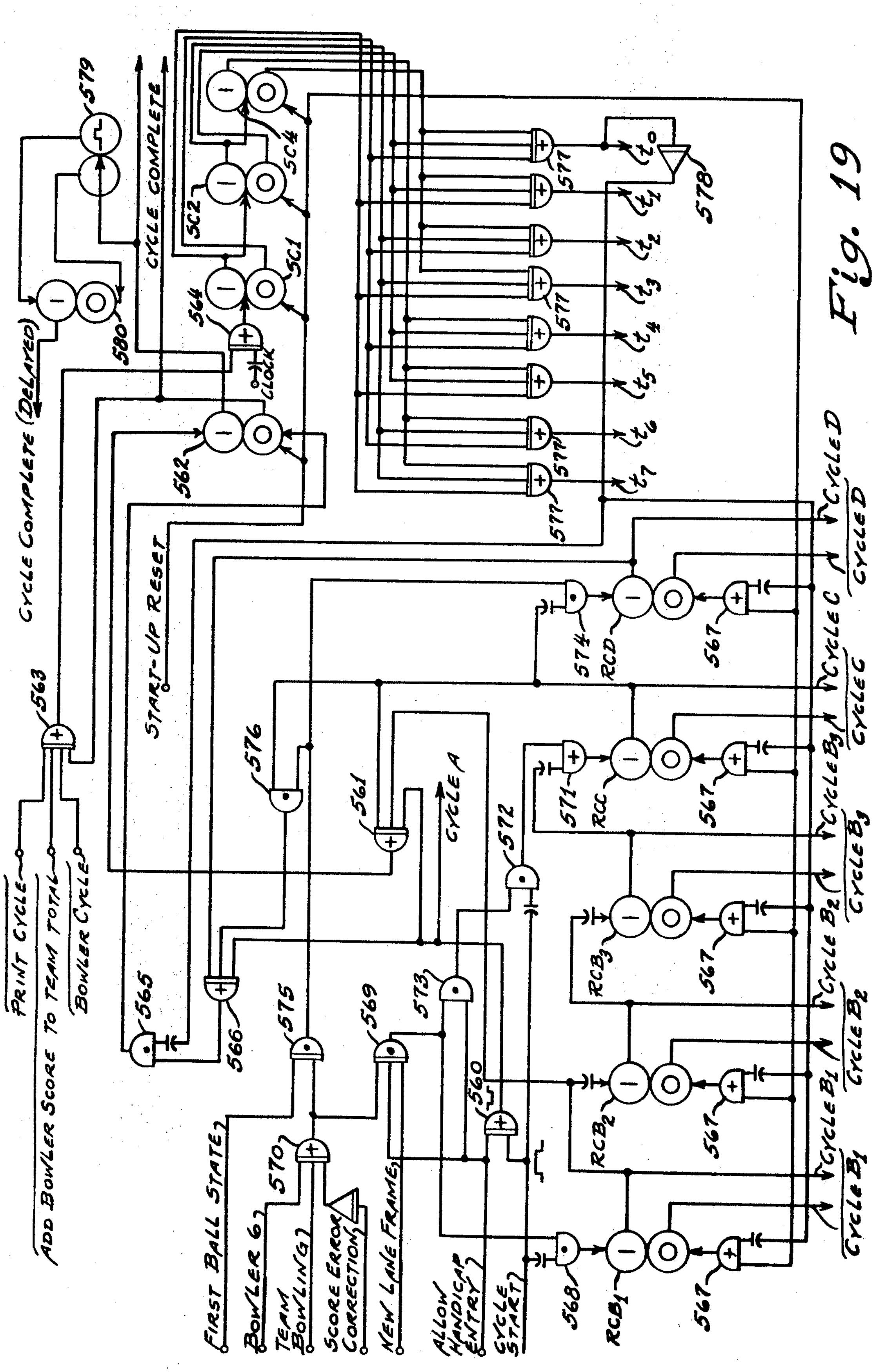
FIG. 19 is a logic diagram of a computer cycle ripple counter and a computer sequence counter which control the computer cycles and sequences for generating the necessary function relative to handicap entry, bowler scoring and team totaling.

The ripple counter is shown in FIG. 19 and comprises five flip-flops, $RCB_1$, $RCB_2$, $RCB_3$, RCC and RCD, the first two letters of each designation serving to indicate that the flip-flop is part of the ripple counter with the last letter (and subscript of present) serving to indicate the cycle for which the flip-flop is responsible. Each of the flip-flops $RCB_1$—RCD includes inputs to their reset sections from OR gates 567 which, as will appear, cause the flip-flops to be reset upon the completion of a count by the sequence counter or upon the receipt of a STARTUP-RESET signal. The flip-flop $RCB_1$ further includes an AND gate 568 connected to its set section for causing the flip-flop $RCB_1$ to be set. The AND gate 568 includes a first input on which a CYCLE START signal may be received from the scanning cycle control and a second input which is connected to the output of a NAND gate 569. The NAND gate 569 includes a first input on which the absence of an ALLOW HANDICAP ENTRY signal may be sensed, a second input for receiving a NEW LANE FRAME signal from the individual lane reset logic and a third input for receiving the output of a NOR gate 570. The NOR gate 570 includes three inputs, the first of which may receive a TEAM BOWLING signal from the computer cycle control gating as will appear. A second input to the NOR gate 570 is receptive of a BOWLER SIX signal (the absence of a BOWLER SIX signal) and will disable the NOR gate 570 if such a signal is not present. A third input to the NOR gate 570 senses the presence of an inverted SCORE $\overline{\text{ERROR CORRECTION}}$ signal (in essence, a $\overline{\text{SCORE ERROR CORRECTION}}$ signal) and, in the absence thereof, will disable the NOR gate 570. Thus, the NOR gate 570 will be enabled only when a TEAM BOWLING signal is present together with the presence of $\overline{\text{BOWLER SIX}}$ and $\overline{\text{SCORE ERROR CORRECTION}}$ signals. The NAND gate 569 is, in turn, disabled when an ALLOW HANDICAP ENTRY signal is not present, a NEW LANE FRAME signal is present and the NOR gate 570 is enabled. The NAND gate 569 is arranged with respect to the AND gate 568 such that whenever the former is disabled the latter is enabled. Accordingly, if the NAND gate 569 is disabled and a CYCLE START signal is received, the AND gate 568 will be enabled to cause the flip-flop $RCB_1$ to be set.

An output from the set section of the flip-flop $RCB_1$ is utilized as an input by the NAND gate 561. When the flip-flop $RCB_1$ is set in the manner just described, the output from the set section thereof to the NAND gate 561 will cause the latter to set the flip-flop 562 in the manner described above with reference to cycle A, and if the conditions at the NOR gate 563 are as described above, clock pulses will be admitted to the sequence counter to cause the latter to go through a count. When the sequence counter has completed its count, it will issue a signal to the NOR gate 567 associated with the flip-flops $RCB_1$ to cause the latter to be reset.

The output from the set section of the flip-flop $RCB_1$ is also connected as an input to the set section of the flip-flop $RCB_2$. When the flip-flop $RCB_1$ is reset in the manner just described, the change will be applied to the set section of the flip-flop $RCB_2$ to cause the latter to become set and thereby initiate cycle $B_2$. The sequence counter will continue to count, and upon completing the count, the output therefrom to the NOR gate 567 associated with the flip-flop $RCB_2$ causes the latter to be reset. The resulting change is sensed by an output from the set section of the flip-flop $RCB_2$ connected as an input to the set section of the flip-flop $RCB_3$ to cause the latter to become set and initiate cycle $B_3$. The sequence counter continues to count and upon the completion of a count, an output therefrom applied as an input to the OR gate 567 associated with the flip-flop $RCB_3$ causes the latter to be reset. The resulting change is applied through an OR gate 571 as an input to the set section of the flip-flop RCC to thereby cause the latter to become set and initiate cycle C. The output of the set section of the flip-flop RCC is applied as an input to the NAND gate 561, and when the flip-flop RCC is set, the signal applied on this output ultimately will cause the NOR gate 564 to be enabled, subject of course to the aforementioned conditions being present at the NOR gate 563, to cause the sequence counter to count.

As noted above, cycle C may be initiated independently of the termination of cycle B by the presence of a CYCLE START signal and the absence of other cycles. In order to provide for this manner of starting cycle C, the OR gate 571 has a second input from an AND gate 572 which may receive a CYCLE START signal. A second input to the AND gate 572 is taken from the output of a NAND gate 573. The NAND gate 573 has a first input adapted to sense the absence of an ALLOW HANDICAP ENTRY signal and a second input which is connected to the output of the NAND gate 569. As a result of this arrangement, when the ALLOW HANDICAP ENTRY signal is not present, and the NAND gate 569 is enabled, which condition it will be recalled will preclude cycle B from occurring the NAND gate 573 will be disabled to enable the AND gate 572. When the AND gate 572 is so enabled, its output will be passed through the NOR gate 571 to the set section of the flip-flop RCC to cause the latter to be set to start cycle C. Upon the completion of the count by the sequence counter, the latter will cause the OR gate 567 associated with the flip-flop RCC to reset the flip-flop RCC and the resulting one to zero change is fed from an output from the set section of the flip-flop RCC to an AND gate 574 having an input to the set section of the flip-flop RCD. The AND gate 574 has a second enabling input connected through an inverter to the output of a NAND gate 575. The NAND gate 575 has a first input connected to the output of the NOR gate 570, which it will be recalled is enabled when a TEAM BOWLING signal is present and BOWLER SIX and SCORE ERROR CORRECTION signals are not present. A second input to the NAND gate 575 is arranged to receive a FIRST BALL STATE signal. When the NOR gate 570 is enabled and a FIRST BALL STATE signal is received by the NAND gate 575, the latter will be disabled to thereby enable the AND gate 574. Additionally, since the flip-flop RCC is reset at this time, the flip-flop RCD will become set due to the output of the AND gate 574.

The identical inputs applied to the AND gate 574 are also applied to an AND gate 576. The output of the AND gate 576 is applied as an input to the NOR gate 566 and is arranged to preclude the latter from enabling the AND gate 565. When the AND gate 565 is disabled, the flip-flop 562 cannot be reset and the sequence counter will continue to count. Thus it will be apparent that resetting of the flip-flop 562 is precluded by the disabling of the AND gate 565 by the NOR gate 566 whenever the NAND gate 575 is disabled by the enabling of the NOR gate 570 and by the presence of a FIRST BALL STATE signal generated when the bowler's state is updated. It will be recalled that the NOR gate 570 is enabled during team bowling when the sixth bowler is not up and an error correction procedure is not taking place. Accordingly, the flip-flop 562 cannot be reset during cycle C when the above conditions are present and the sequence counter will continue to count such that cycle D will occur.

Each of the flip-flops $RCB_1$—RCD has outputs from their respective set sections which issue CYCLE $B_1$, CYCLE $B_2$, CYCLE $B_3$, CYCLE C and CYCLE D signals, respectively, together with outputs from their reset sections which issue $\overline{\text{CYCLE B}_1}$, $\overline{\text{CYCLE B}_2}$, $\overline{\text{CYCLE B}_3}$, $\overline{\text{CYCLE C}}$ and $\overline{\text{CYCLE D}}$ signals respectively, which signals are used as will appear.

2. Computer Sequence Counter

The sequence counter is comprised of three flip-flops SC1, SC2 and SC4 connected to provide a conventional binary counter as seen in FIG. 19. The flip-flop SC1 has its trigger input connected to the output of the NOR gate 564. As mentioned previously, when the NOR gate 564 is enabled by the NOR gate 563, clock pulses will be passed by the NOR gate 564 to the counter. Such clock pulses cause the flip-flops SC1—SC4 to count in a conventional manner. Additionally, each flip-flop SC1—SC4 has an input to its reset section on which a STARTUP-RESET signal may be received to reset the flip-flops.

The combination of conditions of the flip-flops SC1—SC4 represent a basic command to the computer to perform a particular function, although it will be apparent hereafter that each function may not be required for each cycle. Appropriate outputs from the flip-flops SC1—SC4 are utilized as inputs by seven NOR gates 577 which serve to decode the combinations of conditions of the flip-flops SC1—SC4 as follows.

TABLE 12

| SC4 | SC2 | SC1 | Output signal |
|---|---|---|---|
| 0 | 0 | 0 | $t_0$ |
| 0 | 0 | 1 | $t_1$ |
| 0 | 1 | 0 | $t_2$ |
| 0 | 1 | 1 | $t_3$ |
| 1 | 0 | 0 | $t_4$ |
| 1 | 0 | 1 | $t_5$ |
| 1 | 1 | 0 | $t_6$ |
| 1 | 1 | 1 | $t_7$ |
| 0 | 0 | 0 | $t_0$ |

During each of the cycles, A, B, C and D, some or all of the sequences $t_0$—$t_7$ are utilized as inputs to appropriate gating to cause various functions to be performed. In many instances, the same sequence signals $t_0$—$t_7$ will cause the same basic function irrespective of which cycle is occurring. Table 13, below, illustrates the functions performed during each cycle and sequence.

TABLE 13

Cycle A $t_1$—Select handicap memory.
$t_2$—Read handicap entry memory and block entry into arithmetic register to cause erasure of previous handicap entries.
$t_3$—Read handicap entry switches.
$t_6$—Print handicap.* Address eleventh frame. Write handicap into handicap memory.
$t_7$—Reset handicap entry memory flip-flop.

Cycle $B_1$ $t_1$—Select team total memory.
$t_2$—Read team total memory and block entry into arithmetic register to cause erasure of previous team total information.
$t_0$—Reset partial and complete team total reset memory flip-flops.

Cycle $B_2$ $t_1$—Select handicap memory.
$t_2$—Read handicap memory, block frame entry if handicap has not been entered.
$t_6$—Write handicap into handicap memory.

Cycle $B_3$ $t_1$—Select team total memory.
$t_2$—Read team total.
$t_6$—Write team total.

Cycle C $t_1$—Select bowler memory.
$t_2$—Read bowler memory, blocking entry if new game or error correction to cause erasure of previous bowler score information.
$t_3$—Add one to bowler frame if first ball state and not first error correction. Read error score input switches if beginning of error correction procedure. Load printer frame control.
$t_5$—Start bowler cycle. Load BCD down counter.* Load frame buffer. Print bowler score if required.
$t_6$—Write into bowler memory.

Cycle D $t_1$—Select team total memory.
$t_2$—Read team total memory.
$t_3$—Load team total frame into printer frame control.
$t_4$—Add bowler's score to team total if frames are equal.
$t_5$—Add one to printer frame if grand team total.
$t_6$—Start print cycle if bowler 5*, or if bowler is in state eleven, providing frames are equal. Write into team total memory.
$t_7$—Set partial team total reset memory if bowler 5 and frames are equal.*

*The command is issued on the trailing edge of the pulse signal.

The output from the NOR gate 577 on which the $t_0$ signal is issued is connected through an inverter 578 as an input to the AND gate 565. Thus, it will be apparent that when the sequence counter has completed a count and returned to a binary 000 condition, the NOR gate 577 on which the $t_0$ is issued will cause the AND gate 565, provided that it is enabled by the output of the NOR gate 566, to reset the flip-flop 562. Additionally, the inverter 578 is also connected to the inputs of the OR gates 567 associated with the flip-flops $RCB_1$—RCD of the ripple counter. Thus, it will be apparent that the flip-flops comprising the ripple counter will be similarly reset upon the completion of a count by the sequence counter.

When the flip-flop 562 is reset by a $t_0$ signal in the manner just described, an output from its set section is utilized to issue a CYCLE COMPLETE signal. This output is also utilized as an input to a delay multivibrator 579. The delay multivibrator has outputs from both of its sections to the set and reset sections of a cycle complete flip-flop 580. When the delay multivibrator 579 is tripped, the cycle complete flip-flop 580 will be momentarily set. An output from the set section of the cycle complete flip-flop 580 is used to provide a cycle complete signal which is delayed a length of time dependent upon the RC characteristics of the delay multivibrator 579. As will appear, such a CYCLE COMPLETE (DELAYED) signal is utilized in the scanning cycle control. The output of the reset section of the flip-flop 562 is also utilized to issue a CYCLE COMPLETE signal of a level opposite that issued by the set section of the flip-flop 562.

3. Computer Cycle Gating

Figure 20:
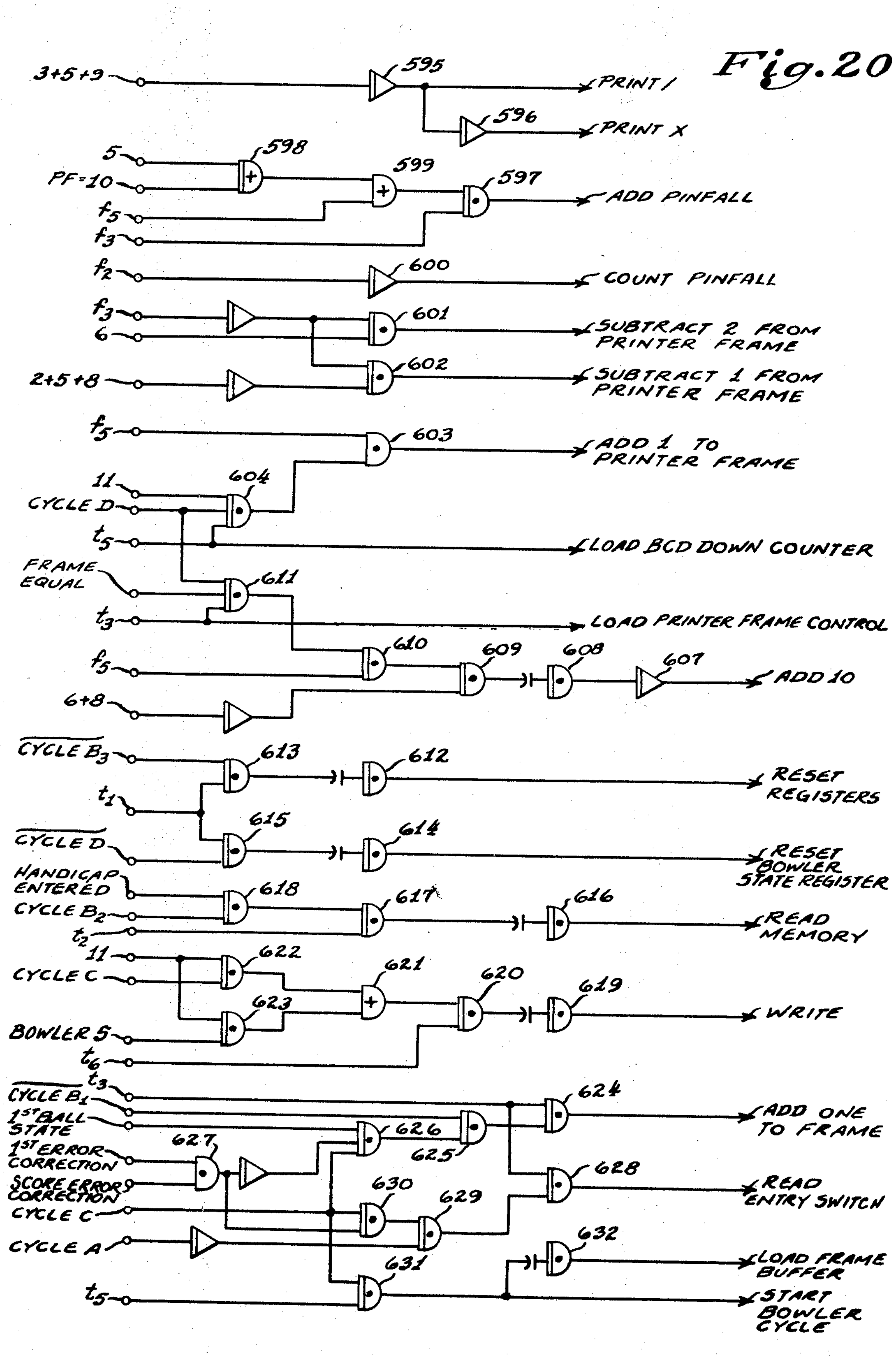
FIGS. 20, 21 and 22 are logic diagrams of various portions of a computer cycle control gating for interpreting computer cycle and sequence information and providing various central control functions.
Figure 21:
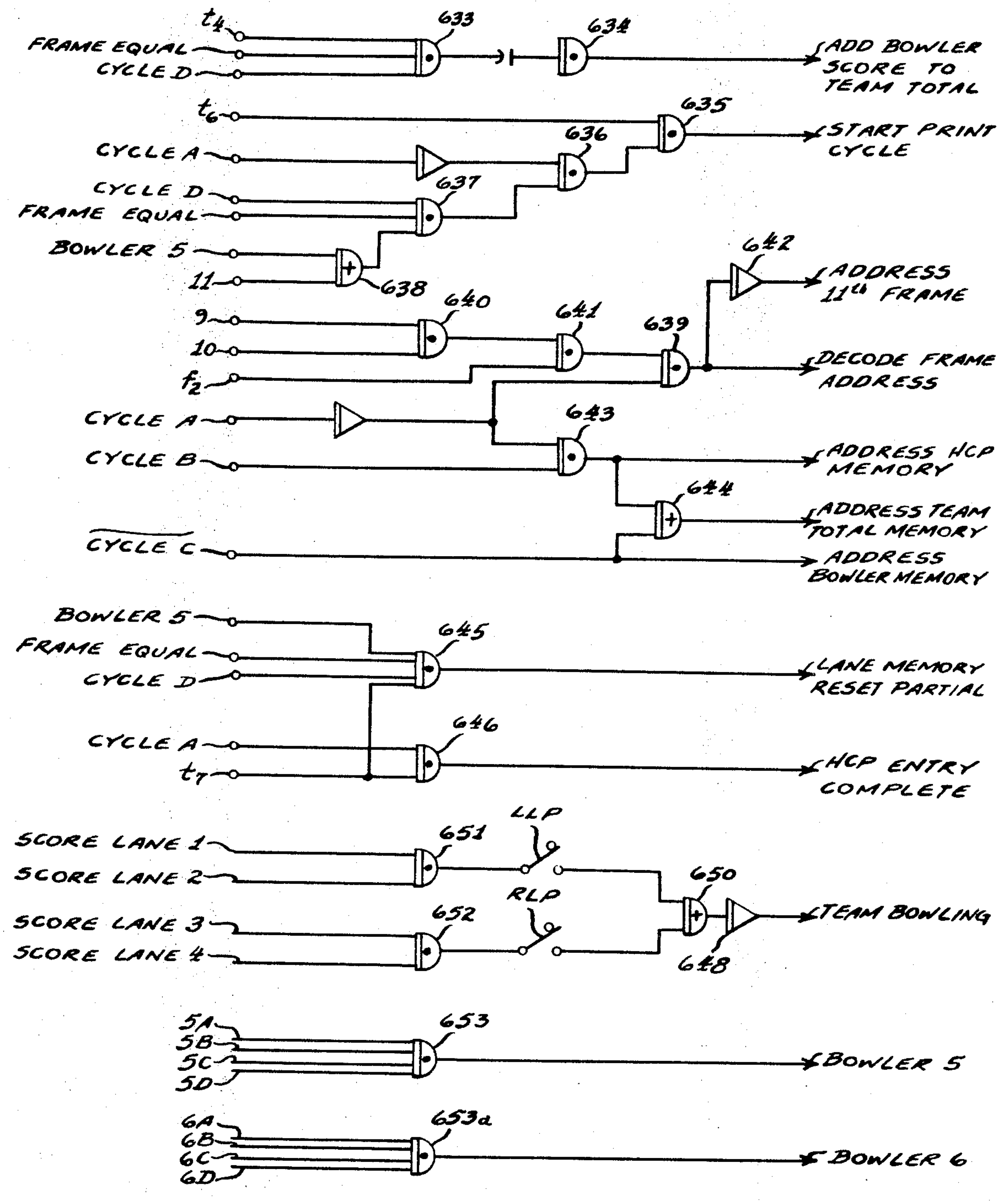
Figure 22:
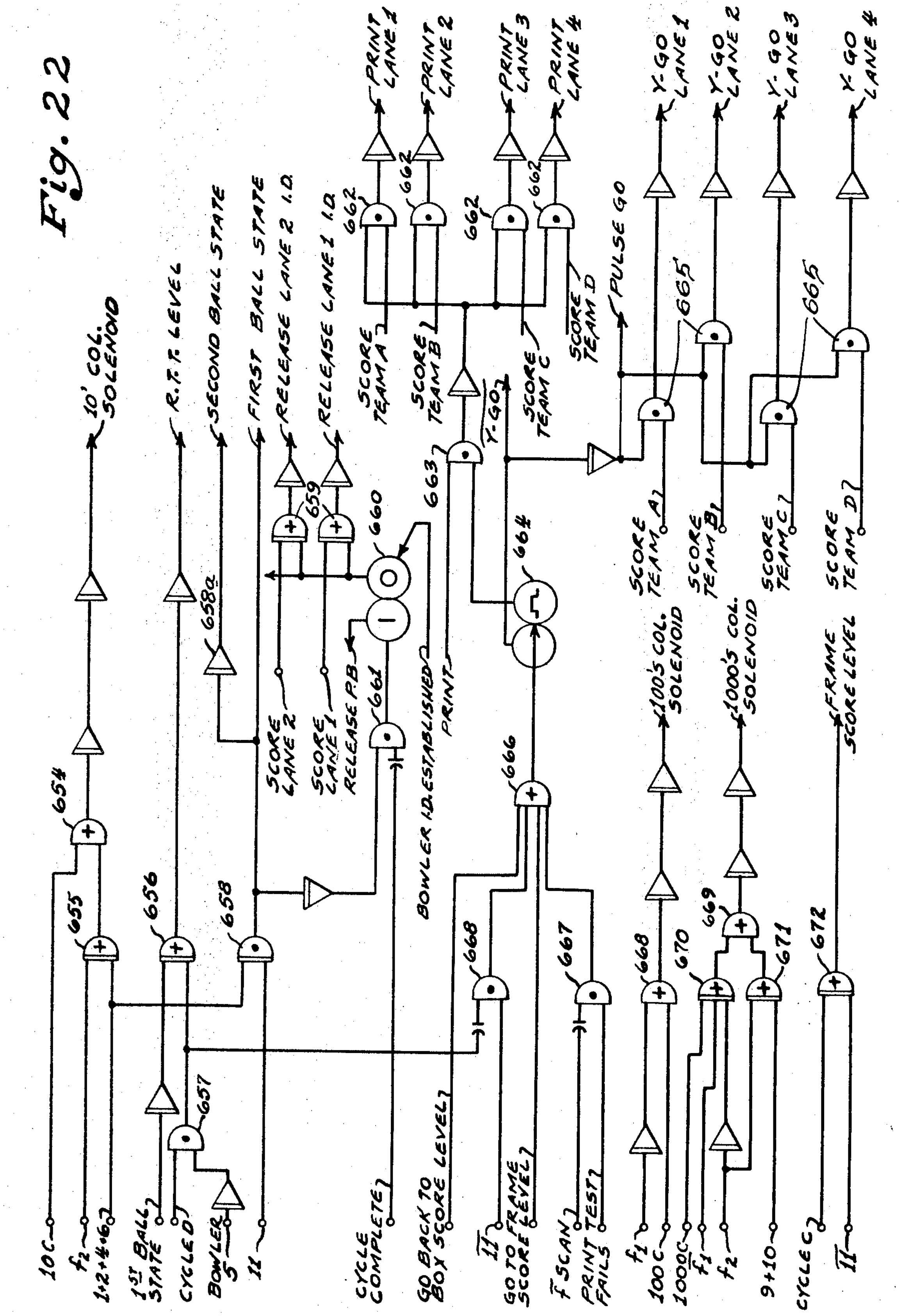

The computer cycle control gating comprises a plurality of gates shown in FIGS. 20, 21 and 22, many of which are independent of others. The various gates receive information relative to bowler's states, pinfall, bowler's scoring sequence functions, computer cycles, computer sequences, signals relative to the lane to be scored, and signals relative to handicap entry and team totaling. Upon receipt of certain ones of such signals, the computer cycle control gating issues signals to the various computer subsystems directing them to perform certain designated functions.

In order to provide a PRINT / or a PRINT X signal to the printer character selection matrix, a pair of inverters 595 and 596 are provided (FIG. 20). The inverter 595 may receive a STATE THREE + FIVE + NINE signal from the OR matrix of the bowler state control. It will of course be recognized from the state definitions, that states three, five and nine are all second ball states. Thus, whenever the signal from the OR matrix corresponding to the existence of one of these states is issued to the inverter 595, the latter will issue a PRINT /signal to the printer character selection matrix such that the latter will cause a spare symbol to be printed if the pinfall achieved is equal to ten. The inverter 596 has its input connected to the output of the inverter 595 and whenever the inverter 595 is not issuing a PRINT /signal, the inverter 596 will issue a PRINT X signal to the printer character selection matrix. The latter will then cause the printing of a strike symbol provided, of course, that the pinfall is equal to 10. It will be apparent to those skilled in the art that whenever a second ball state does not exist, either a first ball state or a 10th frame state wherein a strike should be printed if the pinfall is equal to 10 exists. It is for this reason that the inverter 596 is arranged to sense the absence of a PRINT / signal from the inverter 595 which only senses second ball states.

To cause updating of a bowler's score, an ADD PINFALL signal must be issued to the pinfall register control. As will be apparent from an inspection of the functions of the bowler score cycle control, pinfall should be added any time that an $f_3$ function exists. Accordingly, a NAND gate 597 is arranged to receive an $f_3$ signal and to issue an ADD PINFALL signal whenever the signal is present. It will also be observed that pinfall should be added during the function $f_5$ if the bowler's state is state 5 or if his pinfall equals 10. In the latter situation, such an addition to a bowler's score could be achieved by an ADD 10 signal, a simpler gating arrangement is achieved by merely adding the pinfall which, of course, in such a situation will be equal to 10. The gating used comprises a NOR gate 598 AND an OR gate 599. The NOR gate 598 is arranged to receive STATE FIVE and PF=10 signals and to be disabled by either signal. The OR gate 595 receives the output signal of the NOR gate 598 together with an $f_5$ signal from the bowler's score cycle control. Both of the inputs to the OR gate 595 are such as to cause it to be disabled and lack an output. More simply, the OR gate 599 functions as an AND gate due to the levels of its input signals. The output of the OR gate 599 is connected as an input to the NAND gate 597 in such a manner that whenever the NOR gate 599 does not have an output during an $f_5$ situation, as when the pinfall is equal to 10 or the bowler's state is state 5, the NAND gate 597 will issue an ADD PINFALL signal.

In order to issue a COUNT PINFALL signal to the pinfall register control, an inverter 600 is provided. The inverter 600 receives an $f_2$ signal from the bowler's score cycle control and whenever that signal is present, it will issue a COUNT PINFALL signal.

The computer cycle control gating also issues signals to control the frame in which the printer is to print. Such signals are issued to the printer frame control in the form of SUBTRACT TWO FROM PRINTER FRAME, SUBTRACT ONE FROM PRINTER FRAME and ADD ONE TO PRINTER FRAME signals. In order to issue a SUBTRACT TWO FROM PRINTER FRAME signal, an inverted $f_3$ signal is utilized as an input by a NAND gate 601. The NAND gate 601 has a second input for receiving a STATE SIX signal. Whenever both such signals are present, the NAND gate 601 will issue the SUBTRACT TWO FROM PRINTER FRAME signal. As will be apparent, the only time it is necessary to print back two frames from the current frame is when the bowler has bowled two strikes in a row and the last strike was not achieved in the 10th frame. This situation corresponds to state six and, accordingly, it will be apparent how the inputs to the NAND gate 601 cause the proper result.

The SUBTRACT ONE FROM PRINTER FRAME signal is issued by a NAND gate 602. The NAND gate 602 receives an inverted $f_3$ signal together with an inverted STATE TWO+FIVE+EIGHT signal from the OR matrix of the bowler's state control. When both such signals are present, the SUBTRACT ONE FROM PRINTER FRAME signal will be issued. It will be apparent that printing in a frame back one from that in which the bowler is presently bowling should occur only after the first ball following a spare or the second ball following a strike or after successive strikes in the ninth and 10th frames. The situations just named correspond to states two, five and eight respectively from which relation, it will be apparent how the NAND gate 602 selects the proper frame.

The ADD ONE TO PRINTER FRAME signal is derived from the output of an AND gate 603 which, due to the level of its input signals, functions as an OR gate. The AND gate 603 has a first input for receiving an $f_5$ signal from the bowler's score cycle control which, when the signal is present, will cause the AND gate 603 to issue the ADD ONE TO PRINTER FRAME signal. A second input to the AND gate 603 is derived from the output of a NAND gate 604. The NAND gate 604 causes the AND gate 603 to issue the ADD ONE TO PRINTER FRAME signal when it is necessary to print the team total in the eleventh frame column. Obviously such printing requires that the bowler's game be over and accordingly, the NAND gate 604 is provided with a first input on which a STATE 11 signal may be received. Similarly, such printing should not be done unless it is a team totaling function and accordingly, the NAND gate 604 is provided with a second input on which a CYCLE D signal, the team totaling cycle, is received. Since in the team totaling cycle (cycle D), the sequence $t_3$ requires the loading of the team total frame into the printer frame control and the trailing edge of the pulse representing sequence $t_6$ initiates the print cycle, the adding of one to the printer frame must take place after the sequence $t_3$ and before the sequence $t_6$. Accordingly, the NAND gate 604 is provided with a third input on which a $t_5$ signal may be received from the sequence counter of the bowler's cycle control. When the STATE ELEVEN, CYCLE D and $t_5$ signals are present as inputs to the NAND gate 604, the latter will cause the AND gate 603 to issue the required ADD ONE TO PRINTER FRAME signal.

A LOAD BCD DOWN COUNTER signal is required during each bowler cycle such that the bowler's score may be added to the team total. This signal is, in fact, identical to a $t_5$ signal. However, as will be seen, it is the trailing edge of the $t_5$ signal that actually causes the loading of the down counter.

The issuance of a LOAD PRINTER FRAME CONTROL signal does not require the presence of any gates. Rather, this signal appears whenever a $t_3$ signal is issued by the sequence counter and accordingly, the input to the printer frame control on which the LOAD PRINTER FRAME CONTROL signal is received may be connected directly to the output of the NOR gate 577 (FIG. 19) which issues the $t_3$ signal.

Figure 13:
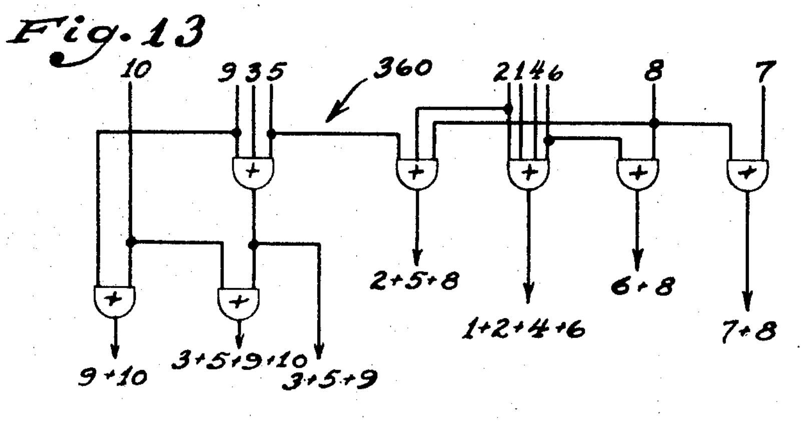
FIG. 13 is a logic diagram of an OR matrix.

As noted previously, whenever a bowler achieves a spare or a strike, 10 points are immediately added to his cumulative score before it is written back into the bowler memory. In some such instances as has also been noted previously, such immediate entry of 10 points may be achieved by a simpler gating structure merely by adding the pinfall which, in such a case, will be equal to 10. In other instances, the simplest gating requires that a single pulse representative of a pinfall of ten be placed directly upon the input to the flip-flop BCD10 (FIG. **9*b*) of the arithmetic register. The latter method of adding 10 to a bowler's cumulative score is achieved by an ADD TEN signal which is fed to both the arithmetic register and the bowler score cycle control from the output of an inverter 607 receiving an input from a pulse forming NAND gate 608. The inverter 607 is arranged to issue the ADD TEN signal whenever the NAND gate 608 is enabled due to the disabling of a NAND gate 609. The NAND gate 609 has a first input on which an inverted STATE SIX + EIGHT signal may be received from the OR matrix (FIG. 13). A second input to the NAND gate 609 is received from a NAND gate 610. The arrangement is such that when the NAND gate 610 is enabled and the inverted STATE SIX + EIGHT signal is present, the NAND gate 609 will be disabled to ultimately cause the ADD TEN signal to be issued. During a bowler score cycle, the NAND gate 610 may be enabled by an $f_5$ signal from the bowler's score cycle control. Thus it will be apparent that whenever a second score updating of the bowler's score is required and the bowler is in either state six or state eight, the ADD TEN signal will be issued such that 20 points, 10 by counting pinfall and 10 by pulsing the flip-flop BCD10 (FIG. 9**) will be added to the bowler's score.

It is also desirable in certain instances to add ten to the team total score but not to the bowler's cumulative score. Such an instance occurs when a bowler has bowled two strikes in a row. By the normal rules of scoring, it will be apparent that the bowler will receive a minimum pinfall of 30, 20 in the frame in which the first strike was achieved and ten in the frame in which the second strike was achieved. However, it will also be apparent that the last value of 10 pins cannot be added to the bowler's cumulative score until the succeeding ball is rolled. If such a value were to be added to the bowler's score, when the cumulative score was printed out in the frame in which the first strike was achieved, such a cumulative score would be erroneous with respect to that frame by the value of 10. Nonetheless, the bowler has achieved the 10 pins in question and this fact should be reflected in the team total for the frame in which the second strike was achieved. In order to cause the addition of such a value to the team total, a NAND gate 611 is provided having inputs on which CYCLE D, FRAME EQUAL and $t_3$ signals may be received. The output of the NAND gate 611 is connected as an input to the NAND gate 610, which arrangement causes the ADD TEN signal to be issued whenever a team total cycle is in progress the bowler's frame is equal to the team frame, the bowler's state is either six or eight and it is a $t_3$ sequence within the team totaling cycle.

It will be apparent that due to the number of bowlers that may be scored by the computer, it is necessary to reset the various registers periodically. This is accomplished by a RESET REGISTERS signal which is issued from the output of a pulse forming NAND gate 612 which receives an input from the output of a NAND gate 613. Whenever the NAND gate 613 receives a $\overline{\text{CYCLE B}_3}$ signal together with a $t_1$ signal, it will be disabled to enable the NAND gate 612 to issue the RESET REGISTERS signal. During cycle $B_3$ the registers are not reset as the handicap value in the BCD up counter would be destroyed precluding its addition to team scores in subsequent frames as will appear.

A similar signal for resetting the bowler state register may be emitted from a NAND gate 614. The signal is designated as RESET BOWLER STATE REGISTER and is obtained by the enabling of the NAND gate 614 due to the disabling of a NAND gate 615 when the latter receives $t_1$ and $\overline{\text{CYCLE D}}$ signals. The bowler state register is not reset during Cycle D as it is necessary to know the bowler's state to perform various functions associated with cycle D.

A pulse forming NAND gate 616 is enabled when a NAND gate 617 is disabled to cause the issuing of a READ MEMORY signal. The NAND gate 617 is arranged to be disabled whenever it receives a $t_2$ signal and when a NAND gate 618 is enabled. The NAND gate 618 is arranged to be disabled when a HANDICAP ENTERED signal is not present during cycle $B_2$. Thus it will be apparent that unless a HANDICAP ENTERED signal is present during cycle $B_2$, the occurrence of a $t_2$ signal will not cause the issuance of a READ MEMORY signal during cycle $B_2$. During other cycles, the READ MEMORY signal will be issued during sequence $t_2$.

The WRITE signal is issued by a pulse forming NAND gate 619 in response due to the disabling of a NAND gate 620. The NAND gate 620 includes a first input for receiving a $t_6$ signal and a second input from an OR gate 621. The arrangement is such that the NAND gate 620 will be disabled whenever the OR gate 621 does not have an input signal and when a $t_6$ signal is issued. The NOR gate 621 has a first input from the output of a NAND gate 622 which is adapted to be disabled by the presence of a STATE ELEVEN signal and a CYCLE C signal. A second input to the OR gate 621 is received from a NAND gate 623 which is arranged to receive a BOWLER FIVE signal and a STATE ELEVEN signal. When either of the NAND gates 622 and 623 are disabled by the presence of the respective input signals, their respective outputs will be passed by the OR gate 621 to enable the NAND gate 620 thereby precluding the issuance of a WRITE signal. The gates 621—623 are provided for the purpose of precluding the writing of bowler scores back into the bowler memory when the game is over as indicated by a state 11 condition and for precluding the writing of the grand team total into the team total memory when bowler five's state is eleven.

It will be recalled that it is periodically necessary to issue an ADD ONE TO FRAME signal to the frame counter to update the bowler frame information. This signal is issued by the disabling of a NAND gate in response to a $t_3$ signal and the output from a NAND gate 625 when the latter is enabled. The NAND gate 625 has a pair of inputs, the first of which is receptive of a $\overline{\text{CYCLE B}_1}$ signal. The second input to the NAND gate 625 is received from the output of a NAND gate 626 which is disabled whenever a FIRST BALL STATE signal is present, a CYCLE C signal is present, and the first error correction flip-flop 760 (FIG. 23*c*) is not set. In the latter respect, the NAND gate 626 receives the inverted output of an AND gate 627 which may receive FIRST ERROR CORRECTION and SCORE ERROR CORRECTION signals on its inputs. Whenever one of these signals is not present, the inverted output thereof together with a FIRST BALL STATE signal and the CYCLE C signal disable the NAND gate 626. When such is the case, and a $\overline{\text{CYCLE B}_1}$ signal is present, the NAND gate 625 will be enabled to thereby cause the NAND gate 624 to issue the ADD ONE TO FRAME signal, providing that sequence $t_3$ is occurring.

The output of the AND gate 627 is also utilized in conjunction with the issuing of the READ ENTRY SWITCH signal. This signal is generated by the output of a NAND gate 628 when the latter is disabled during a $t_3$ sequence by the presence of that signal and the enabling of a NAND gate 629. The NAND gate 629 is normally enabled but will be disabled when it is not an error correction procedure or cycle A is not taking place. In order to achieve the foregoing function, the NAND gate 629 has a first input which is receptive of an inverted CYCLE A signal. A second input to the NAND gate 629 is derived from a NAND gate 620 which receives the output of the AND gate 627 together with a CYCLE C signal and is arranged such that it will be enabled when it is not an error correction procedure during the occurrence of cycle C. When such is the case and the NAND gate 630 is enabled, the NAND gate 629 will be disabled to thereby preclude the issuing of the READ ENTRY SWITCH signal. Similarly, when the inverted CYCLE A signal is not present at the NAND gate 629, the latter will be disabled to preclude the issuance of the signal. Thus it will be apparent that the entry switches will be read only when a handicap entry cycle (cycle A) is occurring or an error correction procedure is taking place and the first error correction flip-flop 760 (FIG. 23C) is set.

In order for the bowler score cycle control to properly score the bowler, it is necessary that the latter receive a START BOWLER CYCLE signal. Such a signal is derived from the output of a NAND gate 631 by the disabling thereof due to the presence of CYCLE C and $t_5$ signals at its inputs. Upon the issuance of the START BOWLER CYCLE signal, the flip-flop BSCC1 in the bowler score cycle control will be set to thereby permit the functions $f_1$—$f_6$ to be performed, if necessary. Additionally the setting of the flip-flop BSCC1 will stop the issuance of the $\overline{\text{BOWLER CYCLE}}$ signal from the inverter 451 and NOR gate 450 thereby disabling the NOR gate 553 of the computer cycle control. Such disabling precludes the NOR gate 564 of the computer cycle control from permitting further clock impulses to the flip-flop SC1 of the sequence counter to stop the latter in a $t_5$ condition. This condition will be maintained until the bowler's scoring cycle is completed by the resetting of the flip-flops BSCC1—BSCC4 of the bowler's score cycle control, whereby the $\overline{\text{BOWLER CYCLE}}$ signal will again be applied to the NOR gate 563, which action will permit further counting by the sequence counter.

In order to prepare for a team totaling sequence as will appear, the output of the NAND gate 631 is fed through a pulse forming NAND gate 632 to issue a LOAD FRAME BUFFER signal. The purpose of this signal will appear more fully hereinafter.

Referring now to FIG. 21, during a team totaling sequence (cycle D) it is necessary to provide an ADD BOWLER SCORE TO TEAM TOTAL signal for the purpose of initiating such addition. As has been stated previously, the bowler's score should not be added to the team total unless the bowler—s frame is the same as the team total frame. Furthermore, the signal should be issued only during sequence $t_4$ of cycle D. Accordingly, the NAND gate 633 is arranged to be disabled when FRAME EQUAL, CYCLE D and $t_4$ signals are present. The disabling of the NAND gate 633 enables a pulse forming NAND gate 634 which issues the ADD BOWLER SCORE TO TEAM TOTAL signal.

The initiation of a print cycle during a bowler score cycle is caused by the bowler score cycle control. However, printing may be required during cycles A and D in which the bowler score cycle control is not active. Accordingly, means are provided for issuing a START PRINT CYCLE signal to the printer cycle control during cycles A and D. The signal is used when a NAND gate 635 is reenabled. The NAND gate 635 may be reenabled by the trailing edge of a $t_6$ input thereto together with a signal from a NAND gate 636 when the latter is enabled. The NAND gate 636 may be enabled either by the presence of an inverted CYCLE A signal as an input thereto or by the output of a NAND gate 637 when the latter is disabled. The NAND gate 637 has first and second inputs which receive CYCLE D and FRAME EQUAL signals, respectively, and a third input which is connected to the output of a NOR gate 638 which may receive BOWLER FIVE or STATE ELEVEN INPUT signals. Thus it will be apparent that a START PRINT CYCLE signal will be issued whenever the sequence $t_6$ occurs and either a CYCLE A signal is present or a CYCLE D signal is present together with a FRAME EQUAL signal and either a BOWLER FIVE signal or a STATE ELEVEN signal.

It will be recalled that the frame decoding matrix will not decode the condition of the printer frame control unless the former is commanded to do such by a DECODE FRAME ADDRESS signal. Such a signal is normally generated by a NAND gate 639. However, during the handicap entry procedure (cycle A) it is always necessary to address the 11th frame. Similarly, when the bowler is in state nine or ten and a box score is to be printed, such printing must be done in the 11th frame. Accordingly, the NAND gate 639 is arranged to preclude the issuance of a DECODE FRAME ADDRESS signal if cycle A is occurring in response to an inverted CYCLE A signal. Similarly, the NAND gate 639 will not issue the DECODE FRAME ADDRESS signal if a pair of NAND gates 640 and 641 determine that either states nine or 10 exist and the box score function ($f_2$) is being generated.

It will also be apparent that the 11th frame should be addressed whenever another frame column is not to be selected. Accordingly, an inverter 642 is arranged to detect the absence of a DECODE FRAME ADDRESS signal and, when such is the case, issue an ADDRESS ELEVENTH FRAME signal which is directed to the frame selection solenoid for the 11th frame.

As stated previously, the handicap memory should be addressed during either cycle A or cycle $B_2$. Accordingly, a NAND gate 643 is arranged to detect when either an inverted CYCLE A signal or a CYCLE $B_2$ signal is present and issue an ADDRESS HANDICAP MEMORY signal.

Similarly, the bowler memory should be addressed only during cycle C and accordingly, the output of the flip-flop RCC of the ripple counter on which a $\overline{\text{CYCLE C}}$ signal is issued is also utilized to issue the ADDRESS BOWLER MEMORY signal. The $\overline{\text{CYCLE C}}$ output is utilized in this respect rather than the CYCLE C output so that the ADDRESS BOWLER MEMORY signal is of the proper level.

The team total memory should be addressed only during cycles $B_1$, $B_3$ and D. In order to generate the appropriate signal, a NOR gate 644 is used. Whenever the NOR gate 644 is enabled, its output will issue an ADDRESS TEAM TOTAL MEMORY signal. The NOR gate 644 includes a first input from the output of the NAND gate 643 and a second input for receiving a $\overline{\text{CYCLE C}}$ signal. Accordingly, whenever the NAND gate 643 has not determined that either cycle A or cycle $B_2$ is occurring or when cycle C is not occurring, the NOR gate 644 will be enabled to issue the ADDRESS TEAM TOTAL MEMORY signal.

As will appear hereinafter in conjunction with the team totaling operation, it is necessary to periodically issue a LANE MEMORY RESET PARTIAL signal. Such a signal is generated when a NAND gate 645 is disabled in response to BOWLER FIVE, FRAME EQUAL, CYCLE D and $t_7$ input signals.

It is also necessary to issue a HANDICAP ENTRY COMPLETE signal. Such a signal is issued by a NAND gate 646 when it is disabled by the presence of a CYCLE A signal and a $t_7$ signal at its inputs.

As will be recalled, when the computer is being used to compute the scores during open bowling, cycles A, B and D need not be performed. That is to say, the performance of these cycles require a signal indicative of the fact that team bowling is to occur. Accordingly, a TEAM BOWLING signal is issued by an inverter 648 in response to the disabling of a NOR gate 650. The NOR gate 650 has a pair of inputs, the first of which is connected to a switch LLP which may be operated by a bowling lane proprietor to condition the left lane pair of the four lanes scored by the computer to either open or league bowling. When the switch LLP is opened, the left lane pair is conditioned for open bowling while when the switch is closed, it is conditioned for league bowling. A similar switch RLP is arranged to condition the right lane pair for either open or league bowling and is connected as a second input to the NOR gate 650. When both of the switches LLP and RLP are opened, the NOR gate 650 will be enabled and a TEAM BOWLING signal will not be issued. If either the switch LLP or the switch RLP is closed, an input may be supplied to the NOR gate 650 be either a NOR gate 651 or a NOR gate 652 respectively. The NOR gates 651 and 652 are arranged to be enabled whenever they receive SCORE LANE ONE or SCORE LANE TWO; or SCORE LANE THREE or SCORE LANE FOUR signals respectively. Accordingly, when either of the NAND gates 651 or 652 are enabled by an appropriate input and the respective switch LLP or RLP connecting them with the NOR gates 650 is closed, the NOR gate 650 will be disabled to cause the inverter 648 to issue the TEAM BOWLING signal. If it is desired to condition the left lane pair for open bowling, and the right lane pair for league bowling, the switch LLP will be opened while the switch RLP will be closed. Accordingly, if either SCORE LANE ONE or a SCORE LANE TWO signal is present, the resulting output of the NAND gate 651 will not be applied to the NOR gate 650 to disable the latter to ultimately cause the issuing of the TEAM BOWLING signal. As a result, the computer is scoring the bowler on either lane on or lane two from which the SCORE LANE ONE or SCORE LANE TWO signal is issued, will not cause cycles A, B or D to occur. However, if a SCORE LANE THREE or a SCORE LANE FOUR signal is issued, the NAND gate 652 will disable the NOR gate 650 to thereby cause the TEAM BOWLING signal to be issued such that the bowlers on lanes three and four will be scored for league bowling. From the foregoing it will be apparent how the computer may be conditioned for open bowling on all lanes, league bowling on all lanes, or open bowling on one lane pair and league bowling on the other lane pair.

A NAND gate 653 is arranged to issue a BOWLER FIVE signal. The NAND gate 653 includes four inputs from the bowler identification system for the reception of signals indicating that the fifth bowler on teams, A, B, C or D is bowling. Thus, whenever the bowler identification system for a lane is energized by the scanning cycle control and when the fifth bowler on the team is bowling, the NAND gate 653 will issue the BOWLER FIVE signal. A similar NAND gate 653*a* is utilized to issue a BOWLER SIX signal.

The computer cycle control additionally includes gating for controlling printer column and level location as seen in FIG. 22. An OR gate 654 is adapted to address the tens column solenoid SOS-10 (FIG. 5) in all printers upon the receipt of a 10C signal from the printer cycle control or when a NOR gate 655 detects that bowler's scoring function $f_2$ is occurring and the bowler's state is one or two or four or six. Thus, the OR gate 654 will cause printing in the tens column in a selected printer when the printer cycle control determines that the digit to be printed is the tens digit or when a box score is to be printed for the first ball in a frame.

The NOR gate 656 is adapted to issue a RTT LEVEL signal to deenergize the RTT contact in the printer to cause the latter to print at the running team total level in response to the presence of a FIRST BALL STATE input and the output from an AND gate 657 which will be true when it is cycle D and bowler five. Thus, whenever cycle D is occurring and the updated state of the fifth bowler on the team is a first ball state, the running team total level on the score sheet will be addressed.

The FIRST BALL STATE signal is generated by a NAND gate 658 in response to the presence of either a STATE ELEVEN signal from the bowler's state decoding matrix or a STATE ONE + TWO + FOUR + SIX signal from the OR matrix of the bowler's state control. In order to issue a SECOND BALL STATE signal, an inverter 658*a* is connected to the output of the NAND gate 658 and whenever the latter does not have an output corresponding to the existence of a first ball state, the inverter 658*a* will issue the SECOND BALL STATE signal.

As will be seen, means are provided for locking a bowler identification switch in the closed position during the period between the rolling of a first ball in a frame and the completion of computation after the second ball in the frame. RELEASE LANE ID signals are generated for each of the four lanes by a NOR gate 659, there being one such NOR gate for each of the four lanes. Each NOR gate is provided with an enabling input on which SCORE LANE ONE-SCORE LANE FOUR signals may be received, respectively. The second input to the NOR gate 659 is taken from a flip-flop 660 which is set by an AND gate 661 when the updated bowler's state is a first ball state and upon receipt of a CYCLE COMPLETE signal from the computer cycle control. The flip-flop 660 is reset by the loss of a BOWLER I.D. ESTABLISHED signal when a pushbutton is released and when set issues a RELEASE P.B. signal to the scanning cycle control to inhibit resetting of the latter until the push button is released.

PRINT LANE ONE-PRINT LANE FOUR signals are generated by a respective one of our AND gates 662. Each of the AND gates has an enabling input on which SCORE TEAM A—SCORE TEAM B signals may be received respectively. The second input to the AND gate 662 is received from an AND gate 663 which will normally be enabled by the output of a delay multivibrator 664. The second input to the AND gate 663 is a PRINT signal from the printer cycle control. Accordingly, when a PRINT signal is generated during the presence of a SCORE TEAM A signal, the PRINT LANE ONE signal issued by the AND gate 662 to the printer cycle solenoid PCS (FIG. 5) and will cause the beginning of a print operation on lane one.

The delay multivibrator 664 is also used in generating appropriate signals for either anticipatory or corrective positioning of the printers on each of the four lanes. An inverted output from the delay multivibrator 664 is utilized as an input by each of the four AND gates 665 and issues a PULSE GO signal to the scanning cycle control while the noninverted output provides a $\overline{\text{Y-GO}}$ signal thereto. The AND gates 665 are respectively arranged to receive SCORE TEAM A—SCORE TEAM D signals. When an AND gate 665 is enabled by the output of the delay multivibrator 664 during the presence of a SCORE TEAM A—D signal, it will issue a Y-GO LANE ONE-FOUR signal depending upon the lane with which the AND gate 665 is associated. Such a signal is directed to the Y-GO solenoid YGO (FIG. 5) and is sufficient in length to cause the printer to move to the next line and stop in a correct position or move to another correct position in accordance with the signals present at commutator contacts ST-RTT. The delay multivibrator 664 is triggered to cause such repositioning of the printer along with simultaneous disabling of the AND gate 663 to preclude printing during repositioning by the output of an OR gate 666. The OR gate 666 may be enabled by a GO BACK TO BOX SCORE LEVEL signal from the printer cycle control or by a GO TO FRAME SCORE LEVEL signal from the printer cycle control. Additionally, the OR gate 666 may be enabled by the output of an AND gate 667. When the AND gate 667 is enabled, it essentially directs the printer to find another bowler. The AND gate 667 is enabled when it receives a $\bar{f}$ SCAN signal and a PRINT TEST FAILS signal. Finally, the OR gate 666 may be enabled by the output of an AND gate 668 which essentially directs the printer to go to the running team total level. The AND gate 668 is only enabled when it is a STATE $\overline{\text{ELEVEN}}$ situation together with the occurrence of cycle D and the presence of bowler five. In the latter respect, the AND gate 668 utilizes the output of the AND gate 657.

When it is necessary to print in the hundreds column an OR gate 668 will address the hundreds column solenoid SOS–100 the presence of an inverted $f_1$ signal (it will be recalled that the printing of split symbol is done during the function $f_1$) or the receipt of an 1000 signal from the printer cycle control indicating that the hundreds digit of a score should be printed.

The OR gate 669 is arranged to normally address the thousands column solenoid SOS–1000 (FIG. 5). However, it will be recalled that it is only necessary to print in the thousands column in the tenth or eleventh frames. The output of the NOR gate 670 normally provides the OR gate 669 with an enabling input. The NOR gate 670 has a first input for receiving a 1000C signal from the printer cycle control, which signal will be present whenever the counter of the printer cycle control is reset. A second input to the NOR gate 670 receives an inverted $f_1$ signal while a third input receives an inverted $f_2$ signal. Accordingly, whenever the 1000C signal is present together with the absence of an $f_1$ or $f_2$ signal, the NOR gate 670 will enable the OR gate 669. It will be appreciated that when the printing of a box score is required, the printing cycle control counter may be reset and the 1000C signal may be present as an input to the NOR gate 670. However, during such occasions (except during the 10th frame) it is not desirable to print in the thousands column and accordingly, the presence of an $f_1$ or an $f_2$ signal will preclude the NOR gate 670 from enabling the OR gate 669. A second NOR gate 671 is used to provide an enabling input for the OR gate 669 for the printing of box scores in the 11th frame column. When the NOR gate 671 receives an $f_2$ signal together with a STATE NINE + TEN signal, it will issue an enabling input to the OR gate 669 so as to cause the addressing of the thousands column solenoid. Thus, when it is necessary to print the box score for the third ball in the 10th frame, the thousands column solenoid SOS–1000 will be addressed.

As will be seen, when it is desired to print at the frame score level, an appropriate signal must be issued to the printer to deenergize the contacts 1F—6F (FIG. 5). Thus a NOR gate 672 is arranged to issue a FRAME SCORE LEVEL signal. The NOR gate 672 is arranged to issue such a signal during cycle C and when the bowler's state is not state 11.

A switch, not shown, which may be associated with an off-on switch in a power supply or the like, may be used to issue the STARTUP RESET signal when the computer is initially energized.

O. Scanning Cycle Control

Figure 23A:
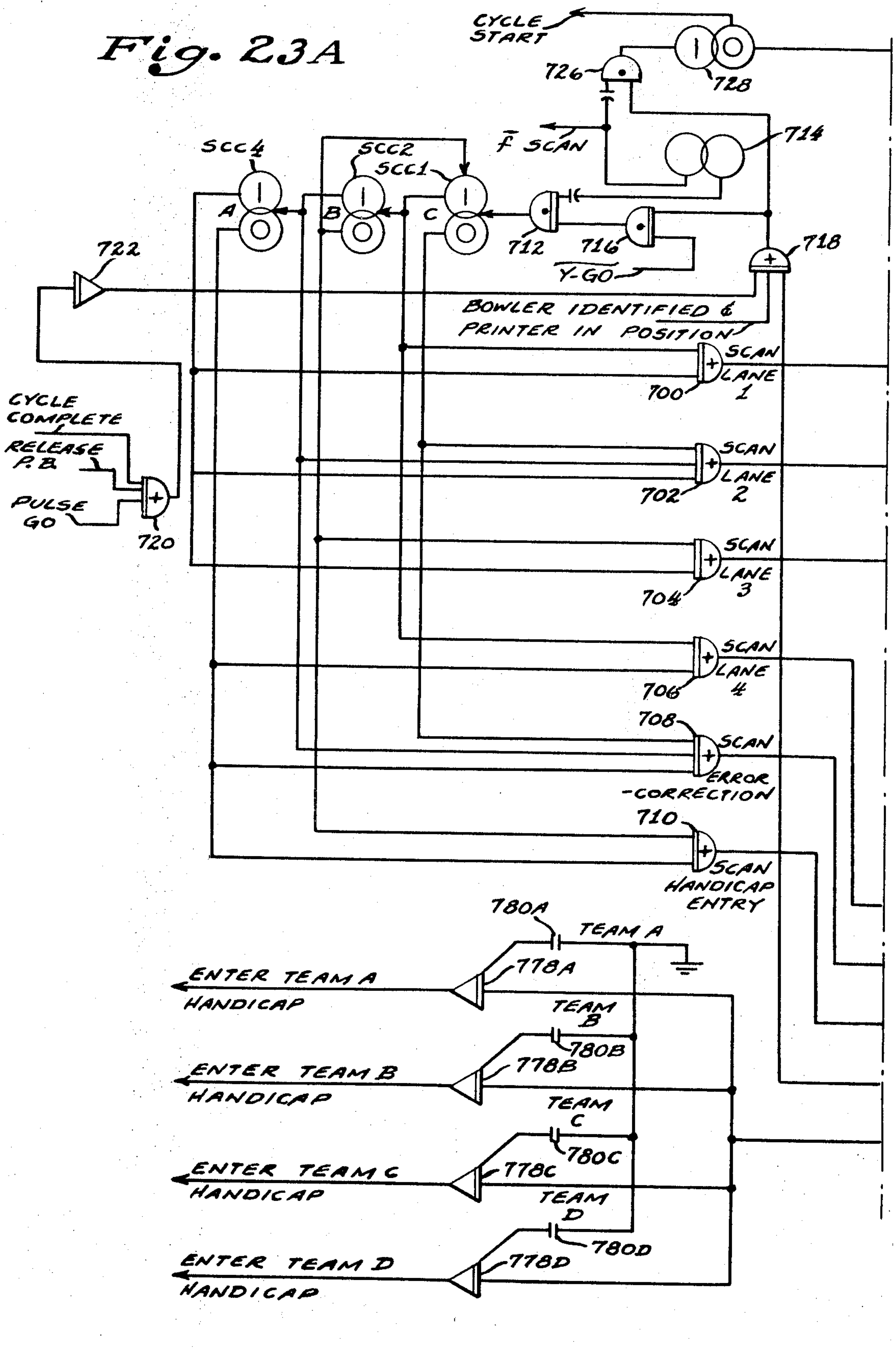

Since the invention contemplates reception of pinfall information from six possible sources, i.e. from each of four different lanes, the error correction system and the handicap entry system, and since only a single computation means is utilized to handle inputs from each of the six sources, it is necessary to provide means for scanning each of the six input sources individually and for precluding entry of pinfall information into the computation means from more than one source at a time. This function is achieved by the scanning cycle control shown in FIGS. 23A, 23B and 23C.

The scanning cycle control comprises a three bit feedback counter which counts on a scale of six and is formed of three flip-flops SCC1, SCC2 and SCC4. Each of the flip-flops SCC1—SCC4 are connected to form a counter. The flip-flop SCC2 has an output from its reset section connected to an input of the set section of the flip-flop SCC1 to provide the necessary feedback. The six possible combinations of conditions of the flip-flops SCC1—SCC4 are each used to issue a command to scan one of the six sources of input information. The counting sequence of the flip-flops SCC1—SCC4 and the decoding of the six possible combinations are as follows.

TABLE 14

| SCC4 | SCC2 | SCC1 | Command |
|---|---|---|---|
| 0 | 0 | 0 | Scan lane one. |
| 0 | 0 | 1 | Scan lane two. |
| 0 | 1 | 1 | Scan lane three. |
| 1 | 0 | 0 | Scan lane four. |
| 1 | 0 | 1 | Scan error correction. |
| 1 | 1 | 1 | Scan handicap entry. |

Various outputs from the set and reset sections of the flip-flops SCC1—SCC4 are utilized as inputs to NOR gates 700, 702, 704, 706, 708 and 710 which detect the conditions of the flip-flops SCC1—SCC4 and issue the signals SCAN LANE ONE-SCAN HANDICAP ENTRY, respectively.

The counter is stepped by a clock input through a NAND gate 712. As illustrated, the clock may take on the form of a free-running multivibrator 714. The NAND gate 712 may be disabled by the input from a NAND gate 716 having a first input on which a $\overline{\text{Y-GO}}$ signal is received from the computer cycle control gating. The second input to the NAND gate 716 is from the output of a NOR gate 718 having three inputs. A first input to the NOR gate 718 is from a NOR gate 720 through an inverter 722. The NOR gate 720 is used as an OR gate and is arranged to respond to any one of a CYCLE COMPLETE, RELEASE P.B. and PULSE GO signals. Upon the detection of one of the three signals noted above, the NOR gate 720 through the inverter 722 causes the NOR gate 718 to issue a signal through the NAND gate 716 to enable the NAND gate 712 and permit the counter to resume the count such that scanning is again resumed.

A second input to the NOR gate 718 is adapted to receive BOWLER IDENTIFIED AND PRINTER IN POSITION signal and the presence of such a signal will ultimately cause the NAND gate 712 to be disabled such that the counter locks on the source of input information which it was scanning at the time such a signal was received by the NOR gate 718.

A third input to the NOR gate 718 is connected to the output of an AND gate 724 which is enabled when the condition of the counter causes the issuance of a SCAN HANDICAP ENTRY signal, the handicap entry memory is set and an ALLOW HANDICAP ENTRY signal is issued. The conditions during which such signals are present will be described in detail hereinafter. Presently, it is sufficient to note that when the AND gate 724 is enabled, the counter will be locked on the handicap entry system.

The output from the NOR gate 718 is additionally utilized as an input through an AND gate 726 to a cycle start flip-flop 728. The AND gate 726 has a second input from the free-running multivibrator 714 such that it is periodically enabled one-half of a clock period after the issuance of a clock pulse to the flip-flop SCC1 through the NAND gate 712.

From the foregoing, it will be apparent that when the scanner stops at a lane, the cycle start flip-flop 728 will be set through the AND gate 726. When the cycle start flip-flop 728 is set in this manner, it will issue a CYCLE START signal to initiate a scoring cycle. An input to the reset section of the cycle start flip-flop 728 permits it to be reset in response to a CYCLE COMPLETE signal.

A pinfall ready flip-flop 730 is provided for each of lanes one—four. Each flip-flop 730 includes an input to its set section from an AND gate 732 which is connected through a switch 734 to ground. The arrangement is such that when the switch 734 is closed, the pinfall ready flip-flop 730 will be set. Preferably, the switch 734 is associated with an automatic pinsetter and is closed thereby at a predetermined point in the pinsetter cycle. When the flip-flop 730 is set, an output from its set section is used to issue a PUSHBUTTON HOLD signal for the lane with which the flip-flop 730 is associated and which is used in a manner to be seen hereinafter. The output from the reset section of the flip-flop 730 issues a READ LANE ONE PINFALL signal to the lane one pinfall buffers and additionally is fed through an inverter 738 to issue a DISABLE PINSETTER TRIGGER signal which, in a manner to be shown hereinafter, will preclude the pinsetter for that lane from initiating a subsequent cycle until the flip-flop 730 is reset. Such a signal is necessary to preclude a subsequent cycle of the pinsetter from destroying pinfall information prior to its being utilized for the computation of a bowler's score.

Each lane is additionally provided with a second flip-flop 740 which serves as a foul memory for that lane. The foul memory flip-flop 740 includes a connection through a foul verification relay contact 742 to ground such that when the occurrence of a foul has been verified and the bowler has closed a switch to energize the relay to close the contact 742, the foul memory flip-flop 740 will be set. The foul memory flip-flop 740 has an output from its set section which serves as an input to the pinfall ready memory flip-flop 730 to cause the latter to be set whenever a foul is detected and verified. This connection is necessary as the occurrence of a foul will take place only when a ball has been rolled and requires the initiation of a scoring sequence even though no pinfall will be added to the bowler's score. A second output from the set section of the foul memory flip-flop 740 is utilized as an input to an AND gate 744 to cause the issuance of a FOUL signal in a manner to be described hereinafter.

Each of the flip-flops 730 and 740 have a common connection to their reset sections on which a STARTUP RESET signal may be issued to cause them to be reset. Additionally, each of the flip-flops 730 and 740 may be reset by the CYCLE COMPLETE (DELAYED) signal from the computer cycle control. This mode of resetting is as follows. A CYCLE COMPLETE (DELAYED) signal is placed as an input on a pulse forming AND gate 746. The output of the AND gate 746 is utilized as an input by AND gates 748. Each of the AND gates 748 includes connections through an electronic switch 750 to the reset sections of the flip-flops 730 and 740. A second input to the respective AND gates 748 is connected to the output of the NOR gate 700 in the case of lane one, the NOR gate 702 in the case of lane two, ... and the output of the NOR gate 710 in the case of the handicap entry system. The input from the respective NOR gates 700—710 serves as an enabling input for the AND gate 748. Thus, if the counter is stopped at a condition corresponding to a SCAN LANE ONE command and the NOR gate 700 has a corresponding output, it will be apparent that only the AND gate 748 associated with the lane one pinfall ready memory flip-flop 730 and the foul memory flip-flop 740 will be enabled when a CYCLE COMPLETE (DELAYED) signal is issued to reset the flip-flops 730 and 740 associated therewith. That is, in such a situation, the various flip-flops associated with lane two, lane three, lane four, the error correction system and the handicap entry system will not be reset as their AND gates 748 are not enabled by appropriate inputs from the NOR gates 702—710 respectively. Accordingly, when information is available for two or more sources, only the memory associated with the source which has had its information utilized by the computer will be reset leaving the memory associated with the source that has not had its information utilized in a set condition such that the scanner will stop at that source within the next scanning cycle.

A group of four flip-flops 752 are respectively associated with the flip-flop 730 for each of the four lanes. Each of the flip-flops 752 have reset inputs that are adapted to receive STARTUP RESET signals and second reset inputs connected to the outputs of the respective electronic switches 750 for the lanes with which they are associated. Thus, the flip-flops 752 will be reset in the same manner as their corresponding flip-flop 730. The flip-flops 752 include inputs to their set section through electronic switches 754 and AND gates 753. When the AND gate 753 for a given lane detects that the scanner is scanning that lane and the pinfall ready memory flip-flop 730 is set, it will normally issue a signal to set the flip-flop 752. However, under certain circumstances the AND gate 753 may be disabled. This occurs when the flip-flop 752 for the other lane in the lane pair is set. In order to provide this disabling function, an output from the reset section of the flip-flop 752 associated with lane two is utilized as an input to the AND gate 753 associated with lane one. A similar connection from the reset section of the flip-flop 752 associated with lane one is utilized as an input by the AND gate 752 associated with lane two. Similar cross connections are made between the flip-flops 752 and the AND gates 752 associated with lanes three and four. The purpose of this arrangement is to provide for the following situation. If the scanner stops as, for example, lane one and pinfall information is available, the flip-flop 752 associated with lane one is set. If the printer from lane one is not in position, the setting of the flip-flop 752 precludes the scanner from stopping at lane two until the printer for lane one is in position and the lane one pinfall information is scored. Simultaneously, a signal is issued by the computer cycle control gating to the printer go solenoid for the printer of lane one to cause the printer to move to proper position. In the meantime, the scanner will resume its search. This feature precludes the endless repositioning of a printer during league competition when two bowlers on the same team are bowling simultaneously on two lanes which could occur as a single printer is used in league bowling to print the scores of members of a single team regardless of which of the two lanes in a lane pair a team member is bowling.

The output from the electronic switches 754 is also utilized to issue a SCORE LANE ONE signal which is utilized as an enabling input by the NOR gate 206 associated with the lane one steering gates. The electronic switches associated with lanes two—four issue corresponding signals. Additionally, the electronic switch output is fed to a corresponding inverter 755 which issues an ENERGIZE LANE ONE IDENTIFICATION signal in the case of the inverter 755 associated with lane one. The inverters 755 associated with lanes two—four issue corresponding signals. Finally, the output from the electronic switch 754 is also utilized as an input to the AND gate 744 associated with the foul member flip-flop 740 to enable the AND gate 744. When the AND gate 744 is enabled by the presence of an output from the set section of the flip-flop 740 and an output from the electronic switch 754, it will issue a FOUL signal. The outputs of the AND gate 744 are applied as inputs to OR gates 757 which are utilized to issue a single FOUL signal which is utilized to cause the printing of the foul character as previously described.

The error correction portion of the scanning cycle control is comprised of a pair of flip-flops 756 and 758. Each of the flip-flops 756 and 758 is arranged to be reset by a STARTUP-RESET signal or to be reset through an AND gate 748 in a manner similar to that set forth above in connection with the description of the flip-flops 730 and 740. The flip-flop 758 includes an output from its set section on which a FIRST ERROR CORRECTION signal is issued. Additionally, the flip-flop 758 has an input to its set section to cause the flip-flop to be set through a pulse forming AND gate 760 which has an input connected to ground through normally open relay contacts 762 which is manually closed to start an error correction procedure. Accordingly, when the relay contacts 762 are closed, the flip-flops 758 will be set to issue the FIRST ERROR CORRECTION signal.

The flip-flop 756 is also connected to the relay contacts 762 to ground via an AND gate 764. The AND gate 764 includes a second input for receiving an ENTER EC PF signal when the corrected pinfall has been set up on the error correction switches. Thus, when the relay contacts 762 are closed and an ENTER EC PF signal is present, the AND gate 764 will issue a signal to the flip-flop 756 to cause the latter to be set such that corrected pinfall may be entered from the setting of the error correction switches. This function is accomplished by virtue of an output from the set section of the flip-flop 756 which serves as an input to a NAND gate 768. The NAND gate 768 has a second input connected to the output of the NOR gate 708 such that it is enabled only when the scanner is in a condition corresponding to the scanning of the error correction system. Accordingly, when the scanner is in such a condition and the flip-flop 766 is set, the NAND gate 768 issues a SCORE ERROR CORRECTION signal to enable the corrected score to be entered into the computer. The reset section of the flip-flop 756 includes an output through an inverter on which a DRIVE ERROR CORRECTION PINFALL SWITCH SOLENOID signal is issued for purposes as will appear.

The handicap entry portion of the scanning cycle control is comprised of a single flip-flop 770 having an input to its set section through normally open relay contacts 772 which have one side connected to ground. When closed, the contacts 772 initiate a handicap entry procedure by setting the flip-flop 770. The flip-flop 770 has a pair of reset inputs, the first of which is receptive of a STARTUP RESET signal while the second is connected to the output of an AND gate 748 for resetting the flip-flop 770 in a manner similar to the resetting of the flip-flops 730 and 740. The output of the set section of the flip-flop 770 is connected as an input to a NAND gate 774 which has a second input connected to the output of the NOR gate 710. As a result, the NAND gate 774 is enabled when the flip-flop 770 is set and when the NOR gate 710 detects a condition of the counter corresponding to the command SCAN HANDICAP ENTRY. The output of the NAND gate 774 is fed through an inverter 776 as an input to the AND gate 724. The AND gate 724 has a second input on which an ALLOW HANDICAP ENTRY signal is placed in a manner to be described hereinafter. Accordingly, when the scanner condition corresponds to binary 111, the handicap entry flip-flop 770 is set and when an ALLOW HANDICAP ENTRY signal is given, the AND gate 724 will issue an input to the NOR gate 718 to stop the counter in the manner described previously.

The output of the inverter 776 is also fed as an input to a group of four inverters 778, each of which corresponds to one of the four teams that may use the invention during league play. Each of the inverters 778 essentially consists of a transistor having its emitter connected to ground through normally open relay contacts 780. When it is desired to load the handicap buffers for a given team for the purposes that will be seen hereinafter, the contacts 780 corresponding to the desired team are closed to thereby enable the corresponding inverter 778. The resulting output of the inverter 778, thus enabled and if associated with team A, will then issue an ENTER TEAM A HANDICAP signal. The remaining inverters 778 similarly issue corresponding signals for the teams with which they are associated.

P. Memory and Related Gating

Since the invention contemplates the use of a single computation means for scoring a plurality of bowlers bowling simultaneously on a plurality of lanes, it is necessary to provide a memory for the information processed by the computation means such that it may be used in a subsequent scoring cycle for any given bowler. The necessity for such storage becomes obvious when it is considered that a given bowler may roll his first ball on one lane and prior to the rolling of the second ball in a frame by that bowler on that lane, a second bowler on a different lane rolls a ball which requires a scoring cycle.

In order to provide means for storing such information a computer memory consisting of a conventional core plane is arranged to provide 32 words, each consisting of 18 bits of information. The memory plane and a portion of its associated circuitry is shown diagrammatically in FIG. 24.

Twenty-four of the words are used to store the information relative to the bowling game of up to 24 bowlers. When the computer is operating in a league mode, the 24 words are used to store the information relative to four, five-man teams, each team having a pace bowler. In the open bowling mode, the 24 words are arranged to accommodate the information relative to six bowlers on each of the four lanes.

Each word in the bowler portion of the memory contains information relative to the state of the bowler's game, frame information relative to that bowler and information representing the bowler's cumulative score at a given point in the game. Specifically, four bits of each word are used to store frame information, four bits to store bowler's state information and ten bits to store score information. The information is organized as follows. Bits M1—M10, inclusive, store the score information. Bits M11—M14 store bowler state information. Bits M15—M18 store frame information.

Of the remaining eight words provided by the memory plane, four are used in league bowling for storing information pertinent to the team totals for each of the four teams that may be scored by the computer. Specifically, one such word is associated with each of the four lanes and will contain team total information for the team that is currently bowling on that lane. That is to say, the word associated with any given lane will, at various stages in a bowling game during league competition, contain team total information for either one of the two teams bowling on that lane. Each word contains information relative to the cumulative team total at a given point in a game and information relative to the lane frame or the frame in which the team is bowling. Specifically, bits M1—M13 are used to store team total cumulative score information while bits M15—M18 are used to store team or lane frame information. Bit M-14 is not used.

The remaining four words are also used in league bowling to store the respective team handicaps. Since it is extremely unlikely that any member of a team will have a handicap in excess of 80, the handicap total for a team which may be utilized by the computer is restrained to a maximum of 399. Since information relative to pinfall (cumulative score and handicap) is used throughout the computer in binary coded decimal code, and the various bits in the memory that function to store score information are arranged on a binary coded decimal basis, it will be apparent that it is only necessary to use the bits M1—M10 for handicap purposes. The remaining bits, M11—M18, are not used.

Figure 24:
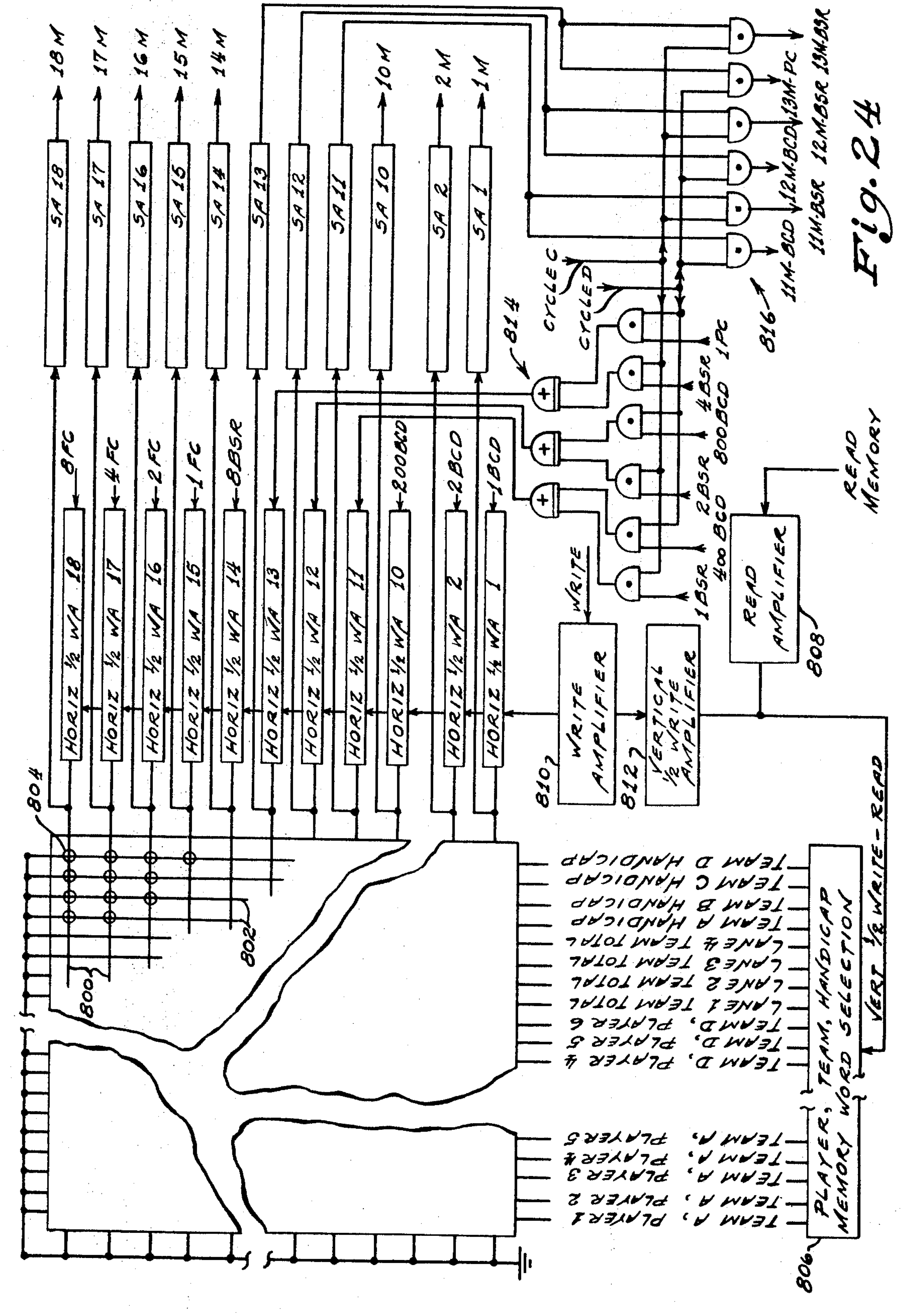
FIG. 24 is a logic diagram of the computer memory and associated gating.

As mentioned previously, the core memory and amplifiers shown in FIG. 24 are of conventional construction. However, for the sake of clarity, their operation and construction will be described briefly. Eighteen fine, insulated X wires 800, one corresponding to each of the bits M1—M18 are provided. Thirty-two fine, insulated Y wires 802, one for each of the 32 words, are arranged transversely to the wires 800 in close juxtaposition thereto. At each physical junction (as opposed to an electrical junction) of the wires 800 and 802, a conventional bistable memory core 804 is placed. Each of the wires 800 and 802 have one end connected to ground. The Y wires 802 have their other end connected to the player, team, handicap memory word selection logic, generally designated 806, while the X wires 800 have their other ends connected to a corresponding one of 18 horizontal one-half write amplifiers WA1—WA18. The same ends of the X wires 800 are similarly connected to a corresponding one of 18 sense amplifiers SA1—SA18. A read amplifier 808 receives a READ MEMORY signal from the computer cycle control and has its output connected to the memory word selection logic 806 in a manner that will be specifically described hereinafter.

There is also provided a write amplifier 810 which receives a WRITE signal from the computer cycle control and which is connected through a vertical one-half write amplifier 812 to the memory word selection logic 806. The write amplifier 810 is also arranged to cause the operation of the 18 horizontal one-half right amplifiers WA1—WA18.

Each of the horizontal one-half write amplifiers WA1—WA10 and WA14—WA18 includes an input from the corresponding bit in the BCD up counter, the bowler state register, or the frame counter. The horizontal one-half write amplifiers WA11—WA13 have inputs from a gating arrangement, generally designated 814 as opposed to direct connections to the bowler state register, BCD up counter or pinfall counter. This arrangement is necessary as during a bowler cycle (cycle C), the information to be written in memory bits M11—M13 is bowler state information and must come from the bowler state register. However, during the team totaling cycle (cycle D) such information pertains to scores and must come from the BCD up counter and, if necessary, from the pinfall counter. Accordingly, the gating arrangement 814 is arranged to provide the horizontal one-half write amplifiers WA11—WA13 with information from the bowler state register during cycle C and to provide the amplifiers WA11—WA13 with information from the BCD up counter and pinfall counter during cycle D.

The sense amplifier SA1—SA10 and SA14—SA18 have direct connections to the appropriate bits in the BCD up counter, the bowler state register and the frame counter through the corresponding memory entry blocking gates. In the case of the sense amplifiers SA11—SA13, a gating arrangement, generally designated 816 is used to direct the information sensed by the sense amplifiers to either the bowler state register or the BCD up counter and pinfall register during cycle C and cycle D respectively. The gating arrangement 816 is, of course, necessary for the same reason as the gating arrangement 814.

The memory plane operates on a conventional coincident current basis and the readout thereof is destructive. With respect to the latter, it will be recalled that the computer cycle control gating for issuing the WRITE signal during cycle C includes means for preventing the writing of information into the memory at the end of the game. Since the previous reading of the appropriate memory bits destroyed the information contained therein, and further writing of information into the memory at the end of the game is precluded, the various bits will not contain any information and accordingly, the memory will be ready to receive information relative to a new bowler in a new game.

When the memory is to be read in response to a READ MEMORY signal, the read amplifier 808 will issue a pulse which is directed to a selected player, team or handicap word by the memory word selection logic 806. The output from the read amplifier 808 thus directed is present on one of the Y wires 802 and the cores 804 at the junction between the particular Y wire 802 and the various X wires 800 will sense the presence of the read amplifier 808 output. If the core flux direction corresponds to that arbitrarily selected to be a set or binary one direction, that core will be reset and in the process will generate a pulse on the X wire 800 with which it is associated. Such a pulse will be sensed by the corresponding sense amplifier, amplified and sent to the appropriate bit in the BCD up counter, the bowler state register or the frame counter (or perhaps the pinfall counter if it is cycle D) to cause such a bit to become set. In this manner, the various bits in a selected word in the memory are sensed and their conditions read into the appropriate registers of the computer.

When it is desired to write information into a selected bowler word in response to a WRITE signal from the computer cycle control gating, the write amplifier 810 will cause operation of the vertical one-half write amplifier 812. The latter will issue a pulse which is directed to the selected word by the memory word selection logic 806, which pulse will have a current level of approximately one-half that required to switch a core 804. Simultaneously, the write amplifier 810 will initiate operation of the horizontal one-half write amplifiers WA1—WA18 to cause the latter amplifiers to issue a similar pulse having a current level of approximately one-half that required to set a core 804. However, the issuance of a pulse by the amplifiers WA1—WA18 is also dependent upon the inputs thereto from the respective registers in the computer. If the input from a particular bit to one of the amplifiers WA1—WA18 corresponds to a set condition of that bit in the computer, the amplifier WA1—WA18 will issue the pulse. The core 804 at the junction of the X wire on which the horizontal one-half write pulse is issued and the Y wire 802 on which the vertical one-half write pulse was directed will then be switched to correspond to a set condition which may be read during a subsequent sequence for purpose of further computation in the manner described previously.

Q. Player, Team, Handicap Memory Word Selection Logic

Figure 25:
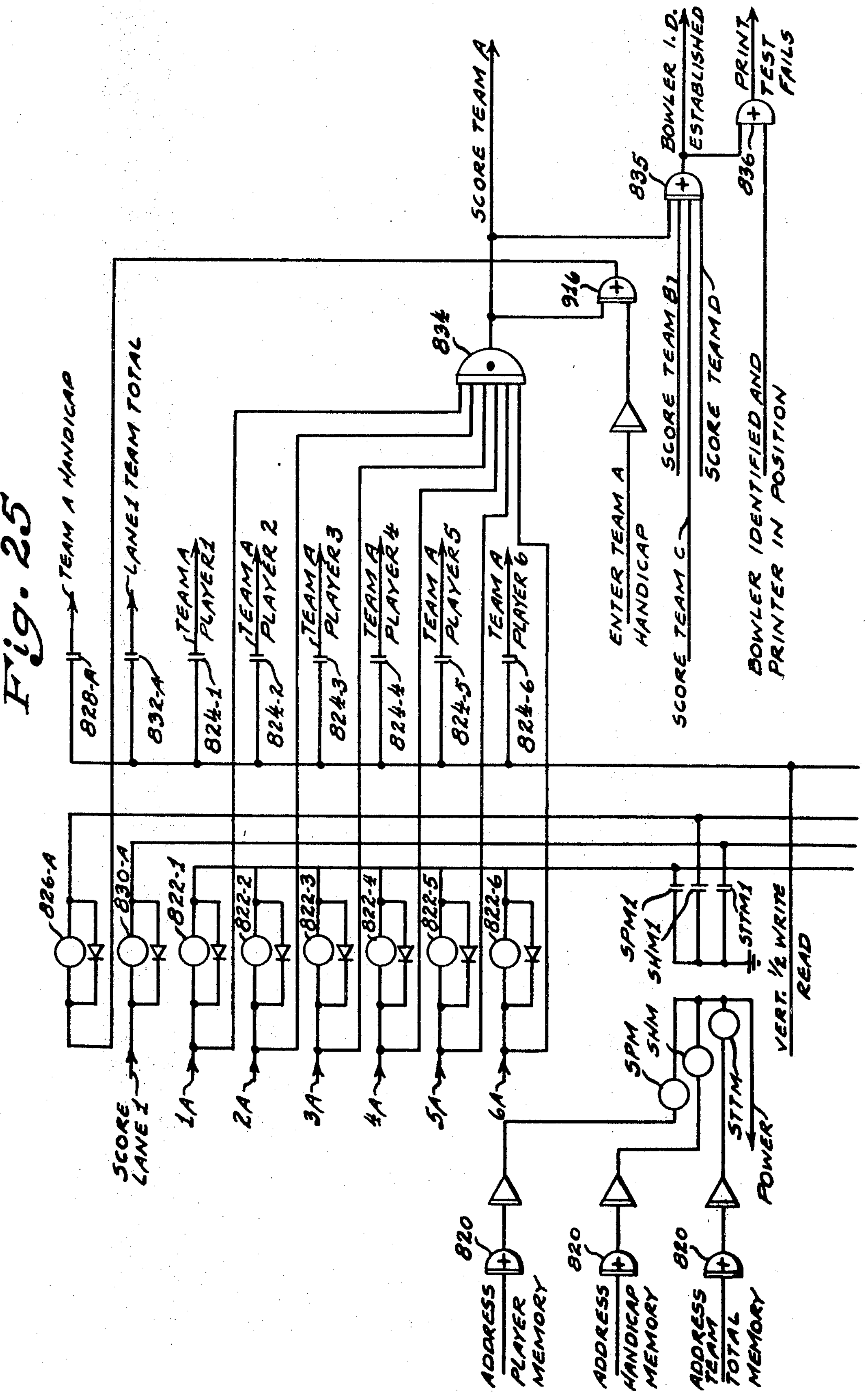
FIG. 25 is a diagram of the memory word selection logic for causing the selection of a particular word in the memory such that information therein may be used in computation.

The memory word selection logic 806 is shown in greater detail in FIG. 25. Three NOR gates 820 are adapted to receive ADDRESS PLAYER MEMORY, ADDRESS HANDICAP MEMORY, and ADDRESS TEAM TOTAL MEMORY signals from the computer cycle control gating, respectively. The outputs of the NOR gates 820 are inverted and fed as inputs to reed switches SPM, SHM and STTM for selecting a player memory, selecting a handicap memory, or selecting a team total memory, respectively. The reed switches SPM, SHM and STTM, when energized, close contacts SPM1, SHM1 and STTM1 respectively. One side of such contacts is grounded while the other is connected to one side of various reed switches. Specifically, the contacts SPM1 are connected to reed switches 822 (only six of which are shown), one reed switch being utilized for selecting the memory word for one of the 24 bowlers which the computer is adapted to score. As shown in FIG. 25, the reed switches 822 correspond to the six bowlers playing on lane one in the open bowling mode or the five team bowlers and pace bowler of team A in the league bowling mode. The reed switches 822 may have their other side connected to a source of power through the bowler identification switches or through the error correction system in a manner that will appear. Each reed switch 822, when energized, is adapted to close the corresponding contact 824. One side of the contacts 824 is connected to the corresponding Y wire 802 in the bowler memory. The other side of each of the contacts 824 is connected to the output of the vertical one-half write amplifier 812 and the read amplifier 808 for receiving either a VERTICAL ONE-HALF WRITE signal or a READ SIGNAL. Accordingly, it will be apparent that when a bowler identification switch is closed and the bowler identification for the lane on which the particular bowler identified is bowling is energized by the scanning cycle control, together with an ADDRESS PLAYER MEMORY signal input to the reed switch SPM from the NOR gate 820, one of the reed switches 822 will be energized to close corresponding contacts 824 to permit either the reading of or the writing into a selected bowler or player word.

The reed switch SHM may be energized by an ADDRESS HANDICAP MEMORY signal to close the contacts SHM1 to thereby ground one side of four reed switches 826 (only one is shown in FIG. 25), one for each of the four teams. The reed switch 826 is energized in response to a SCORE TEAM A and ENTER TEAM HANDICAP signal in a manner to be seen hereinafter. When so energized, the reed switch 826 will close an associated pair of contacts 828 having one side thereof connected to the Y wire for the selected team handicap word. The other side of the contacts 828 is adapted to receive a VERTICAL ONE-HALF WRITE and READ signals such that the selected team handicap word in the memory may either be read or written.

When the reed switch STTM is energized in response to an ADDRESS TEAM TOTAL MEMORY signal, the contacts STTM1 are closed. Such action connects one side of four reed switches 830 to ground such that they may be energized in response to SCORE LANE ONE—FOUR signals. (Only one such reed switch 830 is shown in FIG. 25.) When the reed switch 830 is energized, an associated pair of contacts 832 connected to the Y wire for the selected word in the team total memory, are closed such that either a VERTICAL ONE-HALF WRITE or a READ signal may be directed to that word for reading or writing.

The memory word selection logic is additionally arranged to issue various signals for use in the computer and controlling the various signals and sequences. For example, each of the reed switches 822 for receiving 1A—6A signals has a connection to inputs of a NAND gate 834 such that when any one of the signals 1A—6A are present, the NAND gate 834 will issue a SCORE TEAM A signal. The SCORE TEAM A signal is utilized as an input by a NOR gate 916 for purposes of selecting team A's handicap memory flip-flop as will be seen hereinafter in the discussion of handicap entry. The SCORE TEAM A signal is also used as an input to a NOR gate 835 together with SCORE TEAM B, SCORE TEAM C and SCORE TEAM D signals from similar NAND gates 834 for each of teams B, C and D. The presence of any one of the SCORE TEAM A—SCORE TEAM D signals will disable the NOR gate 835 which serves to indicate that a bowler has identified himself to the computer by issuing a BOWLER ID ESTABLISHED signal. The output of the NOR gate 835 is utilized as an input to an OR gate 836 together with BOWLER IDENTIFIED AND PRINTER IN POSITION signal from the AND gate BIPP (FIG. 5) associated with the four printing devices. The OR gate 836 acts as an AND gate and is arranged to issue a PRINT TEST FAILS signal whenever the NOR gate 835 is disabled and when the BOWLER IDENTIFIED AND PRINTER IN POSITION signal is not present. It will be recalled that the PRINT TEST FAILS signal is used by the computer cycle control gating to cause a selected printer Y-GO solenoid YGO to pulse such that the printer will search for the proper position.

R. League Bowling

1. Team Totals

As has been previously noted, the invention provides means for computing and printing a team total at the end of each frame together with a grand team total which is printed in the eleventh frame column on a score sheet and includes a team handicap entry. In order to provide an accurate team total, it is obviously necessary that the team total reflect the sum of each of the bowler's scores up to and including a given frame, as opposed to, say, the sum of the first bowler's score through five frames and the second through fifth bowler's scores through four frames. The distinction is a necessary one insofar as certain situations can arise wherein two bowlers on a team are bowling in different frames. One such instance is in the case of a bowler who has arrived late and is bowling out of turn in order to catch up with the other members of his team. Accordingly, it is necessary to provide means for precluding the entry of a bowler's cumulative score into the team total unless the frame in which he is bowling corresponds to the frame in which the team total is to be calculated. In order to accomplish such a function, the instant invention contemplates the use of a frame buffer for containing the bowler's frame information while the team frame information is contained in the frame counter, and a frame comparator for comparing the information contained in the frame buffer and the frame counter to detect whether or not the bowler's frame is equal to the team frame.

Additionally, since the possibility exists that a bowler's score may be erroneously computed due to such factors as a failure in the computer, a failure in the pin detection system, improper manipulation of the foul verification system, etc., it is desirable that team totals computed after a correction in a bowler's score be automatically corrected in accordance with the correction of the bowler's score. This feature is achieved by virtue of the computer logic wherein the cumulative score information is only kept for a bowler and not for a team total. Thus, in order to derive a team total at the end of each frame, it is necessary to add the cumulative scores of the bowlers on that team to arrive at the cumulative team total to that frame. Obviously, a team total computed in this manner will reflect any corrections made in the bowler's cumulative score up to and including that frame.

In actuality, when a bowler on the team has completed a frame, his score will then be added to the cumulative scores of any bowler on that team that has preceded him in completing the frame. In the case of the first bowler on a team, only that bowler's cumulative score will be placed in the team total memory. For the second through fifth bowlers on the team, the score contained in the team total memory is read out into the arithmetic register (specifically, the BCD up counter and, if necessary, the first bit of the pinfall counter), and the individual bowler's score is then added thereto. Since, as previously noted, there is no provision for parallel addition in the arithmetic register, means must be provided for accommodating the individual bowler's score when the information in the team total memory is read into the arithmetic register such that the two can be added. This function is achieved through use of a binary coded decimal down counter. As will be seen, the individual bowler's score is read into the BCD down counter and the BCD down counter is then counted down to a binary zero condition in a manner that adds the bowler's score contained therein to the team total information contained in the arithmetic register.

As has been previously noted, a given team total word in the memory will periodically contain information relative to both of the teams bowling on the lane with which the team total memory word is associated. Thus, when teams are not bowling at the same rate and the first bowler on a team will begin bowling on a second lane before the fifth bowler on that team completes his bowling on a first lane, the team total memory words associated with both of the lanes will contain team total information relative to the same team but for different frames. Thus, the instant invention is capable of computing team totals when two bowlers on the same team are bowling on different lanes.

a. Frame Buffer

The frame buffer is shown in FIG. 15 and comprises four flip-flops FB1, FB2, FB4 and FB8. Each flip-flop FB1—FB8 includes an input to its set section from the outputs 1FC—8FC of the set sections of the flip-flops FC1—FC8 of the frame counter. These inputs are received through AND gates 840. Each of the AND gates 840 has a second input from a pulse-forming NAND gate 842 on which a LOAD FRAME BUFFER signal is received.

Each of the reset sections of the flip-flop FB1—FB8 include a reset input from an electronic switch 844 which also receives the LOAD FRAME BUFFER signal.

The operation of the frame buffer is as follows. When a LOAD FRAME BUFFER signal is received, each of the flip-flops FB1—FB8 are immediately reset as a result of the energization of the electronic switch 844. The pulse-forming NAND gate 842 responds to the LOAD FRAME BUFFER signal at the trailing edge thereof to enable the AND gates 840 just after the resetting of the flip-flops FB1—FB8. This operation is similar to that which occurs when a LOAD PRINTER FRAME CONTROL signal is received by the printer frame control on the electronic switch 470 and pulse-forming NAND gate 468. Once the AND gates 840 have been enabled, the condition of the flip-flops FC1—FC8 of the frame counter is passed to the respective flip-flop FB1—FB8 such that each of the latter assume a condition identical to that of their corresponding flip-flop in the frame counter.

In order to use the information present in the frame buffer, the set section of the flip-flops FB1—FB8 include outputs on which signals 1FB—8FB may be issued. Similarly, the reset sections of the flip-flops FB1—FB8 have outputs on which signals $\overline{1FB}$—$\overline{8FB}$ may be present. These signals are used in determining whether the individual bowler frame and the team total frame are equal by comparison with team total frame information in the frame counter.

b. Frame Comparator

In a team totaling sequence as previously stated, it is necessary that the team total frame and the bowler's frame be identical before the bowler's score will be entered into the team total memory for subsequent use in computing the team total. It will be recalled that initially frame information is read from each bowler frame memory into the frame counter from which it is read into both the printer frame control and the frame buffer. As the frame buffer can only receive information from the frame counter, it follows that when this path of information introduction is disabled, the condition of the frame buffer will be identical to the condition of the frame counter with respect to any given bowler. It will also be recalled that team total frame information is placed in the frame counter during cycle D. Thus, it is possible that the bowler frame information in the frame buffer will not correspond to the team frame information contained in the frame counter. Accordingly, in order to provide accurate team totals, it is necessary to compare the frame information contained in the frame counter and the frame buffer to determine whether they are equal. This function is provided by the frame comparator.

The frame comparator is shown in FIG. 15 and is comprised of two groups of four two-input AND gates 846 and 848. One input of each of the AND gates 846 is connected to the output 1FC—8FC of the set sections of the flip-flops FC1—FC8 of the frame counter. The other input to the AND gates 846 comprises the outputs $\overline{1FB}$—$\overline{8FB}$ of the reset sections of the flip-flops FB1—FB8 of the frame buffer.

Each of the AND gates 848 has input connected to the corresponding output $\overline{1FC}$—$\overline{8FC}$ of the reset sections of the flip-flops FC1—FC8 of the frame counter. The second input to the AND gates 848 is supplied by the outputs 1FB—8FB of the set sections of the flip-flops FB1—FB8 of the frame buffer. The outputs of each of the AND gates 846 and 848 are connected as inputs to a NOR gate 850. The NOR gate 850 normally generates a FRAME EQUAL signal but will change its output whenever one of the AND gates 846 and 848 have identical inputs signals applied thereto on both of the inputs thereof to indicate a contrary situation. It will be appreciated that upon such an occurrence, the conditions of the flip-flops sensed by the signaling AND gates 846 and 848 are not, in fact, equal. As an illustration, assume that the flip-flop FB1 of the frame buffer is in a reset condition while the flip-flop FC1 of the frame counter is in a set condition. In such a case, the output from the reset section of the flip-flop FB1 will be identical to the output of the set section of the flip-flop FC1. Similarly, the output of the reset section of the flip-flop FC1 will be identical to the output of the set section of the flip-flop FB1. Accordingly, the AND gates 434 and 436 associated with the flip-flops FB1 and FC1 will thereby be enabled to cause the NOR gate 438 to provide a $\overline{\text{FRAME EQUAL}}$ indication.

The arrangement of the gates 846, 848 and 850 is such as to follow the logical relation:

$$\overline{\text{FRAME EQUAL}} = (1FC)\,(\overline{1FD}) + (\overline{1FC})\,(1FB) + (2FC)\,(\overline{2FB}) + \ldots + (8FC)\,(\overline{8FB}) + (\overline{8FC})\,(8FB).$$

When this expression is true, the bowler's score is not entered into the team total. Such an entry blocking function is accomplished by the absence of the FRAME EQUAL signal in the manner previously described in conjunction with the computer cycle control gating (FIGS. 20, 21 and 22).

c. BCD Down Counter

Figure 26A:
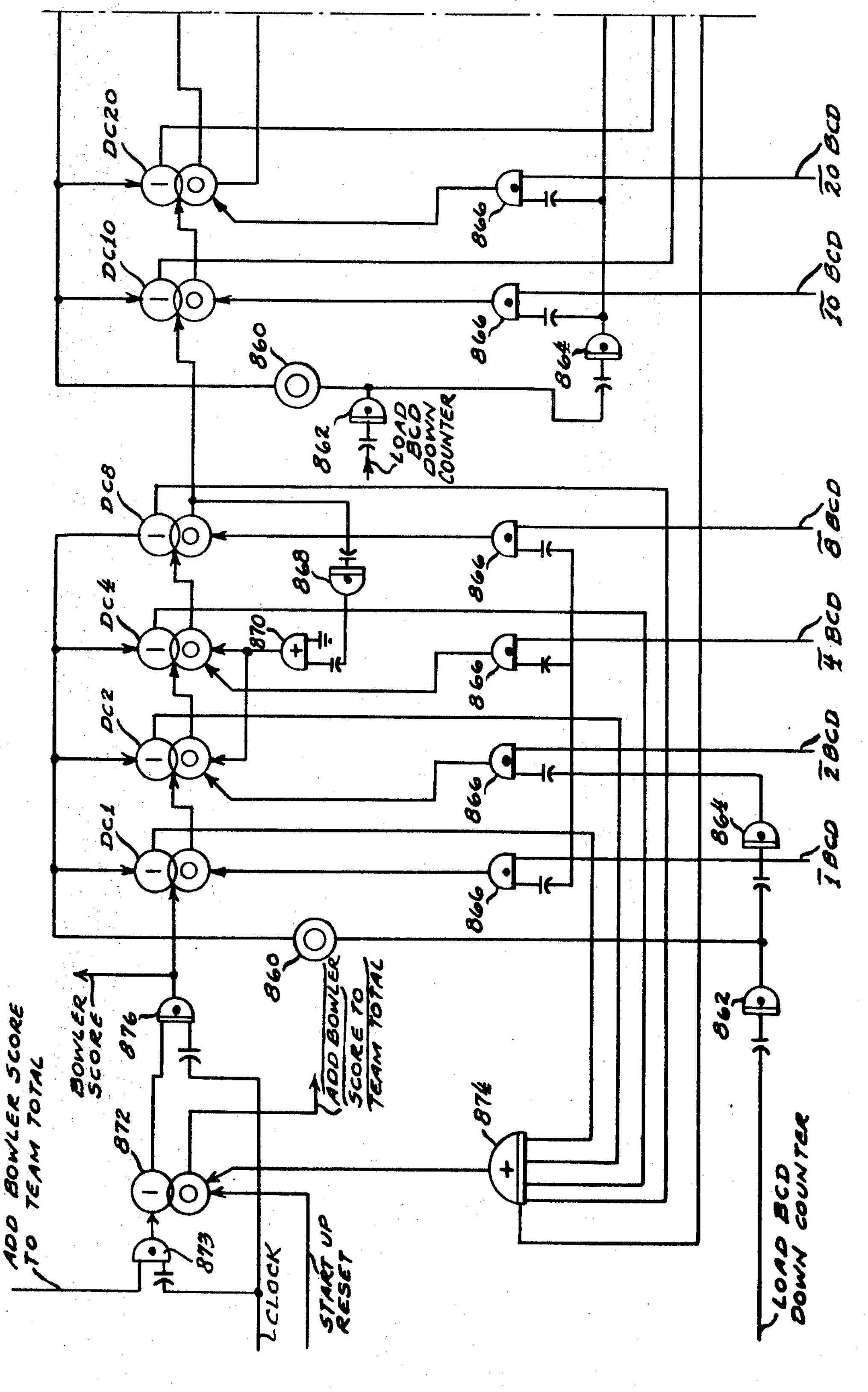
FIG. 26 is a logic diagram of a BCD down counter used for team totaling and is comprised of FIGS. 26A and 26B.
FIG. 26B is to be placed adjacent the right-hand edge of FIG. 26A.
Figure 26B:
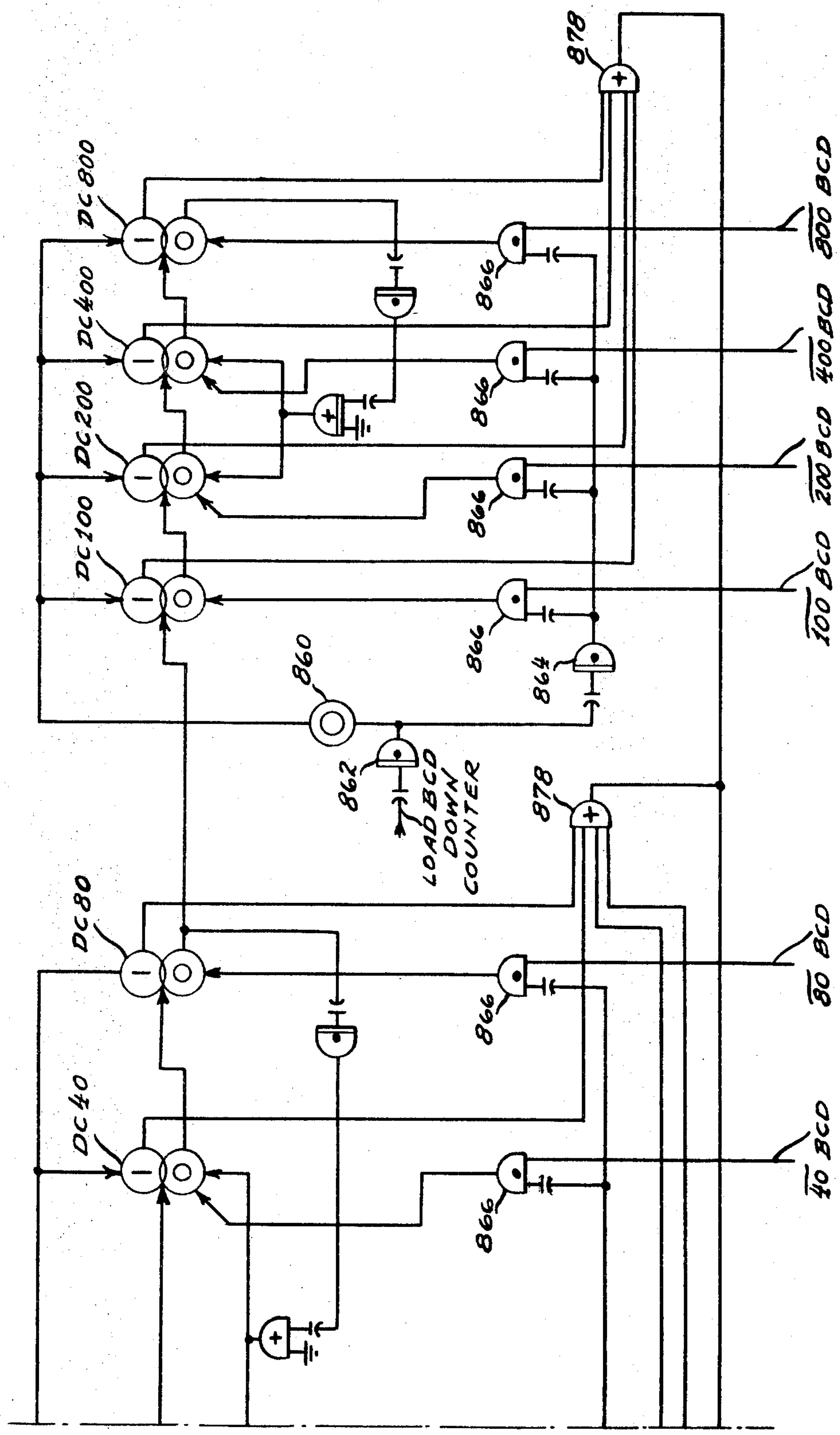

As previously mentioned, in order to add a bowler's score to the team total in response to an ADD BOWLER SCORE TO TEAM TOTAL signal from the computer cycle control gating, a three decade binary coded decimal down counter is provided. The down counter is shown in FIGS. 26A and 26B and comprises 12 flip-flops, DC1, DC2, DC4, DC8, DC10, DC20, DC40, DC80, DC100, DC200, DC400 and DC800. Each of the flip-flops DC1—DC400 has an output from its reset section connected to the trigger inputs of the next higher flip-flop. Thus, it will be apparent that the flip-flops DC2—DC800 are adapted to change their condition in response to a binary zero to binary one change in the immediately lower flip-flop.

Each of the flip-flops DC1—DC800 has an input to its set section from an electronic switch 860. The input to the electronic switch 860 is received from the output of a pulse forming NAND gate 862 on which a LOAD BCD DOWN COUNTER signal is received from the computer cycle control gating. The output of the pulse forming NAND gate 862 is also utilized as an input to a second pulse forming NAND gate 864 and the output of the latter is utilized as an input by 12 pulse forming AND gates 866, one being associated with each of the 12 flip-flops DC1—DC800. Each of the pulse forming AND gates 866 includes a second input from the set section of the corresponding flip-flop BCD1—BCD800 in the arithmetic register. The output of each AND gate 866 is utilized as an input to the reset section of the corresponding flip-flop DC1—DC800.

From the foregoing, it will be apparent that when a LOAD BCD DOWN COUNTER signal is received by the NAND gate 862, the resulting energization of the electronic switch 860 will cause each of the flip-flops DC1—DC800 to be set. Upon the trailing edge of the pulse output from the NAND gate 862, and after the setting of the flip-flops DC1—DC800, the NAND gate 864 will issue an enabling pulse to each of the AND gates 866. Depending upon the level of the second input to the AND gates 866, certain of the flip-flops DC1—DC800 will be reset. Such resetting of selected flip-flops DC1—DC800 will correspond to the presence of a reset flip-flop in the binary coded decimal up counter. Accordingly, the flip-flops DC1—DC800 will have a condition corresponding to that of the BCD up counter which, of course, represent the bowler's score.

The most significant bit of each decade (DC8, DC80 and DC800) is provided with an output from its reset section through a pulse forming NAND gate 868 and a pulse forming OR gate 870 to serve as a feedback input to the reset sections of the two immediately lower flip-flops. Thus, when the most significant bit in each decade goes from reset to set during a counting sequence, the two immediately lower flip-flops will be reset. As will be apparent to those skilled in the art, such an arrangement is necessary to achieve the binary coded decimal down counting function.

A control flip-flop 872 is provided to control the adding of a bowler's score to a team total. The flip-flop 872 includes an input to its set section from an AND gate 873 having an input which may receive an ADD BOWLER'S SCORE TO TEAM TOTAL signal. The AND gate 873 includes a second input on which clock pulses may be received. Thus, upon receipt of the first clock pulse by the AND gate 873 following the generation of an ADD BOWLER'S SCORE TO TEAM TOTAL signal, the flip-flop 872 will be set. The flip-flop 872 has a first input to its reset section on which a STARTUP RESET signal may be received and a second input connected to the output of what is essentially a 12 input NOR gate 874.

An output from the set section of the flip-flop 872 is used as an enabling input by a NAND gate 876 which includes a second input on which clock pulses may be received. The output of the NAND gate 876 is placed upon the trigger input of the flip-flop DC1 and, accordingly, when the NAND gate 876 is enabled, the clock pulses will be passed to the flip-flop DC1 to cause the down counting sequence. The output of the NAND gate 876 also issues BOWLER SCORE pulses which are directed to the BCD up counter to cause the latter to increase the count contained thereby by the number of such pulses received.

Referring once again to the twelve input NOR gate 874, it will be seen that the gate is illustrated as a five input NOR gate combined with two four input OR gates 878. However, the logical arrangement is such as to provide a NOR function. In any event, the inputs to the NOR gate 874 are taken from the reset sections of each of the 12 flip-flops DC1—DC800 and the overall arrangement is such that when each of the flip-flops DC1—DC800 is reset, the output of the NOR gate 874 will cause the flip-flop 872 to be reset to thereby preclude further passage of clock pulse inputs to the flip-flop DC1 and to the BCD up counter.

As will be seen, once the down counter has been loaded with a bowler's score, the number of clock pulse inputs required to count it down to an all binary zero condition will correspond to the bowler's numerical pinfall. Thus, by application of this same number of pulses to the BCD up counter which, during the appropriate portion of cycle D, contains team total pinfall information, the bowler's cumulative pinfall will be added to the team total information contained in the BCD up counter by a regular counting sequence.

An example of the operation of the down counter is as follows. Assume that the down counter has been loaded by the BCD up counter and the condition of the former corresponds to a decimal value 11. Thus, the binary coded decimal number 000000010001 will be in the down counter. When the computer cycle control gating issues the ADD BOWLER'S SCORE TO TEAM TOTAL signal, the flip-flop 872 will be set to enable the NAND gate 876. The first clock pulse will cause the flip-flop DC1 to be reset. Since the arrangement between the flip-flops DC1—DC800 is such as to sense only a binary zero to binary one changes, the resetting of the flip-flop DC1 will not have an affect on the other flip-flops. Accordingly, the binary coded decimal number in the down counter, neglecting the seven most significant bits, will be 10000. The second clock pulse input will cause the flip-flop DC1 to become set. This change will be sensed by the flip-flop DC2 to cause the latter to become set, which in turn will cause the flip-flop DC4 to become set, which in turn will cause the flip-flop DC8 to become set which action will cause the resetting of the flip-flop DC10. Simultaneously, with the setting of the flip-flop DC8, the feedback therefrom through the NAND gate 868 and the OR gate 870 will cause the resetting of the flip-flops DC2 and DC4. Accordingly, the binary coded decimal in the counter after two input pulses will be 01001. The third input pulse will cause the resetting of the flip-flop DC1 and the number will be 01000. The fourth input pulse will cause the flip-flop DC1 to be set which, in turn, will cause setting of the flip-flop DC2, which in turn will cause the setting of the flip-flop DC4 which finally will cause the resetting of the flip-flop DC8. Accordingly, the number will be 00111. The fifth input pulse will merely reset the flip-flop DC1 and the number will be 00110. The sixth input pulse will set the flip-flop DC1 which will cause the resetting of the flip-flop DC2. Accordingly, the number will be 00101. The seventh input pulse will cause the flip-flop DC1 to be reset and the number will be 00100. The eighth pulse input will cause the setting of the flip-flop DC1 which in turn will cause the setting of the flip-flop DC2 which will cause the resetting of the flip-flop DC4. Accordingly, the number will be 00011. The ninth input pulse will merely cause the resetting of the flip-flop DC1 and the number will be 0010. The 10th input pulse will cause the setting of the flip-flop DC1 which action will reset the flip-flop DC2 and the number will be 00001. The eleventh input pulse will cause the resetting of the flip-flop DC1 and at this point, all of the flip-flops DC1—DC800 will be reset. This condition is sensed by the NOR gate 874 and the latter will cause the resetting of the flip-flop 872 to preclude the issuance of further counting pulses by the NAND gate 876. Thus it will be apparent that the number of pulses passed by the NAND gate 876 corresponds to the bowler's score contained by the down counter. As noted previously, such BOWLER SCORE pulses passed by the NAND gate 876 are also passed to the BCD up counter such that the number contained therein will be increased by the number of such pulses by a normal counting sequence such as that described previously. As a result, the bowler's cumulative score is added to the team total score. When the addition is complete, the resetting of the flip-flop 872 causes the latter to issue an ADD BOWLER SCORE TO TEAM TOTAL signal to the computer cycle control to thereby enable the sequence counter to continue the count and write the team total score back into the memory such that it may be used in the addition of additional bowler scores to the team total score or to print out the team total.

2. Handicap Entry 10th

As has been pointed previously in connection with the computer cycle control and computer cycle control gating, a team handicap entry may be addressed to the BCD up counter from which it will ultimately be placed in the selected handicap memory and included in subsequently computed running team totals and the grand team total. Additionally, the team handic{:p value will be printed at the bowler one box score level in the{11th frame.

Figures 27A, 29:
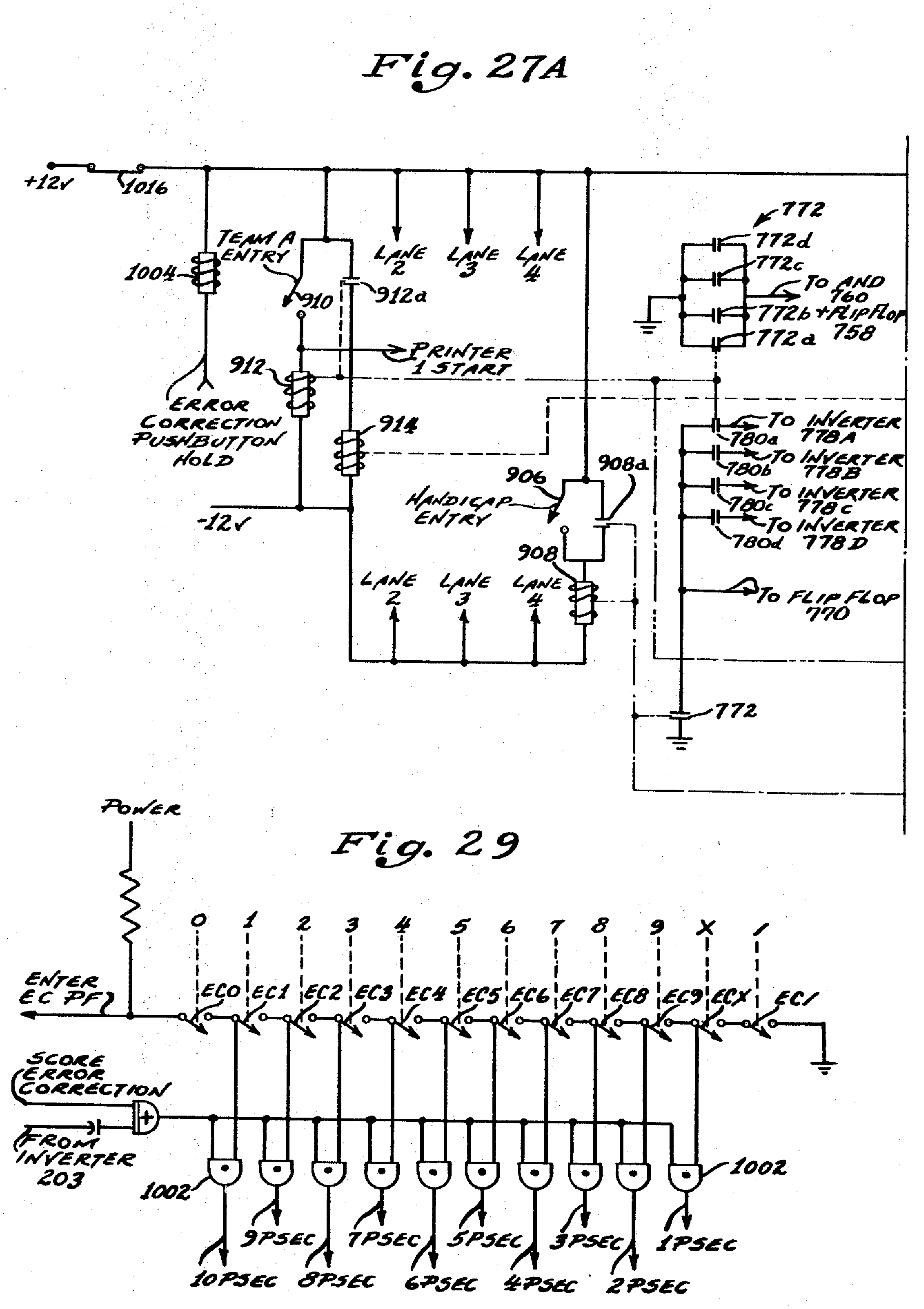
FIG. 29 is a schematic of a portion of the error correction system.
Figure 27B:
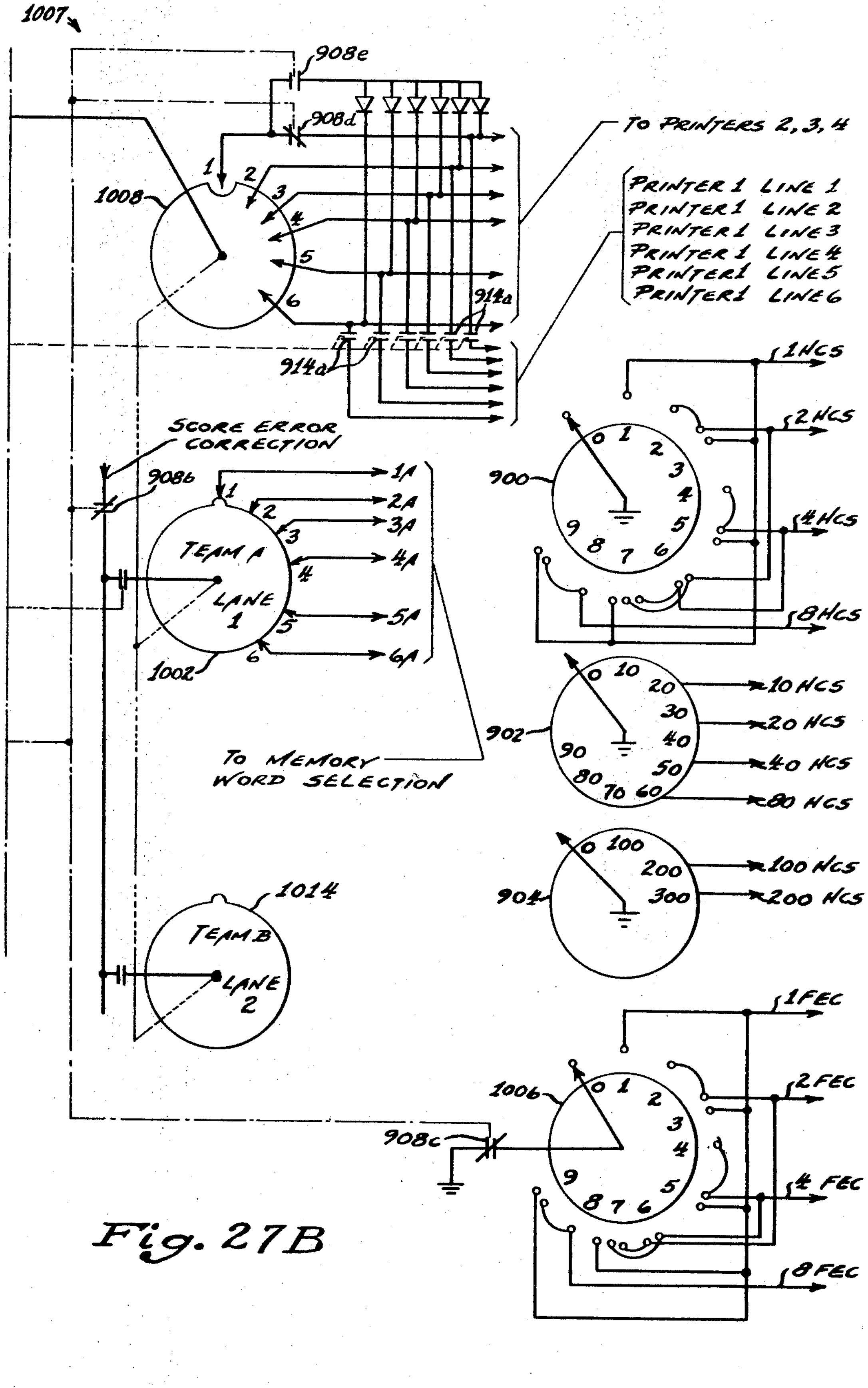
FIG. 27B is to be placed adjacent the right-hand edge of FIG. 27A.

In order to introduce handicap values into the arithmetic register, three 10 position rotary switches 900, 902 and 904, for entry of the units, tens and hundreds digits respectively, are provided as shown in FIGS. 27A and 27B. Each of the switches 900, 902 and 904 includes circuitry similar to that shown with respect to the switch 900 for issuing signals 1HCS—200HCS to the inputs of the respective AND gates 278 of the BCD up counter (FIG. 9). Thus, by rotating the wiper of the switches 900, 902 and 904, to position corresponding to the units, tens and hundreds digit of a handicap value, input signals that are arranged to set the various flip-flops BCD1—BCD200 of the BCD up counter are provided as inputs to the AND gates 278 such that when the computer cycle control gating issues a READ ENTRY SWITCH signal, the appropriate flip-flops BCD1—BCD200 in the BCD up counter will be set to correspond to the score manually set up on the switches 900, 902 and 904.

It will be recalled that a team handicap entry value is arbitrarily limited to a value of decimal 399. Accordingly, the switch 904 is arranged only to issue signals to the two least significant flip-flops, BCD100 and BCD200, on the third decade of the BCD up counter. The switches 900, 902 and 904 are also used for inserting a bowler's cumulative score into the BCD up counter during an error correction procedure as will be seen.

Since a bowler's cumulative score can never exceed 300, the outputs of the switches 900, 902 and 904 are sufficient to insert any 400HCS into 800HCS up counter for handicap entry or cumulative score correction purposes. However, as will be apparent to those skilled in the art, if it be desired to increase the maximum limit of the handicap value, it would only be necessary to arrange the switch 904 in the manner of the switch 900 such that the former could additionally issue 400HCS and 800HCS signals to the AND gates 278 associated with the flip-flops BCD400 and BCD800 of the arithmetic register. When it is desired to enter a handicap value for a team and the reset logic to be described hereinafter is in a condition to permit such an entry, the handicap value is set up on the switches 900, 902 and 904.

A switch 906 bearing the legend ENTER HANDICAP may be closed to energize a relay 908. The relay 908 includes a pair of contacts 908*a* in parallel with the handicap entry switch 906 that provide a holding circuit for the relay 908. The relay 908, when energized, will also close the contacts 772 (see FIGS. 27A and 23C) to set the handicap entry flip-flop 770 (FIG. 23C). Thus, when the scanning cycle control counter reaches a condition corresponding to the scanning of the handicap entry system, the latter will be stopped, assuming that the AND gate 724 (FIG. 23C) is receiving an ALLOW ENTRY signal from the reset logic. Simultaneously, with the setting of the flip-flop 770, the inverter 778 will be in a condition to issue an ENTER TEAM HANDICAP signal for an appropriate team whenever their associated relay contacts 780 are closed.

Referring once again to the relay 908, the energization thereof will additionally cause the opening of relay contacts 908*b* and 908*c* to disable the error correction bowler identification system and the error correction frame switch as will be seen. Additionally, relay contacts 908*d* will be opened to cause the addressing of the bowler one line by each of the four printers if they are subsequently required to print. Finally, contacts 908*e* are closed such that, as will be seen hereinafter, the selected printer cannot address bowler lines 2—6.

In order to direct the handicap value to a given team, a manually operated switch 910 bearing the legend TEAM A ENTRY, which is also used for team A error correction, is closed. Such action will energize a relay 912 and a relay 914. The relay 912 includes a first set of contacts 912*a* that are closed to provide a holding circuit for the relay 912 and 914. The closing of the switch 910 will cause the issuance of a PRINTER ONE START signal that will cause the printer on lane one corresponding to that used to print out team A score information, to proceed to the box score level of bowler one. The relay 912 additionally causes the closing of the relay contacts 780A (see FIGS. 27A and 23A) to enable the inverter 778A (FIG. 23A) to thereby issue a TEAM A HANDICAP ENTRY signal. This signal is fed to the team A reset logic, and, if, in a manner to be described hereinafter, team A's handicap entry is to be permitted, the team A reset logic will cause the computer cycle control to begin cycle A. The occurrence of cycle A together with the various sequences $t_0$—$t_7$ will ultimately cause the entry of the team handicap value into the handicap memory for team A. This is accomplished by the closing of the reed switch contacts 828A (FIG. 25) by the reed switch 826A when the computer cycle control gating issues an ADDRESS HANDICAP MEMORY signal and the completion of the circuit involving the reed switch 826A by the output of a NOR gate 916 in response to the presence of an inverted ENTER TEAM A HANDICAP signal from the inverter 778A of the scanning cycle control.

Cycle A additionally requires that the handicap value be printed. To cause actuation of the printer, the relay 914, which is energized by the team A entry switch 910 and the holding circuit provided by the relay contacts 912*a*, will close relay contacts 914*a* thereby addressing printer number one. The closing of the contacts 914*a* associated with printer one insure that the latter will address the bowler line one as dictated by the opening of the relay contacts 908*d* and not address bowler lines 2—6 as dictated by the closing of the relay contacts 908*e*. Thus, the PRINTER ONE START signal together with the printer position directions taken from the relay contacts 914*a* will cause the printer on lane one to address the box score level of bowler line one.

As the computer cycle control proceeds through cycle A, the computer cycle control gating will cause the printer to address the 11th frame and to cause a print cycle in the manner previously described. The handicap value entered into the BCD up counter will be read into the pinfall counter where it is decoded by the printer character selection matrix under the direction of the printer cycle control in the manner described previously. While the above-described handicap entry procedure has been described with respect to team A, it will be appreciated that the operation is the same for teams B, C, and D and is achieved by the use of identical circuitry including entry switches 910 and relays 912 and 914 for each of teams B, C and D. Such circuitry has been omitted from the drawing for the purpose of clarity. However, it will be understood that such circuitry together with the corresponding relay contacts is required for handicap entry for teams B, C and D.

3. Individual Lane Reset Logic

The manner in which the team total is derived requires that information contained within the team total memory be erased prior to the writing of the first bowler's score into the team total memory at the beginning of a new team frame. Additionally, it is desirable to provide means such that a handicap entry may only be entered once during the progress of a game to preclude the occurrence of a situation wherein two or more members of a team enter the handicap separately such that the handicap value is erroneously multiplied by the number of such players making such an entry. To provide such functions, the individual lane reset logic is provided for each of the four lanes.

Figures 28, 31:
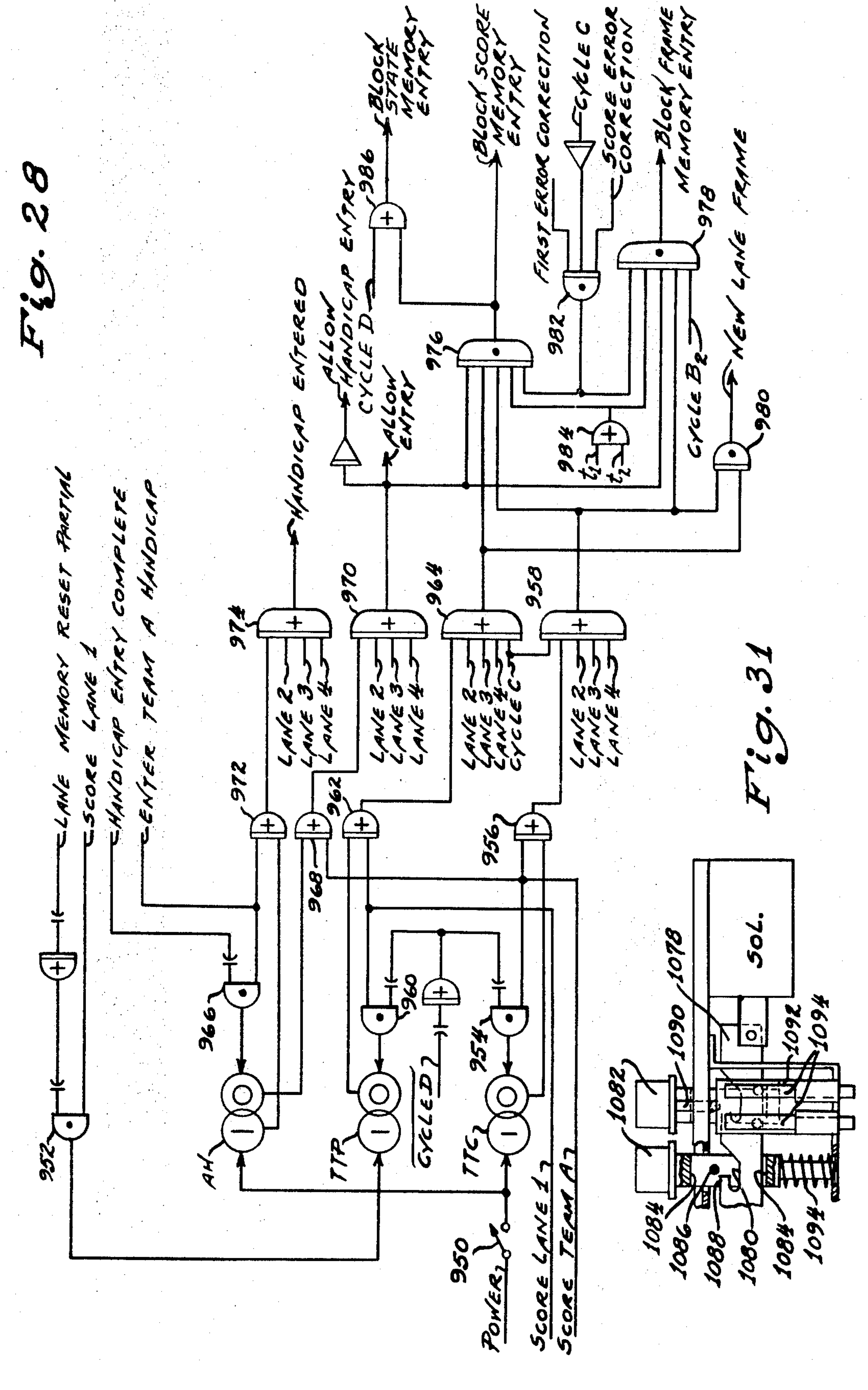
FIG. 28 is a logic diagram of the lane reset logic for one lane and is used for clearing team total and handicap words in the memory prior to a new bowling game.
FIG. 31 illustrates a mechanism for latching a manually operable switch for entering error correction pinfall or for bowler identification in a depressed position.

The individual lane reset logic for lane one is shown in FIG. 28 and comprises three flip-flops TTC, TTP and AH. The flip-flops TTC, TTP and AH are provided for each of lanes 1—4. The flip-flop TTC and AH have inputs to their set sections from a switch 950 which is connected to a source of power and is arranged to be opened at the beginning or end of a game as by insertion or removal of a score sheet into or from the printer. When the switch 950 is closed as by removal of the score sheet, the flip-flops TTC and AH will be set. It will be apparent that the switch 950 is maintained open by the score sheet during a game such that the flip-flops TTC and AH will be set only once (at the beginning of a game) as no other means are provided for setting the flip-flops TTC and AH. The flip-flop TTP has an input to its set section from an AND gate 952 such that the flip-flop TTP will be set whenever a SCORE LANE ONE signal is present together with a LANE MEMORY RESET PARTIAL signal.

The flip-flop TTC has an input to its reset section from an AND gate 954 which will cause the flip-flop TTC to be reset whenever $\overline{\text{CYCLE D}}$ (an indication that cycle D is complete) and SCORE TEAM A signals are present. The output of the reset section of the flip-flop TTC is directed to a NOR gate 956 together with a SCORE TEAM A signal and the output of the NOR gate 956 is utilized as an input by a NOR gate 958. The NOR gate 958 has similar inputs from the NOR gates 956 associated with the TTC flip-flops for lanes 2—4 together with an input on which the CYCLE C signal may be received.

The flip-flop TTP has an input to its reset section from an AND gate 960 which may be enabled by the presence of $\overline{\text{CYCLE D}}$ signal together with a SCORE LANE ONE signal to cause the flip-flop TTP to be reset. An output from the reset section of the flip-flop TTP is utilized as an input by a NOR gate 962 together with a SCORE LANE ONE signal. The output of the NOR gate 962 is utilized as an input by a NOR gate 964 which receives inputs from the NOR gate 962 associated with lanes 2—4 together with a CYCLE C signal.

The flip-flop AH includes an input to its reset section from an AND gate 966 which is enabled by a HANDICAP ENTRY COMPLETE signal together with an ENTER TEAM A HANDICAP signal to cause the flip-flop AH to be reset. An output from the reset section of the flip-flop AH is utilized as an input by a NOR gate 968 together with an input on which an ENTER TEAM A HANDICAP signal may be received. The output of the NOR gate 968 is utilized as an input by a NOR gate 970 together with similar inputs from the NOR gates 968 associated with lanes 2—4. An output from the set section of the flip-flop AH is utilized as an input by a NOR gate 972 together with a second input on which a SCORE TEAM A signal may be received. The output of the NOR gate 972 is utilized as an input by a NOR gate 974 together with inputs from the NOR gates 972 associated with lanes 2—4 to issue a HANDICAP ENTERED signal when a particular flip-flop AH is reset thereby permitting the reading of that team's handicap memory during following $B_2$ cycles.

The flip-flop TTC is utilized to cause the clearing of all of the bits in the corresponding team total word in the memory while the flip-flop TTP is used to cause only the clearing of the bits in the team total word containing score information as it is necessary to maintain team frame information for comparison during the team totaling cycle during a game. As will be recalled, the flip-flop TTC is set at the beginning of a game by the action of the switch 950. This condition is sensed by the NOR gate 956 when it is desired to score the team to which the flip-flop TTC corresponds and the information is passed onto the NOR gate 958. The NOR gate 958 will sense the condition on any of the lanes 1—4 and will issue an output to NAND gates 976 and 978. When the flip-flop TTC is set, the NAND gate 978 will issue a BLOCK FRAME MEMORY ENTRY signal. The NAND gate 976 will issue a BLOCK SCORE MEMORY ENTRY signal when the flip-flop TTC is set. Thus, when the computer cycle control gating issues the READ signal to the memory, the resulting destructive readout of the memory will cause the clearing of the bits of the selected word and since the information contained in the bits of the word is not passed onto the various registers in the computer due to the blocking of the entry thereto, such information is literally removed from the logic of the computer. At the first simultaneous occurrence during the game of a $\overline{\text{CYCLE D}}$ and a SCORE TEAM A signal, the flip-flop TTC will be reset and thereafter the NAND gate 978 will not issue a BLOCK FRAME MEMORY ENTRY signal in response to the set condition of the flip-flop TTC.

When the flip-flop TTP is set, the condition is sensed by the NOR gate 962 when a SCORE LANE ONE signal is present and the NOR gate 964 ultimately passes on such information to the NAND gate 976 to cause the latter to issue the BLOCK SCORE MEMORY ENTRY signal. Thus, when the computer cycle control gating issues the READ signal, the resulting destructive readout and blocking will similarly cause such information contained in all bits but those containing frame information in the selected word to be destroyed. At this point it will be noted that the set condition of the flip-flop TTP will not cause blocking of frame information into the frame counter. The flip-flop TTP for any lane will be set upon the completion of cycle D when the fifth bowler on the team is bowling and his frame is equal to the team frame. It will be recalled that this circumstance is detected by the computer cycle control gating which issues the LANE MEMORY RESET PARTIAL signal. Thus, it will be apparent that the flip-flop TTP is set upon the completion of the computation of each running team total. The next time that the computer is in cycle D and is scoring the lane to which the flip-flop TTP corresponds, the flip-flop TTP will be reset to thereby permit utilization of score information in computing the next running team total. It will be apparent that such resetting of the flip-flop TTP will occur after the computer has progressed through cycle D for the first bowler on a team.

A NAND gate 980 is arranged to receive the outputs of the NOR gates 958 and 964 and thus, whenever either the flip-flop TTC or the flip-flop TTP for a given lane are set, the NAND gate 980 will issue a NEW LANE FRAME signal which is utilized by the computer cycle control. It will be apparent that such a signal will be issued at either the beginning of the game due to the set condition of the flip-flop TTC or during the computer cycle for the first bowler on a team due to the set condition of the flip-flop TTP.

It should be noted that the flip-flop TTP corresponds to a particular lane rather than to a particular team. The flip-flop TTC corresponds to the team that started the game on the lane to which the flip-flop TTP corresponds, although it, too, is lane orientated. In this respect, it will be recalled that the team total words in the memory are associated with a given lane rather than with a given team. Thus, the memory clearing effects generated by the flip-flops TTC and TTP will always be directed to a particular team total word. This relationship is particularly important with respect to the clearing effect produced by the flip-flop TTP insofar as in league bowling the completion of a team frame or a lane by a team means that the other team will begin bowling on that lane and thus, if the lane team total memory word was not cleared, team total information for one team would be mixed with the team total information for the second team.

The initial set condition of the flip-flop AH is detected by the NOR gates 968 and 972. Such a condition of the flip-flop AH on any one of the four lanes is utilized by the NOR gate 970 to issue an ALLOW ENTRY signal. It will be recalled that such a signal causes the initiation of cycle A′ together with the stopping of the scanning cycle control at the handicap entry station if the handicap entry flip-flop 770 (FIG. 23C) has been set by manual manipulation of the handicap entry switch 906 (FIG. 27A). The output of the NOR gate 970 is also used as an input to the NAND gates 976 and 978 to cause blocking of all information contained in the bits in the selected word such that the bits are cleared of previous handicap information. When the computer cycle control gating issues a HANDICAP ENTRY COMPLETE signal, the flip-flop AH corresponding to the team whose handicap has been entered will be reset such that the NOR gate 970 will no longer issue the ALLOW ENTRY signal but the NOR gate 974 will issue a HANDICAP ENTERED signal when that team is being scored. Accordingly, cycle A cannot reoccur until the flip-flop AH is again set when a new game is started although the team handicap memory may be read during cycle $B_2$ such that the handicap value may be added to the team total.

{The NAND gates 976 and 978 are also arranged to issue t{eir respective blocking signals during the occurrence of cycle C and an error correction procedure when both of the error correction flip-flops 756 and 760 (FIG. 23C) are set. This condition is sensed by a NAND gate 982. Additionally, the blocking signals will be issued during sequences $t_3$—$t_0$. This function is provided by the output of an OR gate 984 which is arranged to sense the absence of sequences $t_1$ and $t_2$.

As will be apparent from FIG. 28, the output from the NAND gate 976 is passed through an OR gate 986 to issue a BLOCK STATE MEMORY ENTRY signal. A second input to the OR gate 986 receives a cycle D signal such that score and state information cannot be entered into the bowler state register when the running team total level is addressed. Thus, state memory entry is precluded whenever score memory entry is precluded or during cycle D.

As previously noted, clearing of the individual bowler memory is accomplished by blocking the WRITE signal when a bowler is in the end of game state (state 11). Occasionally, a bowler may not finish a game and in such a case, that bowler's words in the memory will not be cleared in the usual manner and the error correction system must be used to complete the game to clear the bowler memory. Thus, it may be desirable to provide means for clearing a bowler memory independently of the end of game state. One form of means for clearing the bowler memory is generally similar to the arrangement including the flip-flops TTC and TTP just described. Specifically, a flip-flop may be provided for each of the bowler words and arranged to be set by operation of the switch 950 in the same manner as the setting of the flip-flops TTC and TTP. Each such bowler flip-flop may have an input to its reset section from an AND gate for receiving a START BOWLER CYCLE signal from the computer cycle control gating via a pair of pulse forming gates and a second input for receiving a bowler identification signal 1A—6A corresponding to the bowler with which the flip-flop is associated.

The same bowler identification signal is also utilized as an input by a NOR gate together with an output from the reset section of the flip-flop. The output of each of the NOR gates associated with the flip-flops used as bowler reset memories on each lane are connected in common as an input to a five input NOR gate. The second—fourth inputs to the five input NOR gate are derived from the individual bowler reset memories associated with lanes 2—4. The fifth input to the five input NOR gate may be derived from the NAND gate 982 (FIG. 28) while the output of the five input NOR gate may be directed to the NAND gates 976 and 978.

The use of such logic will cause the blocking of entry of score, state and frame information during the first bowler cycle in a game for each bowler therefore effectively clearing the bowler memory by virtue of the destructive readout in a manner similar to that described above in conjunction with the flip-flops TTC and TTP.

S. Error Correction

The error correction system is shown in FIGS. 27A, 27B and 29 and includes 12 switches EC0, EC1, EC2, EC3, EC4, EC5, EC6, EC7, EC8, EC9 ECX and EC/ (FIG. 29). The switches EC0—EC/ are operated by pushbuttons respectively bearing the legends 0—9, X and / corresponding to pinfall inputs from zero to nine, a strike or a spare. The switches EC0—EC/ are arranged in series and a contact of the switch EC/ is grounded. The blade of the switch EC0 is connected through a resistor to a source of power and is also arranged to issue an ENTER EC PF signal to the error correction flip-flop 756 (FIG. 23C) in the scanning cycle control. It will be apparent that whenever all of the switches EC0—EC/ are closed, the potential thereat will be ground. However, when a selected switch is open, the potential at all lower switches will be substantially equal to the potential of the power supply and the ENTER EC PF signal will be issued. The blade of each of the switches EC1—ECX is utilized as an input to a respective AND gate 1002. The AND gates 1002 have a second enabling input from the output of the NOR gate 204 associated with the error correction station (see also, FIG. 6). The output of the AND gate 1002 associated with the switch EC1 is utilized as an input to the OR gate 207 associated with the flip-flop PR10 of the pinfall register (FIG. 7). The output of the AND gate 1002 associated with the switch EC2 is utilized as an input to the OR gate 207 associated with the flip-flop PR9 of the pinfall register...while the output of the AND gate 1002 associated with the switch ECX is connected as an input to the OR gate 207 associated with the flip-flop PR1 of the pinfall register. Thus, it will be apparent that when a bowler wishes to enter an error correction pinfall of four, the depression of the pushbutton associated with the switch EC4 will cause the AND gates 1002 associated with the switches EC1—EC4 to be disabled while enabling the AND gates 1002 associated with the switches EC5—EC/, provided of course that they also receive enabling inputs from the NOR gate 204 of the error correction station. Accordingly, the flip-flops PR7—PR10 of the pinfall register will remain reset to correspond to downed pins. The flip-flops PR1—PR6 will be set to correspond to standing pins by their respective OR gates 207 which have not been disabled. Thereafter, the error correction pinfall is treated by the computer as any other pinfall.

The arrangement of the switches EC0—EC/, the AND gates 1002 and the flip-flops PR1—PR10 of the pinfall register is such that for any pinfall entered by the error correction system less than 10, the flip-flop PR1 of the pinfall register will not be set to correspond to a downed pin. Thus, for error correction purposes, for any pinfall of less than 10, the one pin is always presumed to be standing. This precludes improper printing of a split symbol during an error correction procedure as the error correction system is not arranged to provide pin position information.

The pushbuttons associated with the switches EC0—EC/ are arranged to be locked in a depressed position when both error correction flip-flops 756 and 760 (FIG. 23C) are set. This precludes the changing of the error correction pinfall during computation by the computer. The function is achieved by a latch mechanism such as that shown in FIG. 31 and described hereinafter. The latch mechanism is operated by a solenoid 1004 in response to the ERROR CORRECTION PUSHBUTTON HOLD signal from the second error correction flip-flop 756 (FIG. 23C).

In order to set up frame information during an error correction procedure, a 10 position rotary switch 1006 is provided. The rotary switch 1006 is generally similar to rotary switches 900, 902 and 904 except that it is arranged to provide output signals to the frame counter on a strictly binary coded basis as opposed to a binary coded decimal basis. The wiper of the switch 1006 is normally connected to ground through the normally closed contacts 908*c* operated by the handicap entry relay 908. Thus, whenever the handicap entry relay 908 is not energized and the computer cycle control gating is issuing a READ ENTRY SWITCH signal, the condition manually set up on the rotary switch 1006 will be sensed by the flip-flops of the frame counter and they will assume the manually programmed condition for purposes of error correction computation.

In order to introduce cumulative score information, the rotary switches 900, 902 and 904 are used in a manner identical to the handicap entry procedure during error correction and the manually programmed information will be directed to the BCD up counter in the same manner.

In order to direct the error correction to the proper bowler, a ganged set 1007 of five, six position rotary switches are used, only three of which are shown. A first rotary switch 1008 serves to direct the printer to the proper bowler line. The remaining four rotary switches, only two of which are shown and designated 1012 and 1014, correspond to the six bowlers on each of the four lanes and are used to select the proper bowler memory word. The five ganged rotary switches may be rotated to any one of six positions corresponding to the bowler line of bowlers 1—6. The switch 1012 provides memory word selection for the bowlers of Team A or lane one and the switch 1014 provides a similar function for the bowlers of Team B or lane two while the two switches not shown provide for memory word selection for Team C or lane three and Team D or lane four.

The wipers of the switches 1012 and 1014 are connected thru normally open contacts 912*a*, which are closed when the corresponding relay 912 is energized by the closing of the team entry switch 910, and normally closed contacts 908*b* operated by the handicap entry relay 908 to the scanning cycle control to receive the SCORE ERROR CORRECTION signal.

If bowler number one on team A desires to make a correction in his score, he will set the rotary switches 900, 902 and 904 to his last correct cumulative score. Additionally, he will set the rotary switch 1006 to the frame in which the last correct cumulative score was obtained.

The bowler will also manipulate the five ganged rotary switches 1007 to the proper one of the six positions corresponding to his identification. The bowler will then press the corresponding team A entry switch 910. This will cause the relay 912 to become energized and close the set 762A of the sets of four parallel sets of contacts 762A—762D comprising the relay contacts generally designated 762 as seen in FIG. 23C. This in turn will cause the flip-flop 758 to be set. This will cause the second error correction flip-flop 756 to become set when one of the switches EC0—EC/ is opened by a bowler causing the ENTER EC PF signal to be issued. Accordingly, the depressed pushbutton will be locked in position and a SCORE ERROR CORRECTION signal will be generated when the scanning cycle control locks on the error correction system.

It will be recalled from the discussion of handicap entry that when a team entry switch 910 is closed, the printer associated with that team or lane will be started to search for the proper bowler line. Simultaneously with the energization of the relay 912, the relay 914 is energized to close contacts 914*a* such that the printer will be stopped at the contact 1B—6B (FIG. 5) that has been deenergized by the rotary switch 1008 and open contacts 914*b* (FIG. 30A) to disconnect the bowler identification system from the contacts 1B—6B. As may be seen from FIG. 27B the wiper of the switch 1008 is arranged such that each of the contacts 1B—6B will be energized except for that corresponding to the bowler being identified by the switch 1008. When the printer is in position, the computer cycle control will initiate cycle C in response to input signals from the error correction system and each of the manual input switches will be read and scoring will proceed. The information will be directed to the proper bowler by virtue of one of the switches 1012 or 1014 or the two switches not shown and will issue a 1A—6D signal to the memory word selection logic. This will occur due to the closing of a contact 912*a* in response to the energization of a relay 912 by the closing of the switch 910 by the bowler whose score is to be corrected. Since only one of the switches 910 will be closed at a time, only one of the switches 1012 or 1014 or the two switches not shown will be able to receive the energizing SCORE ERROR CORRECTION signal from the scanning cycle control through the closed contacts 908*b*. As a result, the wiper of one of the switches 1012 or 1014 or the switches not shown will be energized and will provide power to the lead to issue one of the signals 1A—6D to the memory word selection logic to energize an appropriate read switch therein and select the proper word in the memory. Since all information required to form a bowler's state has been set up on the manually operated switches, and all such information has been set up to correspond to the last correct score, the bowler state control will compute a new state for the bowler corresponding to the proper one for the pinfall data set up on the manually operated switches and will proceed with computation in the manner previously described. Such computation will proceed until the cycle is complete as indicated by the CYCLE COMPLETE (DELAYED) signal issued by the computer cycle control which will cause resetting of the error correction flip-flops. As a result, the error correction pinfall pushbuttons will no longer be held in a depressed position and the bowler may readjust the switches EC0—EC1 such that additional error correction pinfall may be introduced to the computer. During such further introduction of error correction pinfall, the relays 912 and 914 will be maintained energized until such time as the bowler completes error correction pinfall introduction. When such is done, the bowler will open a switch 1016 to thereby interrupt the flow of power to the relays 912 and 914. Preferably, the switch 1016 may be operated by a cover for housing the manually operated switches of the error correction and handicap entry system. If such an arrangement is used, it will be apparent that the error correction and handicap entry system will be deenergized during such times as the cover is closed but energized when it is open by a bowler for purposes of making an error correction or introducing handicap values.

It will be observed that the just described arrangement permits error correction to be made with relation to a plurality of frame and box scores without reidentifying the bowler for which the error correction is to be made and without further adjustment of any of the switches other than those used for the introduction of pinfall values (EC0—EC/). This feature of the invention is derived by virtue of the use of the pulse forming AND gate 760 (FIG. 23C). When the first error correction pinfall has been introduced by means of manipulation of the various switches and the flip-flops 756 and 758 have been reset by the CYCLE COMPLETE (DELAYED) signal, the flip-flop 758 cannot again be set until the relay 912 is deenergized by the opening of the switch 1016 which, it will be recalled, is opened only when the error correction is complete by virtue of the closing of the cover housing the error correction switches. It will be apparent that this is due to the fact that the AND gate 760, as noted above, is of the pulse forming type. However, the flip-flop 756 may be set a second time independently of the opening of the switch 1016 by opening a selected one of the switches EC0—EC/. Thus, when the bowler makes a further error correction entry, the opening of a selected one of the switches EC0—EC/ will cause the issuing of the ENTER EC PF signal to once again set the flip-flop 756, which condition will ultimately be detected by the scanner, and the SCORE ERROR CORRECTION signal will be issued to initiate another round of computation utilizing the manually entered error correction pinfall. This procedure may be repeated until the error has been corrected and the score brought up to date corresponding to the frame or frames left to be bowled by the bowler.

It should be noted that cumulative score and frame information set up on the switches 900, 902, 904 and 1006 preliminarily to the initial error correction cannot be utilized by the computer as the computer cycle control gating issuing the READ ENTRY SWITCH signal is disabled by the first resetting of the flip-flop 758. Similarly, the blocking of entry of information in the memories is precluded by the resetting of the flip-flop 758. Thus, a plurality of error correction pinfall values may be introduced in quick succession by adjusting the switches 900, 902, 904, 1006, 1007, 910 and one of EC0—EC/ for the first error correction pinfall value and thereafter merely by manipulation of the switches EC0—EC/.

T. Bowler Identification

Figure 30A:
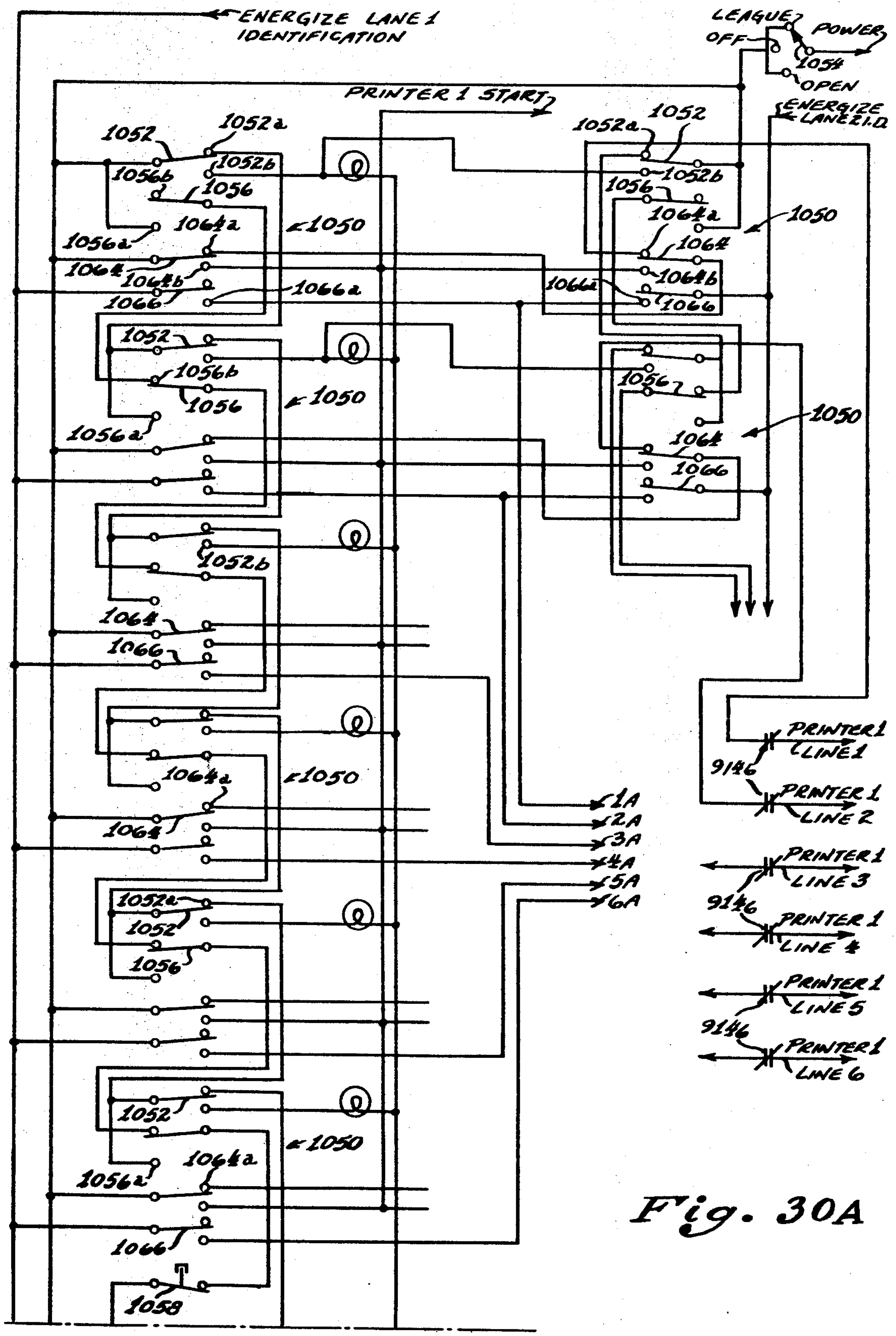
FIG. 30 is a schematic illustration of a bowler identification system for identifying bowlers to the computer and is comprised of FIGS. 30A and 30B.
FIG. 30B is to be placed adjacent the lower edge of FIG. 30A.
Figure 30B:
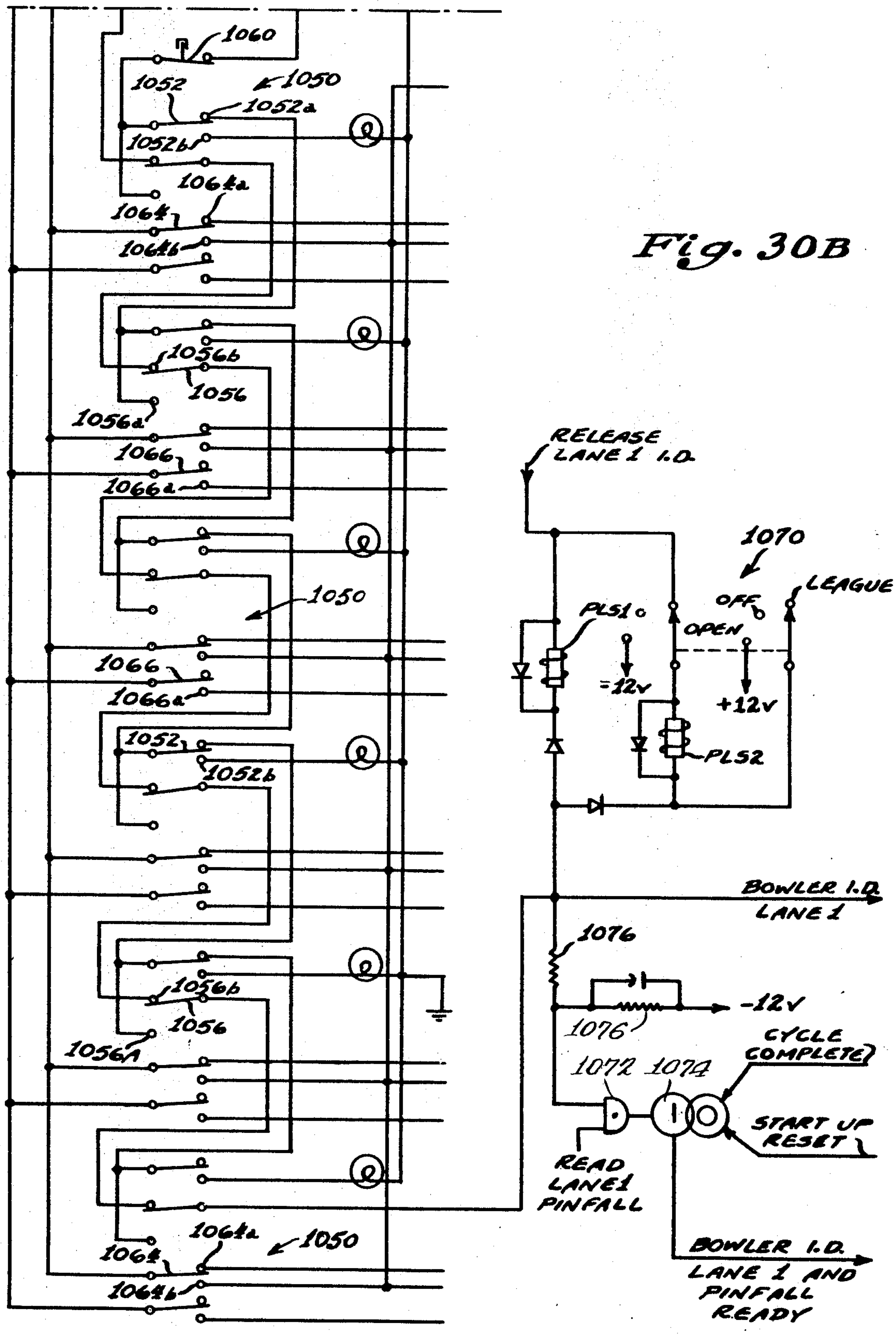

The bowler identification provides means for selecting the proper word in the computer memory together with means for positioning the printer at the proper bowler line on a score sheet. As shown in FIGS. 30A and 30B, the bowler identification comprises 24 manually operated switching devices 1050 for each lane pair, only 14 of which are shown, and which may be arranged on a panel adjacent each lane pair. Twelve of the switching devices 1050 are arranged for use with respect to one of the lanes of the lane pair while the other 12 switching devices 1050 are arranged for use with the other lane of the lane pair. In league bowling, a team and an associated pace bowler will use six of the switching devices 1050 associated with each lane while the other team will use the six switching devices 1050 associated with each lane not used by the first team. In the open bowling mode, only six of the switching devices 1050 associated with each lane will be used.

Each of the switching devices 1050 is essentially comprised of four ganged switches. A first switch 1052 may be closed either between a contact 1052*a* or a contact 1052*b*. The switch 1052 is connected to a source of power through a three position switch 1054 that is arranged to provide power to the switch 1052 when it is either a "league" or "open" bowling position and to cut off power to the switch 1052 when it is in an "off" position.

When the switch 1052 is closed between the contact 1052*a*, the latter will supply power from the switch 1054 to the switching device 1050 associated with bowler number two of Team A on lane one. Specifically, the power is directed to a similar switch 1052 and to a contact 1056*a* of a second one 1056 of the four ganged switches.

The switch 1056 includes a second contact **1056*b* which is arranged to be closed whenever the switch 1056 is not closed through the contact 1056*a*. The switch 1056 associated with the first switching device 1050 for a given lane is connected to the contact 1056*b* of the switch 1056 for the second switching device 1050 associated with that lane. This arrangement is continued through each of the 12 switching devices 1050 associated with a given lane for issuing a BOWLER ID LANE 1 signal for purposes as will be seen when one of the switching devices 1050 is actuated. However, a first bowler identification release switch 1058 is placed in the line between the switch 1056 of the sixth switching device 1050 and the contact 1056*b* of the seventh switching device 1050. A similar switch 1060 is placed in the line between the contact 1052*a* of the sixth switching device 1050 and the switch 1052 of the seventh switching device 1050. The 12 switching device 1050 associated with each lane is connected to a switch locking solenoid that will be described in greater detail hereinafter. Thus, it will be apparent that when all of the switching devices 1050 are in the position shown in FIGS. 30A and 30B, the switch locking solenoid will be connected to power. However, when one of the switching devices 1050 is moved to a depressed position by the pushing of the manual push button associated therewith, each switch 1056 on the subsequent switching devices 1050 will receive power from the switch 1056 on the depressed switching device 1050 due to the latter's closing with the contact 1056*a* which is connected to a source of power through the contact 1052*a* and the switch 1052 of each preceding switching device 1050. Accordingly, the depressing of the push button associated with any of the switching devices 1050 will cause energization of the switch locking solenoid to maintain the depressed switching device 1050 in its depressed position, as will be seen. Upon such an occurrence, the depressed switching device 1050 will have its switch 1052, which will be connected to a source of power through the source of path just mentioned, closed through contact 1052*b*. The contact 1052*b* is connected to a second contact 1052*b* associated with the switching device 1050 on the second lane which the same bowler on a team will depress when he is bowling on the second lane in league bowling. Both of the contacts 1052*b* are connected through lamps 1062 to ground. Thus, when a given bowler on a team depresses the switching device 1050 on either lane one or two, depending upon which lane he is about to bowl, the lamp 1062 associated with that bowler will be lit. The lighting of the lamp 1062 may serve as a visual indication that the bowler has identified himself and should be about to bowl. If desired, the lamp 1062** may be utilized to illuminate a small translucent plate on which the bowler's name may be directly written or placed by means of transparent or translucent tape or paper.

The four ganged switches comprising each switching device 1050 include a third switch 1064 which may be closed either between contacts **1064*a* or 1064*b*. The switch 1064 is connected to the source of power through the switch 1054. A contact 1064*a* on the first lane of the lane pair is connected to the switch 1064 of the corresponding switching device 1050 on the second lane pair. The contact 1064*a* of the switching device 1050 associated with the second lane of the lane pair is connected to a contact 1B—6B in the printing device associated with lane one through normally closed contacts 914*b* operated by relay 914 of the error correction system. Thus it will be apparent that when either the switch 1064 associated with the given bowler on lane one is not closed through the contact 1064*a* or the corresponding switch 1064 is for the same bowler on lane two is not closed through the contact 1064*a*, the contact 1064*a* of the switching device 1050 on lane two will be deenergized. Such deenergization of the contact 1064*a* associated with the second lane of the lane pair will cause the printer to stop at the box score level on the score sheet of the particular bowler line associated with the bowler who actuated the switching device 1050** on either lane one or lane two, as described previously, providing that neither error correction nor handicap entry is taking place in which case printer position is controlled by the error correction system.

The contacts **1064*b* in each of the first six switching devices 1050 for each of the lanes one and two are connected together and are directed to the printer for lane one to issue a PRINTER ONE START signal whenever one of the switching devices 1050 is depressed. It will be apparent that the PRINTER ONE START signal is issued by virtue of the connection of a contact 1064*b* to the source of power through the switch 1054 by the closing of the switch 1064** in response to the depression of the switching device pushbutton.

The contacts **1064*b*** for each of the last six switching devices on both lane one and lane two are similarly connected together to issue a PRINTER TWO START signal in a similar manner.

The fourth of the ganged switches in each of the switching devices 1050 is designated 1066. Each of the switches 1066 of the switching devices 1050 associated with one lane are connected in common and may receive an ENERGIZE LANE 1 ID signal from the scanning cycle control. The switches 1066 associated with the switching devices 1050 for the second lane in the lane pair are connected in common and are adapted to receive an ENERGIZE LANE 2 ID signal from the scanning cycle control. Each switch 1066 may be closed through a contact **1066*a* which is connected to the contact 1066*a* in the corresponding switching device 1050 for the other lane of the lane pair. Both of the contacts 1066*a* are connected to the corresponding reed relay in the memory word selection logic for a given bowler. Thus, when a switching device 1050 is depressed on lane one, the ENERGIZE LANE 1 ID signal from the scanning cycle control will cause the reed relay associated with the switching device 1050 to be energized and select the appropriate bowler memory word as described previously. The signals issued by the switches 1066** when closed are labeled 1A—6A to illustrate that the first through sixth bowler on team A has identified himself, respectively.

The signals from the switching devices 1050 for each of the possible 24 bowlers bowling on the four lanes handled by the computer 1A—6D are also directed to the particular team or lane printer contacts A1—A6 (FIG. 5) to provide a test of whether a bowler on a team or lane has identified himself and the printer is in the proper position to print that bowler's score information.

As mentioned previously, it is desirable to provide means for locking a depressed pushbutton associated with each switching device. The reasons for such an arrangement are twofold. In the first place, the switching devices should be spring-biased such that they assume the positions normally shown in FIGS. 30A and 30B. This permits the bowler panel to be in a condition where no bowler is identified. Accordingly, if pinfall is achieved when a bowler has not identified himself, it will not be credited to the previous bowler as when the pushbutton of the previous bowler was released from its depressed position, its associated switching device can no longer provide the computer with bowler identification. In the second place, the locking of a depressed pushbutton in a depressed position prevents accidental erroneous changing of bowler identification. For example, if a bowler had rolled the first ball in a frame and was awaiting the rolling of a second ball, erroneous computation would obviously result if the bowler identification was changed during this period.

A pair of pushbutton locking solenoids PLS1 and PLS2 are arranged for use in locking the 12 switching devices 1050 associated with each lane. The pushbutton locking solenoid PLS1 is arranged to lock the pushbuttons associated with the first six switching devices 1050 on the lane while the solenoid PLS2 is arranged to lock the pushbuttons associated with the second six switching devices 1050 associated with that lane. In the case of the pushbuttons associated with lane one, the solenoid PLS1 has one side thereof connected to the inverted output of the NOR gate 659 associated with lane one in the computer cycle control gating for receiving a RELEASE LANE ONE ID signal therefrom. The other side of the solenoid PLS1 is connected to the switching devices 1050 to receive a BOWLER ID LANE ONE signal therefrom whenever they are depressed. The solenoid PLS2 includes a similar connection to the bowler panel for receiving the BOWLER ID LANE ONE signal therefrom and a second connection to a three position switch 1070. When the switch 1070 is moved to the "league" position, the solenoid PLS2 will have its second connection in common with the solenoid PLS1 to the computer cycle control gating. When the switch 1070 is in the second or "off" position, it cannot be energized while if the switch 1070 is moved to the third or "open" bowling position, it will be constantly energized. In this respect, it will be apparent that during open bowling, the second six switching devices 1050 cannot be depressed. This is a necessary feature insofar as such switching devices correspond to the team that started out on the second lane of the lane pair if in league bowling or to the bowlers bowling on the second lane of the lane pair in open bowling and the depression of such a pushbutton during open bowling would cause pinfall values obtained on the first lane of the lane pair to be directed to the bowler memories for the bowlers bowling on the second lane of the lane pair. Similarly, frame, state and score information from the bowler memories of the bowlers bowling on the second lane of the lane pair would be used to compute the score obtained as a result of the pinfall on the first lane on the lane pair. Obviously, if such were permitted, the resulting computed scores would be a hopeless jumble of erroneous pinfall entries.

When the switch 1070 is in the "league" position, and any one of the twelve pushbuttons associated with a lane are depressed, both of the solenoids PLS1 and PLS2 will be energized to lock all pushbuttons in the desired position.

Thus, when a bowler has depressed a pushbutton to cause the issuance of a BOWLER IDENTIFIED LANE ONE signal, the solenoids PLS1 and PLS2 will be energized and will be maintained energized until the RELEASE LANE ONE ID signal is generated. It will be recalled that such a signal is generated whenever a bowler's state is updated to a first ball state at the end of a bowler's cycle and when the computers cycle is complete. Thus, when a bowler has completed a frame as evidenced by the updating of his state to a first ball state and the computer cycle is complete, the solenoids PLS1 and PLS2 will be deenergized thereby permitting the detained pushbutton to be urged upwardly from its previously depressed position by a spring associated therewith. At this time, the bowler panel is in a condition such that a subsequent bowler may depress a pushbutton to identify himself to the computer whereupon the cycle will be repeated.

Figure 23B:
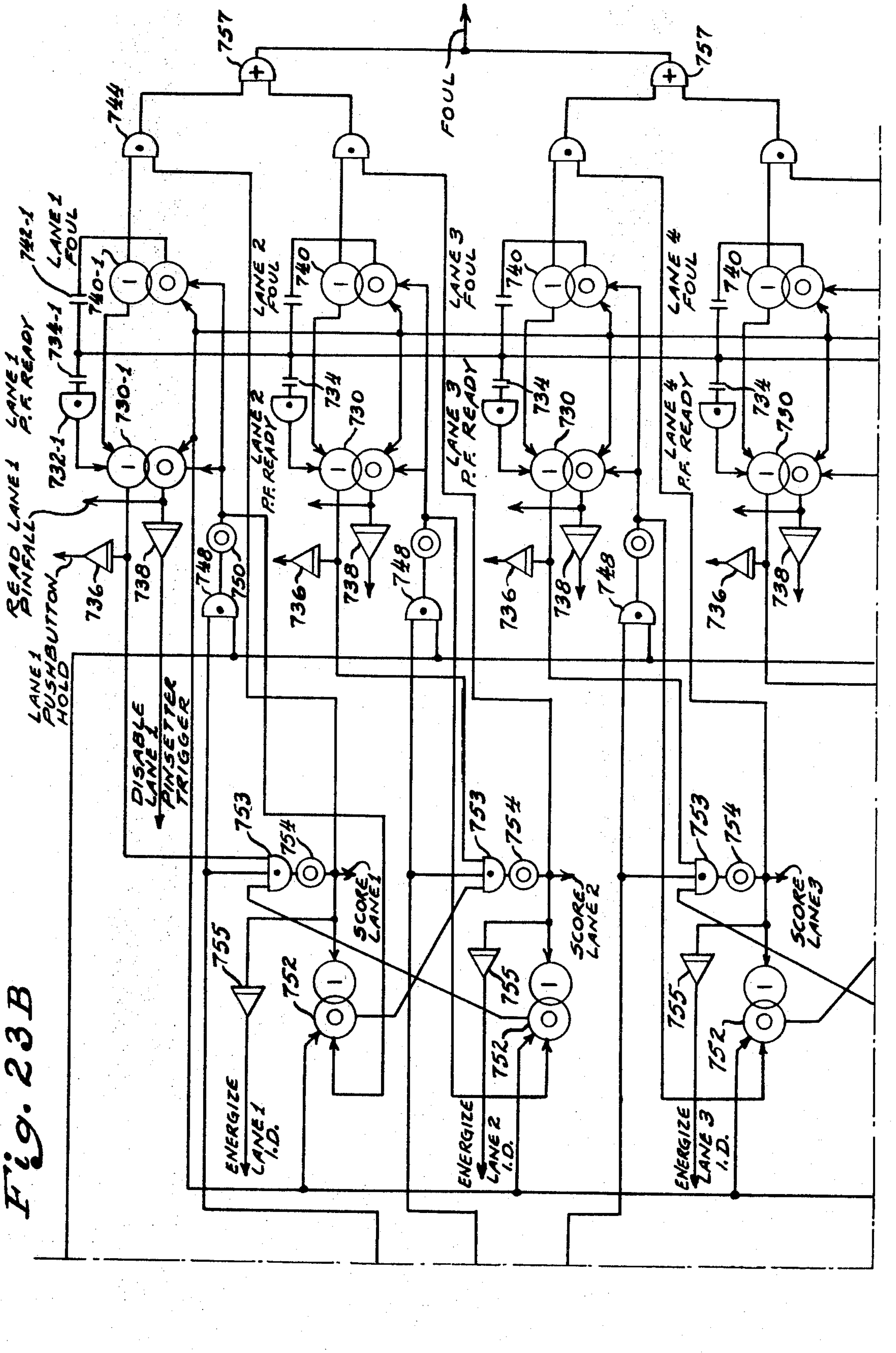

As will be seen hereinafter, means are provided for controlling the operation of an automatic pinsetter. The BOWLER ID LANE ONE signal is used in conjunction with pinsetter control together with foul detection and verification. In order to provide various necessary signals for such control functions, an AND gate 1072 is utilized to set a flip-flop 1074. The AND gate 1072 has a first input for receiving a READ LANE ONE PINFALL signal from the flip-flop 730-1 of the scanning cycle control (FIG. 23B). A second input to the AND gate 1072 is connected to the common junction of a pair of resistors 1076. One of the resistors is connected to a source of power while the other is connected to the bowler panel to receive the BOWLER ID LANE ONE signal which is generated whenever a pushbutton associated with the switches 1050 for lane one is depressed. When the BOWLER ID LANE ONE signal is generated, and the READ LANE ONE PINFALL signal is present, the AND gate 1072 will be enabled to set the flip-flop 1074.

The output from the set section of the flip-flop 1074 issues a BOWLER ID LANE ONE AND PINFALL READY signal which energizes a relay PHK (FIG. 34) to close a set of contacts PHK*a* to connect the pushbutton locking solenoids PLS-1 and PLS-2 to a source of power independently of the path to a power through the pushbutton release switches 1058 and 1060. Accordingly, when the flip-flop 1074 is set in response to the presence of pinfall and bowler identification, it will be apparent that a depressed pushbutton will be held in such a position until such time as a RELEASE ONE ID signal is generated, thus precluding the possibility of changing bowler identification before computation for a second ball in a frame is completed. The flip-flop 1074 additionally includes a pair of inputs to its reset section for receiving CYCLE COMPLETE and STARTUP RESET signals for the purpose of resetting the flip-flop 1074.

Turning now to FIG. 31, one form of latching mechanism for locking a pushbutton in a depressed position is shown. The latching mechanism includes a solenoid actuator SOL which may be the solenoid PLS1 or PLS2 of the bowler panel or the solenoid 1004 (FIG. 27A) of the error correction system. The solenoid SOL operates a slidable latch bar 1078 having a plurality of hook-shaped notches 1080 in its upper surface.

Pushbuttons 1082 are provided with internal slots 1084 through which the slide bar 1078 passes. The upper portion of each slot 1084 is bridged by a transverse pin 1086 which may be received in the hook-shaped slot 1080 when the pushbutton 1082 is depressed.

Each pushbutton 1082 has a cam surface 1090 which causes movement of a leaf spring 1092 when the pushbutton 1082 is depressed. The leaf spring 1092 serves as an actuator for switch blades 1094 which may comprise the switching devices 1050 of the bowler panel or the switches EC0—EC1 of the error correction system, although the lower end of the pushbutton 1082 may be used for the switch actuator if desired.

Coil springs 1094 are associated with each pushbutton 1082 for normally urging the pushbutton upwardly from a depressed position.

When the solenoid SOL is energized, the latch bar 1078 will move to the right as seen in FIG. 31 against the bias of a spring (not shown) which normally urges the latch bar 1078 to the left, which is the unlatching position. Rightward movement of the latch bar 1078 will cause a pin 1086 of a depressed pushbutton 1082 to be latched in the slot 1080. At this time, other ones of the pushbutton 1082 cannot be depressed as the upper surfaces 1088 of the latch bar 1078 will have been moved to positions underlying the pins 1086 to preclude downward movement thereof. When the solenoid SOL is deenergized, the latch bar will be moved to the left under the influence of the biasing spring (not shown) and the spring 1094 will cause the pushbutton 1082 to move upwardly.

As will be obvious to those skilled in the art, a single latch mechanism such as that just described may be employed with any number of pushbuttons simply by lengthening the latch bar 1078 and increasing the number of hook-shaped slots 1080 therein.

U. Split Detection

The invention includes means for detecting the presence of splits bowled on each of the four lanes and for issuing an output signal indicative of the presence of a split. The American Bowling Congress, in the Rules for the 1962—63 season, has defined a "split" substantially as follows. "A split shall be a set up of pins remaining standing after the first ball has been legally delivered provided the headpin is downed, and (1) At least one pin is downed between two or more pins which remain standing, as for example: 7—9, 3—10. (2) At least one pin is downed immediately ahead of two or more pins which remain standing, as for example: 5—6."

It is possible to derive a logical equation that will be true when any one of the many permutations and combinations of standing pins is arranged in a pattern constituting a split within the above definition. One such simplified logical equation is as follows:

$$S=\overline{1}\{10[\overline{6}(3+9)+\overline{3}(5+8)+2+4+7]+7[\overline{4}(2+8)+\overline{2}(5+9)+3+6]+8.\overline{5}[3+9]+4[\overline{2}(5+9)+3]+6[\overline{3}(5+8)+4]+2[\overline{5}.9+6+3]\}$$

Where:

S represents the presence of a split

1—10 represent standing pins in their conventional position, and $\overline{1—10}$ represent downed pins in their conventional positions.

Figure 32:
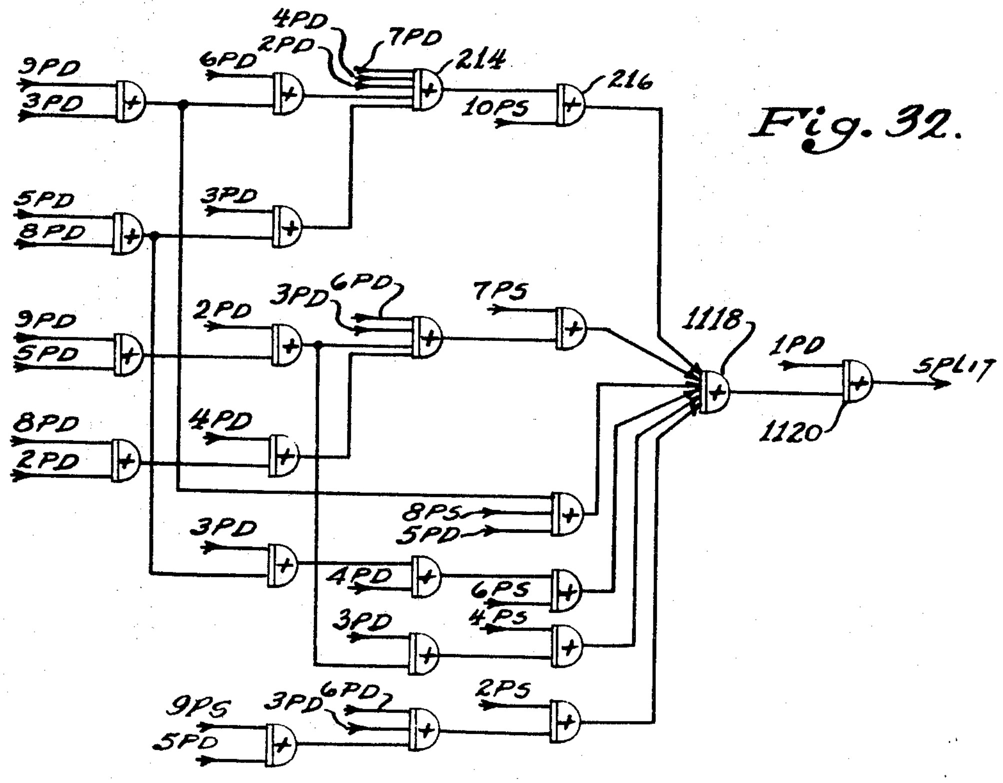
FIG. 32 is a logic diagram of the split detection logic.

This simplified logical equation is implemented with a plurality of electronic gates such as the NOR gates shown in FIG. 32. The various inputs of the NOR gates are connected as noted in the various outputs of the set and reset sections of the flip-flops PR1—PR10 of the pinfall register described above. As will be apparent to those skilled in the art, the NOR gates are arranged with respect to their inputs and to each other to issue a split signal when the above logical equation is true.

A typical split detecting operation is as follows. It will be recalled that in the description of the pinfall register, it was indicated that the outputs 1PD—10PD have no signal thereon when the pin to which they correspond is downed, but have an output signal when the pin is standing. Similarly, there is no signal on the 1PS—10PS terminals when the pin to which they correspond is standing but that there is an output signal when that pin is downed. It will also be recognized that the general character of a NOR gate is such that there is no output therefrom when the gate receives one or more inputs. Accordingly, if it be assumed that a 7—10 split exists, a NOR gate 1114 will receive an input signal on its input 7PD. Accordingly, the NOR gate 1114 will have no output. A subsequent NOR gate 1116 will not receive an input from the NOR gate 1114 nor will it receive a signal on its 10PS input. Accordingly, the NOR gate 1116 has an output which serves as an input signal to a NOR gate 1118. The presence of an input signal at the NOR gate 1118 causes the latter to fail to issue an output and, as a result, a NOR gate 1120 is lacking at least one input signal. Since the other input of the NOR gate 1120 is connected to the 1PD output of the pinfall register, and the one pin is down, a signal will not be received on its 1PD input. Accordingly, the NOR gate 1120 does not have an input and will have an output which indicates the presence of a split. For the sake of brevity, it is not believed necessary to consider the occurrences at the various unnumbered NOR gates. However, an examination of the logic in the light of the assumed split condition will indicate that the NOR gate 1118 receives an input signal only on its input lead from the NOR gate 1116, the remaining input connections having no signals thereon.

While the logic shown in FIG. 32 is capable of detecting any split within the definition of a split set forth by the American Bowling Congress, it will be readily apparent to those skilled in the art that many splits which the above-described logic is capable of detecting occur only rarely and/or may not be considered splits by the average, uninformed bowler. As a result, it is possible to simplify considerably the logic required if it only be desired to detect certain commonly occurring, well-known splits such as the 5—7, 5—10, 2—7, 3—10, 6—7, 4—10 and 7—10. Accordingly, the split detection system described above is not to be limited to a system precisely following the above-noted logical equation, but rather, should be considered to include simplified systems that are merely capable of substantially following but a portion of the above described logical equation that detect, as for example, the above-noted seven commonly occurring splits.

V. Pinsetter Mechanical Modifications and Related Circuitry

As has been noted previously, the computing device of the instant invention is adapted for use in conjunction with an automatic pinsetter. In particular, in the exemplary embodiment of the invention, the pin detecting switches of the pinsetter are used to provide the computer with pinfall information. Similarly, the pinsetter is modified to provide the computer with a signal to set a corresponding one of the flip-flops 730 of the scanning cycle control to indicate that pinfall is ready on the lane with which the pinsetter is associated. Additionally, the computer is arranged to stop a selected pinsetter with its rake down to indicate to a bowler that another ball should not be rolled as the computer has not yet digested previously obtained pinfall information or that bowler identification is required. Finally, the computer and the pinsetter are arranged to provide automatic cycling of the pinsetter in situations involving a first ball foul or the third ball in the tenth frame. The manner in which these functions are accomplished is described in greater detail hereinafter.

Specifically, the computer is particularly well adapted to be used in conjunction with a Brunswick Model A-2 pinsetter which is the current commercial automatic pinsetter marketed by the Brunswick Corporation.

The Model A-2 pinsetter in its unmodified form may undergo two cycles. One cycle is used following the rolling of a first ball in a frame while the other cycle takes place after the rolling of a second ball in a frame. Accordingly, such cycles will be termed hereinafter a first ball cycle and a second ball cycle, respectively. Since identical modifications are made to each pinsetter and control circuitry therefor, only the modifications relative to the pinsetter and circuitry for lane one will be described.

1. Pin Detection During Second Ball Cycle

As set forth in the Brunswick Automatic Pinsetter Service Manual for the Model A-2 pinsetter, Brunswick part No. 12-752828, each complete cycle of the pinsetter is considered to be 360°. The pinsetter is designed to be able to stop at a quarter cycle (90°), a half cycle (180°), three quarters of a cycle (270°), and a full cycle (360°), although in its normal adjusted state it will not stop at 270°.

During a first ball cycle when the bowler has bowled a strike, the deck of the pinsetter is lowered at 90° and will find no standing pins. The deck then moves upwardly and the rake sweeps the fallen pins (deadwood) into the pit at 180°. At 270°, the deck comes down and spots a new set of pins on the lane. The deck and the rake will then return upwardly to their original positions at 360° and the lane is ready for the next ball.

During a first ball cycle when standing pins are detected, the lowering of the deck at 90° will cause the detection of standing pins. At 180°, the pin gripping scissors associated with the deck grip the standing pins while the deck returns upwardly and the rake sweeps the deadwood into the pit. At 270°, the deck returns downwardly and respots the standing pins. At 360°, the deck and rake return to their original positions and the lane is ready for the second ball in the frame.

During a normal second ball cycle, the deck will not be moved downwardly at 90° while at 180°, the rake will sweep the deadwood into the pit. At 270°, the deck will come down and spot a new set of pins while at 360°, the deck and rake will have returned to their original positions and the lane is ready for the next ball.

Figures 33, 35:
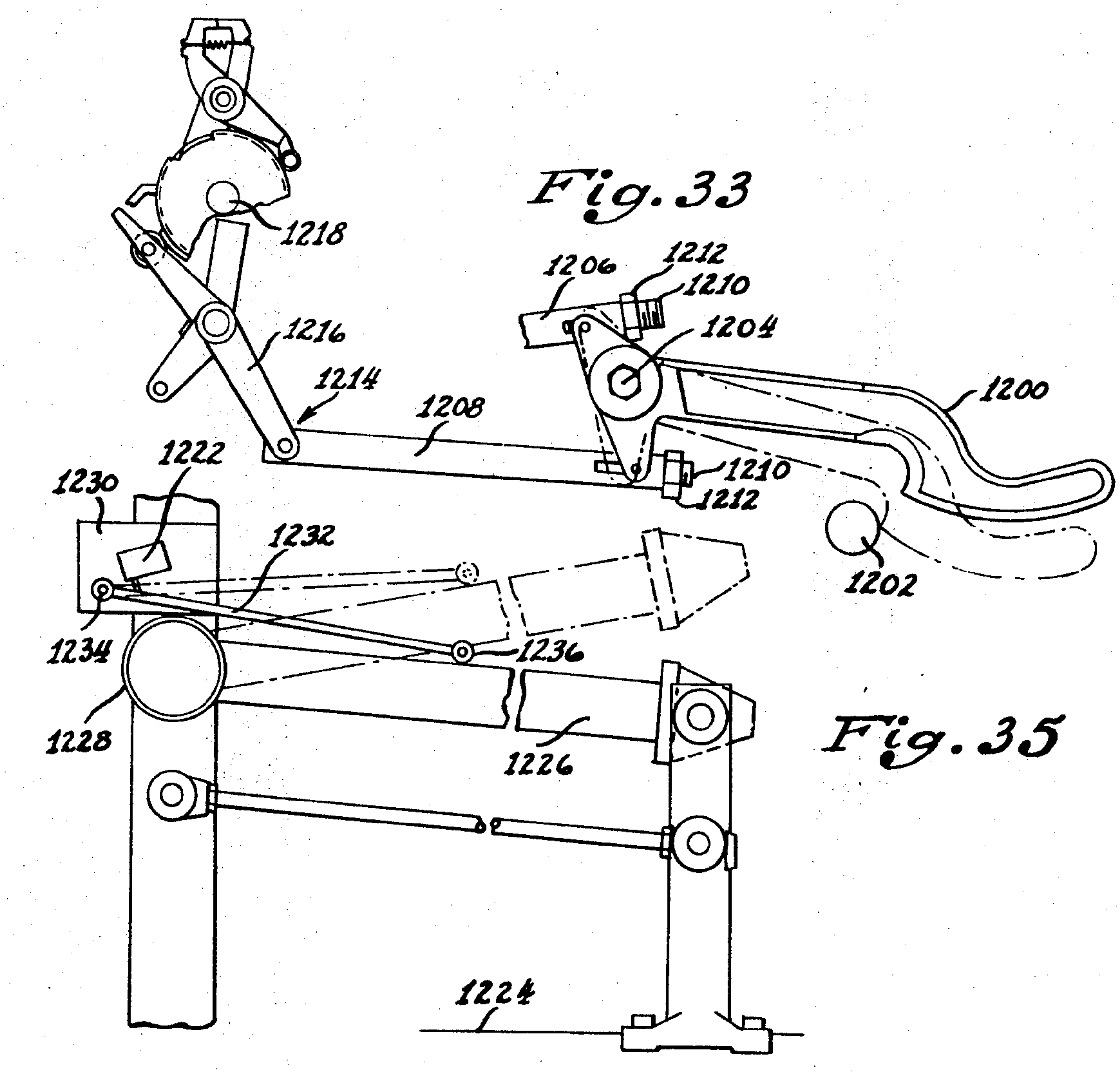
FIG. 33 illustrates a modification made to an automatic pinsetter to achieve pin detecting during a second ball cycle.
FIG. 35 is an illustration of a mechanical switching device used in conjunction with an automatic pinsetter for informing the computer when the pinsetter has detected out-of-range pins.

From the foregoing, it will be apparent that during a second ball cycle, the pinsetter deck is not moved downwardly at 90° to detect whether or not pins remain standing. Thus, in an unmodified Model A-2 pinsetter, the pin detecting means associated therewith would be inoperative to provide the computer with information relative to the pinfall achieved on a second ball. In order to provide for the lowering of the deck at 90° during a second ball cycle such that pinfall following a second ball may be detected, a slight modification is made to the pinsetter. As will be apparent to those skilled in the art, the lowering of the deck at 90° during a second ball cycle is normally restrained by a deck holding hook 1200. As seen in FIG. 33, the deck holding hook in an unmodified Model A-2 pinsetter is normally arranged with respect to a pin 1202 on the deck support arm in the manner shown in dotted lines. The deck holding hook 1200 is pivoted at 1204 and its attitude may be varied by movement of an upper control link 1206 and a lower control link 1208. The attitude of the deck holding hook 1200 may be varied relative to the control links 1206 and 1208 by means of adjustment screws 1210 and lock nuts 1212.

In order to preclude the deck holding hook 1200 from engaging the pin 1202 during a second ball cycle, the lock nut 1212 associated with the upper control link 1206 is turned from a locking position such that the adjustment screw 1210 associated with the upper control link 1206 may be turned within the upper control link 1206 to cause the attitude of the deck holding hook 1200 to be raised with respect to its normal position to a new position such as that shown in solid lines in FIG. 32. Additionally, a lost motion connection 1214 between the lower control link 1208 and the deck holding hook selector 1216 is removed as by the use of a block such that the deck holding hook selector 1216 will be pivoted to the lower control link 1208 at the leftmost extent of the latter as seen in FIG. 33.

The deck holding hook 1200 is also used to engage the pin 1202 when an "out-of-range" pin is encountered during a first ball cycle. An out-of-range pin is a standing pin that has been moved either by the ball or another pin to a position where it cannot be detected by the pin detecting means on the deck of the pinsetter. It has been found that the modification and adjustment just described, while permitting the deck to lower to a pin detecting position during a second ball cycle, does not interfere with the deck holding function when an out-of-range pin is encountered during a first ball cycle. Thus, it will be apparent that a Model A–2 pinsetter adjusted and modified in the respects just mentioned will operate in its normal manner when an out-of-range pin is detected and will further detect standing pins during a second ball cycle.

2. Miscellaneous Switches

As will be seen, a number of switches have been added to the pinsetter and which are adapted to be opened or closed at various points in the pinsetter cycle. Such switches are operated at 105°, 90° and 330°, 270° and 350°, and their functions will be described in greater detail hereinafter. However, at the present it should be noted that the switches are operated by cams (not shown) mounted on an extension of the detector one-to-one shaft 1218 as seen in FIG. 32.

3. Pinfall Ready Circuit

Figure 34:
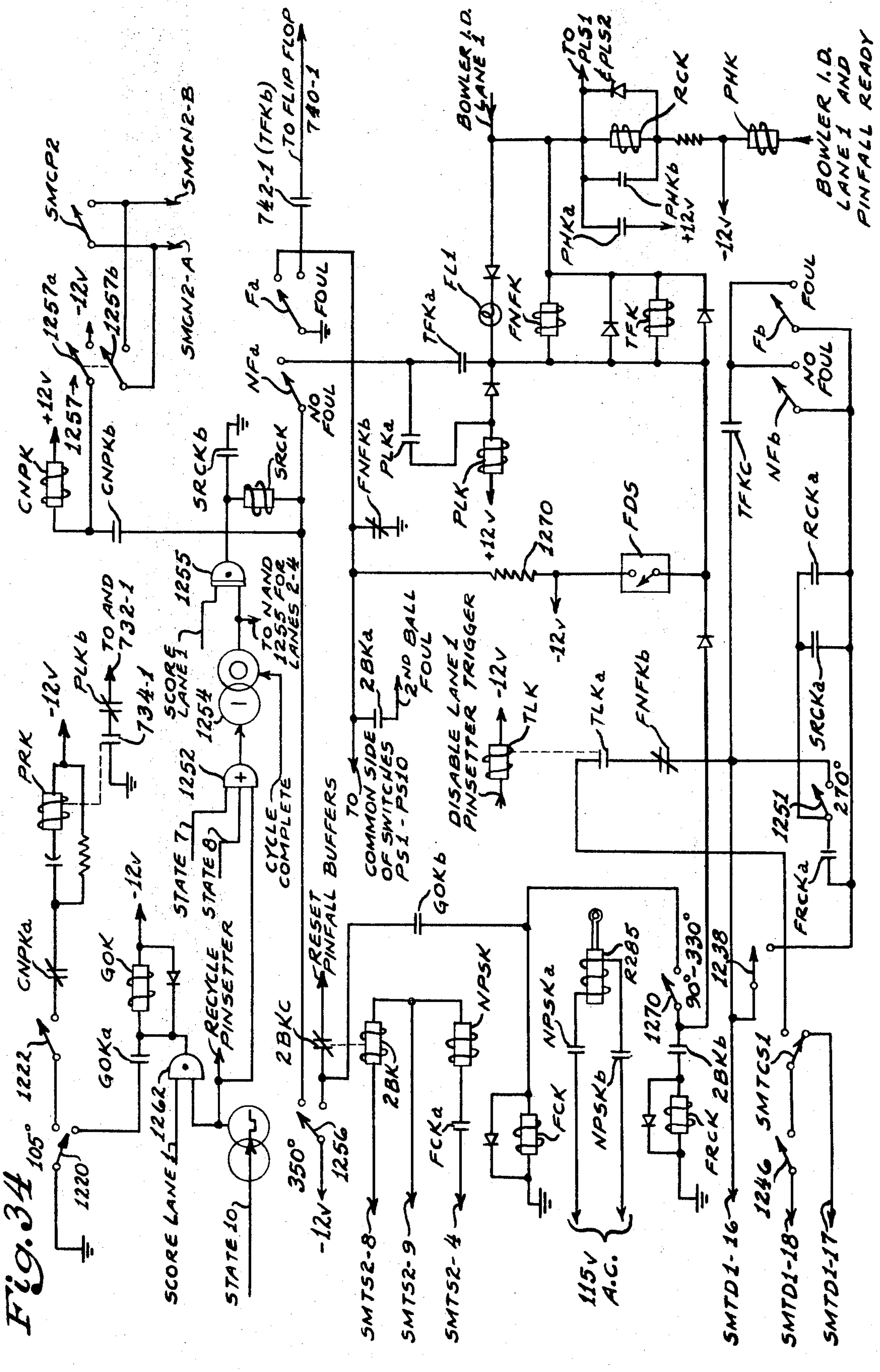
FIG. 34 is a schematic of miscellaneous circuitry used in foul detection, pinsetter control and the detection of the presence of pinfall.

A switch is normally used to cause the setting of the flip-flop 730 of the scanning cycle control for the lane with which it is associated at 105° of the pinsetter cycle. As seen in FIG. 34, one side of a 105° switch 1220 is connected to ground while the normally open contact thereof is connected to power through a deck down switch 1222, the normally closed contacts CNPK*a* of a relay CNPK, and a relay PRK. The relay PRK when energized, is operative to close the relay contacts 734–1 (FIGS. 33 and 23B) which are connected in series with ground, the normally closed contacts PLK*b* of a relay PLK and the AND gate 732–1 of the scanning cycle control (FIG. 23B). Thus, assuming that the deck down switch 1222 is closed and the relays CNPK and PLK are not energized, the closing of the switch 1220 at 105° will cause the energization of the relay PRK thereby closing the contacts 734–1 to cause the flip-flop 730–1 associated with lane one to be set. The setting of the flip-flop 730–1 will initiate operation of the computer in the manner described previously in conjunction with the scanning cycle control.

4. Out-Of-Range Pins

In a Model A–2 pinsetter, the deck thereof may be stopped at anyone of five levels in normal operation. Such positions are described in detail in said service manual. However, for the sake of brevity, it is only believed to be necessary to describe herein, the particular positions or levels of pertinence to the instant invention. Specifically, there are two pertinent levels of the pinsetter deck. The first is the "out-of-range" level while the second is the "standing pins" level. When the pinsetter encounters an out-of-range pin, it is stopped at the out-of-range level by its out-of-range pin mechanism. However, if an out-of-range pin is not encountered by the pinsetter deck, the deck will continue to lower until it is at the standing pins level. As seen in FIG. 35, the pinsetter deck 1224 is supported by a deck lift arm 1226. The deck lift arm 1226 may be raised or lowered by a deck lift shaft 1228. The solid line representation of the deck lift arm 1226 approximately represents the deck position at the standing pins level while the dotted line representation of the deck lift arm 1226 approximately depicts its position when the deck 1224 is at the out-of-range level. A bracket 1230 is mounted on the pinsetter frame and in turn has the deck down switch 1222 mounted thereon. An operator 1232 for the deck down switch 1222 is pivotally mounted at one end thereof as at 1234 to the bracket 1230 while the other end thereof mounts a roller 1236 which is adapted to ride on the upper surface of the deck lift arm 1226. The switch 1222 is arranged with respect to the actuator arm 1232 such that the switch will close at a point when the deck lift arm 1226 is approximately intermediate the dotted and solid line positions of the deck lift arm 1226 as seen in FIG. 35. Accordingly, it will be apparent that the deck down switch 1222 will be open when the deck 1224 is at the out-of-range level but will be closed when the deck 1224 is at the standing pins level.

It will be recalled that the deck down switch 1222 is interposed in the circuit between the switch 1220 (FIG. 34) and the relay PRK such that the flip-flop 730 associated with lane one and found in the scanning cycle control (FIG. 23B) cannot be set unless the deck down switch 1222 is closed. Thus, if the deck 1224 is at the out-of-range level, the computer will not stop at lane one and the pinfall thereon will not be detected to cause the erroneous computation of a score due to the presence of the out-of-range pin. When such a situation occurs, the pinsetter may be run through its normal out-of-range cycle by manual initiation thereof by a pinsetter mechanic or bowling lane manager. The pinfall obtained on the ball may be credited to the bowler by manual entry thereof through the error correction system. Once the out-of-range first ball cycle of the pinsetter has been completed and the pinfall manually entered, the bowler may resume bowling in the normal manner rolling the second ball of the frame and the pinsetter will function in the usual manner.

5. Indication of Lack of Bowler Identification

The instant invention contemplates means for indicating to a bowler when he has failed to identify himself to the computer. Specifically the rake of the pinsetter is left in a lowered position until the bowler has depressed a pushbutton associated with one of the switches 1050 (FIGS. 30A and 30B). Accordingly, several modifications are necessary.

Figure 36:
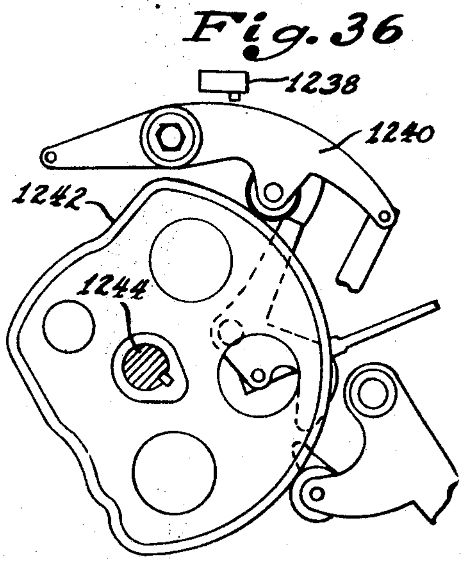
FIG. 36 illustrates a switch used with the scissors mechanism in an automatic pinsetter for determining whether the scissors have closed on standing pins.

Referring now to FIG. 36, a scissor switch 1238 is mounted in close proximity to the scissor cam follower 1240 of a Model A–2 pinsetter. As will be apparent to those skilled in the art, the scissor cam follower 1240 follows the moving deck-scissor cam 1242 which is mounted on the gear box one-to-one shaft 1244. The scissor switch 1238 is normally held open by the scissor cam follower 1240 but will be closed when the scissor cam follower 1240 is on the low dwell of the cam 1242 which, as will be apparent to those skilled in the art, occurs during a first ball cycle when standing pins are detected. The purpose of the scissor switch 1238 will be described in greater detail hereinafter.

Figure 37:
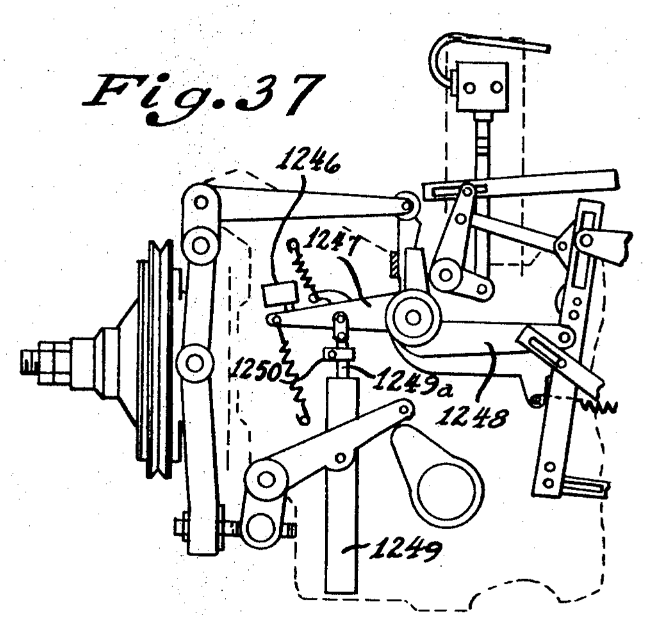
FIG. 37 illustrates a switch added to an automatic pinsetter for use in controlling the triggering thereof together with an adjustment to cause the pinsetter to stop at 270° of a cycle thereof.

Referring now to FIG. 37, a trigger silencing switch 1246 is mounted in close proximity to an extension of the left-hand end 1247 of the plunger lever 1248 of a Model A–2 pinsetter. The trigger silencing switch 1246 is arranged to be closed by the extension of the plunger lever 1248 when the pinsetter is at the 0° point in a cycle and serves merely to prevent false triggering of the pinsetter.

The modification to a Model A–2 pinsetter required to cause it to stop at 270° is shown in FIG. 37 and comprises merely an adjustment of already present structure. A dash pot 1249 has a piston rod **1249*a* connected to end 1247 of the plunger lever 1248. A stop collar 1250 is adjustably secured to piston rod 1249*a* such that its position relative to the piston rod 1249*a* may be changed. In a normally adjusted Model A–2 pinsetter, the stop collar 1250 is placed in a position on the piston rod 1249*a* that the pinsetter will not stop at 270° but by moving the stop collar 1250 downwardly (as seen in FIG. 37**)

on the piston rod 1249*a*, the pinsetter may be caused to stop at 270° of each cycle.

The normal manner of initiating a cycle of a Model A–2 pinsetter when the pinsetter is stopped at 0°, is by the striking of the pit cushion by a ball. The resulting movement of the pit cushion actuates a mechanical linkage which immediately causes the rake of the pinsetter to lower to indicate to the bowler that further balls should not be rolled. The motion of the lowering rake is used to trip a trigger switch SMTCS1 which initiates the pinsetter cycle after a predetermined time delay. The trigger switch SMTCS1 is referred to in said service manual as TCS1, the "SM" prefix used herein designating that, in every instance of its use, the connection or element corresponds to that designated in the service manual by the following reference symbol.

It will be recalled that at 270° of a pinsetter cycle, the rake of the pinsetter is in a lowered position. Means, to be described hereinafter, are provided for triggering the pinsetter to continue the cycling from 270° to 360° during various situations including that wherein the bowler has identified himself to the computer by depressing a push button on the bowler panel. However, when such a push button is not depressed on the bowler panel, the pinsetter will stop at 270° with its rake down to indicate to the bowler that a ball should not be rolled due to the fact that the computer, lacking bowler identification cannot credit the resulting pinfall to a bowler. In other words, when the pinsetter is stopped at 270° with its rake down, it serves to remind the bowler to identify himself to the computer by depressing a push button on the bowler panel.

Referring now to FIG. 34, the modified circuitry for controlling the triggering of the pinsetter at 270° is shown to comprise the conventional triggering switch SMTCS1 of a Model A–2 pinsetter. The common side of the triggering switch SMTCS1 is connected through the triggering silencing switch 1246 to the terminal SMTD1–18 of the pinsetter wiring. The normally closed contact of the triggering switch SMTS1 is connected to the terminal SMTD1–17 of the pinsetter wiring.

The triggering circuitry additionally includes a branch connected to the terminal SMTD1–16 of the pinsetter wiring through the normally closed contacts FNFK*b* and the normally opened contacts TLK*a* of the relays FNFK and TLK, respectively. The relay TLK is connected to the output of the inverter 738–1 of the scanning cycle control (FIG. 23B) and is normally energized thereby to close the contacts TLK*a*. However, when the flip-flop 730–1 of the scanning cycle control is set by the pinfall ready circuitry or the detection and verification of a foul, the inverter 738–1 will deenergize the relay TLK to open the contacts TLK*a*. Accordingly when a ball is rolled to close the triggering switch SMTCS1 through its normally open contacts, a circuit will be completed through that switch, the trigger silencing switch 1236, which it will be recalled is closed at 0°, the relay contact TLK*a* which may only be open after 105° of the pinsetter cycle to the dependence of the relay TLK of the flip-flop 730–1 and the pinfall ready circuitry or the verification of a foul, and the relay contact FNFK*b* which will be closed as a foul will have not been detected. This will cause the triggering of the pinsetter after a time delay and it will proceed through a cycle until it reaches 270°. If standing pins are detected, the scissor switch 1238 will be closed at 270° to thereby shunt the terminals SMTD1–16 and SMTD1–17. This will cause the retriggering of the pinsetter at 270° without a time delay and it will proceed through a complete cycle.

In the event that a strike was achieved, the scissor switch 1238 will not be closed and the pinsetter will be halted at 270° to await a new triggering impulse. If the strike was obtained in any frame but the 10th frame, a new bowler will be ready to bowl. If the bowler does not depress a pushbutton on the bowler panel, he will be reminded to do so due to the lowered position of the rake of the pinsetter at 270°. When the bowler depresses a pushbutton on the bowler panel, a BOWLER ID LANE ONE signal will be issued to energize a rake control relay RCK. When the relay RCK is energized, it will close normally open contacts RCK*a* which are connected in series with a 270° switch 1251 across the terminals SMTD1–16 and SMTD1–17. The resulting completed circuit will cause the triggering of the pinsetter without the time delay to cause it to go to 360°. The bowler may then proceed to bowl.

In certain tenth frame situations, the usual method of triggering the pinsetter at 270° (use of the scissor switch 1238) will not operate as standing pins will not remain on the lane. Specifically, states seven, eight and ten provide such situations. Accordingly, an OR gate 1252 is provided for receiving state seven and state eight signals together with a RECYCLE PINSETTER signal from a delay multivibrator 1253 in response to a STATE 10 signal applied thereto. When one of the aforementioned signals is present, the OR gate will cause the setting of a flip-flop 1254 which has an output from its reset section to the input of a NAND gate 1255. The NAND gate 1255 has a second input on which a SCORE LANE ONE signal may be received. When the flip-flop 1254 is set and a SCORE LANE ONE signal is present, the NAND gate 1255 will energize a special rake control relay SRCK through the normally closed contact of a 350° switch 125 which is opened at 350° of each pinsetter cycle. The energization of the relay SRCK closes contacts SRCK*b* which provide a holding circuit therefore together with contacts SRCK*a* which are arranged in parallel with the relay contacts RCK*a*. Thus, when states seven, eight or 10 occur, the resultant energization of the relay SRCK will cause the triggering of the pinsetter at 270°.

It should be noted that the method of triggering the pinsetter via the relay contacts RCK*a* during such tenth frame situations is inoperative as the relay RCK is deenergized when a bowler on a lane has identified himself and the pinsetter is ready to be utilized by the computer. Such deenergization of the relay RCK occurs by the shunting thereof by relay contacts PHK*b* which are operated by a relay PHK. It will be recalled that the relay PHK is energized in response to a BOWLER ID LANE ONE AND READY signal and additionally closes the normally open contacts PHK*a* for preventing the changing of bowler identification until the second ball in a frame has been rolled and the resulting computation completed.

It will be noted that the just described arrangement permits a bowler to roll a second ball in a frame whether or not the computer has digested the first ball information. For example, then it is necessary to roll a second ball in a frame in a conventional bowling game, standing pins will remain in the lane after the first ball. Accordingly, the scissor switch 1238 will retrigger the pinsetter at 280° and it will proceed to 360° in the manner just described. If the first ball information has been utilized by the computer, no problem exists. However, if it has not, precaution must be taken to preclude destruction of the first ball information in the pinfall buffers by the resetting thereof which will occur at 105° of the second ball cycle.

Since the first ball information has not been used, the flip-flop 730–1 of the scanning cycle control (FIG. 23B) will still be set in response to the operation of the pinfall ready circuitry. Accordingly, the relay TLK will be deenergized and the controls TLK*a* will be open to preclude triggering of the pinsetter. As a result, the rolling of the second ball will merely cause the pinsetter rake to drop without cycling the pinsetter. When the first ball information has been digested as evidenced by the resetting of the flip-flop 730–1, the relay TLK will be energized to close the contacts TLK*a* thereby triggering the pinsetter. This feature of the invention permits a bowler to roll both balls in a frame without possible delay caused by the computer during a computation cycle.

6. New Pins Solenoid

The Model A–2 pinsetter is additionally modified to include a solenoid actuator that is arranged with respect to the mechanism such that whenever the solenoid is pulsed, the pinsetter will be switched to a second ball cycle. The specific arrangement of such a solenoid in the pinsetter is shown in FIG.

16 of U.S. Pat. No. 3,153,538 issued to A. P. Rogers. The new pin solenoid as shown by Rogers is numbered 285. Thus, reference hereinafter to a new pin solenoid R285 will be understood to refer to the just-mentioned construction disclosed by Rogers.

7. Manual Cycling Of Pinsetter

An unmodified Brunswick Model A–2 pinsetter includes a switch that may be manually manipulated to cause cycling of the pinsetter in four situations. These situations are (1) when a new set of pins is desired because the pins just delivered by the machine are off spot or one has fallen over, (2) to spot a new set of pins upon the occurrence of a first ball foul, (3) to spot a new set of pins in certain 10th frame situations, and (4) when the pinsetter fails to trigger in the normal manner by the striking of a ball against the pincushion.

As will be seen, the instant invention provides means for automatically cycling the pinsetter to accommodate situations two and three above. However, it is still necessary to manually recycle the pinsetter when either of situations one or four above occur. In the case of situation one above, it will be obvious to those skilled in the art that the pinfall-ready circuitry described above will cause reading of the pinfall obtained by the lane when the pinsetter is cycled. It will also be apparent that when a new set of pins is desired because the previously set pins are off spot or one or more of the pins has fallen over, that the computer should not utilize information made available to it by the pin detecting means of the pinsetter when the latter is cycled solely for the purpose of obtaining a new set of pins. Thus, it is necessary to provide means for preventing the setting of the flip-flop 730 in the scanning cycle control (FIG. 23B) associated with the pinsetter to by cycled in such a situation which would cause initiation of a computer operation. However, when the pinsetter fails to trigger in the normal manner, it will be apparent that the pinfall should be determined and a scoring operation should result. Thus, the unmodified cycle switch which is designated CP2 in the above-referred-to service manual is retained. As seen in FIG. 34, the standard cycle switch is designated SMCP2. The switch SMCP2 may be operated to cause cycling of the pinsetter when the machine fails to trigger. The sides of the switch SMCP2 are connected to the usual terminals SMCN2–A and SMCN2–B in the pinsetter wiring. A second switch, generally designated 1257, is provided to accommodate recycling of the pinsetter in situation one above. The switch 1257 includes a first switch **1257*a* that is ganged with a second switch 1257*b*. Both are maintained in a normally open position. The switch 1257*b* is connected to the terminals SMCN2–A and SMCN2–B in the same manner as the switch SMCP2. The switch 1257*a* is connected in series with a relay CNPK and a power source. Thus, when the switch 1257 is closed to cause the recycling of the pinsetter without the initiation of a scoring operation by the computer, the switch 1257*b* will cause the pinsetter to cycle in the normal manner while the switch 1257*a*** will energize the relay CNPK. The relay CNPK operates normally closed contacts CNPK*a* associated with the switches 1220 and 1222 and the relay PRK. Thus, when the relay CNPK is energized, the contact CNPK*a* will be opened such that the relay PRK cannot be energized and the flip-flop 730–1 of the scanning cycle control will not be set. The relay CNPK additionally operates a pair of normally open contacts CNPK*b* which operate as a holding circuit for the relay CNPK. The contacts CNPK*b* are connected to the normally closed contact of a 350° switch 1256 which is arranged to be opened at 350° of the pinsetter cycle. The other side of the switch 1256 is connected to a source of power. Thus, when the switch 1257 is depressed to energize a relay CNPK*a* through the switch **1257*a***, the holding circuit formed by the contacts CNPK*b* and the 350° switch 1257 will maintain the relay CNPK energized and the contacts CNPK*a* opened until the pinsetter has gone through 250° of its cycle. Since the relay PRK can only be energized to ultimately cause the flip-flop 730–1 of the scanning cycle control (FIG. 23B) to be set at 105° of the pinsetter cycle due to the arrangement of the 105° switch 1220, it will be apparent that a pinsetter cycle initiated by the depression of the switch 1257 cannot cause the flip-flop 730–1 to be set.

While the primary purpose of the switch 1257 has been described as providing a new set of pins without causing the initiation of a scoring operation by the computer, it may also be used to provide a secondary function. In the event of a power failure in either the computer or the pinsetter or a malfunction in the computer, or as a possible consequence of the use of the pinsetter without the computer and the subsequent energization of the computer for use with the pinsetter, the pinsetter may be in a second ball cycle when the computer logic indicates that scoring should proceed on a first ball basis or vice versa. In such a situation, the computer and the pinsetter may be out of phase with each other. In order to place the computer and the pinsetter back in synchronization with each other, the switch 1257 may be used to cycle the pinsetter without initiating a computer operation.

8. Third Ball—Tenth Frame Pinsetter Cycling

As will be apparent from Table 1, bowler states nine and 10 are common to the third ball in the 10th frame. In the case of state nine, the first ball in the 10th frame will have been a strike and accordingly, the second ball in a 10th frame in such a situation will cause the pinsetter to go through a first ball cycle in the normal manner. The third ball in the 10th frame in such a situation will cause the pinsetter to go through a normal second ball cycle such that upon completion of the scoring thereof, the pinsetter will automatically set new pins for the next bowler. Accordingly, when a bowler is in state nine, there is no need to provide for cycling of the pinsetter.

However, since state 10 is defined as the third ball in a 10th frame following two strikes or a spare in the 10th frame, it will be apparent that the pinsetter would normally treat the third ball in the 10th frame in a state 10 situation as a first ball and, in the event a strike was not obtained on that ball, the pinsetter would leave standing pins remaining on the lane even though the bowler has completed his game. Accordingly, means are provided for cycling the pinsetter in a state 10 situation such that the pinsetter will undergo a second ball cycle for the third ball in the 10th frame. Specifically, the delay multivibrator 1260 (See FIG. 34) is adapted to receive a STATE TEN signal from the bowler state decoding matrix. The STATE TEN signal is received upon the completion of the bowler's scoring cycle following the second ball in the 10th frame. In other words, the state 10 signal is the updated state and is used to trip the delay multivibrator 1260 as soon as it is formed. The output of the delay multivibrator 1260 is utilized as an input by an AND gate 1262 together with a SCORE LANE ONE signal. The output of the delay multivibrator 1260 is termed a RECYCLE PINSETTER signal and is utilized as an input to similar AND gates 1262 for lanes 2—4. When both the SCORE LANE ONE and RECYCLE PINSETTER signals are present at the AND gate 1262, a game over relay GOK will be energized. The energization of the game over relay GOK causes the closing of normally open contacts GOK*a* which provide a holding circuit for the game over relay GOK through the normally closed contact of the 1050 switch 1220. The energization of the game over relay GOK additionally causes the closing of contacts GOK*b* which are connected to the normally open side of the 350° switch 1256. When the pinsetter reaches the 350° point in a cycle, power will be supplied through 350° the switch 1256, and the contacts GOK*b* to a four cycle relay FCK. The relay FCK when energized is adapted to close normally open contacts FCK*a* which are placed in series with a new pin solenoid relay NPSK across the terminals SMTS2–9 and SMTS2–4 of the pinsetter wiring. The arrangement is such that when the foul cycle relay FCK is energized through the contacts GOK*b* and the 350° switch 1256, the new pin solenoid relay NPSK will be energized to close a pair of normally open contacts NPSK*a* and NPSK*b*. The contacts NPSK*a* and NPSK*b* are connected in series with the new pin solenoid R285 across a source of power and it will be apparent that when the new pin solenoid relay NPSK is energized, the new pin solenoid R285 will be energized. This will occur at 350° of the pinsetter cycle due to the presence of the switch 1256 in the circuitry and will cause the pinsetter to ready itself to undergo a second ball cycle when the next ball is rolled. Since the just described operation takes place after the rolling of the second ball in the 10th frame during a state 10 situation, it will be apparent that when the third ball is rolled in the 10th frame, the pinsetter will undergo a normal second ball cycle and thereby spot a new set of pins at the usual point in a second ball cycle in readiness for the next bowler.

9. Resetting of the Pinfall Buffers Prior to a Subsequent Bowler

As mentioned previously in conjunction with the description of the pinfall buffers, it is desirable to cause resetting thereof near the completion of a second ball cycle of the pinsetter such that the pin position lamps L1—L10 will be extinguished before the next bowler is ready to bowl. Since a Model A–2 pinsetter includes a first ball-second ball switch, the position of such a switch may be used to permit the issuing of the RESET PINFALL BUFFERS signal only after the second ball in a frame. Specifically, a second ball relay 2BK is connected across terminals SMTS2—8 and SMTS2—9 of the pinsetter wiring such that the relay 2BK will be energized whenever the first ball-second ball switch of the pinsetter is in a position corresponding to a second ball situation. In a Model A–2 pinsetter, the first ball-second ball switch is in the second ball position from about 270° of a first ball cycle to about 180° of a second ball cycle. When the relay 2BK is energized by the first ball-second ball switch, it will open contacts 2BK*c*. The contacts 2BK*c* are connected in series with the normally open contact of the 350° switch 1256 and the OR gate 201 (FIG. 6). Thus, it will be apparent that at 350° of a first ball cycle, the contacts 2BK*c* will be opened due to the energization of the second ball relay 2BK and cannot provide a RESET PINFALL BUFFERS signal to the OR gate 201. However, at 350° of a second ball cycle, the switch 1256 will be closed as will be the contacts 2BK*c* due to the deenergization of the second ball relay 2BK and the resultant RESET PINFALL BUFFERS signal will be fed to the OR gate 201 to cause each of the pinfall buffers PB1—PB10 (FIG. 6) to be reset thereby extinguishing the lamps L1—L10 such that they will not be lit when the subsequent bowler begins a frame.

W. Foul Detection and Verification System

The instant invention makes use of conventional automatic foul detecting equipment such as that marketed by the Brunswick Corporation under the trademark "Telefoul." Typically, such foul detecting equipment includes a switch such as that shown at FDS in FIG. 34 which is momentarily closed when a foul is detected. One side of the switch FDS is connected to one side of a source of power. The other side of the switch FDS is connected through normally open contacts 2BK*b* of the second ball relay 2BK and a foul rake control relay FRCK to ground. Additionally, the same side of the switch FDS is connected through a 90°—330° switch 1270 which is closed by the pinsetter at 90° and 330° of each pinsetter cycle and the foul cycle relay FCK to ground. A relay PLK is connected in series with a source of power and the switch FDS. Thus, when the switch FDS is closed, the relay PLK will be energized to open its normally closed contacts PLK*b* which, it will be recalled, are interposed between ground, the relay contacts 734–1 and the AND gate 732–1 of the scanning cycle control (FIG. 23B). Accordingly, the flip-flop 730–1 of the scanning cycle control cannot be set by the closing of the contacts 734–1 when a foul has been detected as the contacts PLK*b* are opened by the energization of the relay PLK. Additionally, normally open contacts PLK*a* will be closed to provide a holding circuit for the relay PLK through a switch NF*a* and the 350° switch 1252.

If a BOWLER ID LANE ONE signal is issued by the bowler panel in response to the depression of one of the switches associated therewith, a foul indicating lamp FL1 will be lit through the circuit path from the bowler panel and the switch FDS to a source of power. Similarly, a foul-no foul relay FNFK and a relay TFK will be energized through the same path.

The energization of the relay TFK closes contacts TFK*a* to establish a holding circuit for the relays PLK, FNFK and TFK through the normally closed contact of a no foul switch NF*a* and the normally closed contact of the 350° switch 1256. The lamp FL1 is maintained in an illuminated condition by the same holding circuit.

The energization of the foul-no foul relay FNFK is operative to open the normally closed contacts FNFK*b* which normally connect the common side of the pin detecting switches PS1—PS10 (FIG. 6) to ground. However, the common side of such pin detecting switches are still connected to ground through the normally closed contact of a foul switch F*a*.

The no foul switch NF*a* is ganged with a second switch NF*b* while the foul switch F*a* is ganged with a second switch F*b*. The purpose of the switches NF*b* and F*b* will appear hereinafter. The no foul switches NF*a* and NF*b* are arranged on the bowler panel as are the foul switches F*a* and F*b*.

When the automatic foul detecting system detects a foul and closes the switch FDS, the computer will not automatically disregard the pinfall, if any, achieved, as being obtained by a foul ball. Rather, the computer will disregard the happenings entirely as the energization of the relay PLK in the manner just described will have opened the contacts PLK*b* to prevent the lane one pinfall ready flip-flop 730–1 from being set. Thus, the no foul switches NF or the foul switches F may be manually operated by a bowler or a referee to verify the occurrence or nonoccurrence of a foul. In other words, the foul switches F and the no foul switches NF provide a manual check on the foul detection system and their operation may be assigned to a referee or the like. It will be noted that manipulation of the switches F and NF when a foul has not been detected as evidenced by the closing of the switch FDS will be ineffectual as the relays PLK, FNFK and TFK all require the closing of the switch FDS as a preliminary condition of their energization. Thus, a ball cannot inadvertently be scored as a foul ball unless a foul has, in fact, been detected.

If the switch FDS was momentarily closed by the foul detecting system, the foul lamp FL1 together with the relays PLK, FNFK and TFK will be illuminated and energized, respectively, and will be maintained in such a condition through the holding circuit previously mentioned. In the event a bowler or a referee makes a decision that no foul was in fact committed, the depression of a pushbutton associated with the no foul switches NF will cause the holding circuit to be broken by virtue of the opening of the switch NF*a*. Since the switch FDS will have been closed only momentarily, it will be apparent that the interruption of the holding circuit by the opening of the switch NF*a* will deenergize the relay PLK thus permitting the contacts PLK*b* to be closed and the flip-flop 730–1 will be permitted to be set in the normal manner such that the computer will eventually score the pinfall.

In the event a bowler or a referee decides that a foul has, in fact, been committed, he will depress a pushbutton associated with the foul switch F. This will cause the foul switch F*a* to be closed through its normally open contact and will disconnect the common side of the pin switches PS1—PS10 from ground such that when the computer ultimately reads the pinfall, all pins will be read as standing as described with reference to the pinfall buffers. This operation is caused by the presence of a resistor 1270 connected between a source of power and the normally closed contact of the foul switch F*a*. As will be apparent to those skilled in the art, when the switch F*a* is no longer closed between its normally closed position, the potential at the normally closed contact thereof will go to that of the power source.

The junction of the normally closed contact of the switch F*a* and the resistor 1270 is connected through the normally open contacts 2BK*a* to the NAND gate 200 (FIG. 6) to issue the SECOND BALL FOUL signal which, it will be recalled, precludes the resetting of the pinfall buffers, such that first ball pinfall information is retained therein and credited to the bowler. The SECOND BALL FOUL signal will be issued due to the change in potential at the junction and the closed position of the normally contacts 2BK*a* due to the energization of the second ball relay 2BK during the portions of the first and second ball cycles of the pinsetter as noted above.

The closing of the switch F*a* through its normally open contact will additionally cause the setting of the foul memory flip-flop 740–1 of the scanning cycle control. This is due to the closing of the normally open relay contact 742–1 by the energization of the relay TFK. It will be recalled that the setting of the flip-flop 740–1 in response to a verified foul will cause the associated pinfall ready flip-flop 730 to be set independently of the usual path through the AND gate 732–1. Accordingly, when the scanning cycle control detects that the flip-flop 730–1 is set, it will proceed to score the bowler in a proper manner for a foul as previously described.

Once energized by the momentary closing of the switch FDS, the relays PLK, FNFK and TFK will be energized until either the no foul switch NF is depressed to open the switch NF*a* or the pinsetter has proceeded through 350° of the cycle thereby opening the 350° switch 1256 with respect to its normally closed contact and closing it through its normally open contact in the manner previously mentioned. In the case of a second ball foul, the relays FNFK and TFK are deenergized when the BOWLER ID LANE ONE signal is removed.

X. Relation of the Foul System to the Pinsetter

It will be recalled from the discussion of pinsetter triggering that the normal path of triggering the modified pinsetter at 0° includes the normally closed contacts FNFK*b* operated by the foul-no foul relay FNFK. Since the mere detection of a foul energizes the foul-no foul relay FNFK in the manner described above, the pinsetter cannot be triggered through the usual path. Accordingly, it will be disabled and will remain disabled until either the foul switch F or the no foul switch NF is depressed. In order to provide triggering when either of the two switches NF or F are depressed, the switches NF*b* and F*b* are arranged in parallel and have a common connection to the terminal SMTD1–17. The normally open contacts of the switches NF*b* and F*b* are connected in common and in series with the normally contacts TFK*c* to the terminal SMTD1–16. It will be recalled that when a foul has been detected, the relay TFK is energized. Accordingly, the normally open contacts TFK*c* will be closed and the depression of the pushbuttons associated with either the switch NF*b* or the switch F*b* will effectively shunt the terminals SMTD1–16 and SMTD1–17 to trigger the pinsetter without a time delay. Accordingly, the pinsetter will proceed through the cycle to 270° where it will stop as, in a manner to be described hereinafter, the lane will have been cleared of standing pins in response to the occurrence of a foul such that the scissors switch 1238 will not operate to trigger the pinsetter at 270°. Similarly, the pinsetter may not be triggered through the relay contacts RCK*a* as the relay RCK will have been deenergized by the presence of a BOWLER ID LANE ONE and PINFALL READY signal. Furthermore, it may not be a 10th frame situation such that the pinsetter cannot be triggered through the relay contacts SRCK*a*. Accordingly, normally open relay contacts FRCK*a* operated by a foul rake control relay FRCK are placed in series with the 270° switch 1251 across the terminals SMTD1–17 and SMTD1–16. The relay FRCK is connected through normally open contacts 2BK*b* to the holding circuit provided by the switch NF*a* and the 350° switch 1252. Accordingly, if it is not a second ball situation, the relay FRCK will be energized to close the contacts FRCK*a* to thereby trigger the machine without a time delay through those contacts and the 270° switch 1251. In the event the foul is committed on the second ball, the pinsetter will remain stopped at 270° awaiting the depression of a pushbutton on the bowler panel by the next bowler to energize the relay RCK to trigger the pinsetter through the contacts RCK*a*.

As has been noted above, when a first ball foul occurs it is necessary to cycle the pinsetter such that it will spot new pins and be ready for a second ball cycle. This operation is achieved by pulsing the new pin solenoid R285 twice during the respotting cycle. It will be recalled that when a foul is detected and verified, the relay TFK will be maintained energized to provide a holding circuit through the 350° switch 1256, the switch NF*a* and the relay contacts TFK*a*. The 90°—330° switch 1270 is connected into the holding circuit such that when it is closed at 90° of a pinsetter cycle and again at 330° of the pinsetter cycle, it will cause the foul cycle relay FCK to be energized twice in response to each of the closings of the switch 1270. It will be recalled from the discussion of pinsetter recycling in 10th frame situations that the energization of the foul cycle relay will ultimately cause energization of the new pin solenoid R285. Accordingly, the new pin solenoid R285 will be pulsed once at 90° of a pinsetter cycle and again at 330° of a pin cycle. When the new pin solenoid R285 is pulsed at 90° of the cycle, it will cause the pinsetter to spot new pins. When it is pulsed again at 330° of the cycle, it will cause the pinsetter to ready itself to go through a second ball cycle when the next ball is rolled. Accordingly, it will be seen that the foul circuit just described is operative in response to the detection and verification of a first ball foul to cause the pinsetter to spot new pins and prepare itself for a second ball cycle such that when the bowler rolls the second ball in the frame at the newly spotted pins, the pinsetter will automatically treat the ball as a second ball and cycle accordingly whereby new pins will be spotted in readiness for the next bowler.

An examination of the just described circuitry will also show that the new pin solenoid R285 is pulsed twice in response to a detected and verified second ball foul. However, it has been found that such unnecessary pulsing of the new pin solenoid R285 does not preclude the pinsetter from readying itself for a first ball cycle after a second ball foul.

III. SUMMARY OF FUNCTIONS

From the foregoing description it will be apparent to those skilled in the art that we have provided in bowling score keeping system capable of providing virtually entirely automatic score keeping functions for a plurality of bowlers bowling on a plurality of lanes in either open bowling or league competition. The provision in the system for manual bowler and lane sequencing permits bowlers to bowl out of order, permits late bowlers to "catch up" to the other bowlers bowling on the lane or the team and permits two members of the same team to be bowling simultaneously on different lanes. The latter feature distinctly speeds up bowling in league competition while the former features provide the advantage of a flexible sequencing of bowlers such that a bowler who is temporarily indisposed when his turn comes up will not hold up the other bowlers bowling on the lane or the team.

The control of an automatic pinsetter by the system for causing automatic cycling of the pinsetter following a first ball foul or in certain 10th frame situations speeds up the game by insuring that the pinsetter will always undergo a first ball cycle to spot a new set of pins in readiness for the bowler or new game. Furthermore, the pinsetter control provides the advantage of indicating to a bowler that he has failed to utilize the bowler identification system and is arranged to prevent scoring errors when a ball has been rolled in the absence of bowler identification to the computer. Finally, the interrelation between the pinsetter and the bowler panel is such as to permit a bowler to bowl, in rapid succession, two balls in a frame without destroying first ball pinfall information if it has not been used by the computer. It will be appreciated that this feature obviates the possibility of a bowler having to wait for the computer to complete processing of the first ball information before he may roll his second ball.

It will also be appreciated that the bowler identification system effectively precludes the occurrence of more than one bowler identification to the computer on one lane at any given instant. This feature effectively eliminates scoring errors that would obviously result where more than one bowler identification was present at a given time.

The printer position control provided by the bowler identification system provides the distinct advantage of printer positioning generally independently of the computer such that computer time is not wasted in readying the printer to print when a new bowler is about to bowl. Furthermore, additional computer time is saved by the feature of anticipatory positioning of the printer when the computer senses that another printing operation is to take place before the bowler has completed his frame.

The system also provides the advantage of permitting a pace bowler to bowl with a team in league competition while automatically precluding the score of the pace bowler from being included in the team total.

The error correction system provides the advantage of correcting information contained within the computer such that all scores computed after the error correction, including team totals, will be correct. This feature provides a distinct advantage over prior art systems wherein error correction must be manually entered on a score sheet insofar as the error corrections will be printed on the score sheet. Furthermore, the error correction system design provides the advantage that frame, cumulative score and bowler identification information need only be entered into the computer for the initial error correction operation. Thereafter, only pinfall information need be entered. This provides a significant time savings where an error is not discovered until a bowler has bowled one or more subsequent frames.

The system also provides the advantage of automatically detecting and indicating the occurrence of a "split" in accordance with the definition thereof set forth by the American Bowling Congress. In this respect, the provision of means which not only indicate the pins downed or standing, but additionally provide such information relative to each pin position is of particular significance.

Provision is made for automatic foul detection while permitting manual verification of occurrence of foul by a referee or the like. The foul detection system also includes an interlock such that the foul verification means cannot be operated erroneously or inadvertently insofar as it is disabled unless a foul is detected by the automatic foul detecting means. Finally, the foul detection system is arranged to preclude computation until a decision is made as to whether a foul, in fact, occurred. This feature provides the distinct advantage over certain prior art systems in that it permits any length of time to be used in the course of arriving at a decision and does not force the decision to be made within any given time period.

The provision for stopping the pinsetter and precluding computation by the computer in the case of an "out-of-range" pin permits the correct pinfall to be verified and entered manually by means of the error correction system immediately upon the occurrence of such an out-of-range pin and thereby negates the possibility of erroneous scoring due to out-of-range pins.

An interlock between the computer and pinsetter provides the advantage of indicating to a bowler that computation of the score of a previous bowler is not completed and precludes the destruction of pinfall information relative to the prior bowler by the rolling of a ball by the new bowler. This arrangement is of particular significance when the pin detecting means of an automatic pinsetter is used for ultimately providing the computer with pinfall information.

The computer logic permits the computer to compute score information relative to a single ball rolled by a bowler, compute score information relative to balls rolled by other bowlers and subsequently return to the first bowler to compute further score information for that bowler even though that bowler had not completed a frame by the rolling of the first ball. This permits optimum use of computer time such that a single computer may be used to score a plurality of bowlers bowling on a plurality of lanes.

The system provides for the computation, in league competition, of running team totals for each frame and an end of game team total, all of which are printed and indicated throughout the remainder of the game. This is a significant advantage over prior art systems where counters of the like are used to display the team total as it permits a frame by frame comparison of the totals of two teams such that the trend of the bowling game may be observed. Furthermore, the particular manner in which the team totals are computed permits reflection of error corrections made to the score of an individual bowler bowling on that team as well as indicating all pinfall definitely earned by members of the team through the frame in which the team total is computed. Such team totals additionally include a handicap value, if any, for the team in any frame following the entry of the handicap value. In this respect, the handicap entry is also printed on a score sheet and is entered into the computer using a portion of the error correction system.

The invention also provides the advantage of providing a complete history of pinfall. In this respect, the printed record includes an indication of frame score, first and second ball box scores, the indication of strikes and spares, and indications of splits and fouls, running and end of game totals and the handicap entry. The arrangement is such that the score sheet is laid out in a conventional format.

The fact that but a single computer is used for computing scores on a plurality of lanes permits the use of a single console for housing the computer. This provides an advantage to the proprietor of a bowling lane in the form of a space savings as a single console for a plurality of lanes is required.

The use of a single printer associated with each lane provides an advantage as the single score sheet associated with the printer reflects the scores only of the bowlers bowling on that lane or of a single team bowling on a lane pair. Thus, the printed record of a bowler's game is not combined with printed records of the bowling games of unrelated bowlers. Furthermore, the arrangement conserves computer time as a use of a plurality of printers permits a more rapid readout.

The use of primarily electronic logic provides the advantage that the size of the computer is materially reduced while the speed thereof is greatly increased together with the elimination of many potential trouble sources such as pitted relay contacts, etc.

The provision in the bowler identification system for locking a depressed pushbutton during the period beginning with the first ball cycle of the pinsetter through the end of the frame while permitting the computer to score other lanes provides the advantage of preventing inadvertent or erroneous changing of bowler identification between balls in a frame that could result in erroneous attributing of pinfall to the wrong bowler. Furthermore, the construction of the bowler identification that permits the rolling of a ball when no bowler identification is present, and causes the subsequent attributing of any pinfall achieved by a ball so rolled to the bowler who subsequently identifies himself to the computer provides the distinct advantage over prior art systems of precluding the erroneous crediting of the pinfall to the preceeding bowler.

The arrangement wherein the standing pin lights are turned off just prior to the bowling of a new bowler permits indication of the standing pins remaining after the second ball in a frame while preventing such lights from acting as a distraction for the following bowler.

Finally, the construction permitting the cycling of an automatic pinsetter associated with the computer without initiating computation provides the advantage of correcting synchronization between the pinsetter and the computer or the obtaining of a new set of pins without causing erroneous scoring.

While we have described specific embodiments of our arrangement for exemplification purposes, we do not wish it to be limited to the specific details set forth, but rather, to have the scope of our invention construed as set forth in the following claims.

We claim:

1. In a bowling scoring system, the combination comprising: an automatic pinsetter of the type having at least first and second cycles of operation, the first cycle normally following the second cycle for spotting a new set of pins and the second cycle normally following the first cycle for respotting pins remaining standing following the rolling of the first ball in a frame in a bowling game, and a trigger for initiating operation; means responsive to operation of said pinsetter for detecting pinfall information; foul means for providing information relative to fouls committed in a bowling game; means for receiving said pinfall information and said foul information from both of said means and for computing bowling scores therefrom; first manually operable means, including a manually operable switch, separate from said foul information means for triggering said pinsetter to cause the same to undergo the next succeeding one of the first and second cycles while disabling said detecting means so that a new set of pins may be spotted without providing said receiving and computing means with pinfall information such that an erroneous score would be computed; and second manually operable means, including a manually operable switch, separate from said foul information means for triggering said pinsetter to cause the same to undergo a cycle while enabling said pinfall detecting means so that said pinsetter may be cycled to provide said computing means with pinfall information if said pinsetter fails to trigger through the normal rolling of a ball.

2. The bowling scoring apparatus of claim 1 wherein said pinfall information detecting means comprise means for sensing pinfall information and means for indicating to said receiving and computing means that pinfall information is available for computation; and said first cycling means is operative to disable said indicating means.

3. In a bowling scoring system for computing bowling scores based on pinfall achieved on a plurality of lanes, the combination of: a plurality of automatic pinsetters, one for each of said plurality of lanes; a plurality of pinfall detecting means, one for each of said plurality of lanes, each of said pinfall detecting means being arranged with respect to its corresponding pinsetter so as to detect pinfall during each cycle of its corresponding pinsetter; a single computation means for receiving pinfall information from each of said pinfall detecting means and for computing bowling scores therefrom; means operative in response to the first ball in a frame on any of said lanes for preventing the corresponding pinsetter from initiating a subsequent cycle while permitting completion of the current cycle; and means responsive to the utilization of pinfall information relative to said first ball by said computation means for disabling said preventing means whereby a bowler may bowl two balls in a frame in quick succession without having the first ball pinfall information destroyed by the cycling of the pinsetter in response to the second ball in the frame or having to wait for completion of computation by said computation means.

4. The bowling scoring system of claim 3 wherein each said pinsetter includes a movable rake and is arranged to cause said rake to move to a lane blocking position independently of said preventing means.

5. The bowling scoring system of claim 3 including a plurality of buffer means, one for each lane, for storing pinfall information for subsequent utilization by said computation means, and means responsive to the cycling of the associated pinsetter for loading pinfall information from the corresponding one of said pinfall detecting means into a corresponding buffer means.

6. In a bowling scoring system for computing bowling scores bowled by a plurality of bowlers on a plurality of lanes, the combination comprising: a plurality of automatic pinsetters, one for each lane, and having a rake movable to and from a lane blocking position; means associated with each pinsetter for detecting pinfall; manually operable bowler identification means for each lane for associating pinfall information with the bowler to whom it relates; a single computing means common to all of said lanes and responsive to said manually operable means for each of said lanes for receiving pinfall information from all of said detecting means and for computing bowling scores; a plurality of printers, one for each lane for receiving a computed score from said receiving and computing means and positionable to print the score of each bowler bowling on the associated lane at a different location on a score sheet; means responsive to the corresponding one of said manually operable means for controlling the positioning of the associated printer relative to said different location; means for causing each pinsetter to stop with its rake in said lane blocking position at the completion of a frame by a bowler on the associated lane; and means responsive to operation of the associated manually operable means for causing each of said pinsetter to move said rake from said lane blocking position.

7. The bowling scoring system of claim 6 further including a single means selectively operable to correct an erroneous bowling score computed by said receiving and computing means or to enter a handicap value into a computed score if some of said bowlers are bowling as a team.

8. The bowling scoring system of claim 6 further including means on each lane for detecting the occurrence of a foul; means responsive to said foul detecting means for disabling the associated pinsetter while permitting the rake thereof to move to said lane blocking position; means operable only in response to said foul detecting means for manually verifying the occurrence of a foul detected by said foul detecting means; and means responsive to operation of said verification means for enabling said associated pinsetter.

9. The bowling scoring system of claim 6 wherein each said manually operable means comprises means movable to a plurality of unique positions, each unique position corresponding to a bowler on the associated lane; means operable in response to operation of said movable means by a bowler for thereafter precluding further operation thereof by a bowler; and means responsive to the completion of a frame by a bowler for disabling said precluding means.

10. The bowling scoring system of claim 6 wherein each said pinfall detecting means comprises means for sensing pinfall and means for providing an indication that pinfall information is available; said receiving and computing means being operable with respect to pinfall information from any given pinfall sensing means only in response to said indication that pinfall information is available.

11. The bowling scoring system of claim 10 including means for disabling said indicating means when a standing pin is out of the range of said pinfall sensing means.

12. The bowling scoring system of claim 10 including means responsive to said indication from one of said pin detecting means for disabling the corresponding pinsetter; and means responsive to the utilization of said pinfall information by said receiving and computing means for precluding operation of said disabling means.

13. The bowling scoring system of claim 10 further including means for simultaneously disabling any one of said indicating means and cycling the associated pinsetter.